United States Patent
Dahm et al.

(10) Patent No.: US 11,538,110 B1
(45) Date of Patent: *Dec. 27, 2022

(54) COMMUNICATION SYSTEM AND METHOD FOR COMMUNICATION BETWEEN A RETIREMENT PLAN ADMINISTRATOR AND A NEW PARTICIPANT

(71) Applicant: The PNC Financial Services Group, Inc., Pittsburgh, PA (US)

(72) Inventors: Matt Dahm, Chagrin Falls, OH (US); Sherri Painter, Evans City, PA (US); Anna C. Shade, Kalamazoo, MI (US); Elizabeth Read Arnold Spenko, Chicago, IL (US); Ryan Edward Sievert, Chicago, IL (US); Jordi Parra Ferrero, Stockholm (SE); Maria Julia Da Silva Benini, Chicago, IL (US); Momo Miyazaki, Chicago, IL (US); Simon King, Chicago, IL (US); Rebecca Marie Hornbuckle, Boston, MA (US); Burton Michael Rast, Chicago, IL (US); Mary Beth Foyder, Chicago, IL (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 335 days.

This patent is subject to a terminal disclaimer.

(21) Appl. No.: 14/813,230

(22) Filed: Jul. 30, 2015

Related U.S. Application Data

(60) Provisional application No. 62/032,012, filed on Aug. 1, 2014, provisional application No. 62/032,038, filed
(Continued)

(51) Int. Cl.
*G06Q 40/06* (2012.01)

(52) U.S. Cl.
CPC ................... *G06Q 40/06* (2013.01)

(58) Field of Classification Search
CPC ........ G06Q 40/06; G06Q 40/00; G06Q 40/04; G06Q 4/02; G06Q 40/025
(Continued)

(56) References Cited

U.S. PATENT DOCUMENTS 5,918,217 A   6/1999   Maggioncalda et al.
6,064,984 A   5/2000   Ferguson et al.
(Continued)

OTHER PUBLICATIONS

PR Newswire Association, Aon Hewitt Survey Finds Most Companies are Improving Automatic Features in 401 (k) Plans to Help Workers Increase their Savings, Jan. 21, 2015, PR Newswire Association LLC, Lincolnshire, Illinois / Wire Feed, 2 pages/Aon plc. (Year: 2015).*

(Continued)

*Primary Examiner* — Benjamin S Brindley
(74) *Attorney, Agent, or Firm* — Buchanan Ingersoll & Rooney PC

(57) ABSTRACT

An apparatus and method for administering and/or managing an employer sponsored retirement plan such as a 401(k) plan can include a host system that supports a graphical user interface (GUI) that is displayable to a user communicating with the host system via a user computer device. The use can manipulate one or more input devices connected to the user's computer device for facilitating the communication of data to the host system and updating of displays of the GUI. The GUI can be configured to permit employee participants to enroll and manage their retirement accounts. The GUI can also be configured for employers that sponsor a retirement plan to communicate with the host system to manage their retirement plan and oversee administration of the plan. Displays of the GUI can be generated and updated by a user
(Continued)

computer device display based on communications with the host system.

12 Claims, 61 Drawing Sheets

Related U.S. Application Data on Aug. 1, 2014, provisional application No. 62/032,054, filed on Aug. 1, 2014, provisional application No. 62/032,005, filed on Aug. 1, 2014, provisional application No. 62/032,074, filed on Aug. 1, 2014.

(58) Field of Classification Search
USPC .................................................. 705/36 R
See application file for complete search history.

(56) References Cited

U.S. PATENT DOCUMENTS

| | | | |
|---|---|---|---|
| 7,305,347 B1 | 12/2007 | Joao | |
| 7,383,218 B1 | 6/2008 | Oros | |
| 7,634,436 B1 | 12/2009 | Wagner | |
| 7,797,211 B1 | 9/2010 | Reeth, II et al. | |
| 7,840,470 B2 | 11/2010 | Robinson | |
| 7,917,415 B1 | 3/2011 | Petruzzi | |
| 7,962,394 B2 | 6/2011 | Wagner | |
| 8,103,566 B1 | 1/2012 | Petruzzi | |
| 8,229,806 B1* | 7/2012 | Chapman | G06Q 40/12 705/30 |
| 8,423,444 B1* | 4/2013 | Mackrell | G06Q 40/06 705/36 R |
| 8,429,051 B1 | 4/2013 | Samson | |
| 8,429,052 B2 | 4/2013 | Herr et al. | |
| 8,521,633 B2 | 8/2013 | Scott et al. | |
| 8,639,622 B1* | 1/2014 | Moore | G06Q 20/227 705/42 |
| 8,725,603 B1* | 5/2014 | Harman | G06Q 40/10 705/30 |
| 8,732,057 B1 | 5/2014 | Becker et al. | |
| 8,930,217 B2 | 1/2015 | Feinschreiber et al. | |
| 2005/0102154 A1 | 5/2005 | Dodd et al. | |
| 2007/0011089 A1 | 1/2007 | DeSchryver | |
| 2007/0061237 A1 | 3/2007 | Merton et al. | |
| 2008/0154792 A1* | 6/2008 | Maggioncalda | G06Q 40/02 705/36 R |
| 2010/0094778 A1 | 4/2010 | Wagner | |
| 2010/0100470 A1 | 4/2010 | Buchanan | |
| 2010/0153298 A1 | 6/2010 | Fulshaw | |
| 2010/0299160 A1 | 11/2010 | Roscoe et al. | |
| 2011/0087985 A1* | 4/2011 | Buchanan | G06Q 40/04 715/771 |
| 2011/0246393 A1* | 10/2011 | Wagner | G06Q 40/02 705/36 R |
| 2011/0283188 A1* | 11/2011 | Farrenkopf | G06F 3/0488 715/833 |
| 2012/0016812 A1* | 1/2012 | Frain | G06Q 40/06 705/36 R |
| 2012/0215718 A1 | 8/2012 | Sitaram | |
| 2012/0290504 A1* | 11/2012 | Mercier | G06Q 40/08 705/36 R |
| 2013/0103580 A1* | 4/2013 | Ventura | G06Q 40/12 705/40 |
| 2013/0282542 A1* | 10/2013 | White | G06Q 40/00 705/35 |
| 2013/0318007 A1 | 11/2013 | Van Harlow et al. | |
| 2013/0325752 A1 | 12/2013 | Kmak et al. | |
| 2014/0006050 A1 | 1/2014 | Feinschreiber et al. | |
| 2014/0058976 A1 | 2/2014 | Goodrich et al. | |
| 2014/0067714 A1 | 3/2014 | Melton et al. | |
| 2014/0143175 A1 | 5/2014 | Greenshields et al. | |
| 2014/0279701 A1* | 9/2014 | Farrow | G06Q 40/06 705/36 R |
| 2014/0304147 A1* | 10/2014 | Wolff | G06Q 30/02 705/39 |
| 2014/0379611 A1 | 12/2014 | Goldman | |
| 2015/0095265 A1 | 4/2015 | Feinendegen et al. | |
| 2015/0213472 A1 | 7/2015 | Raikula | |

OTHER PUBLICATIONS

Non-Final Office Action dated Apr. 16, 2021 for U.S. Appl. No. 14/813,186 (49 pages).
Non-Final Office Action dated Apr. 28, 2021 for U.S. Appl. No. 14/813,219 (49 pages).

* cited by examiner

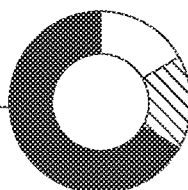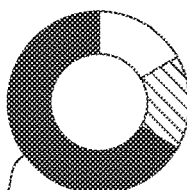
FIG. 24C

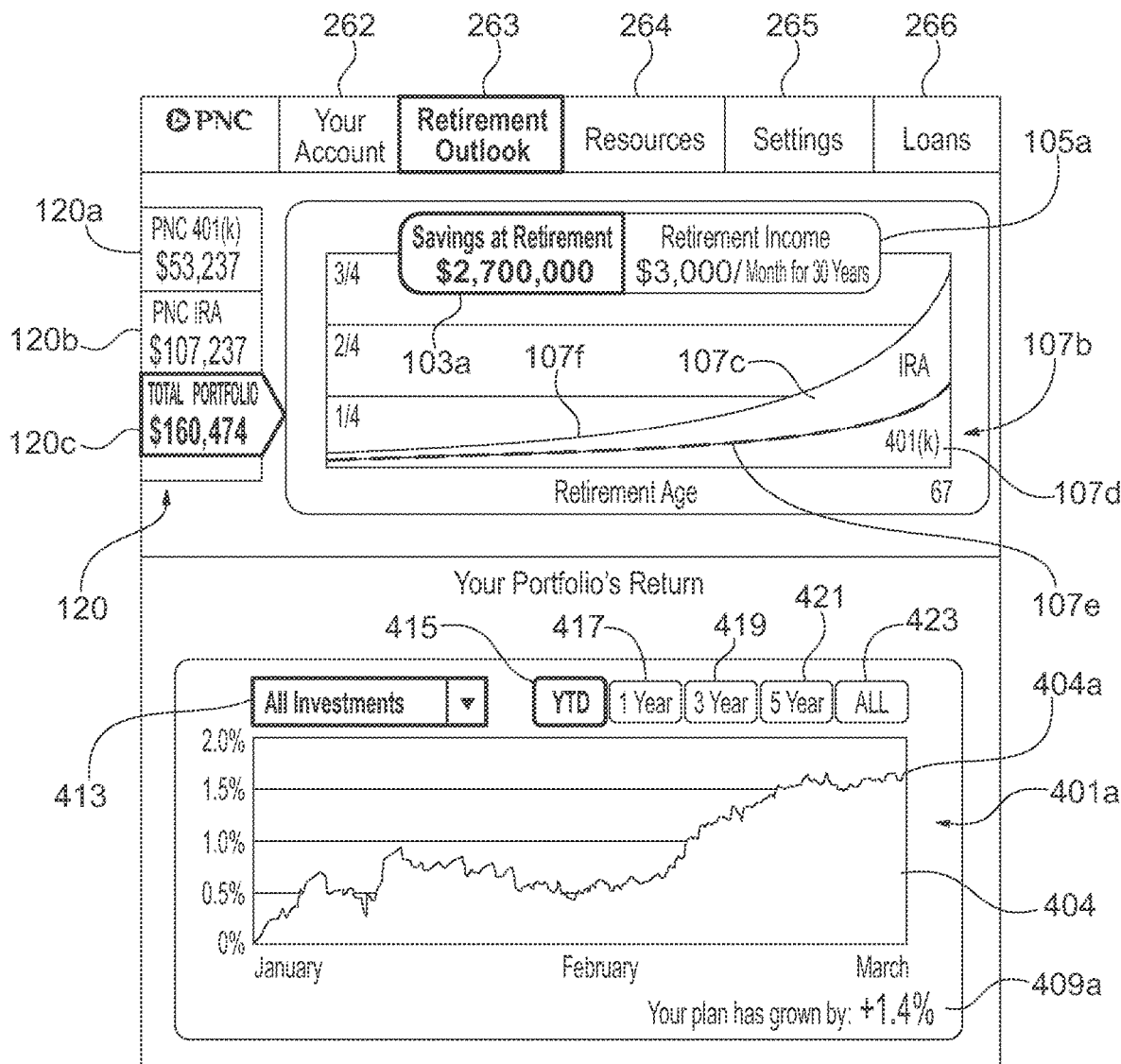
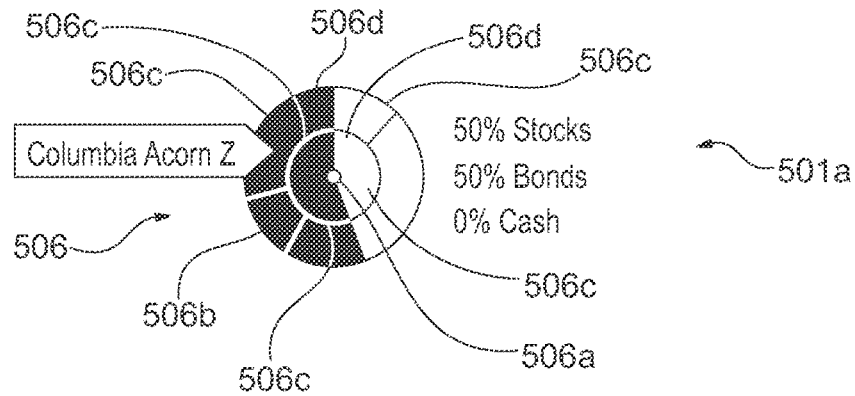
FIG. 33

FIG. 39

PNC

| Dash Board | Plan Health | Plan Level Reports | Reports Center | Fund Information | Participant Reports | Access Participant Site | Maintenance | Notifications |

Prototype Employees 401(k) Plan                                    Calendar   Access Another Plan   Log Out

[ Current Day Market Value ($) ]   [ Plan Rate of Return (%) ]

856 — *Sponsor Overview*

| Upload to PNC | Urgent To Dos | To Dos By Category | Calendar of Events |

☑ All  ☑ Payroll  ☑ Government Stuff  ☑ Administration

« January 2015 »

| M | T | W | Th | F |
|---|---|---|----|---|
| 20<br>Discrimination Testing Due<br>Your 4th Quarter Reports... | 21<br>Upload Payroll | 22 | 23 | 24 |
| 27 | 28 | 29 | 30 | Feb 1 |
| 4 | 5<br>Upload Payroll | 6 | 7 | 8 |
| 11 | 12 | 13 | 14 | 15 |

⊙PNC

| Dash Board | Plan Health | Plan Level Reports | Reports Center | Fund Information | Participant Reports | Access Participant Site | Maintenance | Notifications |

Prototype Employees 401(k) Plan                                              Calendar   Access Another Plan   Log Out

[ Current Day Market Value ($) ]   [ Plan Rate of Return (%) ]

824 — Sponsor Overview

| Upload to PNC | Urgent To Dos ○ | To Dos By Category | Calendar of Events |

Upload Type: Payroll + Employee Info                                Edit
Upload File                                                          Edit 826 — File will be sent separately by secure transmission
Comments
This file is for Division X Funding Method
828 — ● Debit from PNC Bank
   Checking Account: [      ]
○ ACH
○ Wire
○ Check Money Type
830 — Pay Period Ending: [     📅]

Employee Deferral 401(k) Contributions:      [ $        ]
*Pre-Tax*
Employee Contributions:                      [ $        ]
*After-Tax*
Roth 401(k) Contributions:                   [ $        ]
*After-Tax*
Employer Match Contributions:                [ $        ]
Employee Loan Repayments:                    [ $        ]
Employer Profit Sharing Contributions:       [ $        ]
                                             [ $        ]
Total Rollovers:                             [ $        ]
Other: [        ]                            [ $        ]
Funding From Liquicdated Forfeiture Accounts: - [ $     ]
*Reduce contributions (-)*

Total Amount of Funding Will Be:         [ $        ] — 836

[ Complete Upload ]

FIG. 44

◉ Debit from PNC Bank

Checking Account: _____

◉ ACH
○ Option 1
○ Option 2

Receiving Financial Institution: PNC Bank
ABA: #xxxxxx
Account Number: #xxxxxxxxxx
(ACA Test Plan)

◉ Wire

Receiving Financial Institution: PNC Bank
ABA: #xxxxxx
Credit Account Number: #xxxxxxxxxx
Further Credit To: (ACA Test Plan)
Attention: Vested Interest Contributions ◉ Check Payable to PNC Bank, Trustee for (ACA Test Plan)

FIG. 45

PNC

Dash Board | Plan Health | Plan Level Reports | Reports Center | Fund Information | Participant Reports | Access Participant Site | Maintenance | Notifications Prototype Employees 401(k) Plan — Calendar | Access Another Plan | Log Out

[ Current Day Market Value ($) ] [ Plan Rate of Return (%) ]

824 — *Sponsor Overview*

| Upload to PNC | Urgent To Dos ○ | To Dos By Category | Calendar of Events |

844 — An error occurred. Please update and resubmit.

Upload Type: Payroll — Edit
Upload File — Edit
File will be sent separately by secure transmission
Comments
*This file is for Division X*
Funding Method 844 — ● Debit from PNC Bank
 Checking Account: [ ]
This is not a valid checking account.
○ ACH
○ Wire
○ Check Money Type Pay Period Ending: [ 📅 ]

| Employee Deferral 401(k) Contributions: | $ |
| *Pre-Tax* | |
| Employee Contributions: | $ |
| *After-Tax* | |
| Roth 401(k) Contributions: | $ |
| *After-Tax* | |
| Employer Match Contributions: | $ |
| Employee Loan Repayments: | $ |
| Employer Profit Sharing Contributions: | $ |
| | $ |
| Total Rollovers: | $ |
| Other: [     ] | $ |
| Funding From Liquidated Forfeiture Accounts: - | $ |
| *Reduce contributions (-)* | |
| Total Amount of Funding Will Be: | $ |

836 — [ Complete Upload ]

FIG. 51

| | PNC | To Do | Employees | Reports | Plan Health | Resources |

| | PARTICIPANT NAME | EMPLOYEE ID | RATE | BALANCE | COMPLETENESS |
|---|---|---|---|---|---|
| ☐ | Brad Pitt | 873-284-22 | 4% | $112,328 | ✓ |
| ☐ | Angelina Jolie | 842-136-46 | 6% | $57,573 | ✓ |
| ☐ | Michael Kane | 925-178-58 | 6% | $187,203 | ✓ |
| ☐ | Julia Roberts | 281-056-81 | 6% | $18,200 | ✓ |
| ☑ | Nicole Kidman | 885-106-61 | -- | -- | ✗ Hasn't Enrolled |
| ☐ | Tom Cruise | 851-064-18 | 6% | $200,128 | ✓ |
| ☑ | Robert Pattinson | 520-581-56 | -- | $112,328 | ✓ |
| ☐ | Paris Hilton | 842-136-46 | 3% | $57,573 | ✓ |
| ☐ | Jennifer Aniston | 185-134-50 | 10% | $187,203 | ✓ |
| ☐ | Robin Williams | 183-136-69 | 12% | $18,200 | ✓ |
| ☐ | Madonna | 175-174-64 | 8% | $200,128 | ✓ |
| ☐ | Katie Holmes | 824-024-66 | 6% | $112,328 | ✓ |
| ☐ | Jennifer Lopez | 186-123-62 | 5% | $112,328 | ✓ |
| ☐ | Britney Spears | 180-381-36 | 5% | $57,573 | ✓ |
| ☑ | Clint Eastwood | 285-850-36 | -- | $187,203 | ✓ |
| ☑ | Victoria Beckham | 820-265-21 | -- | $18,200 | ✓ |
| ☐ | Keanu Reeves | 385-122-29 | 2% | $200,128 | ✓ |
| ☐ | Matt Damon | 215-282-58 | 2% | $112,328 | ✓ |
| ☐ | Johnny Depp | 160-822-85 | 5% | $112,328 | ✓ |
| ☐ | Scarlett Johansson | 166-919-26 | 6% | $57,573 | ✓ |
| ☐ | Lindsay Lohan | 185-286-11 | -- | $187,203 | ✓ |

Showing All 73 Participants

COMMUNICATION SYSTEM AND METHOD FOR COMMUNICATION BETWEEN A RETIREMENT PLAN ADMINISTRATOR AND A NEW PARTICIPANT

CROSS-REFERENCE TO RELATED APPLICATIONS

This application claims priority to U.S. Provisional Patent Application Nos. 62/032,005; 62/032,012; 62/032,038; 62/032,054; and 62/032,074, all filed Aug. 1, 2014, and which are all incorporated herein by reference in their entireties.

The present application is related to concurrently-filed U.S. patent application Ser. No. 14/813,186, entitled "Communication System and Method for Communication Between a Sponsor and an Administrator of a Retirement Plan"; concurrently-filed U.S. patent application Ser. No. 14/813,197, entitled "Communication System and Method for Communication Between an Administrator and a Participant of a Retirement Plan"; concurrently-filed U.S. patent application Ser. No. 14/813,210, entitled "Communication System and Method for Projecting and Establishing a Savings Practice for a Prospective Retirement Plan Participant"; and concurrently-filed U.S. patent application Ser. No. 14/813,219, entitled "Communication System and Method for Communication Between a Participant and an Administrator of a Retirement Plan for Initiating Temporary Cessation to Contributions to a Retirement Plan", which are all incorporated herein by reference in their entireties.

FIELD OF THE INVENTION

The present disclosure is generally directed towards a system and method for management of retirement plans, such as, for example, 401(k) plans, and other systems/methods used by the provider to facilitate management and/or administration of retirement plans and/or management of retirement accounts of participants to such plans.

BACKGROUND OF THE INVENTION

Investments and retirement planning can be complex, and to some, be an unpleasant experience. This may be especially so for newly hired employees with whom investing and retirement planning is uncharted territory. For instance, many new employees can be cash-strapped, ineligible to invest, and/or too busy or unsophisticated to compile and analyze the vast amounts of information to make intelligent decisions about investing and retirement. Targeting these individuals and maintaining their interest is a difficult task that may require exorbitant amounts of time and resources. Yet, targeting them and maintaining their interest can be a deciding factor as to whether they become engaged with such planning. Providing them with distilling information and access to investment related information that is tailored to their needs, as opposed to general investment advice, is largely left to the time-consuming process of speaking with an investment advisor. Providing such advice in a manner that lessens the role of the advisor has typically been done by providing general, abstract, and sometimes obscure investment information.

Consequently, many employees forego investing to the detriment of their retirement. Those who have interest and the means to invest may not do so once they become eligible because they become set in their spending habits, they forget, and/or advisors and sponsors of retirement plans lack the information to properly target and engage such individuals. Even if a sponsor/advisor does contact the individual, the investment strategy presented is typically generic unless a comprehensive assessment of the individual's situation is ascertained. Providing generic advice may bread cynicism and distrust, yet gathering the information for a comprehensive assessment may be unappealing and be seen as intrusive. Furthermore, even if the individual is properly targeted and provided tailored advice, the information is typically overwhelming and convoluted with technical jargon.

Retirement plans offered by employers can be administered by an employer along with help from at least one other party that the employer contracts with to help with the administration of the retirement plan. Such a provider can assist with regulatory and legal compliance with the administration of such plans. Yet, existing methods and systems fail to provide an efficient means of gathering employee (i.e., investor) information, determining the eligibility and status of the employee, and providing distilled information about investing and retirement planning. The communication with employees that can be participants with such plans often results in large numbers of employees not enrolling with a plan or contributing to their retirement account of the plan in a way that helps them effectively save for retirement. Employees that fail to participate in such a plan or fail to adequately contribute to a retirement plan in which they are a participant can often need to work well after a desired retirement age due to their failure to properly manage their retirement savings activities.

SUMMARY OF THE INVENTION

Embodiments of the system and method disclosed herein can include a communication system with a host system in communication with at least one of a client computer, a party computer, and a provider computer. A graphical user interface (GUI) may be used to enable interaction between the host system and at least one of the computers for enrollment and administration of a retirement plan. Some embodiments may include enrollment and administration of a savings plan. In some embodiments, enrollment into the retirement plan may be deferred by enrollment into the savings plan based on eligibility. Other embodiments may include a snooze function to enable temporary cessation of participation in a plan. Further embodiments may include a savings nudge function to communicate savings advice to users based on events, such as a pay increase for example. Administration aspects can include display and communication of pertinent data, which may include, but is not limited to, statistical information, reports, tasks communicated to users, etc.

Information about the employee can be gathered in an efficient and non-intrusive manner. Orchestrated interaction between parties can be facilitated via interfacing of the computers through the GUI so that each computer can display and have access to differentiated information at appropriate times and for which is tailored for users of a computer. Information about an employee can be taken via inputs made by the user-employee and/or acquisitioned via a host system's database about the employee from the sponsor's own infrastructure. Policies, regulations, and life-events related to the employee and retirement plans can be automatically matched for coordinated dissemination to user-employees, user-administrators, user-sponsors, etc. for concerted action. Centrally controlled dissemination of information and coordinate delegation of tasks among users can be done automatically. This may result in reductions of redundant communications and expenditure of marketing tactics. Coordinated dissemination of information and delegation of tasks can result in reduced infrastructure, as well as a reduction in computations performed by system components.

Information communicated to user-employees may not only be tailored for them, but can be displayed in an intuitive and comprehensive manner. Use of graphical elements via the GUI can facilitate quick assessment by user-employees related to benefits and consequences of investing, choosing a plan, adjusting contributions, etc. This can be done without users expending time to manually enter data, conducting an investor-profile, and/or sifting through investment options, policies, and regulations. Rather, data may be automatically acquisitioned and presented factoring the above-delineated variables. In some embodiments, a user-employee need only actuate a slide controller to be presented with cost-benefit assessments (including tax and return on investment consequences), investment/savings options, and effects on cash flows from paychecks. This can be performed via an interactive display that automatically communicates to other users and delegates tasks based upon user-employees' chosen options and user-administrators' policies. The interactive display can be made to be intuitive for the sophistication level of the user-employee, providing comprehensive guidance without overwhelming technical jargon.

Some features may include enrollment into a savings plan with automatic enrollment into a retirement plan once the user-employee is eligible. This may induce user-employees to form saving-habits before actual participation in a retirement plan. This can also provide other users with indications as to the interest and sophistication level of the user-employee.

Some features may include temporary cessation of participation with automatic re-institution of participation. This may afford user-employees the ability to avoid tax and debt liabilities by offering an alternative means to increase cash flows. Automatic re-institution of participation can avoid non-saving-habits from developing. Furthermore, this can be done without expenditure of time to complete paperwork, without redundant communications with various users, without multiple and redundant data processing, etc.

As disclosed herein, a communication system can include a host system that comprises at least one server computer device having hardware comprising at least one processor, at least one non-transitory memory, and at least one transceiver unit. The host system can be configured to communicate with at least one client computer device such that a GUI for displaying information to a user of the client computer device is displayable on a display device of the client computer device based on data the host system sends to the client computer device when the client computer device is communicatively connected to the host system. The host system, within a sponsored retirement plan environment, can be configured to receive at least one of employee information data and employee payroll data as input data, reconfigure the input data to output data, and display the output data via the GUI. The input data may not be suitable for display via the GUI, so the host system can reconfigure it as output data. The input data can be, in part, acquisitioned from information stored about at least one employee based on the input data. The GUI defined by the data to be sent by the host system is configured such that enrollment in a retirement plan is facilitated via information to be displayed in the graphical user interface and manipulation of the GUI by use of at least one input device of the client computer device causes enrollment data to be communicated to the host system for enrolling the user in the retirement plan. The GUI can also be configured to display a first enrollment display that includes a first graphical display projecting an estimated value of a retirement account over a future time period. The first enrollment display can also have a plurality of actuatable indicia that comprises a first actuatable indicia, a second actuatable indicia, and a third actuatable indicia. The first actuatable indicia can be configured such that selection of the first actuatable indicia results in a first slider bar graphical element being displayed. Manipulation of a slider element of the first slider bar graphical element can result in a change to a selected retirement age being shown in the first graphical display of the GUI. The second actuatable indicia can be configured such that selection of the second actuatable indicia results in a second slider bar graphical element being displayed. Manipulation of a slider element of the second slider bar graphical element can result in a change to a selected contribution amount for periodic contributions to be made into the retirement account being displayed in the first graphical display of the GUI. The third actuatable indicia can be configured such that selection of the third actuatable indicia results in a third slider bar graphical element being displayed. Manipulation of a slider element of the third slider bar graphical element can result in a change to a selected asset allocation for contributions to the retirement account being displayed in the GUI and the first graphical display of the GUI illustrating an effect of the changed asset allocation.

Embodiments of the communication system can be configured such that the GUI also has a fourth actuatable indicia. Selection of the fourth actuatable indicia can be configured to result in a selected contribution level, a selected retirement age, and a selected asset allocation being communicated to the host system for enrollment of the user in the retirement account.

In other embodiments, the GUI can be configured to have fourth actuatable indicia that is displayable adjacent to the third slider bar graphical element when the third actuatable indicia is selected such that actuation of the fourth actuatable indicia results in a display for selecting funds to be purchased using contributions made to the retirement account. The display for selecting funds to be purchased using contributions made to the retirement account can include: a pie chart graphical element illustrating a selected asset allocation having at least one pie piece for stock assets and at least one pie piece for bond related assets, and/or at least one selectable menu for selecting at least one stock fund, and/or at least one selectable menu for selecting at least one bond fund. The display for selecting funds to be purchased using contributions made to the retirement account can include actuatable indicia for saving selected stock and bond fund information such that selection of the actuatable indicia is configured to cause data comprising the selected stock fund and bond fund information to be transmitted to the host system.

Embodiments of the GUI can also be configured to include a fifth actuatable indicia that is displayable adjacent to the third slider bar graphical element when the third actuatable indicia is selected such that actuation of the fifth actuatable indicia results in a display for taking a risk tolerance quiz being displayed in the GUI.

Some embodiments of the communication system can include at least one party computer device that is communicatively connectable to the host system to provide information identifying employees that are eligible for enrollment in the retirement plan, at least one provider computer device that is communicatively connectable to the host system to provide information relating to at least one of stock funds and bond funds that are selectable for the retirement plan, and at least one provider computer device that is communicatively connectable to the host system to provide information relating to transactions involving at least one of stock funds and bond funds for the retirement plan.

In some embodiments, the at least one server computer device of the host system can include one or more of: a web server computer device having hardware comprising at least one processor, at least one non-transitory memory, and at least one transceiver unit, an application server computer device having hardware comprising at least one processor, at least one non-transitory memory, and at least one transceiver unit, at least one database server computer device having hardware comprising at least one processor, at least one non-transitory memory, and at least one transceiver unit, an email server computer device having hardware comprising at least one processor, at least one non-transitory memory, and at least one transceiver unit, and a transaction server computer device having hardware comprising at least one processor, at least one non-transitory memory, and at least one transceiver unit. In some embodiments, the web server computer device and the application server computer device can be communicatively connected to the database server. The transaction server computer device can also be communicatively connected to at least one of the web server computer device, the application server computer device, and the database server computer device. In yet other embodiments, each of the server computer devices can be communicatively connected to the other server computer devices.

A method of facilitating enrollment into a retirement plan is also provided. Embodiments of the method can include a host system communicating with at least one client computer device such that a GUI for displaying information to a user of the client computer device is displayable on a display device of the client computer device based on data the host system sends to the client computer device when the client computer device is communicatively connected to the host system, and manipulating the GUI defined by the data sent by the host system such that enrollment in a retirement plan is facilitated via information to be displayed in GUI in response to selection input communicated to the host system. In some embodiments, the GUI can be configured to display a first enrollment display that includes a first graphical display projecting an estimated value of a retirement account over a future time period. The first enrollment display can also have a plurality of actuatable indicia that comprises a first actuatable indicia, a second actuatable indicia, and a third actuatable indicia. The first actuatable indicia can be configured such that selection of the first actuatable indicia results in a first slider bar graphical element being displayed. Manipulation of a slider element of the first slider bar graphical element resulting in a change to a selected retirement age being shown in the first graphical display of the GUI. The second actuatable indicia can be configured such that selection of the second actuatable indicia results in a second slider bar graphical element being displayed. Manipulation of a slider element of the second slider bar graphical element resulting in a change to a selected contribution amount for periodic contributions to be made into the retirement account being displayed in the first graphical display of the GUI. The third actuatable indicia can be configured such that selection of the third actuatable indicia results in a third slider bar graphical element being displayed. Manipulation of a slider element of the third slider bar graphical element resulting in a change to a selected asset allocation for contributions to the retirement account being displayed in the GUI and the first graphical display of the GUI illustrating an effect of the changed asset allocation.

In some embodiments of the method, the GUI can have a fourth actuatable indicia such that selection of the fourth actuatable indicia results in a selected contribution level, a selected retirement age, and a selected asset allocation being communicated to the host system for enrollment of the user in the retirement account. In other embodiments, the GUI can have a fourth actuatable indicia that is displayable adjacent to the third slider bar graphical element when the third actuatable indicia is selected such that actuation of the fourth actuatable indicia results in a display for selecting funds to be purchased using contributions made to the retirement account. In yet other embodiments of the method, the GUI can have a fourth actuatable indicia that is displayable adjacent to the third slider bar graphical element when the third actuatable indicia is selected such that actuation of the fourth actuatable indicia results in a display for taking a risk tolerance quiz being displayed in the GUI.

A communication system is also provided that includes a host system comprising at least one server computer device having hardware comprising at least one processor, at least one non-transitory memory, and at least one transceiver unit. The host system can be configured to communicate with at least one client computer device such that GUI for displaying information to a user of the client computer device is displayable on a display device of the client computer device based on data the host system sends to the client computer device when the client computer device is communicatively connected to the host system. The GUI defined by the data to be sent by the host system is configured such that enrollment in a savings plan is facilitated via information to be displayed in the graphical user interface and manipulation of the GUI by use of at least one input device of the client computer device causes data to be communicated to the host system for scheduling periodic deposits to be made in a savings account of the user. The GUI can include a slider bar graphical element that has a moveable slider element. The slider element can be moveable along a bar of the slider bar graphical element to select a contribution rate or savings deposit rate for deductions to be made from a paycheck of the user for deposit into the savings account. The bar of the slide bar graphical element can have three different demarcated portions that can include a first end portion identifying a contribution level or savings deposit level for deductions to be taken from the paycheck for deposit in the savings account, a second end portion that is opposite the first end portion identifying taxes to be deducted from the paycheck, and a third middle portion that is between the first and second end portions, the third middle portion identifying a take home pay amount. The take home pay amount can be an amount remaining from the paycheck after the taxes and the deposit to be made to the savings account are subtracted from the paycheck.

In some embodiments of the system, the GUI can also include selectable indicia for enrollment in the savings plan, the host system to receive data identifying the selected contribution level or savings deposit level for the savings account from the client computer device in response to actuation of the selectable indicia for enrollment in the savings plan. The host system can also be configured to determine when a user of the client computer device is eligible for an employer sponsored retirement plan after the user is enrolled in the savings plan based on data the host system receives from the client computer device during enrollment of the user in the savings plan. The host system can also be configured to send at least one message to at least one device associated with the user in response to the host system determining that the user of the client computer device is eligible for the employer sponsored retirement plan. The message can include information for facilitating enrollment of the user in the employer sponsored retirement plan. For example, the message can include actuatable indicia that is configured such that actuation of the indicia results in a computer device of the user being communicatively connected to the host system such that the host system sends data to the computer device of the user that defines a retirement plan enrollment GUI that is displayable via the computer device based on the data sent by the host system.

In some embodiments of the communication system, the host system can be configured to determine whether a user of the client computer device is eligible for an employer sponsored retirement plan based on data received from at least one of the client computer device and a computer device of the employer, and, in response to determining that the user of the client computer device is ineligible for the employer sponsored retirement plan, the host system communicates with the client computer device to send the data defining the GUI for enrollment in the savings plan. The host system can be configured to determine when a user of the client computer device is eligible for the employer sponsored retirement plan after the user is enrolled in the savings plan. In response to the host system determining that the user of the client computer device is eligible for the employer sponsored retirement plan, the host system can send at least one message to at least one device associated with the user. The message can include information to facilitate enrollment of the user in the employer sponsored retirement plan. For instance, the message can include actuatable indicia that is configured such that actuation of the indicia results in a computer device of the user being communicatively connected to the host system such that the host system sends data to the computer device of the user that defines a retirement plan enrollment GUI that is displayable via the computer device based on the data sent by the host system. The retirement plan enrollment GUI defined by the data sent by the host system can be configured such that enrollment in a retirement plan is facilitated via information to be displayed in the retirement plan enrollment GUI and manipulation of the retirement plan enrollment GUI by use of at least one input device of the user computer device causes enrollment data to be communicated to the host system for enrolling the user in the retirement plan. The retirement plan enrollment GUI can be configured to display a first enrollment display that includes a first graphical display projecting an estimated value of a retirement account over a future time period. The first enrollment display can also have a plurality of actuatable indicia that comprises a first actuatable indicia, a second actuatable indicia, and a third actuatable indicia. The first actuatable indicia can be configured such that selection of the first actuatable indicia results in a first slider bar graphical element being displayed and manipulation of a slider element of the first slider bar graphical element results in a change to a selected retirement age being shown in the first graphical display of the GUI. The second actuatable indicia can be configured such that selection of the second actuatable indicia results in a second slider bar graphical element being displayed and manipulation of a slider element of the second slider bar graphical element results in a change to a selected contribution amount for periodic contributions to be made into the retirement account being displayed in the first graphical display of the GUI. The third actuatable indicia can be configured such that selection of the third actuatable indicia results in a third slider bar graphical element being displayed and manipulation of a slider element of the third slider bar graphical element resulting in a change to a selected asset allocation for contributions to the retirement account being displayed in the GUI. The first graphical display of the GUI can also be configured to illustrate an effect of the changed asset allocation.

In some embodiments, the retirement plan enrollment GUI can also have a fourth actuatable indicia such that selection of the fourth actuatable indicia results in a selected contribution level, a selected retirement age, and a selected asset allocation being communicated to the host system for enrollment of the user in the retirement account. In other embodiments, the retirement plan enrollment GUI can have a fourth actuatable indicia that is displayable adjacent to the third slider bar graphical element when the third actuatable indicia is selected such that actuation of the fourth actuatable indicia resulting in a display for selecting funds to be purchased using contributions made to the retirement account. The display for selecting funds to be purchased using contributions made to the retirement account can include: a pie chart graphical element illustrating a selected asset allocation having at least one pie piece for stock assets and at least one pie piece for bond related assets, and/or at least one selectable menu for selecting at least one stock fund, and/or at least one selectable menu for selecting at least one bond fund. The display for selecting funds to be purchased using contributions made to the retirement account can include actuatable indicia for saving selected stock and bond fund information such that selection of the actuatable indicia is configured to cause data comprising the selected stock fund and bond fund information to be transmitted to the host system.

In some embodiments of the communication system, the retirement plan enrollment GUI can also include a fifth actuatable indicia that is displayable adjacent to the third slider bar graphical element when the third actuatable indicia is selected. Actuation of the fifth actuatable indicia can be configured to result in a display for taking a risk tolerance quiz being displayed in the retirement plan enrollment GUI.

The communication system can also include other computer device or communication device elements. For instance, embodiments of the communication system can include at least one party computer device that is communicatively connectable to the host system to provide information identifying employees that are eligible for enrollment in the retirement plan and at least one provider computer device that is communicatively connectable to the host system to provide information relating to at least one of stock funds and bond funds that are selectable for the retirement plan.

A method for facilitating enrollment into a savings plan when a user is determined to be currently ineligible for an employer sponsored retirement plan is also provided that includes the step of a host system communicating with at least one client computer device such that a GUI for displaying information to a user of the client computer device is displayable on a display device of the client computer device based on data the host system sends to the client computer device when the client computer device is communicatively connected to the host system. The host system can include at least one server computer device having hardware comprising at least one processor, at least one non-transitory memory, and at least one transceiver unit. The GUI can be defined by the data to be sent by the host system so that the GUI is configured such that enrollment in a savings plan is facilitated via information to be displayed in the graphical user interface and manipulation of the GUI by use of at least one input device of the client computer device causes data to be communicated to the host system for scheduling periodic deposits to be made in a savings account of the user.

Embodiments of the method can also include the steps of the host system receiving data from the client computer device and, in response to the data received from the client computer device, the host system scheduling periodic deposits to be made into a savings account of the user, the deposits to be made into the savings account being taken from a portion of take home pay from a paycheck an employer of the user is to provide to the user. The host system can be configured such that the GUI displays information that identifies a portion of take home pay the user will receive from the paycheck and a portion of the taxes to be deducted from the paycheck as well as a selected amount of the paycheck to be deposited into the savings account in a slider bar graphical element of the GUI.

Embodiments of the method can also include the steps of the host system determining when the user of the client computer device is eligible for the employer sponsored retirement plan after the user is enrolled in the savings plan, in response to the host system determining that the user of the client computer device is eligible for the employer sponsored retirement plan, the host system sending at least one message to at least one device associated with the user. The message can include information to facilitate enrollment of the user in the employer sponsored retirement plan. For instance, the message can include actuatable indicia that is configured such that actuation of the indicia results in a computer device of the user being communicatively connected to the host system such that the host system sends data to the computer device of the user that defines a retirement plan enrollment GUI that is displayable via the computer device based on the data sent by the host system. The retirement plan enrollment GUI defined by the data sent by the host system can be configured such that enrollment in a retirement plan is facilitated via information to be displayed in the retirement plan enrollment GUI and manipulation of the retirement plan enrollment GUI by use of at least one input device of the user computer device causes enrollment data to be communicated to the host system for enrolling the user in the retirement plan. The retirement plan enrollment GUI can be configured to display a first enrollment display that includes a first graphical display projecting an estimated value of a retirement account over a future time period and also has a plurality of actuatable indicia that comprises a first actuatable indicia, a second actuatable indicia, and a third actuatable indicia. The first actuatable indicia can be configured such that selection of the first actuatable indicia results in a first slider bar graphical element being displayed and manipulation of a slider element of the first slider bar graphical element results in a change to a selected retirement age being shown in the first graphical display of the GUI. The second actuatable indicia can be configured such that selection of the second actuatable indicia results in a second slider bar graphical element being displayed and manipulation of a slider element of the second slider bar graphical element resulting in a change to a selected contribution amount for periodic contributions to be made into the retirement account being displayed in the first graphical display of the GUI. The third actuatable indicia can be configured such that selection of the third actuatable indicia results in a third slider bar graphical element being displayed and manipulation of a slider element of the third slider bar graphical element results in a change to a selected asset allocation for contributions to the retirement account being displayed in the GUI and the first graphical display of the GUI illustrating an effect of the changed asset allocation.

A communication system is also provided that includes a host system comprising at least one server computer device having hardware comprising at least one processor, at least one non-transitory memory, and at least one transceiver unit. The host system can be configured to communicate with at least one client computer device such that a GUI for displaying information to a user of the client computer device is displayable on a display device of the client computer device based on data the host system sends to the client computer device when the client computer device is communicatively connected to the host system and sends data authenticating a user of the client computer device as having a retirement account, information about the retirement account being within the memory of the host system. The host system can be configured to receive at least one of employee information data and employee payroll data as input data, with the host system within a sponsored retirement plan environment, reconfigure the input data to output data, and display the output data via the GUI. If the input data is not suitable for display via the GUI, the host system can reconfigure it to output data. The host system can be configured so that the input data is, in part, acquisitioned from information stored about at least one employee based on the input data. The GUI defined by the data to be sent by the host system can be configured such that information about a status of the retirement account is displayed in the GUI and manipulation of the GUI by use of at least one input device of the client computer device causes data to be communicated to the host system for making changes to how subsequent contributions are to be made to the retirement account. The GUI can include a retirement savings account snooze display that includes a first actuatable indicia that is selectable for initiating a cessation of previously scheduled periodic contributions to the retirement account for a selectable period of time.

In some embodiments, the retirement savings account snooze display can be configured such that upon selection of the first actuatable indicia, a selectable menu is displayed that is configured to solicit a selection of a pre-selected period of time in which previously scheduled periodic contributions to the retirement account will no longer be made. The retirement savings account snooze display can also be configured such that a second actuatable indicia is displayed adjacent the selectable menu after actuation of the first actuatable indicia. Selection of the second actuatable indicia can trigger a communication being sent to the host system that includes information identifying a cessation of previously scheduled contributions for the retirement account is to occur for a selected period of time. The host system can be configured so that a retirement account cessation of contributions communication is sent by the host system to at least one computer device of an employer in response to receipt of the communication that includes the information identifying the cessation of previously scheduled contributions for the retirement account. The retirement account cessation of contributions communication can contain data identifying an employee and a number of pay periods in which contributions to the retirement account of the employee is to be stopped. The retirement savings account snooze display can be configured to also include information identifying an amount of additional money to be retained by a user in response to a selection of the preselected period of time in which previously scheduled periodic contributions to the retirement account will no longer be made. The host system can also be configured such that after the selected period of time in which contributions to the retirement account are to be stopped, subsequent contributions to the retirement account are resumed without the host system receiving any input from a user associated with the retirement account after the selection of the second actuatable indicia was communicated to the host system.

Embodiments of the communication system may also include at least one party computer device that is communicatively connectable to the host system to provide information identifying employees that are eligible for enrollment in the retirement plan and at least one provider computer device that is communicatively connectable to the host system to provide information relating to at least one of stock funds and bond funds that are selectable for the retirement plan. The at least one server computer device of the host system can include any combination of the following: (i) a web server computer device having hardware comprising at least one processor, at least one non-transitory memory, and at least one transceiver unit, (ii) an application server computer device having hardware comprising at least one processor, at least one non-transitory memory, and at least one transceiver unit, (iii) at least one database server computer device having hardware comprising at least one processor, at least one non-transitory memory, and at least one transceiver unit, (iv) an email server computer device having hardware comprising at least one processor, at least one non-transitory memory, and at least one transceiver unit; and (v) a transaction server computer device having hardware comprising at least one processor, at least one non-transitory memory, and at least one transceiver unit.

A method of pausing contributions to a retirement account is also provided. Embodiments of the method can include the step of a host system communicating with a client computer device of a user to provide data to the client computer device where the data defines a retirement savings account snooze display that includes a first actuatable indicia that is selectable for initiating a cessation of previously scheduled periodic contributions to the retirement account for a selectable period of time.

In some embodiments of the method, the client computer device can display the retirement savings account snooze display based on the data received from the host system. The retirement savings account snooze display can be configured such that upon selection of the first actuatable indicia, a selectable menu is displayed that is configured to solicit a selection of a pre-selected period of time in which previously scheduled periodic contributions to the retirement account will no longer be made. The retirement savings account snooze display can also be configured such that a second actuatable indicia is displayed adjacent the selectable menu after actuation of the first actuatable indicia. The host system can receive a communication from the client computer device that includes information identifying a cessation of previously scheduled contributions for the retirement account is to occur for a selected period of time in response to a selection of the second actuatable indicia. The host system can send a retirement account cessation of contributions communication to at least one computer device of an employer in response to receipt of the communication that includes the information identifying the cessation of previously scheduled contributions for the retirement account. The retirement account cessation of contributions communication can contain data identifying an employee and a number of pay periods in which contributions to the retirement account of the employee is to be stopped. Thereafter, contributions into the retirement account for the selected period of time can be ceased and, upon the selected period of time expiring, contributions into the retirement account can resume without the host system receiving any input from a user associated with the retirement account after the selection of the second actuatable indicia was communicated to the host system.

For some embodiments of the method, the host system can also be configured to communicate with at least one client computer device such that a GUI for displaying information to a user of the client computer device is displayable on a display device of the client computer device based on data the host system sends to the client computer device when the client computer device is communicatively connected to the host system and sends data authenticating a user of the client computer device as having a retirement account. The GUI defined by the data to be sent by the host system is configured such that information about a status of the retirement account is displayed in the GUI and manipulation of the GUI by use of at least one input device of the client computer device causes data to be communicated to the host system for making changes to how subsequent contributions are to be made to the retirement account. The GUI can be configured to display a first retirement account display that includes a first graphical display projecting an estimated value of the retirement account over a future time period based on the data to be sent by the host system to the client computer device in response to receipt of information authenticating the user of the client computer device. The first retirement account display can also include a plurality of actuatable indicia that comprises a third actuatable indicia, a fourth actuatable indicia, and a fifth actuatable indicia. The third actuatable indicia can be configured such that selection of the third actuatable indicia results in a first slider bar graphical element being displayed and manipulation of a slider element of the first slider bar graphical element resulting in a change to a selected retirement age being shown in the first graphical display of the GUI. The fourth actuatable indicia can be configured such that selection of the fourth actuatable indicia results in a second slider bar graphical element being displayed and manipulation of a slider element of the second slider bar graphical element resulting in a change to a selected contribution amount for periodic contributions to be made into the retirement account being displayed in the first graphical display of the GUI. The fifth actuatable indicia can be configured such that selection of the fifth actuatable indicia results in a third slider bar graphical element being displayed and manipulation of a slider element of the third slider bar graphical element resulting in a change to a selected asset allocation for contributions to the retirement account being displayed in the first graphical display of the GUI.

In some embodiments of the method, the method can include the step of displaying information identifying an amount of additional money to be retained by a user in the retirement savings account snooze display in response to a selection of the pre-selected period of time in which previously scheduled periodic contributions to the retirement account will no longer be made.

A communication system is also provided that includes a host system comprising at least one server computer device having hardware comprising at least one processor, at least one non-transitory memory, and at least one transceiver unit. The host system can be configured to communicate with at least one client computer device such that a GUI for displaying information to a user of the client computer device is displayable on a display device of the client computer device based on data the host system sends to the client computer device when the client computer device is communicatively connected to the host system and sends data authenticating a user of the client computer device as having a retirement account. Information about the retirement account being within the memory of the host system. The GUI defined by the data to be sent by the host system can be configured such that information about a status of the retirement account is displayed in the GUI and manipulation of the GUI by use of at least one input device of the client computer device causes data to be communicated to the host system for making changes to how subsequent contributions are to be made to the retirement account. The GUI can also be configured to display a first retirement account display that includes a first graphical display projecting an estimated value of the retirement account over a future time period based on the data to be sent by the host system to the client computer device in response to receipt of information authenticating the user of the client computer device.

In some embodiments, the first retirement account display can also include a plurality of actuatable indicia that comprises a first actuatable indicia, a second actuatable indicia, and a third actuatable indicia. The first actuatable indicia can be configured such that selection of the first actuatable indicia results in a first slider bar graphical element being displayed and manipulation of a slider element of the first slider bar graphical element resulting in a change to a selected retirement age being shown in the first graphical display of the GUI. The second actuatable indicia can be configured such that selection of the second actuatable indicia results in a second slider bar graphical element being displayed and manipulation of a slider element of the second slider bar graphical element resulting in a change to a selected contribution amount for periodic contributions to be made into the retirement account being displayed in the first graphical display of the GUI. The third actuatable indicia can be configured such that selection of the third actuatable indicia results in a third slider bar graphical element being displayed and manipulation of a slider element of the third slider bar graphical element results in a change to a selected asset allocation for contributions to the retirement account being displayed in the GUI and the first graphical display of the GUI illustrating an effect of the changed asset allocation.

In some embodiments, the first retirement account display can also have a fourth actuatable indicia such that selection of the fourth actuatable indicia results in a selected contribution level, a selected retirement age, and a selected asset allocation being communicated to the host system for updating at least one of the contribution level, selected retirement age, and selected asset allocation for the retirement account. In other embodiments, the first retirement account display can have a fourth actuatable indicia that is displayable adjacent to the third slider bar graphical element when the third actuatable indicia is selected such that actuation of the fourth actuatable indicia results in a display for selecting funds to be purchased using contributions made to the retirement account. The first retirement account display can also include an account bar graph that includes a first end portion identifying an amount of contributions made to the retirement account by the user, a second portion identifying an amount of contributions made to the retirement account by an employer of the user, and a third portion identifying an amount of gain or loss experienced by the retirement account over a selected time period. The first retirement account display can also illustrate a retirement account return graphical element that displays a return experienced by the retirement account over a selectable time period and/or can be configured to illustrate a retirement account asset allocation graphical element that illustrates a current asset allocation of assets within the retirement account.

In some embodiments, the host system can be configured to include savings nudge information within the data the host system sends to the client computer device when the client computer device is communicatively connected to the host system and sends data authenticating the user of the client computer device as having the retirement account. The savings nudge information can be configured such that the first retirement account display includes a notification that is displayable that includes indicia identifying increased income to be received by the user and information identifying that more money is contributable to the retirement account.

Embodiments of the communication system can also include at least one party computer device that is communicatively connectable to the host system to provide information identifying employees that are eligible for enrollment in the retirement plan and at least one provider computer device that is communicatively connectable to the host system to provide information relating to at least one of stock funds and bond funds that are selectable for the retirement plan. Also, the at least one server computer device of the host system can include a web server computer device having hardware comprising at least one processor, at least one non-transitory memory, and at least one transceiver unit, and/or an application server computer device having hardware comprising at least one processor, at least one non-transitory memory, and at least one transceiver unit, and/or at least one database server computer device having hardware comprising at least one processor, at least one non-transitory memory, and at least one transceiver unit, and/or an email server computer device having hardware comprising at least one processor, at least one non-transitory memory, and at least one transceiver unit, and a transaction server computer device having hardware comprising at least one processor, at least one non-transitory memory, and at least one transceiver unit.

In some embodiments, the host system can be configured to determine when the user has received an increase in annual income and is also configured to send at least one message to a computer device associated with the user in response to determining that the user has received the increase in annual income. Each message can include savings nudge information and a link that is actuatable for establishing a connection with the host system. The link can be configured such that actuation of the link results in a connection being between the host system by the computer device associated with the user that is utilized to actuate the link.

A method of managing a retirement account is also provided that includes the step of a host system communicating with at least one client computer device such that a graphical user interface GUI for displaying information to a user of the client computer device is displayable on a display device of the client computer device based on data the host system sends to the client computer device when the client computer device is communicatively connected to the host system and sends data authenticating a user of the client computer device as having a retirement account. The host system can comprise at least one server computer device having hardware comprising at least one processor, at least one non-transitory memory, and at least one transceiver unit.

Information about the retirement account can be within the memory of the host system. The GUI defined by the data to be sent by the host system can be configured such that information about a status of the retirement account is displayed in the GUI and manipulation of the GUI by use of at least one input device of the client computer device causes data to be communicated to the host system for making changes to how subsequent contributions are to be made to the retirement account.

The GUI can be configured to display a first retirement account display that includes a first graphical display projecting an estimated value of the retirement account over a future time period based on the data to be sent by the host system to the client computer device in response to receipt of information authenticating the user of the client computer device. The first retirement account display can also include a plurality of actuatable indicia that comprises a first actuatable indicia, a second actuatable indicia, and a third actuatable indicia. The first actuatable indicia can be configured such that selection of the first actuatable indicia results in a first slider bar graphical element being displayed and manipulation of a slider element of the first slider bar graphical element results in a change to a selected retirement age being shown in the first graphical display of the GUI. The second actuatable indicia can be configured such that selection of the second actuatable indicia results in a second slider bar graphical element being displayed and manipulation of a slider element of the second slider bar graphical element resulting in a change to a selected contribution amount for periodic contributions to be made into the retirement account being displayed in the first graphical display of the GUI. The third actuatable indicia can be configured such that selection of the third actuatable indicia results in a third slider bar graphical element being displayed and manipulation of a slider element of the third slider bar graphical element resulting in a change to a selected asset allocation for contributions to the retirement account being displayed in the GUI and the first graphical display of the GUI illustrating an effect of the changed asset allocation.

The first retirement account display can also have a fourth actuatable indicia such that selection of the fourth actuatable indicia results in a selected contribution level, a selected retirement age, and a selected asset allocation being communicated to the host system for updating at least one of the contribution level, selected retirement age, and selected asset allocation for the retirement account. The first retirement account display can also include an account bar graph that includes a first end portion identifying an amount of contributions made to the retirement account by the user, a second portion identifying an amount of contributions made to the retirement account by an employer of the user, and a third portion identifying an amount of gain or loss experienced by the retirement account over a selected time period. A retirement account return graphical element that displays a return experienced by the retirement account over a selectable time period and a retirement account asset allocation graphical element that illustrates a current asset allocation of assets within the retirement account can also be included in that display.

Embodiments of the method can also include the steps of the host system determining that the user has experienced an increase in annual income and, in response to determining that the user has experienced an increase in income, the host system performing at least one of: (i) sending at least one message to a computer device associated with the user where each message includes savings nudge information and a link that is actuatable for establishing a connection with the host system and wherein the link is configured such that actuation of the link results in a connection being between the host system by the computer device associated with the user that is utilized to actuate the link, and (ii) including savings nudge information within the data the host system sends to the client computer device when the client computer device is communicatively connected to the host system and sends data authenticating the user of the client computer device as having the retirement account where the savings nudge information within the data sent to the client computer device is configured such that the first retirement account display includes a notification that is displayable that includes indicia identifying increased income to be received by the user and information identifying that more money is contributable to the retirement account.

Embodiments of the communication system are also provided in which a host system overseen by a retirement plan administrator comprises at least one server computer device having hardware comprising at least one processor, at least one non-transitory memory, and at least one transceiver unit. The host system can be configured to communicate with at least one retirement plan sponsor computer device such that a GUI is displayable on a display device of the sponsor computer device based on data the host system sends to the sponsor computer device when the sponsor computer device is communicatively connected to the host system and sends data authenticating a user of the sponsor computer device, information about a retirement plan being within the memory of the host system. The GUI defined by the data to be sent by the host system can be configured such that information about a status of the retirement plan is displayed in the GUI. A first display of the GUI can include a plurality of selectable tabs and at least one graphical element identifying tasks that require approval. The identified tasks can comprise at least one of: submission of a report to the host system; and approval of at least one loan relating to a retirement account of the retirement plan.

At least one graphical element identifying tasks that require approval of the first display of the GUI can also comprise: a listing of employees having retirement accounts within the retirement plan that have made contribution rate changes and a listing of employees having become eligible for enrolling in the retirement plan. At least one graphical element identifying tasks that require approval can include actuatable indicia adjacent indicia identifying a submission of the report to the host system is to be done. The actuatable indicia can be configured to identify a file to upload to the host system. The actuatable indicia can be configured such that use of a mouse to drag and drop a file into the actuatable indicia initiates the uploading of that file to the host system.

Embodiments of the system can be configured such that a second display of the GUI includes a searchable listing of employees that are enrolled in the retirement plan and/or are eligible for enrollment in the retirement plan and a first actuatable indicia that is configured to initiate the sending of at least one message to employees selected in the searchable listing. The message can be a pre-selected message that includes information identifying one of: eligibility to enroll in the retirement plan, ability to increase contributions to a retirement account of the retirement plan to receive a full matching contribution offered by a sponsor of the retirement plan, a need for updated beneficiary information for a retirement account, and resetting of a password to a retirement account of the plan.

In some embodiments of the system, a third display of the GUI can include actuatable indicia for creating a report, viewing progress on report generation, and viewing previously generated reports. The host system can be configured to receive a request for a report in response to a selection of actuatable indicia for creating the report. The request can identify parameters for the report. The host system can access information relating to the parameters identified in the request stored within the memory of the host system for generating the report. The host system can be configured to send periodic messages to the sponsor computer device to identify a state of progress in generating the report in response to receiving the request and can also be configured to send the generated report to the sponsor computer device after the report is generated.

Embodiments of the communication system can also be configured such that a fourth display of the GUI includes graphical information based on data within the memory of the host system about performance of the retirement plan. The graphical information can identify a current balance for the retirement plan and graphically illustrating performance metrics for the retirement plan. The fourth display of the GUI can also include a graphical display comparing the retirement plan with other retirement plans.

The host system can be configured to send data to the sponsor computer device for the graphical display comparing the retirement plan with other retirement plans based on retirement plan data stored in the memory of the host system relating to multiple different retirement plans sponsored by multiple different parties. Demographic information for participants in the retirement plan can also be displayable in the fourth display of the GUI in response to selection of actuatable indicia that is selectable for viewing demographic information. The demographics for the participants in the retirement plan can be displayed based on data the host system transmits to the sponsor computer device that is based on demographic data for the plan within the memory of the host system. Fund performance information for funds offered in the retirement plan can also be displayable in the fourth display of the GUI in response to selection of actuatable indicia that is selectable for viewing fund information. The fund performance information for the funds offered in the retirement plan can be displayed based on data the host system transmits to the sponsor computer device that is based on fund performance data within the memory of the host system.

A method of facilitating management of a retirement plan sponsored by a sponsor is also provided. The method can include the step of a host system communicating with at least one sponsor computer device such that a GUI is displayable on a display device of the sponsor computer device based on data the host system sends to the sponsor computer device when the sponsor computer device is communicatively connected to the host system and sends data authenticating a user of the sponsor computer device. Information about a retirement plan being within the memory of the host system. The GUI defined by the data to be sent by the host system can be configured such that information about a status of the retirement plan is displayed in the GUI.

In some embodiments of the method, the host system can comprise at least one server computer device having hardware comprising at least one processor, at least one non-transitory memory, and at least one transceiver unit. Displaying of tasks to be completed by the user where the tasks comprise at least one of: submission of a report to the host system, approval of at least one loan relating to a retirement account of the retirement plan, confirming acknowledgement of receiving a listing of employees having retirement accounts within the retirement plan that have made contribution rate changes, and confirming acknowledgement of receiving a listing of employees having become eligible for enrolling in the retirement plan can also be included in embodiments of the method.

Embodiments of the method can also include the steps of searching a searchable listing of employees that are enrolled in the retirement plan and/or are eligible for enrollment in the retirement plan, selecting a first actuatable indicia that is configured to initiate sending of at least one message to employees selected in the searchable listing where the message is a pre-selected message that includes information identifying one of: eligibility to enroll in the retirement plan, ability to increase contributions to a retirement account of the retirement plan to receive a full matching contribution offered by a sponsor of the retirement plan, a need for updated beneficiary information for a retirement account, and resetting of a password to a retirement account of the plan. The selecting of the first actuatable indicia can initiate the sending of a message to employees selected in the searchable listing that includes information identifying the ability to increase contributions to a retirement account of the retirement plan to receive a full matching contribution offered by a sponsor of the retirement plan.

Embodiments of the method can also include the steps of receiving, by the host system, a request for generation of a report based on parameters identified within the request for the report; generating a report, by the host system, based on the parameters identified within the request, the report generated based on data within memory of the host system, and communicating the report to the sponsor computer device, by the host system, after the report is generated by the host system.

Various other objects, aspects and advantages of the present disclosure can be obtained from a study of the specification, the drawings, and the appended claims.

BRIEF DESCRIPTION OF THE DRAWINGS

Further possible embodiments are shown in the drawings. The present invention is explained in the following in greater detail as an example, with reference to exemplary embodiments depicted in the drawings. It should be appreciated that like reference numbers used in the drawings may identify like components. In the drawings:

FIG. 24C is a mobile version of the alternative graphic of FIG. 24B.

FIG. 33 is a view of a display of an exemplary GUI in response to a retirement outlook tab being selected by user input communicated to a host system hosting retirement plan services relating to the displayed GUI.

Figure 39:
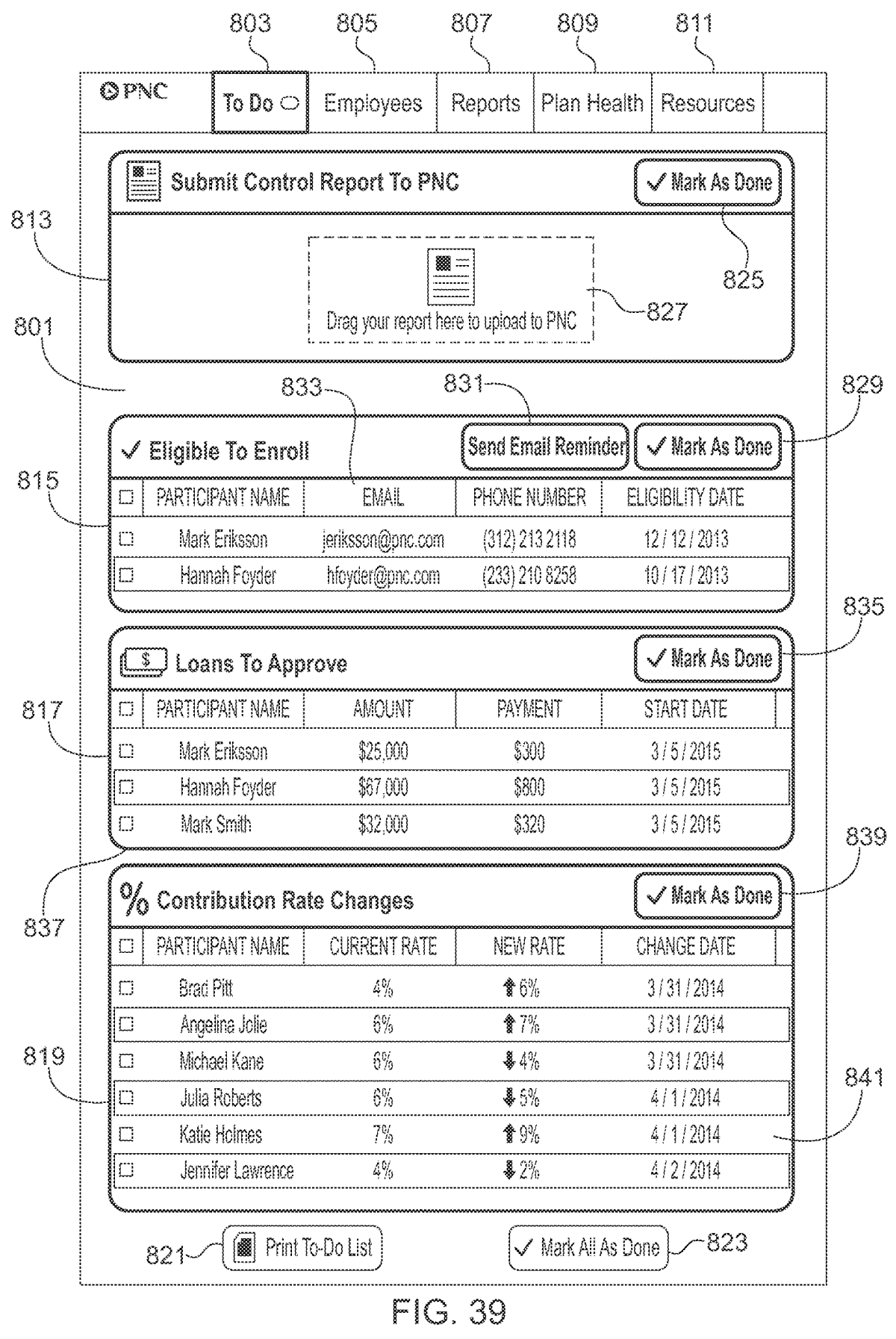

FIG. 39 is a view of a display of an exemplary GUI providable to a computer device of an employer providing a retirement plan benefit to employees upon communications with a host system configured to support the administration and management of the retirement plan.

FIG. 40C is a view of a Calendar of Events Screen that may be accessible from the GUI of FIG. 40A.

Figure 43:
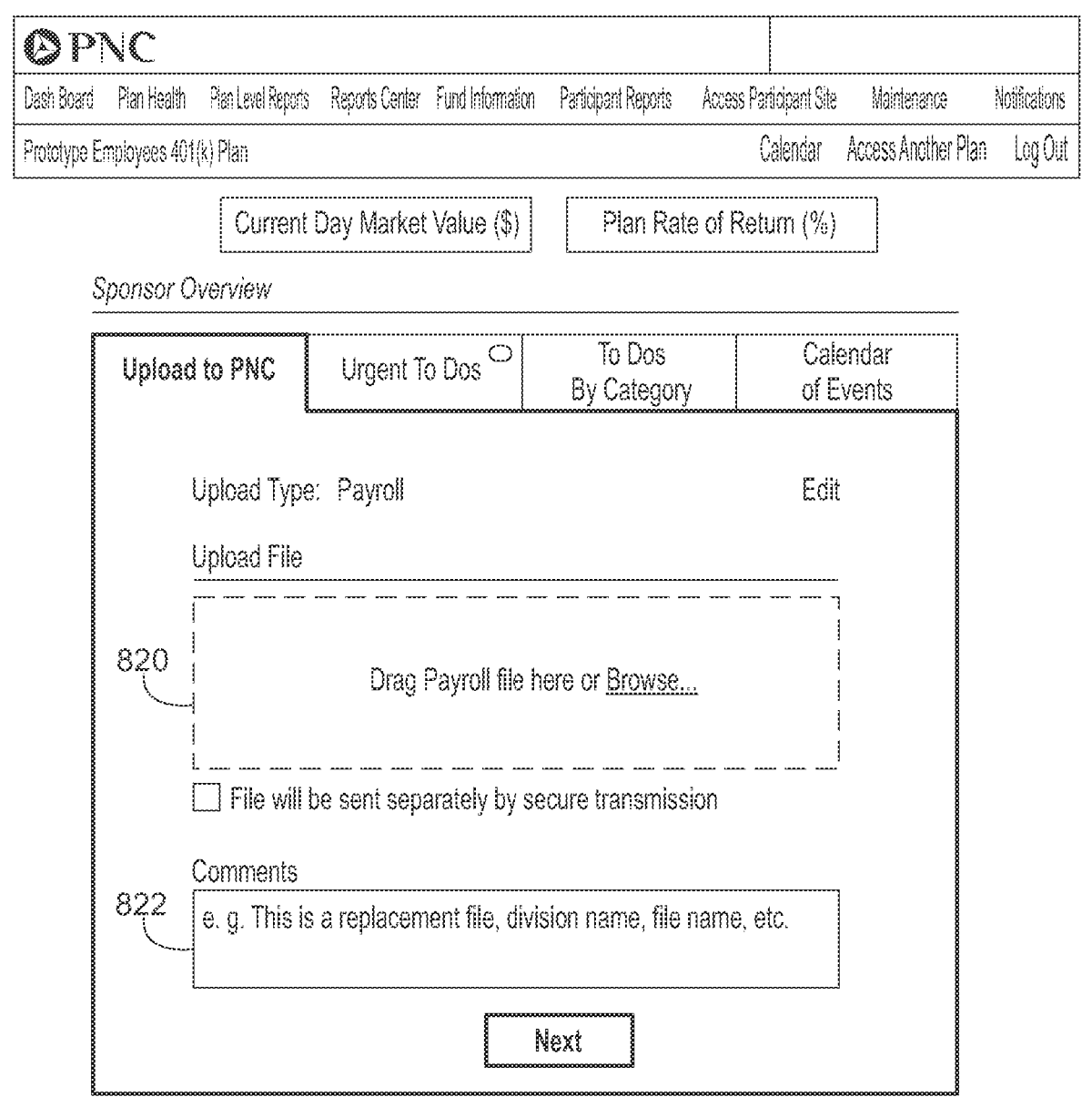

FIG. 43 is a view of a display of an exemplary GUI providable to a computer device displaying an upload function for payroll information as part of the to do display.

FIG. 44 is a view of a display of an exemplary GUI providable to a computer device displaying an upload overview screen as part of the upload function.

FIG. 45 is a view of a display of an exemplary GUI providable to a computer device displaying input blocks for the funding method as part of the upload function.

FIG. 46 is a view of the display of FIG. 41 where a user selects to input employee information.

FIG. 49 is a view of a display of an exemplary GUI providable to a computer device displaying an upload function for payroll and employee information as part of the to do display.

FIG. 51 is a view of the upload overview screen with inline error text as part of the upload function.

FIG. 53 is a view of the display of an the exemplary GUI shown in FIG. 39 after input is communicated to the host system providing input for selecting a tab of the GUI display shown in FIG. 39 relating to employee utilization of the plan offered by the employer.

FIG. 58 is a view of a display of the exemplary GUI after input in communicated to the host system indicating information about a particular employee is to be illustrated.

DETAILED DESCRIPTION OF THE INVENTION

Example Network and System Implementations

Figure 1A:
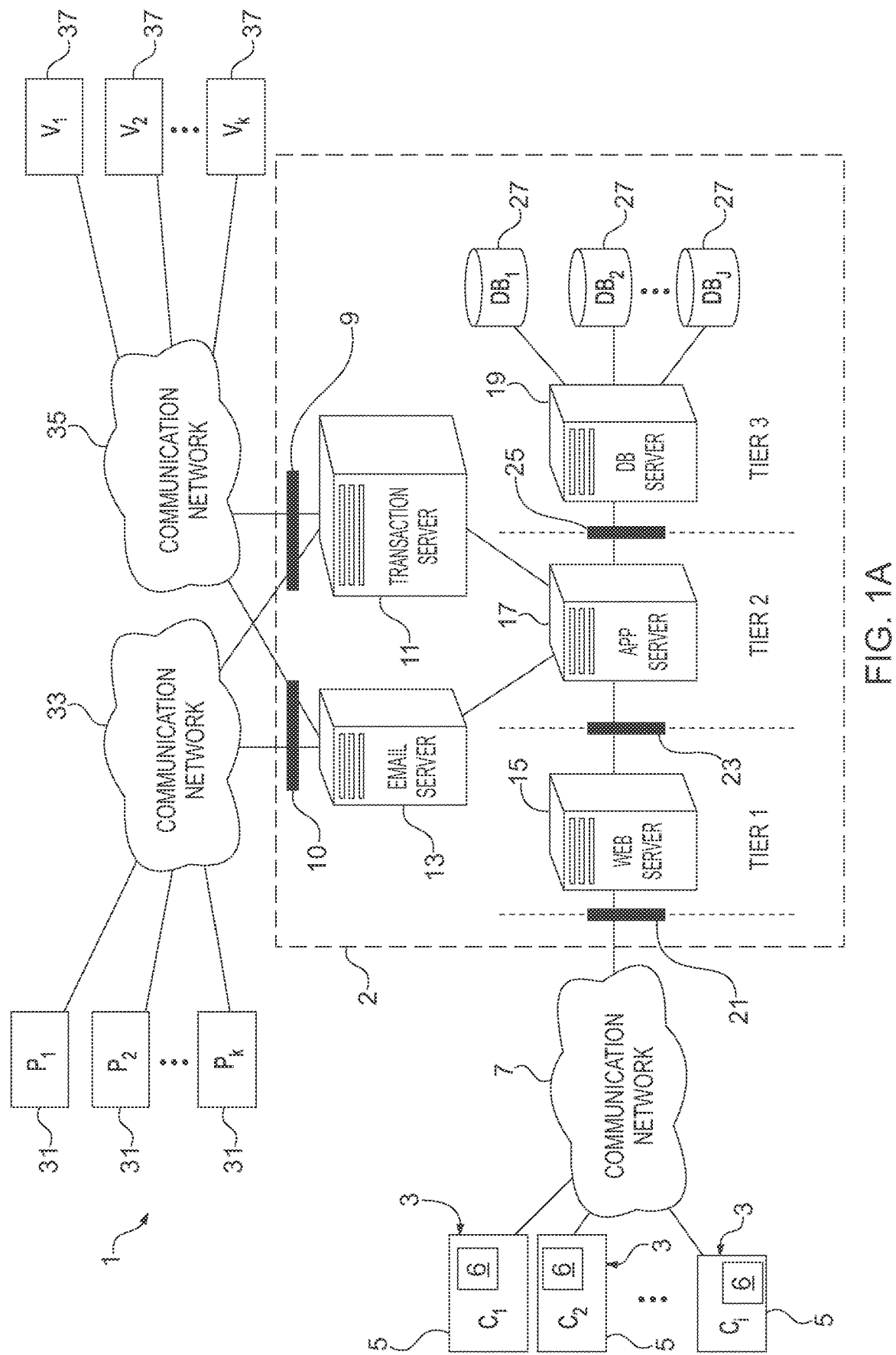
FIG. 1A illustrates exemplary network architecture for various exemplary embodiments of the present disclosure.
Figure 1B:
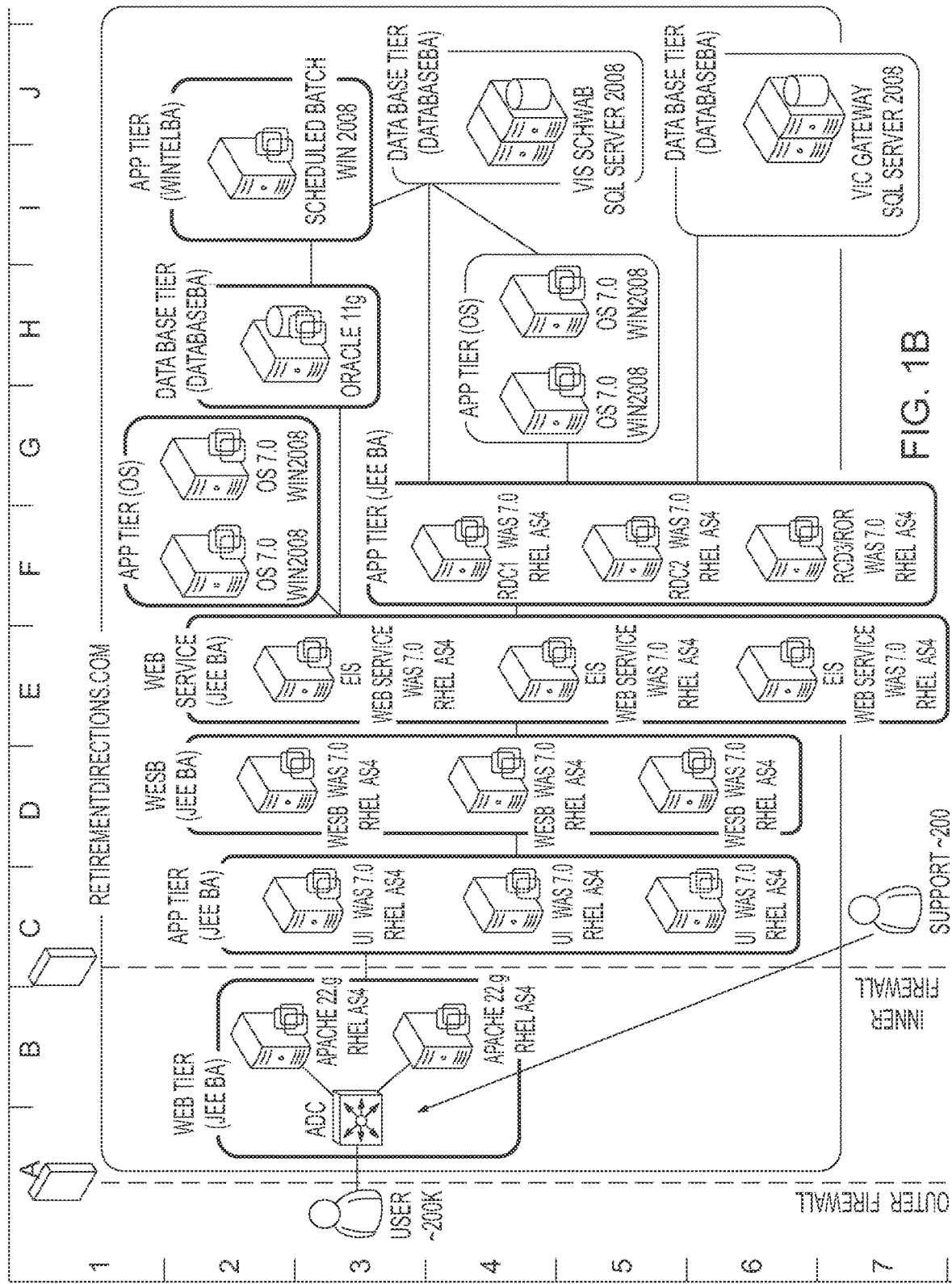
FIG. 1B illustrates a multi-tiered network architecture that may be used with the disclosed system and method.
Figure 2:
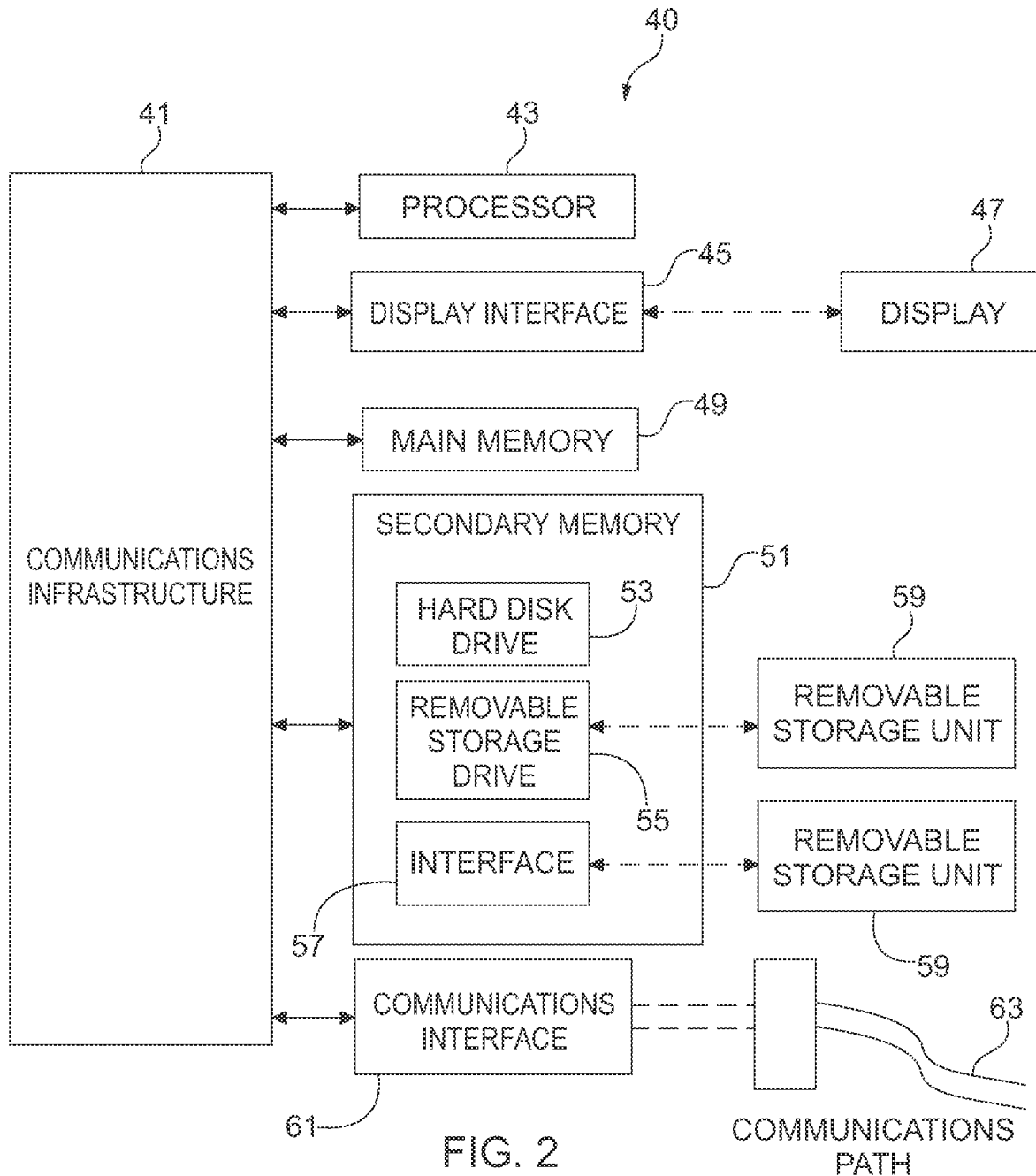
FIG. 2 depicts an example computer system in which embodiments of the present invention may be implemented. For instance, a client 3, provider 37, party 31 can each be structured as a computer system having a structure of the computer system shown in FIG. 2 in embodiments of the apparatus for managing a retirement plan. Each server of the host system 2 can also have a structure of the computer system shown in FIG. 2 for embodiments of the apparatus for managing a retirement plan.

FIGS. 1 and 2 illustrate a network architecture and computer system, respectively, for an apparatus for management of a retirement plan such as a 401(k) plan.

FIG. 1A illustrates a system 1 according to embodiments of the present disclosure. As shown in FIG. 1A, the system 1 includes a host system 2 in communication with one or more client devices $C_1, C_2, \ldots, C_i$ 3 (hereinafter also referred to as "clients 3") via a communications network 7. The clients 3 may each be a computer device such as a personal computer (also referred to herein as a "PC"), an electronic table, a smart phone, an internet appliance, or other type of computer device that can include at least one processor connected to at least one non-transitory memory and at least one transceiver unit. The processor can be any type of hardware processor element such as a microprocessor, a controller, a microcontroller, or a central processing unit. The non-transitory memory can be any type of memory storage unit such as flash memory, a hard drive, or other type of memory storage device. The transceiver unit can be any type of transceiver system that can include a transceiver configured for wireless communications and/or a transceiver configured for wired communications with one or more other communication devices such as, for example, base stations, routers, or other type of communication nodes. The communications network 7 may be the Internet, although it will be appreciated that any public or private communication network, using wired or wireless channels, suitable for enabling the electronic exchange of information between one or more clients 3 and the host system 2 may be utilized.

According to exemplary embodiments, the host system 2 may be implemented by an institution, (hereinafter also referred to as a 'host institution') such as for example, a financial institution, and can be configured to provide network-based product and service features to users (e.g., customers of the host institution that access the host system 2) associated with the clients 3. The customers can be individual customers, users responsible for managing financial accounts of a retirement plan provider, or an entity associated with managing one or more financial accounts of a retirement plan provider.

In preferred embodiments, the clients 3 may include any form of mobile or portable network-enabled computing device configured to transmit and receive information via the communications network 7 using wired or wireless connections. Clients 3 are capable of receiving user input via an input device 6. According to some exemplary embodiments, the input device may be one or more of a touch-sensitive display such as a touch screen interface, a keyboard, a microphone, or a pointing device such as a mouse or stylus. Clients 3 can also include a display device such as, for example, a liquid crystal display screen, television, or computer monitor, that is capable of rendering at least one interactive Graphical User Interface ("GUI"). Each input device 6 of a client 3, or that is communicatively connected to a client 3, allows a user to interact with the GUI described below with reference to FIGS. 3-53 to instruct the network and systems discussed herein to display, edit, and/or otherwise manipulate retirement account related information, which is then rendered in the display device.

The GUI can be rendered on a display device of one or more server computer devices of the host system 2, such as the email server 13, transaction server 11, web server 15 (which can also be referred to as a website server or website hosting server), application server 17 (which can also be referred to as an app server), and database server 19 shown in FIG. 1A. Each server can be a computer device of the host system 2. For instance, each server can be configured as a computer device such as a computer, a work station or other type of server computer system that includes hardware. The hardware can include at least one processor communicatively coupled to at least one non-transitory memory and at least one transceiver unit. The processor of each server computer system may execute at least one application for hosting a service offered to clients or other communication devices that are communicatively connectable to the server computer system.

In exemplary embodiments, a client 3 can be, but is not limited to, a personal computer, a Personal Digital Assistant (PDA), a tablet computing device, a smart phone, an internet appliance, a computer device operating the Android operating system (OS) from Google Inc., an electronic device running the Microsoft Windows® Mobile OS, an electronic device running the Microsoft Windows® Phone OS, an electronic device running the Symbian OS, a device running the webOS from Hewlett Packard, Inc., an electronic device running the iOS OS from Apple, Inc., a mobile phone, a hand held computer, a netbook computer, a palmtop computer, a laptop computer, an ultra-mobile PC, a portable gaming system, or another similar type of mobile computing device having a capability to communicate via the communications network 7.

In the exemplary embodiment depicted in FIG. 1A, the host system 2 can be based on a multi-tiered network architecture, and can include one or more of a web server 15 (Tier 1), an application server 17 (Tier 2), and a database server 19 (Tier 3). According to this embodiment, the web server 15 corresponds to the first tier of the host system 2 and is configured to communicate with the communication network 7 via a border firewall 21, and with the application server 17 via an application firewall 23. The web server 15 can be configured to accept information requests, such as, for example, HTTP requests, from one or more of the clients 3 via the communication network 7 and to provide responses thereto. The responses may include, for example, HTTP responses including static and/or dynamic HTML documents for providing a user interface ("UI") to users via the clients 3. For some embodiments, the UI may be shown on a display via an internet browser application running on a client 3 a user is operating or a client to which a user is associated such that a user is able to provide input via use of the UI so that the input from the user provided to the UI is transmittable from the client 3 to an element of the host system 2. Additionally, the web server 15 may further be configured to authenticate each user before allowing access to the UI and other resources associated with the host system 2. Authentication may be performed, for example, by validating a received account identifier ("ID") or user name and a corresponding password. The ID/user name and password may be input in the UI using an input device 6 of the client 14.

In some embodiments, the host system 2 receives at least one of employee information data and employee payroll data as input data. The input data may not be suitable for display via the GUI, thus requiring reconfiguration of the input data to output data. The input data can be acquisitioned from the information stored within the non-transitory memory of the host system 2 and/or received by inputs and/or uploads by a user through an input device 6. The input data acquisitioned may be associated with at least one employee.

With continued reference to the exemplary embodiment of FIG. 1A, the application server 17 corresponds to the second tier of the host system 2 and can be configured to communicate with the web server 15 via the application firewall 23, and with the database server 19 via an internal firewall 25. The application server 17 may host one or more applications executing logic to provide account reconciliation service features to each user via their respective user interfaces (UIs). The application server 17 may receive account credentials (e.g., an account ID/user name and password), input and selections (e.g., a request to access particular account features) from the UI of each client 3 via the web server 15. Based on this and other information received from the clients 3, applications hosted by the application server 17 may be invoked to perform a financial transactions or perform a function related to a financial transaction (e.g., retrieve account balances, estimate a possible return for a given investment option, display investment options for a 401(k) plan, etc.) and generate corresponding informational content (e.g., account balance information, account creation confirmation, etc.). Information relating to financial transactions may be communicated to the web server 15 and subsequently presented to the users using, for example, a dynamic web page or interactive GUI of the UI. Information provided to the user client device for display in the GUI can also be transmitted via the host system's use of one or more Application programming interface ("API") connections it may have or that it may form with one or more party 31 devices and/or one or more provider 37 devices. Information provided to a client computer device via an API connection may include information that is only transitorily stored in the host system but is otherwise not within a database or other non-transitory memory of a host system. For instance, the host system can communication with a device of a provider 37 to obtain information about a number of transactions for a user account for a 401(k) plan and/or performance of one or more funds of the user in the user's 401(k) account via an API connection with that device of the provider 37 and provide the information obtained via the API connection and provide data to the client computer device of that user for display on the GUI. The information obtained from the API connection can be manipulated by the host system 2 for having information displayed in a desired format or particular type of indicia. Additionally, or as an alternative, such information or a portion of such information obtained via an API connection can be provided by the host system 2 to the client computer device without substantial change for display in the GUI. Additionally, the application server 17 may also host an application for enabling users to conduct email communication with the host system 2 and other parties, as well as an application for enabling transactions and communications with one or more computer devices of a retirement plan providers and/or other parties.

In the embodiment shown in FIG. 1A, the database server 19 can correspond to the third tier of the host system 2 and be configured to communicate with the application server 17 via the internal firewall 25. The database server 19 manages one or more databases $DB_1, DB_2, \ldots, DB_t$ 27 (hereinafter also referred to as "databases 27") which store data to support one or more applications hosted by the application server 17 or elsewhere. Such databases may include, for example, account information databases, account configuration databases, new account opening databases, document identification/authentication databases, user information databases, user identification/authentication databases, user preferences/settings databases, as well as databases for storing other settings and/or configuration data. Database information requested by a particular application is retrieved from the databases 27 by the database server 19, communicated to the requesting application, and updated by the database server 19 as needed.

The host system 2 may further include an email server 13 which is configured to communicate with the application server 17. In some embodiments, the host name of the email server 13 is determined by a registered domain name of the host institution (e.g., xyzbank.com), but other nomenclature may be used. In embodiments, the email server 13 includes an email client application configured to enable exchange of electronic communications between the clients 3 and one or more parties $P_1, P_2, \ldots, P_k$ 31 (hereinafter also referred to as "parties 33") external to the host system 2 via a communications network 33. The communication networks 7, 33 may be a common communication network (e.g., the Internet) or portions of a common communication network (e.g., separate local area networks connected together via the internet).

Although only a single email server 13, transaction server 11, web server 15, application server 17, and database server 19 are depicted in FIG. 1A it is to be understood that in certain embodiments, the functionalities of one or more of these servers can be implemented cluster of computing devices operating in a cluster or server farm.

The parties 31 may be computer devices associated with any person or entity with whom a user desires to communicate regarding particular aspects of a retirement account or related financial matters generally. The user of a client 3 may have, or desire to have, a financial relationship with at least one of the parties 31. Such parties 31 may include, but are not limited to, computer devices controlled by parties that offer mutual funds, bonds, stock, money market accounts, or other retirement plan related financial offerings to which a user of a client 3 can invest in, purchase, or otherwise acquire For example, parties 31 can include, but are not limited to, at least one computer system associated with a mutual fund provider, an investment brokerage company, or retirement plan provider.

As illustrated in FIG. 1A, the host system 2 may include an email firewall 10 disposed between the email server 13 and the communication network 33 to protect network traffic and electronic communications between the parties 6 and the host system 2. To supplement network traffic protection provided by the email firewall 10, the email server 13 may implement one or more policies and anti-virus scanning software for intercepting email (e.g., "spam" email) unrelated to financial matters and possibly including malicious content. A user of a client 3 may be allowed to view intercepted email and authorize trusted senders, such as a particular one or more selected parties or providers.

The host system 2 may further include a transaction server 11 which is configured to communicate with the application server 17. The transaction server 11 typically includes a client transaction application for enabling transactions. For example, transactions may take place between the clients 3 (customers of the host institution) and one or more financial service providers $V_1, V_2, \ldots, V_k$ 37 (hereinafter also referred to as "provider 37") external to the host system 2 via a communications network 35. The communication networks 7, 33, 35 may be a common communication network (e.g., the Internet) or may be separate local area networks, enterprise networks, or other types of networks that are each communicatively connected together via the Internet. The transaction 11 server includes functionality to allow retirement plan participants and/or potential retirement plan participants to assign deposits to one of their financial accounts managed or overseen by a provider 37. When a transaction is authorized (e.g., by signature, by PIN number, etc.), the provider may communicate an acknowledgement of receipt and/or deposit to the transaction server 11 via the communications network 35. When an acknowledgement of receipt and/or deposit is received from a provider 37, the transaction server 11 and/or the application server 17 may initiate appropriate steps to account for the receipt and/or deposit from the user to a financial account (e.g., 401(k) retirement account, individual retirement account, savings account, money market account, etc.) of the retirement plan participant and/or potential retirement plan participant. According to certain embodiments, the providers 37 can include, for example, banks, investment service providers, and mutual fund companies that may be associated with the retirement plan participant and/or potential retirement plan participant and/or offer an investment vehicle that is an option in an retirement plan of the retirement plan participant and/or potential retirement plan participant.

As shown in FIG. 1A, a transaction firewall 9 is disposed between the transaction server 11 and the communications network 35 for protecting network traffic and communications between the providers 37 sent via the communication network 35 and the host system 2.

The clients 3, as discussed above and below, may be PCs and/or other network-enabled devices (e.g., cell phones, mobile phones, mobile tablets, PDAs, etc.) configured to transmit and receive information via the communication network 7 using a wired or wireless connection. The clients 3 may include a suitable browser software application (e.g., Internet Explorer, Internet Explorer Mobile, Chrome, Safari, Firefox, Blazer, etc.) for enabling the user to display and interact with information exchanged via the communication network 16. The clients 3 may thus access and navigate static and/or dynamic HTML documents of the UI.

The display devices of the clients 3 can differ depending on the type of computing device used as a particular client 3. For example, a display device of a tablet device, netbook, or laptop is typically an integrated LCD screen, which is often smaller than a monitor or console such as the display device for a workstation or desktop PC. Similarly, the display device of a mobile computing device may be a relatively small display such as mobile phone display.

The input devices 6 can also vary depending on the characteristics of a particular client 3 and its display device of that client. For example, the input device 6 of a tablet, netbook, or laptop client may include a relatively small physical or touchscreen keyboard, an integrated camera, track pad, and/or microphone, while the input device 6 of a desktop PC or workstation client such as client 3 will typically include a physical QWERTY or Dvorak keyboard and a mouse. Also, for example, an input device of a mobile client will typically lack a full physical keyboard and may instead comprise one or more of a touch-screen keyboard, a microphone, an integrated camera, a track pad, a scroll wheel, a track ball, a T9 keyboard, a button, and a touch screen display device. In embodiments, any of the display devices can be a touch screen display. It is to be understood that in the case of a touch screen interface, the input device 6 can include the configuration of the display device that allows contact with the screen of the display device or positioning of an object near the screen of the display device to provide input as well as a tool (e.g., a stylus) that is capable of interacting with the touch screen that can be used to select, slide, drag, and resize (i.e., expand, maximize, shrink, and/or minimize) interactive UI elements through pointing, pinching, and scrolling gestures.

In accordance with embodiments, the UI can be tailored to or customized for a particular client 3 based on the capabilities of the platform used by that client 3. The platform comprises physical capabilities of the client computing device such as, memory capacity in terms of random access memory (RAM) and read only memory (ROM), central processing unit (CPU) capabilities in terms of clock speed and available processing capacity, available storage in terms of disk space or flash memory, communications capabilities in terms of current wired and/or wireless network connectivity and a communications interface such as a network interface card (NIC) of the computing device, capabilities of the display device, and capabilities of the input device 6. These physical capabilities and others can be determined based on a manufacturer, model number, serial number, a Media Access Control address (MAC address) and/or another unique identifier of a computing device used as a client 3.

The platform of a client 3 also comprises software and firmware components, such as an operating system (OS) running on the client 3, Internet browser(s), native software applications installed, and privileges/permissions associated with the client 3 or a user associated with the client computer device. The privileges/permissions may be controlled by the host system 2 based on a user and/or an entity associated with the client 3 and can include data access, communications, and application execution privileges.

According to embodiments, the UIs for mobile clients may be rendered as streamlined 'mobile friendly' versions of the 'full' UI for ease of use on relatively small display devices. In embodiments, mobile friendly UIs may have reduced capabilities and/or display a lesser level of detail as compared to UI utilized for larger electronic appliances such as a PC or a workstation. A mobile friendly UI can also be tailored to accept input from input devices for a specific platform of a mobile client. The mobile friendly UIs can be automatically selected by the host system 2 in response to detecting one or more platform characteristics of a particular mobile client. Alternatively, a user of a mobile client can be prompted within the full UI to opt-in to using the mobile friendly UIs in response to detecting that the client is accessing the host system 2 via a mobile computing device. In cases where a user's mobile client has display devices and input devices capable of using the UI, the user may not wish to use the mobile friendly UI.

According to some embodiments, the UI can allow retirement plan management operations and transactions to be performed and displayed with a greater level of detail than the mobile friendly UIs. For example, the granularity of transactions or simulated transactions may be finer (i.e., more detailed) in a full UI as compared to the mobile friendly UIs.

The one or more of the communications networks 7, 33, 35 can be any network or combination of networks that can carry data communications. Such networks can include, but are not limited to, wireless data networks such as a Wi-Fi, 3G, and a 4G/LTE network. In addition, the communications networks 7, 33, and 35 shown in FIG. 1A can include, but are not limited to a wired Ethernet network, a local area network (LAN), a medium area network, and/or a wide area network (WAN) such as the Internet. In exemplary implementations of system including wireless networks, one or more of the communications networks 7, 33, and 35 can support protocols and technology including, but not limited to, Internet or World Wide Web protocols and/or services. Intermediate network routers, gateways, or servers (not shown) may be provided between components of the architecture and the system depending upon a particular application or environment.

In some embodiments, the network architecture, the multi-tiered network architecture can be configured as illustrated in FIG. 1B. Such a configuration can be achieved through the application of the disclosed communication systems and methods. With such a configured network, a reduction of real time operating systems may be realized. For example, the network architecture of FIG. 1B may be implemented with only two real time operating systems. As shown, the user interface components can be employed in-house. More control of the user experience and flexibility for changes that may occur in the future can be achieved by such a configuration. In addition, open source software, such as Angular for example, can be used, in conjunction with the in-house user interface components, to implement web services that will insulate the user interface from the back-end system. Such a configuration may facilitate an agnostic system on the user interface side. This can also enable integration of the back-end system into other front-end platforms.

FIG. 2 illustrates an example computer system 40 in which embodiments of the present disclosure, or portions thereof, may be implemented as computer-readable code. For example, the various aspects of a UI can be implemented in computer system 40 using hardware that can include a non-transitory computer readable media having instructions stored thereon connected to a processor configured to execute the instructions to cause the computer system to implement a method as defined by the instructions. The hardware of the computer system 40 can also be configured to work in connection with software and firmware. For example, each client 3, each provider 37, each party 31, the email server 13, transaction server 11, web server 15, application server 17, and/or database server 19 described above with reference to FIG. 1A can be implemented as computer system 40 or include the structure of the computer system 40. Also, the respective display devices of clients 3 and the above-listed server computing systems can be implemented as display 47, which, together with display interface 45, can be configured to render any GUI discussed herein or any visual component to a UI discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments. A processor device may be a single processor, a plurality of processors, or combinations thereof. Processor devices may have one or more processor "cores."

Various embodiments of the present disclosure are described in terms of this example computer system 40. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

The processor 43 may be a special purpose or a general purpose processor device. As will be appreciated by persons skilled in the relevant art, processor 43 may also be a single processor in a multi-core/multiprocessor system, such system operating alone, or in a cluster of computing devices operating in a cluster or server farm. Processor 43 is a hardware processor that is is connected to a communication infrastructure 41, for example, a bus, message queue, network, or multi-core message-passing scheme. The communications infrastructure 41 can communicatively connect the processor 43 to the display interface 45, display 47, main memory 49, secondary memory 51, elements of the secondary memory 51 such as a hard disk drive 53, removable storage drive 55, interface 57 for a removable storage unit 59, and/or a communications interface 61.

The computer system 40 can also include a main memory 49, for example, random access memory (RAM), and may also include a secondary memory 51. Secondary memory 51 may include, for example, a hard disk drive 53 and removable storage drive 55. Removable storage drive 55 may comprise a floppy disk drive, a magnetic tape drive, an optical disk drive, a flash memory, or the like.

The removable storage drive 55 may read from and/or writes to a removable storage unit 59 in a well-known manner. The removable storage unit 59 may comprise a floppy disk, magnetic tape, optical disk, Universal Serial Bus ("USB") drive, flash drive, memory stick, etc. which is read by and written to by removable storage drive 55. As will be appreciated by persons skilled in the relevant art, the removable storage unit 59 includes a non-transitory computer usable storage medium such as non-transitory memory having computer software, computer files, and/or data stored therein.

In alternative implementations, the secondary memory 51 may include other similar means for allowing computer programs or other instructions to be loaded into computer system 40. Such means may include, for example, a removable storage unit 59 and an interface 57. Examples of such means may include a program cartridge and cartridge interface (such as that found in video game devices), a removable memory chip (such as an EPROM, or PROM) and associated socket, and other removable storage units and interfaces which allow software and data to be transferred from the removable storage unit to computer system 40.

The computer system 40 may also include a communications interface 61. In embodiments, the communications interface 61 can include one or more transceivers. The communications interface 61 can be configured to allow software and data to be transferred between the computer system 40 and external devices. The communications interface 61 may include a modem, a network interface (such as an Ethernet card), a communications port, a PCMCIA slot and card, or the like. Software and data transferred via the communications interface 61 may be in the form of signals, which may be electronic, electromagnetic, optical, or other signals capable of being received by communications interface 61. These signals may be provided to the communications interface 61 via at least one communications path 63. The communications path 63 carries signals and may be implemented using wire or cable, fiber optics, a phone line, a cellular/wireless phone link, an radio frequency link or other communications channels.

In this document, the terms 'computer readable storage medium,' 'computer program medium,' 'non-transitory computer readable medium,' and 'computer usable medium' are used to generally refer to tangible and non-transitory. Signals carried over the communications path 63 can also embody the logic described herein. The computer readable storage medium, computer program medium, non-transitory computer readable medium, and computer usable medium can also refer to memories, such as main memory 49 and secondary memory 51, which can be memory semiconductors (e.g., DRAMs, etc.) or other types of memory devices.

Computer programs (also called computer control logic and software) are generally stored in a main memory 49 and/or secondary memory 51. The computer programs may also be received via a communications interface 61. Such computer programs, when executed, can enable computer system 40 to become a specific purpose computer able to implement the present disclosure as discussed herein. In particular, the computer programs, when executed, enable the processor 43 to implement processes of the present disclosure discussed below. Such computer programs or other software may be stored in a computer program product and loaded into the computer system 40 using the removable storage drive 55, interface 57, hard disk drive 53, or communications interface 61.

Example Implementations FOR GUIs Usable for Retirement Plan Management

The host system 2 and/or a computer system 40 can be configured for management of a retirement plan such as a 401(k) plan and/or other type of retirement plan. In some embodiments, clients 3 can be computer devices utilized by employees of a 401(k) provider that is configured to interact with the system 1 to enroll in a 401(k) plan when eligible or to interact with the 401(k) plan prior to being eligible for participation in the plan to perform initial data entry needed for enrolling in the plan as well as utilizing other offers provided by an employer. The host system 2 can be a system run by a financial institution that an employer may contract with to oversee the plan or help run the retirement plan. A party 31 can include at least one computer device of an employer who may communicate with the host system 2 to manage or oversee the 401(k) plan and interact with the host system 2 to review plan participant activities for management purposes. Other parties 31 can include one or more computer devices of financial institutions or other entities that provide information relating to funds that are available for investment in a given 401(k) plan. Providers 37 can include one or more computer devices of service providers that provide information relating to 401(k) plan or other retirement plan related activities. Providers 37 can also include one or more computers devices of financial institutions associated with a particular plan participant that may provide financial related information for a particular plan participant or potential participant to the host system 2. The clients 3, parties 31, and providers 37 can each be communicatively connected with a transaction server 11 or other server of the host system 2 to provide data to the host system.

The host system 2 can be configured to provide data to a client 3 computer device and/or to a party 31 computer device. The data that is communicated can be configured such that the data is displayable via a display device of the client computer device or party computer device. The displayed data can be presented in one or more GUIs, which can be UIs or components of UIs for the host system 2. A user can utilize a computer device to provide input via the GUI such that input provided by the user is communicated from the user's computer device to the host system 2 to provide that input to the host system 2. The host system 2 can perform one or more actions to alter a display of a graph or other visual representation provided via the GUI to be displayed via the user's computer device in response to receipt of such input from the user's computer device.

Establishing an Association with a Retirement Plan

Embodiments of the host system 2 can be configured to interact with a computer device of a client 3. For instance, the web server 15 of the host device 2 can be configured to provide information to a computer device of a client 3 to illustrate a graphical user interface being displayed on a display of the computer device of the client 3. Such a display can be provided via communications made to an internet browser running on the client computer device, for example. As another example, an application server 17 can provide such a graphical user interface via a client computer device communicating with the application server 17. The client computer device may display the graphical user interface shown in FIG. 3 as part of the initialization of an application downloaded and running on the client computer device, for example.

In some embodiments, an employee of an employer may receive information about enrolling with a 401(k) plan or other type of retirement plan offered by the employer. The employee may utilize a computer device to access a web page of a website hosted by the web server 15 or may download and run an application on the employee's computer device as part of beginning an enrollment process to the 401(k) plan. After accessing the web page, the employee may enter information about the employee such as a user name, a password, the user's date of birth, the user's age, and other information about the employee. The employee may then enter input in the employee's computer device to be communicated to the web server 15 or application server 17. For instance, the employee may utilize a mouse or a finger to have a pointer actuate a button or other indicia on a display of the computer device to communicate input to the host system 2 for indicating the user desires to enroll in a 401(k) plan. The web server 15 or application server 17 that receives such data from the computer device of the employee may then respond by sending data to the employee computer device so that a display of the employee computer device provides a representation as shown in FIG. 3, which includes a dashboard representation that includes text and graphic indicia including indicia that are actuatable to communicate input to the host system 2.

For instance, the GUI representation can be configured to include a dashboard display portion 100 that illustrates a first graphical representation that is configured to help the employee make selections for setting up a savings plan for his or her 401(k) plan that is offered by his or her employer. The representation can include informative text indicia 101 provided on a dashboard display that is adjacent to a graphical representation of a projected retirement account value as savings and investment gains are projected to accrue over time. The graphical representation of a projected value of the retirement account 107 can be below or otherwise adjacent to actuatable total retirement savings indicia 103 and retirement income indicia 105, which can be configured as toggle button indicia or other indicia that permit the graphical representation 107 to be displayed from a value of retirement savings as shown in FIG. 3 to a projected retirement income graphical representation 107a as shown in FIG. 4.

Figure 3:
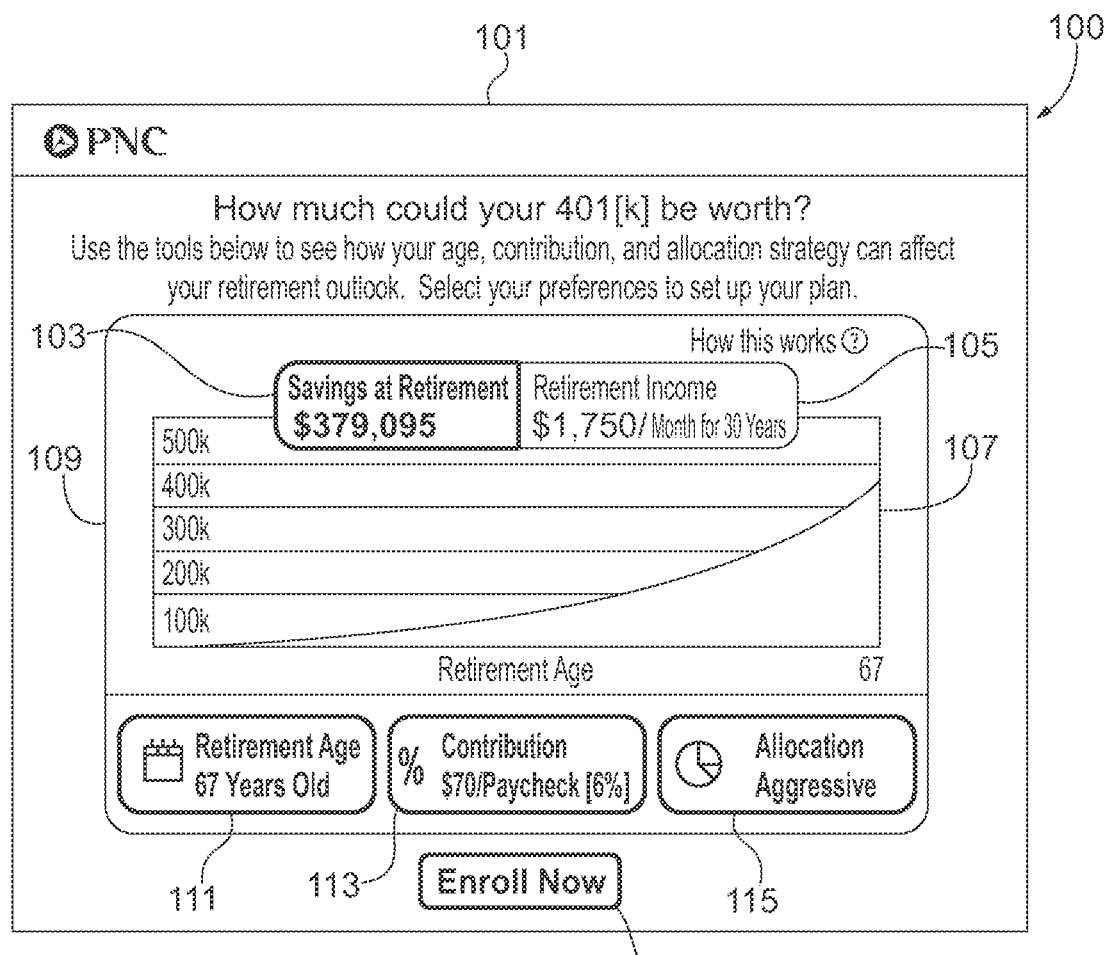
FIG. 3 illustrates an exemplary GUI that can be displayed by a display device of a client computer device based on communication that client computer device has with a host system (e.g., at least one element of the host system).
Figure 4:
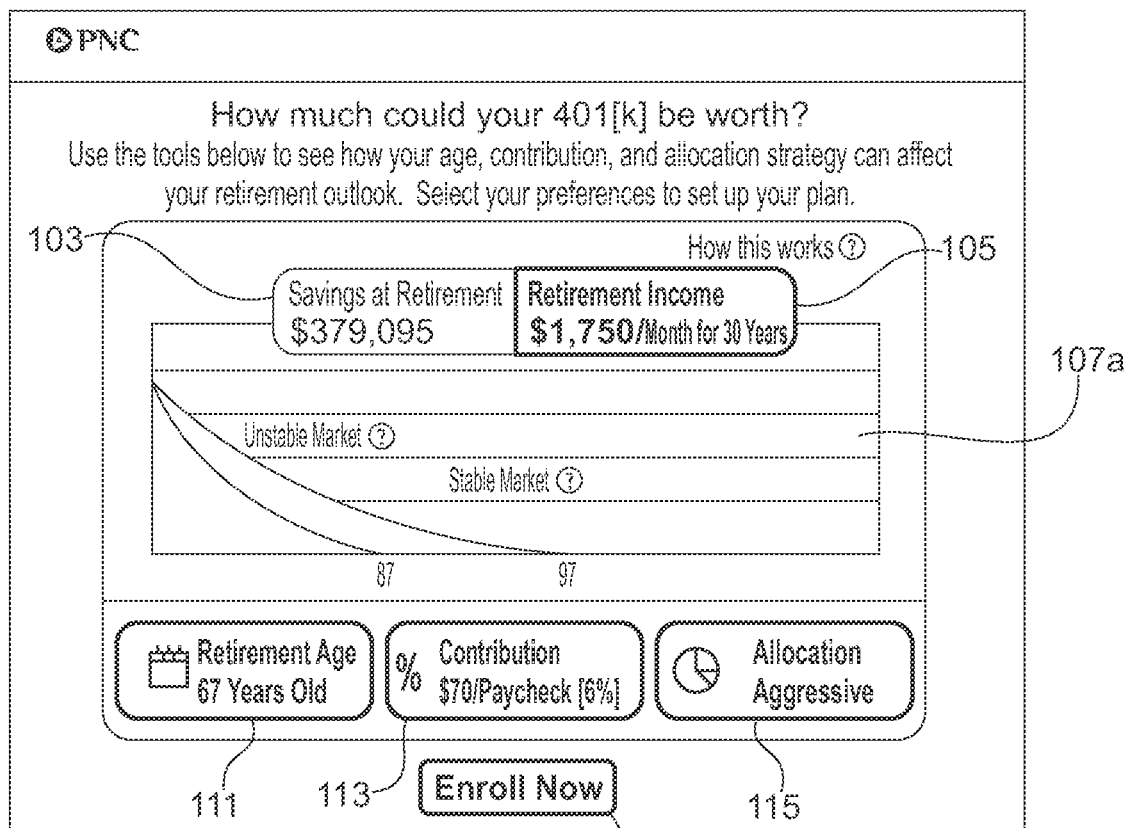
FIG. 4 illustrates the exemplary GUI shown in FIG. 3 with a display being altered in response to activation of an actuation element shown in the display to toggle a view provided by the GUI.
Figure 5:
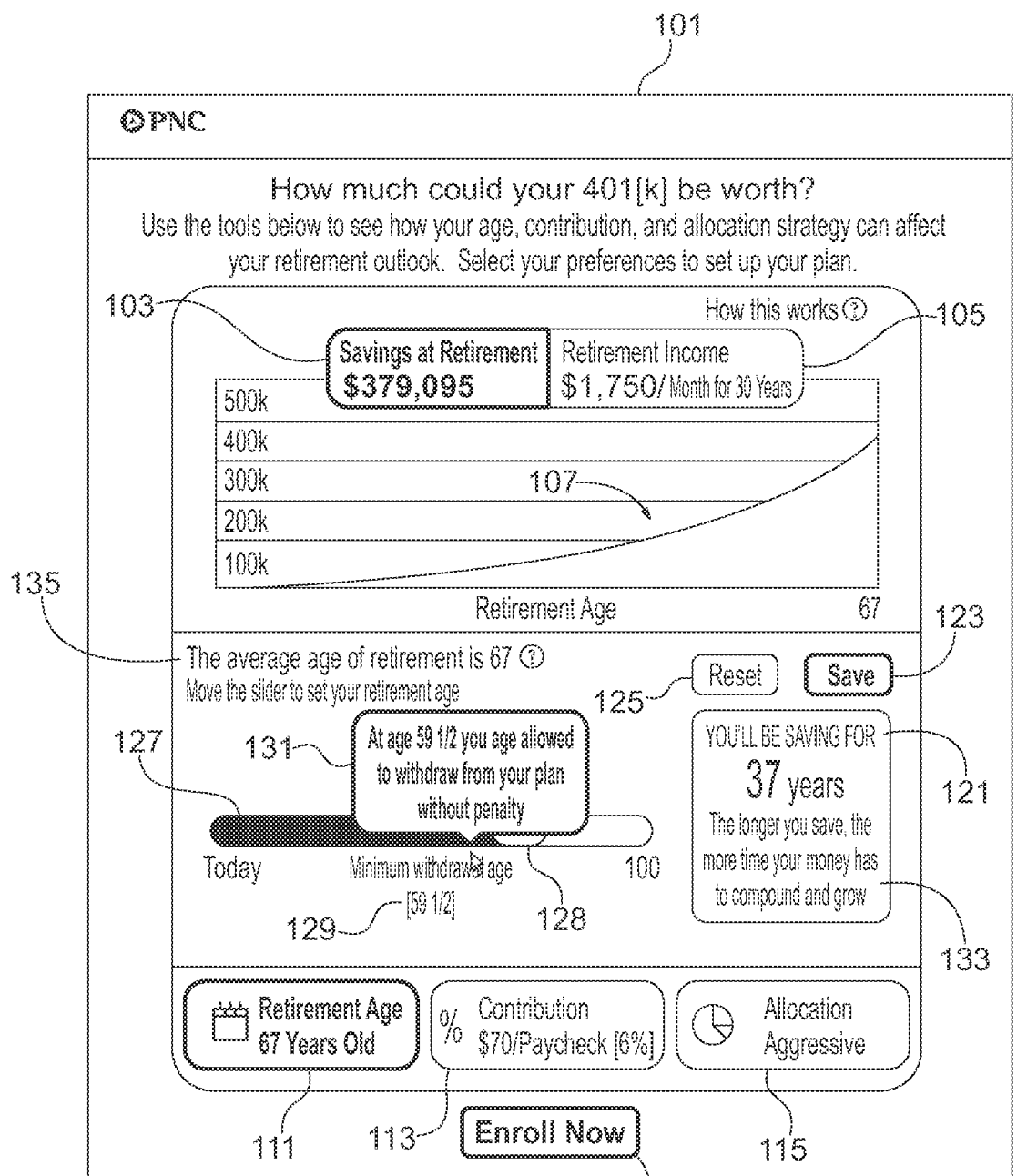
FIG. 5 illustrates the exemplary GUI shown in FIG. 3 with a display being altered in response to activation of an actuation element shown in the display to illustrate indicia relating to a selectable retirement age for predicting retirement savings.
Figure 6:
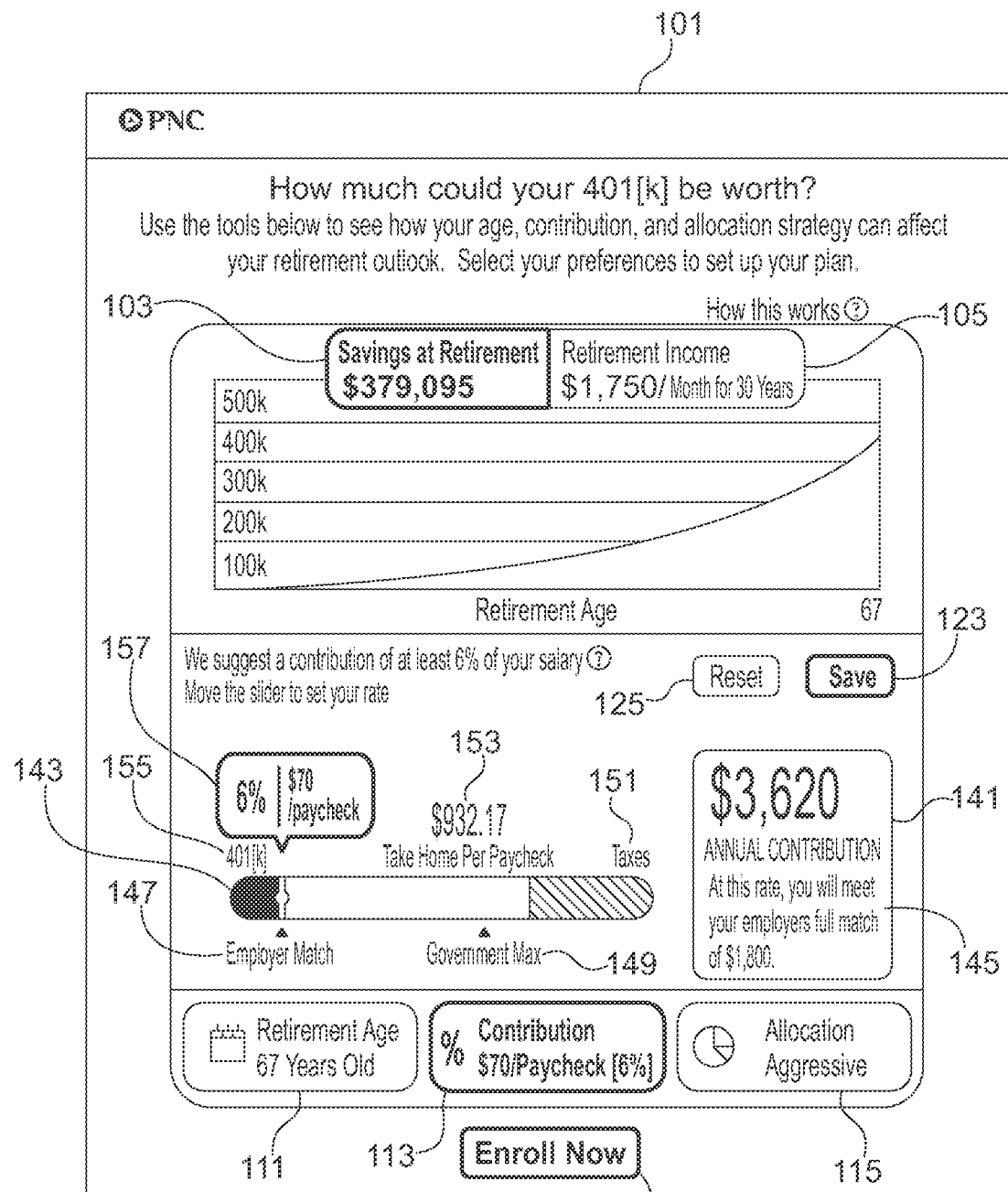
FIG. 6 illustrates the exemplary GUI shown in FIG. 3 with a display being altered in response to activation of an actuation element shown in the display to illustrate indicia relating to a selectable contribution rate for saving money from periodic payments provided to a participant by an employer for use in predicting retirement savings and demonstrating the impact on take home pay.

If a user desires to see the retirement income representation as opposed to the value of the retirement account, a user can provide input by having a pointer select the displayed retirement income indicia 105 so that the displayed graphical representation switches from the representation 107 shown in FIG. 3 to the projected graphical view 107a shown in FIG. 4. Switching back to the view of FIG. 3 can be provided by the user providing input to select the actuatable total retirement savings indicia 103.

The x-axis of the graphical representation 107 is a projected retirement age in years and the y-axis 109 of the graph can be the dollar value of the retirement account. The illustrated value of the retirement account can be shown as a curved line or other line. A height of the line along the y-axis can be shaded to better illustrate the projected value of the retirement account based on selections made by the employee when attempting to enroll. Actuatable indicia for selecting a retirement age 111, actuatable indicia for selecting a contribution level 113, and actuatable indicia for setting an allocation 115 can be displayed for manipulation by a user for selecting desired settings that may be in line with the wishes of the user. The graphical representation shown in the graph of representation 107 and view 107a can be changed in response to different settings for retirement age, contribution amount, and allocation so that a user can visually appreciate differences in value that can be implicated by the choices the user is to make so that the user selects a savings rate, retirement age, and allocation that best meets that particular user's needs and goals prior to enrolling in the retirement plan.

For instance, a user can manipulate a mouse or other type of input device to provide input to his or her computer device for selecting the actuatable indicia for selecting a retirement age 111 such that the input provided for making that selection is transmitted to the web server 115 or application server 17 of the host system 2. The host system 2 may respond to that data by providing a retirement age section display element 121 within the dashboard visual shown to the user via the display device of the user's computer device used to communicate with the host system 2. An example of such a display is provided in FIG. 5. The retirement age selection display element 121 can be configured to provide actuatable indicia for saving a selected setting 123, actuatable indicia for resetting a setting to a pre-selected default value 125, and a slider bar graphical representation 127 that includes a slider 128 that is manipulatable via transmitted user input to change a retirement age selection and select a retirement age. A minimum withdrawal retirement age indicia 129 can be positioned adjacent the slider bar graphical representation to identify an age at which a withdrawal of funds from the retirement account is permissible by applicable law without fines defined by law or penalties defined by applicable law to be incurred. The retirement age selection display element 121 can also be configured so that when a pointer is positioned over the portion of a display that illustrates the minimum withdrawal retirement age indicia 129, a pop-up box 131 is displayed that provides text identifying what the minimum withdrawal age level means to educate a user as to the significance of the minimum age value. A duration of saving text element 133 can be displayed adjacent the slider bar graphical representation 127 that identifies a number of years a user will be saving from the day on which the user is interacting with the host system 2 to the day on which the user will reach a selected age.

Additional text or other information can be included in the duration of saving text element 133 that informs a user that the longer the user saves, the more likely it is that money will compound due to investment gains and the user's account may be worth a greater sum of money.

When the retirement age selection display element 121 is shown on the display, a user may use his finger on a touch screen display, manipulate a stylus on or adjacent a display of a computer device, or utilize a mouse to cause a pointer to move along the representation shown in the retirement age selection display element 121 when being displayed by the display device of the user's computer device to provide input for making selections for providing input to the computer device of the user and for transmitting the user's selections to the host system 2. For example, movement of a mouse can be performed to cause an age selection to be changed. A user may cause a pointer to be moved to a new location on the slider bar that differs from a current setting and click the mouse such that the pointer provides input to the computer device to select the age associated with the location at which the pointer is positioned over the slider bar of the slider bar graphical representation 127. The slider bar graphic may change in response to that selection to the new value. As another example, a user may manipulate a slider 128 shown on the slider bar and provide input via manipulation of a mouse or other type of input device to cause the displayed slider to be slid along the slider bar to a particular location associated with a desired retirement age selection to provide input for selecting a new retirement age selection.

In response to input being provided for changing a retirement age selection, the savings of retirement and retirement income projections may be displayed differently to reflect the new retirement age selection. If the selected retirement age is a younger age, the displayed projected value for the retirement account shown in the graphical representation of the projected value of the retirement account 107 may be illustrated as having a lesser value. If the newly selected retirement age is an older age, the illustrated retirement account value may be greater. If the retirement income indicia 105 is selected, the retirement income graphical representation 107a can be shown above the retirement age selection display element 121 and that income may be projected as being greater when the newly selected age is older and may be shown as being lower when the newly selected age is a younger age.

Additionally, the duration of saving text element 133 can include updated text to identify a total number of years of savings that may be applicable to the user based on the newly selected retirement age. An older age selection will cause the value of the displayed age to be a larger number of years and a younger age selection will cause the value of the displayed age to be a lesser number of years in response to the changed selection for the user's retirement age.

After manipulating the retirement age selector to a desired selected age, a user can provide input by selecting the actuatable indicia for saving a selected setting 123 to save the selected age setting. A selection of that indicia via mouse, stylus, or other input mechanism can result in the user's computer device communicating the new age selection to the host system 2. If a user desires to reset the retirement age after reviewing the effects of different age selections, the user can cause a selection of the indicia for the pre-selected default value 125 to cause the selected retirement age to return to its originally set value, which may be the retirement age that is the currently saved setting for the user's account based on data saved in memory of the host system 2. Alternatively, a selection of the indicia for the pre-selected default value 125 can cause the selected retirement age to return to a pre-selected default value, such as an average age for retirement or other age value.

A user can also choose to adjust a contribution rate by dynamically seeing differences in retirement account values and retirement income values displayed as graphical representations 107 and 107a via adjustment of a contribution setting and adjustment of the graphical representation to be shown via selection of indicia 103 or 105. For instance, a user can cause input for selecting a contribution level to be communicated by using a mouse, stylus, or finger to provide input for selecting the actuatable indicia for selecting a contribution level 113 shown on the dashboard display. In response to such a selection, a contribution level selection display element 141 within the dashboard visual shown to the user via the display device of the user's computer device used to communicate with the host system 2. An example of such a display is provided in FIG. 6. The contribution level selection display element 141 can be configured to provide actuatable indicia for saving a selected setting 123, actuatable indicia for resetting the setting to a pre-selected default value 125, and a slider bar graphical representation 143 that is manipulatable via transmitted user input to change a contribution level selection and select a contribution level.

The contribution level selection display element 141 can also include a text box graphical element 145 adjacent the slider bar of the slider bar graphical representation 143 that identifies an annual savings contribution to the retirement account based upon the selected contribution level as shown in the slider bar of the slider bar graphical representation 143. The text box can also include indicia that is displayed to inform a user as to whether a selected contribution level takes advantage of any contribution match benefits provided by the user's employer and/or the retirement plan administrator.

The slider bar graphical representation 143 that is displayed can be configured to include indicia to identify numerous factors related to a selected contribution level. For instance, employer match indicia 147 can be positioned by the slider bar correlating to a maximum contribution level at which an employer or other retirement plan administer may offer to match contributions. Government maximum contribution indicia 149 can be positioned by the slider bar at a location correlating to a maximum amount of contribution that can be provided to the retirement account to identify a contribution level that will provide a maximum annual savings into the user's account as defined by the applicable laws for that retirement account.

The slider bar of the slider bar graphical representation 143 can be segregated into multiple sections along the length of the displayed bar element. A first end portion of the slider bar can be differentiated by color, text, or other demarcation to indicate that the portion of a pay check is to be contributed for saving in a retirement account based on the selected contribution level. Retirement account label indicia 155 may be positioned over this first end portion. A second end portion of the displayed bar that is opposite the first end portion can be demarcated to distinguish it from the middle and first end portions and include labeling indicia positioned over the second end portion to identify that second end portion as representing taxes deducted from a pay check of the employee based upon the contribution level selected for the retirement account and the employee's annual salary as set forth by his or her employer. The deduction of taxes illustrated by the second end portion can be based on the type of retirement account to which the contribution is to be made. For instance, taxes for a 401(k) account contribution that is to be contributed as pre-tax compensation will only include at least U.S. federal tax deductions applicable to the amount of compensation provided to a plan participant that does not include the retirement account contribution sum. (e.g., for a payment of $1,000 with a $100 contribution to a retirement account, the taxable income to which the tax deduction amount that is identified is based on a taxable income of $900). As another example, taxes for a Roth 401(k) account contribution can be estimated by considering the contribution to the retirement account as being a portion of taxable income. (e.g., for a payment of $1,000 with a $100 contribution to a retirement account, the taxable income to which the tax deduction amount that is identified is based on a taxable income of $1,000). A middle second portion can have take home pay label indicia 153 positioned over it and also be demarcated via color, style, and/or shape to indicate that the middle portion of the displayed bar indicates the take home pay the employee will actually be given after taxes and retirement account contributions are made. Contribution indicia 157 can also be displayed adjacent and above the slider bar to provide text that highlights the selected contribution level as well as how much money is actually to be contributed to the retirement account of the employee per pay check.

Figure 7:
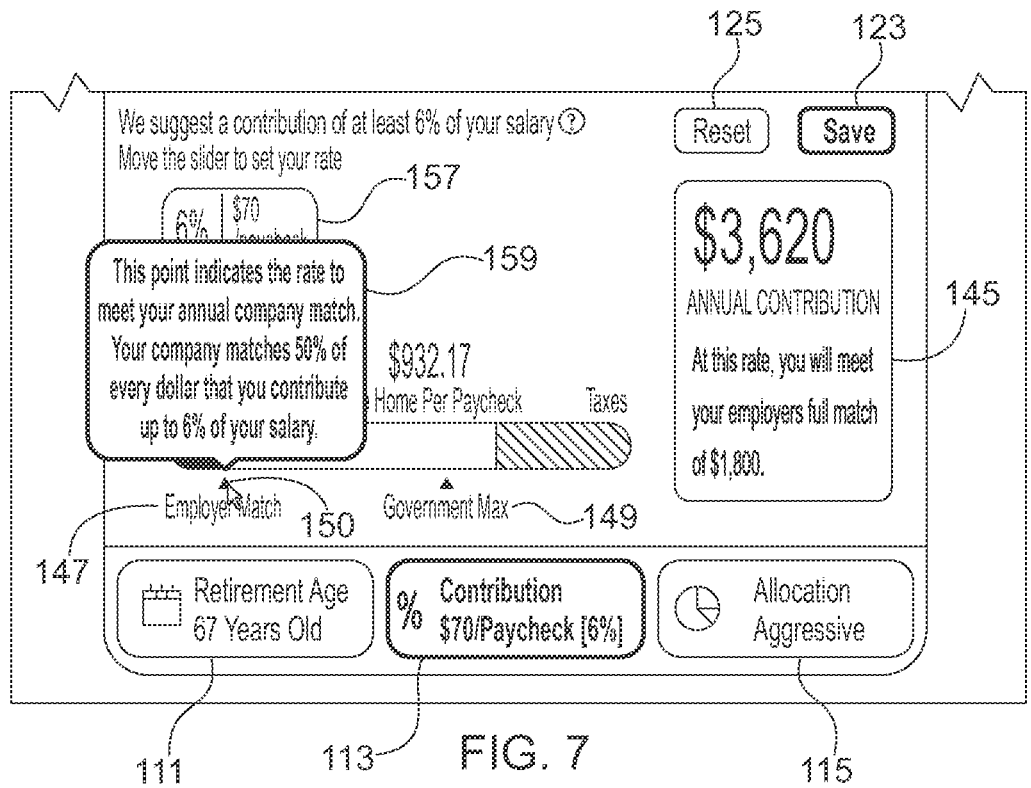
FIG. 7 illustrates the exemplary GUI shown in FIG. 6 with a display being altered in response to activation of an actuation element shown in the display to illustrate indicia relating to an employer match value.
Figure 8:
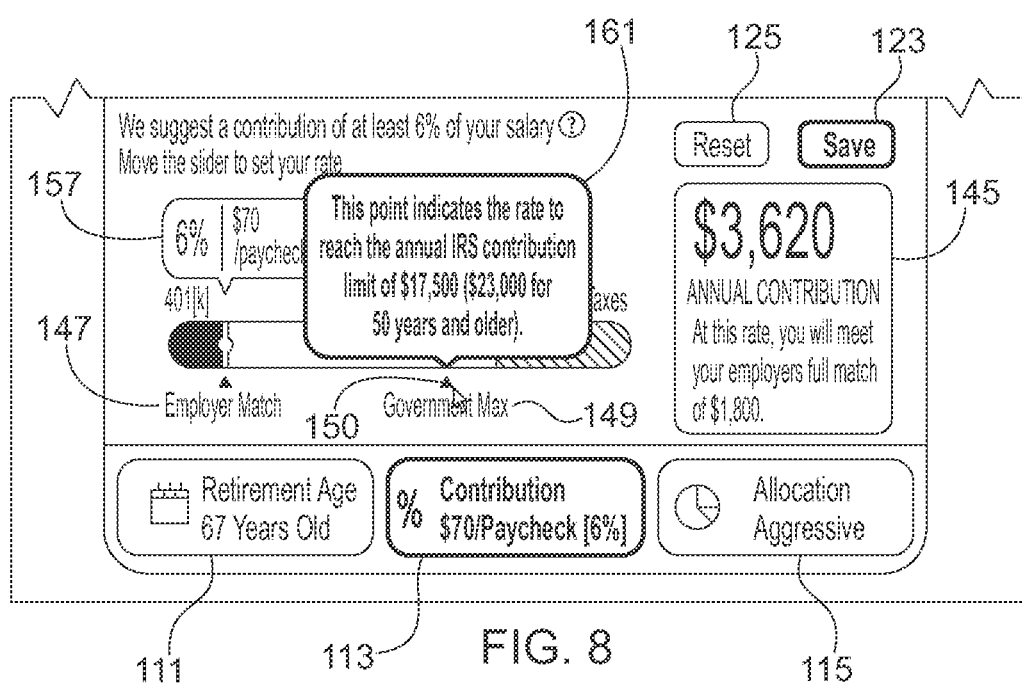
FIG. 8 illustrates the exemplary GUI shown in FIG. 6 with a display being altered in response to activation of an actuation element shown in the display to illustrate indicia relating to indicia indicating a value at which a maximum deposit of money into a retirement account that is permissible under applicable law.
Figure 9:
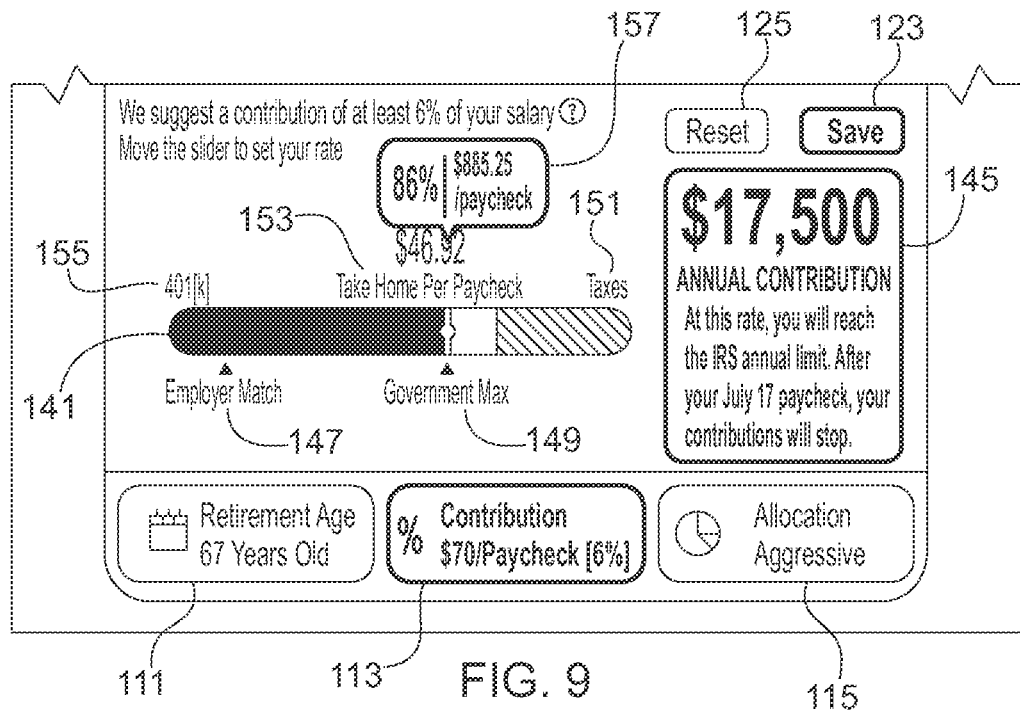
FIG. 9 illustrates the exemplary GUI shown in FIG. 6 with a display being altered in response to a user providing input that adjust a contribution amount for deposit in an applicable retirement savings account or other savings account.
Figure 10:
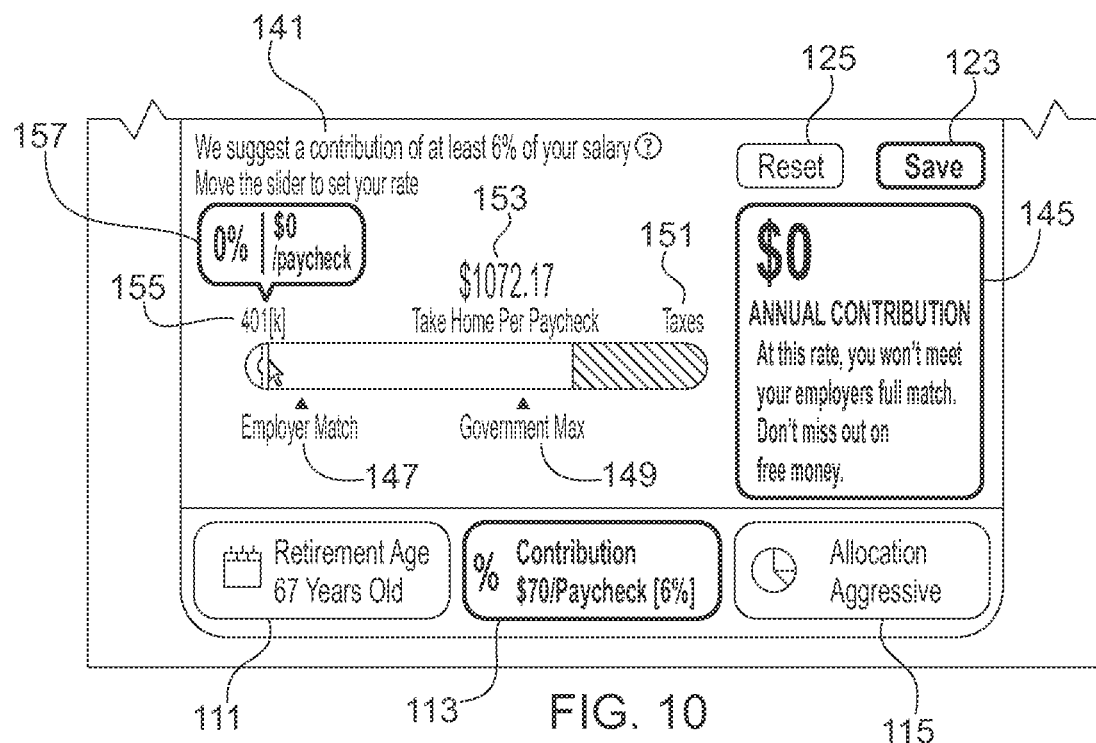
FIG. 10 illustrates the exemplary GUI shown in FIG. 6 with a display being altered in response to a user providing input to reduce a contribution amount such that no deposit of money is placed into a savings account or retirement account.
Figure 11:
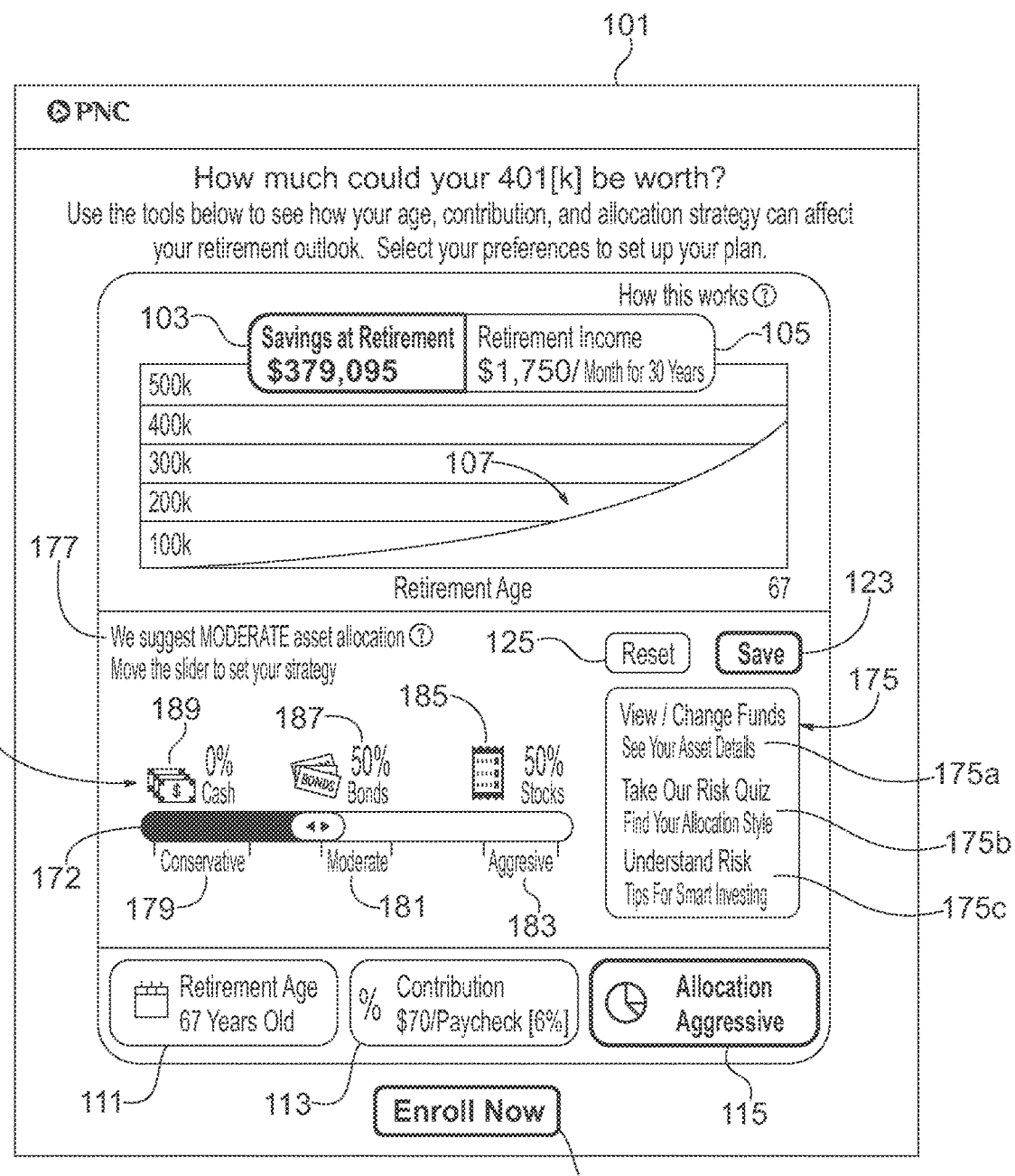
FIG. 11 illustrates the exemplary GUI shown in FIG. 3 with the displayed graphic being altered in response to activation of an actuation element shown in the display to illustrate indicia relating to a selectable allocation of assets to which money from employee compensation is to be contributed.

The contribution level selection display element 141 can be configured to provide pop up boxes or other dynamic indicia in response to a user moving a pointer along a displayed representation as shown in FIGS. 7-8. For instance, if a user moves a mouse pointer or otherwise causes a pointer 150 displayed on the display of the user's computer device illustrating the contribution level selection display element 141 to a position over the employer match indicia 147, a contribution match pop up window 159 can be configured to be displayed to provide text that explains the employer policy for matching contributions or the retirement account administrator's policy for matching contributions of the user. A government maximum pop up window 161 can also be configured to be displayed when it is detected that a user has positioned the pointer 150 over the government maximum indicia 149. The government maximum pop up window 161 can provide text or other indicia that explains information about the maximum contribution level to the retirement savings account. The user's computer device can be configured to generate the pop-up windows 161 and 159 based on data received from the host system 2 prior to or after the user has provided input for having the contribution level selection display element 141 displayed on the display device of the computer device the user is utilizing to communicate with the host system 2.

The contribution level selection display element 141 can be configured such that an adjustment of the selected contribution level results in information displayed to the user via the display of the computer device of the user changing the contribution level. For instance, the graphical representation for the projected value of the retirement account over time and the projected retirement income to be provided by the account over time provided via representations 107 and 107a can be adjusted based on the new contribution level that may be selected by a user. A lower selected level may result in the displayed value decreasing as can be seen from FIG. 10 and a higher selected level may result in the displayed value being increased as can be seen from FIG. 9. Additionally, the contribution indicia 157 can be updated to reflect the new contribution level selection and total contribution to be taken out of each paycheck based on the newly selected value. Further, the sizes of the first end portion, second end portion, and middle portion can be changed to reflect the changed contribution level to show the amount of take home pay per paycheck, taxes deducted from that paycheck and retirement account contribution that is to be made based on the newly selected contribution level. For instance, an increase in the contribution level can result in the first end portion being shown to be larger, the middle portion being shown to be smaller, and the taxes portion being shown to be smaller. As another example, the decreasing of a contribution level can result in the first end portion being smaller and the middle and second end portions of the slider bar being larger.

As yet another example of how the first and second end portions and middle portion of the slider bar graphical representation 143 can be changed based on a change to a contribution level, a change in contribution from 6% to 5% can result in a decrease in the length of the first end portion that is representative of the contribution amount from a paycheck, the middle portion that is representative of the take home pay (e.g., money remaining from a plan participant paycheck after tax deduction and the contribution to the retirement account is removed from a payment to a plan participant) may be increased in size. Additionally, the second end portion that is representative of the tax deductions may or may not change in size. For example, a Roth 401(k) plan participant, the second end portion of tax deduction may have the same length as the taxable income may not be affected by a change in contribution level. As another example, a 401(k) plan participant that is making pre-federal tax contributions would experience a change in taxable income that results from the change in contribution level such that the length of the second end portion is longer due to the decrease in contribution level. In the event a contribution change increases, the first end portion representative of the contribution level may increase in length and the middle portion representative of take home pay may decrease in length. That second end portion that is representative may stay the same length or decrease in length depending on federal or other taxes applicable to the contributions to a participant's retirement account (e.g., for a Roth 401(k) plan the second end portion will have the same length as no change in federal taxable income results from the change in contribution level, for a pre-federal tax contribution 401(k) plan the second end portion may decrease in length as a decrease in taxable income can result from an increase in pre-tax contributions made to the retirement account).

The text box graphical element 145 adjacent the slider bar of the slider bar graphical representation 143 can also change in format or text in view of changes made to the selected contribution level. For instance, an updated calculation of an annual contribution can be provided by the text of this text box graphical element in response to a new contribution level selection. Further, if a max government contribution setting is selected, the color of the text box graphical element or other indicia can be provided to alert a user as to the maximum contribution selection. If a 0% contribution level selection is made or if a contribution level that is below an employer match contribution level is selected, the text box graphical element 145 can be configured to be displayed to alert the user as to such an issue by a color change, change in text or other indicia of the text box graphical element 145 that is designed to alert a user to the issues associated with such a low contribution level selection.

A user can save a particular contribution selection by selecting the actuatable indicia for saving a selected setting 123. A user can also have the contribution level changes previously made removed to show an initial default contribution level by selecting the actuatable indicia for resetting the setting to a pre-selected default value 125 for contribution levels. That default value may be the currently saved contribution level for the user or a default value that is pre-selected such as a default value that equals an employer match level or another level value. Such selections can be made by the user manipulating a keyboard, mouse, stylus, or touch screen display of the computer device being used by the user to communicate with the host system 2.

In response to a user providing input via manipulation of an input device of his or her computer device such as a mouse, stylus, or manipulation of a touch screen display, actuatable indicia for setting an allocation 115 can be selected by a user to cause the display device to illustrate an asset allocation adjustment display element 171. A user can choose to adjust an asset allocation selection by dynamically seeing differences in retirement account values and retirement income values displayed as graphical representations 107 and 107a via adjustment of an asset allocation setting and adjustment of the graphical representation to be shown via selection of indicia 103 or 105. For instance, a user can cause input for selecting an asset allocation level to be communicated by using a mouse, stylus, or finger to provide input for selecting the actuatable indicia for indicia for setting an allocation 115 shown on the dashboard display. In response to such a selection, an asset allocation adjustment display element 171 can be illustrated within the dashboard visual shown to the user via the display device of the user's computer device used to communicate with the host system 2. An example of such a display is provided in FIG. 11. The asset allocation selection display element 171 can be configured to provide actuatable indicia for saving a selected setting 123, actuatable indicia for resetting the setting to a pre-selected default value 125, and a slider bar graphical representation 172 that is manipulatable via transmitted user input to change an asset allocation selection and select between different types of investment assets that are options within a retirement plan.

The slider bar graphical representation 172 can include a slider 173 that is displayed on the slider bar and is moveable along the slider bar via user input provided via an input device of the user's computer device from a first end portion that is associated with conservative investment options such that an asset allocation of savings is mostly for allocation in conservative investment options such as money market funds and/or bonds (e.g., 60% or more of assets to be saved are in money market funds, treasury savings and/or bonds) to a second end portion that is associated with an asset allocation that is considered to be aggressive by having an asset allocation that is mostly (e.g., 60%, 70%, 80%, 90% or 100%) in higher risk investment assets such as stocks and mutual funds. A middle portion of the slider bar can be associated with a moderate risk asset allocation that can allocate assets for savings in a moderate risk allocation (e.g., 50% bonds and 50% stock based, 40%-60% in cash, treasuries and/or bonds, and 40-60% in stock based investment options). The slider bar graphical representation 172 can include indicia that labels these different segments of the slider bar as well as providing other information relating to an asset allocation that is selectable by a user.

For instance, indicia labeling the first end portion as being conservative 179, indicia labeling a middle portion of the slider bar as moderate 181, and indicia labeling the second end portion of the slider bar as aggressive 183 can all be located adjacent to and below the slider bar. Indicia identifying the percentage of assets contributed to the retirement account to be allocated to a cash-based investment option 189, indicia identifying a percentage of contributed assets to be allocated to a bond based investment option 187, and indicia identifying a percentage of contributed assets to be allocated to a stock based investment option 185 can be displayed adjacent to and above the slider bar. Asset allocation suggestion indicia 177 can be provided in the asset allocation selection display element 171 to display indicia that suggests a particular type of asset allocation for the user based such as suggesting a moderate, conservative or aggressive asset allocation. The suggestion indicia 177 that is displayed can be configured to provide a suggestion based on the age of the user and other information about the user that the host system 2 may have available to it such as the amount of savings a user already has accumulated for retirement, retirement income streams to which the user is entitled, and other retirement income cash flow and investment related information a user may have provided to the host system 2.

An asset allocation educational graphical element 175 can also be displayed in the asset allocation selection display element 171 adjacent to an end portion of the slider bar of the slider bar graphical representation 172. The educational graphical element can include fund selecting actuatable indicia 175a that is selectable for providing a new display that a user can see and interact with for changing and/or selecting funds to which contribution to the retirement account are to be invested. A selectable link or other actuatable indicia 175b can also be displayed within the asset allocation educational graphical element 175 to provide an interactive quiz on risk tolerance such that actuation of this indicia results in a user being able to take a quiz on risk tolerance that can help the user better understand if the selected asset allocation is in line with that particular user's tolerance to risk. Educational indicia 175c can also be displayed in the asset allocation educational graphical element 175 that can be actuated via a selection of that indicia to provide a display of information about currently understood best practices for retirement investing to help people better understand risk.

Figure 12:
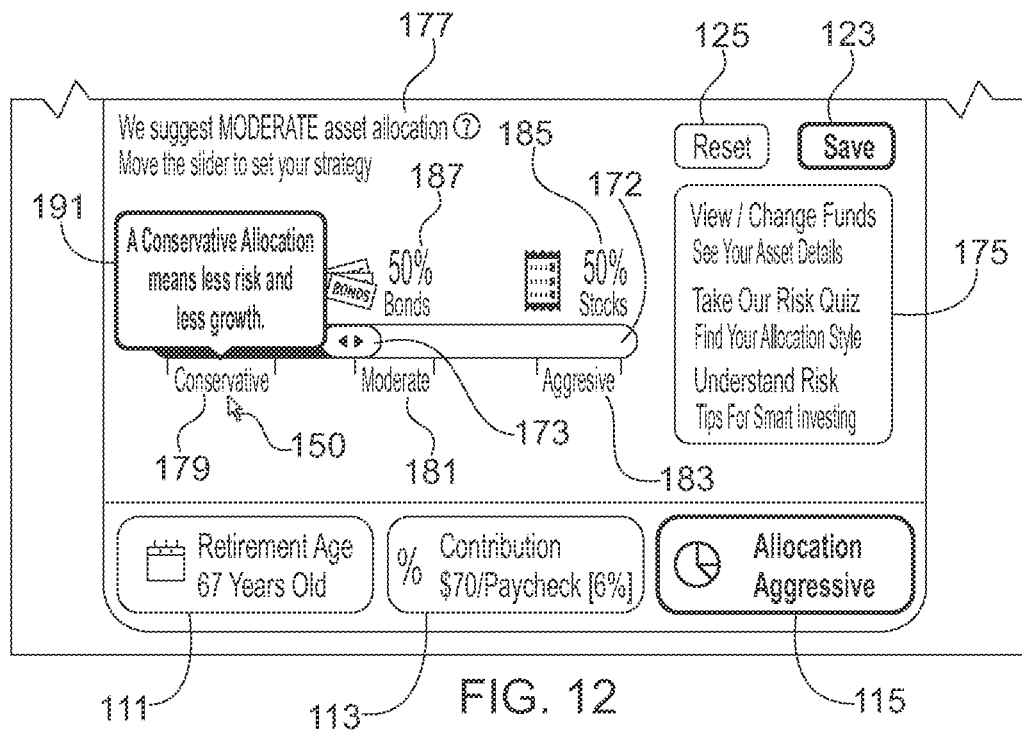
FIG. 12 illustrates an enlarged view of indicia from the GUI shown in FIG. 11 that is displayed in response to a user moving a pointer to hover over an allocation that is pre-defined as being conservative.
Figure 13:
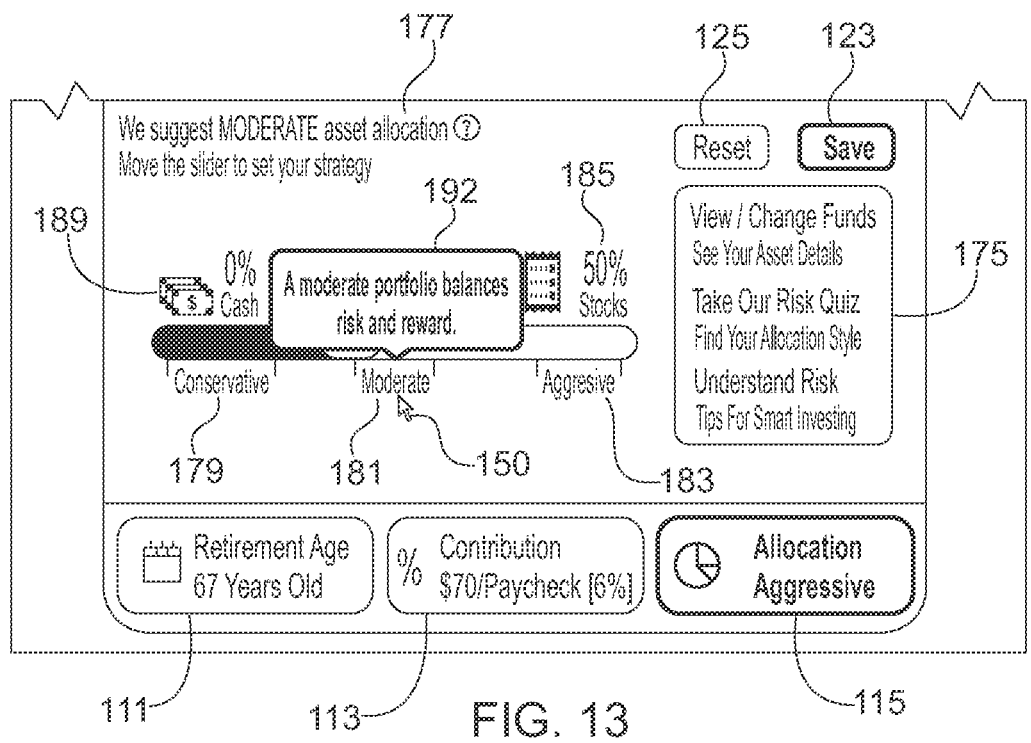
FIG. 13 illustrates an enlarged view of indicia from the GUI shown in FIG. 11 that is displayed in response to a user moving a pointer to hover over an allocation that is pre-defined as being moderate.
Figure 14:
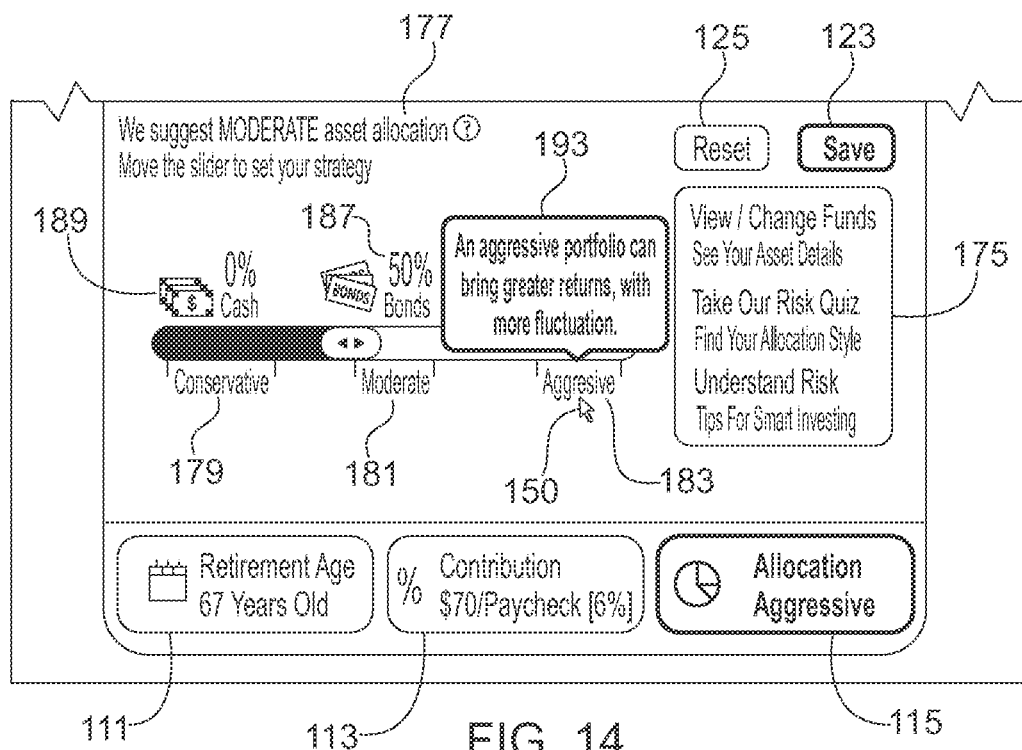
FIG. 14 illustrates an enlarged view of indicia from the GUI shown in FIG. 11 that is displayed in response to a user moving a pointer to hover over an allocation that is pre-defined as being aggressive.
Figure 15:
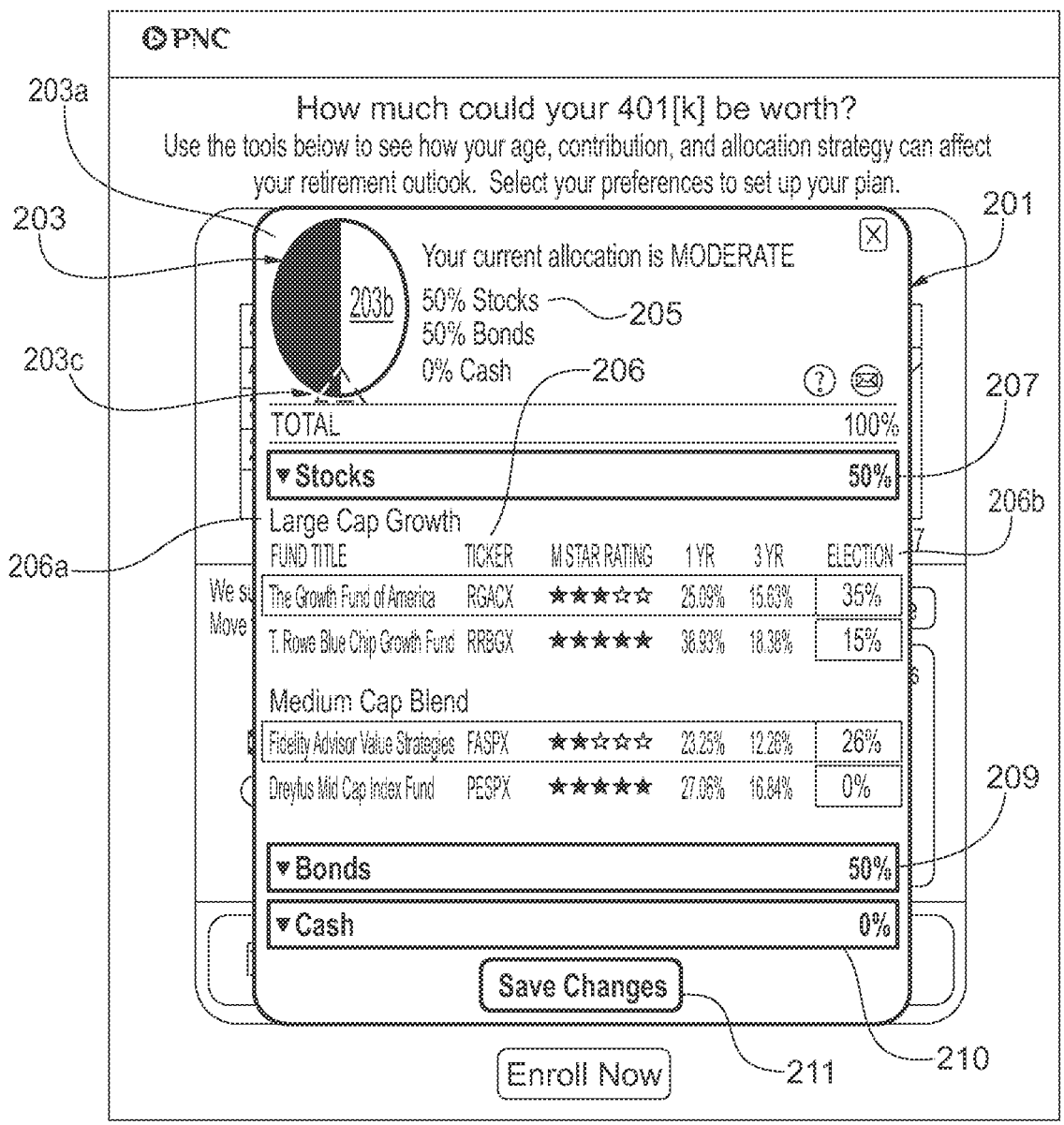
FIG. 15 illustrates an exemplary GUI display that provides indicia identifying assets that are selectable to meet an asset allocation selection previously selected by a user.
Figure 16:
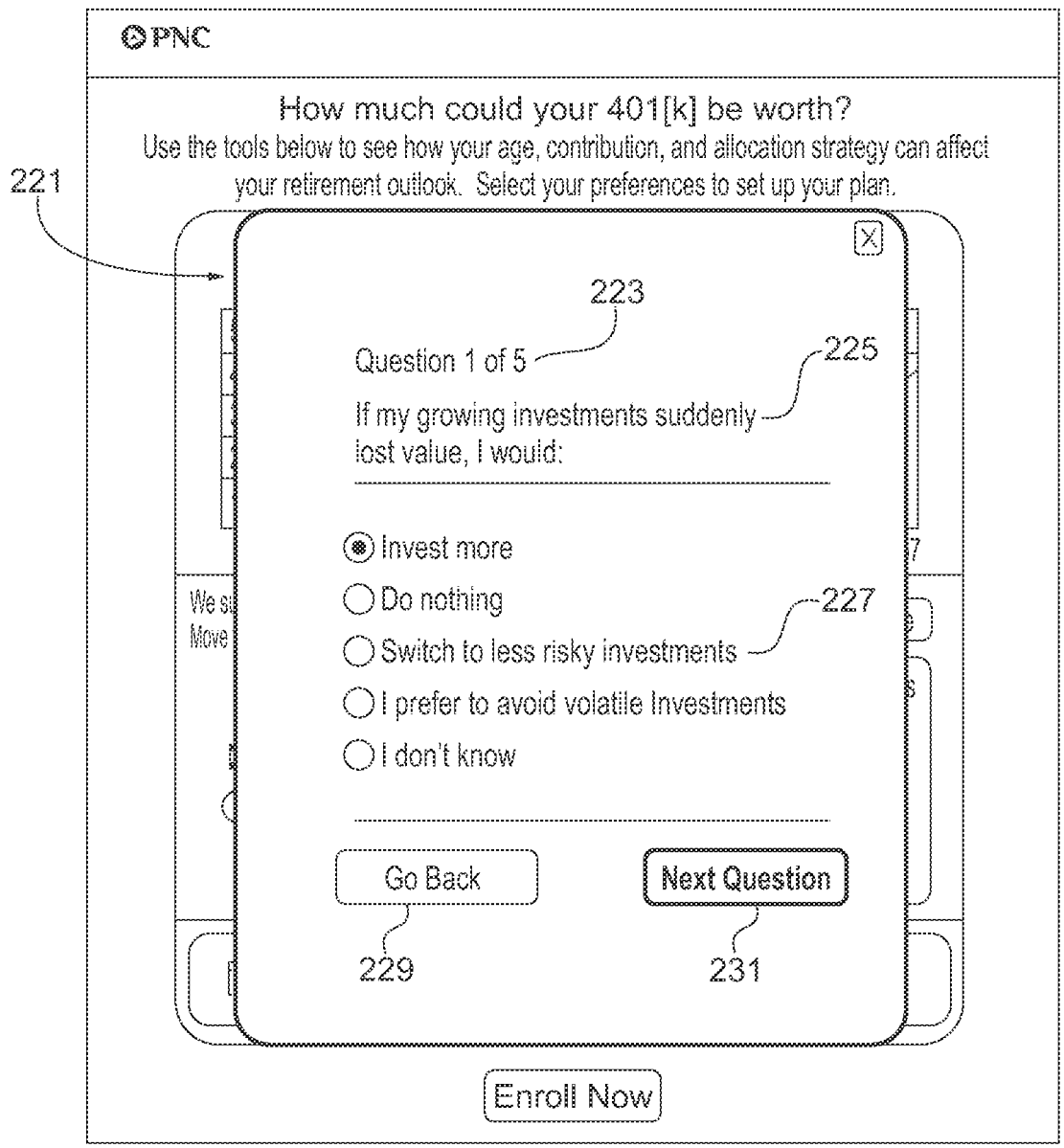
FIG. 16 illustrates an exemplary display relating to a risk quiz to be displayed in response to actuation of a link to such a quiz or selection of an allocation level for savings to be made in connection with a retirement plan.
Figure 17:
FIG. 17 illustrates an exemplary display of a GUI in response to a user providing input to enroll in a retirement plan.

When the user's computer device displays the asset allocation adjustment display element 171 to the user via a display device of the computer device, the user can manipulate an input device to interact with that display element and make selections of different indicia to cause the display to change in different ways for selecting an asset allocation for contributions that user is to make to his or her retirement account. Additionally, pop-up windows or other indicia can be displayed in response to movement of a pointer along the displayed graphics. For example, a user can cause a pointer 150 illustrated on a display device of the user's computer device to move to a location over the indicia labeling the first end portion as being conservative 179 and, in response to a detected movement of the pointer 150 to this location, an informative pop-up window 191 can be displayed as shown in FIG. 12 that displays information identifying the meaning of a conservative asset allocation. In response to movement of the pointer 150 over the indicia labeling a middle portion of the slider bar as moderate 181, a pop-up window 192 can be displayed to provide information identifying the meaning of a moderate asset allocation as shown in FIG. 13. In response to a detected movement of the pointer 150 to a location over or near the indicia labeling the second end portion of the slider bar as aggressive 183, a pop-up window providing information identifying the meaning or significance of an aggressive allocation can be shown as illustrated in FIG. 14.

A user can also move a pointer and provide input for sliding the slider 173 along the slider bar of the slider bar graphical representation 172 to provide input for changing an asset allocation. For instance, a user can move the slider bar to the terminal end of the first end portion to have a 100% cash, treasury, and/or bond investment allocation, can move the slider bar to the terminal end of the second end portion to have all of the assets to be contributed to the user's retirement account be allocated in stock, or have the slider moved between those locations to adjust the allocation for contribution allocations between cash, treasury investments, bonds, and stock based investments as desired. In response to movement of the asset allocation to a new position along the slider bar, the graphical image illustrating a predicted or projected value of the user's retirement savings account and retirement income over time shown in graphical representations 107 and 107a can be updated to reflect the new asset allocation. If the actuatable total retirement savings indicia 103 is toggled for view, the graphical representation of the projected value of the retirement account 107 can be shown to show a larger or smaller amount of overall value in the account over time. If the retirement income indicia 105 is toggled for view, the retirement income graphical representation 107a can be shown to illustrate a smaller or larger projected retirement income.

For instance, in response to input being provided for changing an asset allocation to a different allocation, the savings at retirement and retirement income projections may be displayed differently to reflect the new asset allocation selection. If the selected asset allocation is more conservative than the previously selected asset allocation (e.g., moved from an aggressive allocation to a moderate allocation or moved from a moderate allocation to a conservative allocation or moved from a conservative allocation to a more conservative allocation, etc.), the displayed projected value for the retirement account shown in the graphical representation of the projected value of the retirement account 107 may be illustrated as having a lesser value. If the newly selected asset allocation is more aggressive (e.g., moved from conservative allocation to a more moderate allocation, or moved from a moderate allocation to an aggressive allocation, or moved from an aggressive allocation to a more aggressive allocation, etc.), the illustrated retirement account value may be greater. If the retirement income indicia 105 is selected, the retirement income graphical representation 107a can be shown above the retirement age selection display element 121 and that income may be projected as being lesser when the newly selected allocation is more conservative and may be shown as being greater when the newly selected allocation is more aggressive.

The displayed graphical charts can also be shown to have different types of slopes in view of the changed selections. For instance, a change to a more aggressive allocation can result in a more varied sloped segments of an illustrated projection line having negative and positive gradients indicating that aggressive allocations tend to have substantially more instances of variance as well as more significant variance magnitudes over time in value For instance, a change from an immediately prior asset allocation to a more aggressive allocation can show a graph having more dips and slopes of greater positive and negative variances as compared to a previously displayed graphical line to illustrate the variance and risk tolerance that may be necessary for that asset selection. As another example, when an immediately prior asset allocation is changed to a more conservative allocation, the changed graphical view of retirement income and/or the overall value of the retirement account can be illustrated as being a more continuous upward growth slope with less variance and/or fewer occurrences of steep negative and positive slope segments.

To communicate a changed asset allocation for having that change saved by the host system, the user can provide input for selecting the actuatable indicia for saving the new asset allocation by moving a pointer over the indicia for saving the selected setting 123 and clicking a mouse, touching a touch screen display, or otherwise interacting with an input device to provide input for actuating the indicia for saving the selected setting 123. In response to that input, the user's computer device can communicate with the host system 2 to provide the host system 2 with data relating to the saved allocation asset changes. In response to receipt of such data, the host system 2 can change the asset allocations for that user so that future contributions to the user's retirement account are saved in assets in accordance with the asset allocations saved by the user. The host system 2 can also use such saved data in communications with other computer systems of one or more brokers or other providers when scheduling the purchase of assets for the user's retirement account after subsequent contributions to that account are made by the user to facilitate the purchase of those assets in accordance with the newly selected asset allocation made and saved by the user.

A user can also move a pointer and provide input for selecting a link or other actuatable indicia 175a that is selectable for providing a new display that a user can see and interact with for changing and/or selecting funds to which contributions to the retirement account are to be invested. Upon a user providing input to the user's computer device to select actuatable indicia provided via 175a, the computer device may provide a display for adjusting fund, bond, or cash investment options and/or the computer device may communicate that selection to the host system 2 such that the host system 2 responds to that selection by communicating with the user's computer device so that such a display is displayable on the display device of the user's computer device. An example of such a display 201 that can be presented in response to the selection of actuatable indicia 175a can be appreciated from FIG. 15. The display 201 can be configured as an interactive GUI that includes graphics and other indicia that permit a user to select different stocks, bonds, or cash based investment options offered under the retirement plan to be associated with that user. The user can also manipulate one or more input devices connected to his or her computer device to identify or select a percentage of funds from his or her contributions to be allocated to different selected investment options (e.g., particular stock funds, bond funds, bonds, or cash related investment options).

Display 201 can include a graphical image 203 illustrating an asset allocation that is currently saved or selected by the user immediately prior to having selected and/or actuated the actuatable indicia 175a. The graphical image 203 can be configured as a pie chart or other type of chart or representation. The graphical image can have different colored segments to illustrate representations of different types of assets. The different segments could alternatively be illustrated in some other different way to illustrate the segments representing different investment options (e.g., one area segment of a pie chart is filled in with hash lines and another segment area is filled in with spaced apart dots, etc.). Each different segment area within the graphical image 203 can represent the allocation of the assets selected by the user in a graphical form so that the significance of the different allocations can be more easily understood. For instance, the example of the graphical image 203 illustrates a pie chart having a first colored segment 203a and a second colored segment 203b that is colored differently than the first segment. The first segment 203a is colored to represent stocks for a currently selected moderate asset allocation and the second segment 203b is colored to represent bonds for the currently selected moderate asset allocation. As illustrated in broken line in FIG. 15, a third segment 203c can also be illustrated in the graphical image 203 as a segment area of a third color or of a segment area having a different type of shading for asset allocations in which a cash or treasury allocation is also selected.

Key indicia 205 can provide a key that identifies which colors of the segments correspond to the allocated assets. For instance, the key indicia can include text in the first color to identify the asset type to which the first colored segment 203a corresponds, text in the second color to identity the asset type to which the second colored segment 203b corresponds, and text in the third color to identify the asset type to which any third segment 203c corresponds if that third segment 203c is also to be displayed for a particular asset allocation selection.

The display 201 can also include a listing 206 of different assets or asset types to which a portion of a user's contribution to his or her retirement account is to be allocated. This listing can be illustrated below the graphical image 203 and key indicia 205. The listing 206 can include a plurality of columns identifying the asset type (e.g., stock, bond, cash, etc.), and include other columns such as a ticker symbol column, rating column, one year return column, three year return column, five year return column, 10 year return column and an election column. Additional columns could also be provided to include links or other information relating to fund fact sheets, fund prospectus information, or other fund related information. Each fund of a particular type of investment option can be listed in the different rows and information relating to the columns of the listing can be provided for that particular investment option. Data relating to a particular fund that includes historical performance of the fund, the fund ticker symbol, or the fund name can be provided based on data the host system received from computer devices that provide such data. Such computer devices can include computer devices of vendors or other parties, for example. In addition, the election column can include rows that permit a user to enter input for identifying a percentage of contributions to be allocated for a particular class of assets.

For instance, the listing 206 can include a first section 207 that is dedicated to stock related investments. Such stock related investment can include mutual fund, exchange traded fund, and index based funds that are available under a particular retirement plan offered to the user. The first section 207 can also include other stock related investment options such as classes of stock available under the user's plan. A user can select which stocks within the available options he or she wishes to allocate a portion of the regular contributions. For instance, the user can elect 35% of the contribution to be spent on stocks for acquiring a first type of large cap growth mutual fund, an election of 15% of the contribution to be spent on stocks for acquiring shares of a second type of large cap growth mutual fund, an election of 26% of the contribution to be spent on stocks for acquiring shares of a third type of mutual fund, and an election of 24% of the contribution to be sent on a fourth type of mutual fund.

The election values can be configured such that the user manually types the values into text boxes of the listing for providing input. As another option, a drop and drag box could be configured so that a user can scroll through election percentage options for indicating how the election of funds is to be made. The system can be configured to require the user to have his or her election to a 100% election threshold so that there is no unused portion that is unassigned for the contribution to be made into stock type assets.

A user can select a second class of assets by having a pointer click on indicia related to the second section 209 or the third section 210 to view investment options available to the user for those investment options as well. In response to such a selection, the display may adjust by shrinking the view of the first class of assets of the first section and providing a view of the options available under the second or third class of assets set forth in the second section 209 or third section 210. The second and third selections may include multiple columns similar to the first section 207 and also include an election column as with the first section 207 that is configured so that a user can enter election information or otherwise provide input for making an election selection for different investment options for each class of assets.

After a user has entered his or her elections for the different classes of assets so that 100% of a contribution for each class of assets is elected, the user can be in a position to save the changes for having those elections provided to the host system 2. A user can provide input by selecting a save changes actuatable indicia 211 to provide input to be communicated to the host system 2 for saving the changes made to the election settings that were entered while working in interactive display 201. The user can move a mouse, stylus, or other type of input device connected to his or her computer device to interact with the display 201 illustrated on the display device of the computer device for providing that input. The user's computer device may communicate with the host system to provide data relating to the user's elections for the different asset classes in response to the saved changed actuatable indicia being actuated. The host system 2 can respond to the receipt of that data by updating election values for the user so that the stocks, bonds, and cash investment option elections are saved in memory of the host system such that future contributions made by the user to the user's retirement account are invested into the mutual funds, bonds, bond funds, cash related investment options or other investment options in accordance with the asset allocation and elections made by the user. Future contributions received for the user's retirement account can subsequently be applied to the investment options in accordance with the elections saved by the user and the asset allocation setting saved by the user so that purchases of investment options utilizing contributions to the user's retirement account correspond with the elections and asset allocations made by the user.

The interactive quiz indicia 175b can be selected by a user via use of at least one input device connected to the user's computer device to initiate the taking of a quiz to educate the user on what the user's risk tolerance is. Such a quiz can help ensure that the user selects an asset allocation in line with the user's tolerance for risk of a loss in value of assets in the user's retirement account. In response to the interactive quiz indicia 175b being selected, the user's computer device can display a series of questions to the user via the display device of the computer device based on quiz data it received from the host system 2 prior to the user selecting the quiz indicia 175b or after the user selected the quiz indicia 175b.

In some embodiments, the host system 2 may communicate with the user's computer device so that the quiz is displayable immediately upon actuation of the quiz indicia 175b. Alternatively, the GUI may be configured such that the host system 2 only provides data relating to the quiz after the computer device communicates with the host system 2 to inform the host system that the quiz indicia 175b was actuated such that the host system 2 responds to this event by providing data to the computer device for displaying the quiz.

The quiz can be displayed via one or more windows to overlay the asset allocation adjustment display element 171. An example of such a quiz can be appreciated from FIG. 16. The overlay display 221 can include a window or a series of windows to be shown in sequence. The window 221 can include indicia identifying a number of questions to be asked 223, text asking one or more questions 225, one or more selectable answers to each question 227, and selectable indicia for going back to a previously answered question 229 and selectable indicia for proceeding to a window displaying another question 231. A user can manipulate an input device to enter answers to the questions of the quiz. Those answers can be saved by the computer device or communicated by the user's computer device to the host system 2 for saving and for use in analyzing the user's risk tolerance. After the user has provided input for the questions of the quiz and that data is communicated to the host system 2, the host system 2 can analyze the answers to identify a risk tolerance for the user based on the user's answers. Thereafter, the host system may communicate with the user's computer device to cause the user's computer device to display a suggestion that the user's asset allocation may be too risky or not risky enough given the user's answers to the quiz. The user can then utilize that information to update any asset allocations the user entered.

After a user has provided information about the user's desired retirement age, asset allocation, and contribution level, the user can select selectable indicia to enroll in the retirement plan. The enrollment indicia 117 can be a button displayed in the GUI or be a link or other type of displayed indicia that a user can select via use of an input device connected to the user's computer device for interacting with the host system 2. Upon selection of the enrollment indicia 117, the user can accept enrollment in the retirement plan offered by his or her employer. The user can select the enrollment indicia 117 after adjusting the retirement age, contribution level, and asset allocation levels from predefined default values or can simply actuate the enrollment indicia 117 after deciding that the default settings are acceptable to the user. After the enrollment indicia 117 is selected, the host system may be configured to provide various different notices to the user and require the user to accept acknowledgement of those notices. Such notices can be notices required by law to be shown to the user to ensure the user has provided a knowledgeable acceptance of enrollment in the retirement plan and a knowledgeable acceptance of the financial risks associated with the investment decisions made by the user.

After being enrolled, the user's computer device can display a window 241 that includes selection confirmation indicia 243 that informs the user that he or she is enrolled in the employer retirement account and provides a summary of the retirement age setting, contribution setting, and asset allocation setting selected by the user. Selectable indicia 245 can also be displayed so that a user can quickly access the user's account to make any changes in the event the selection confirmation indicia 243 indicates to the user that he or she made an error in selecting a retirement age, contribution level, or asset allocation setting.

Figure 18:
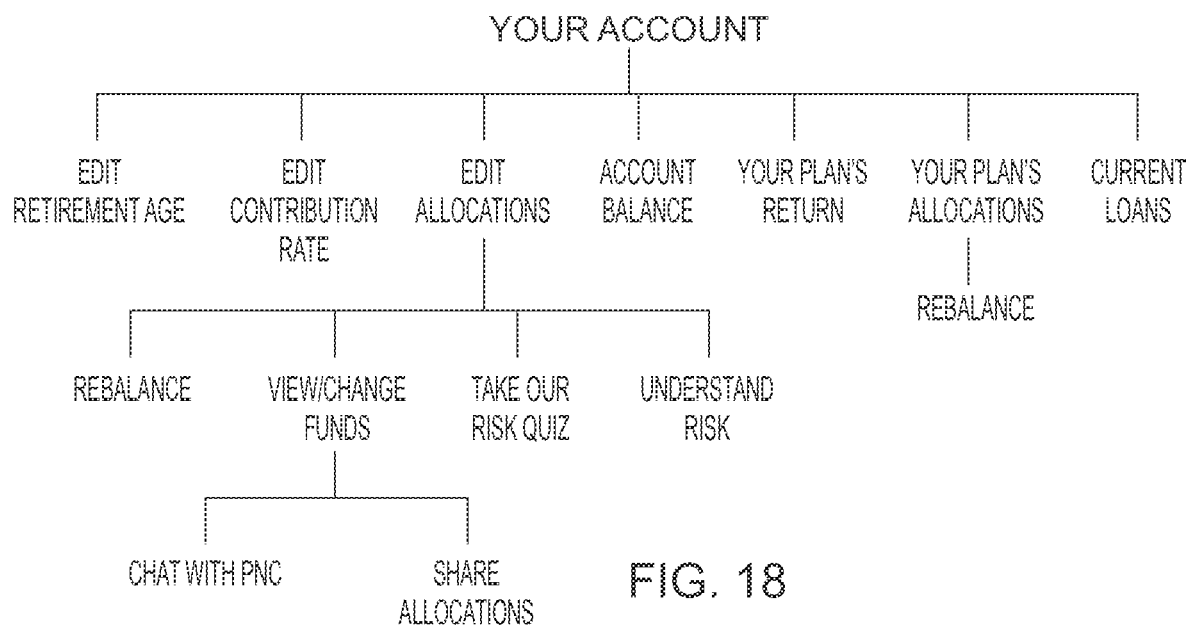
FIG. 18 is a hierarchical view of an exemplary structure for an account subsection of an exemplary dashboard GUI to be displayed to a user of a client computer device accessing information about a retirement account of that user that is providable via communication with a host system of a retirement plan administration entity.
Figure 19:
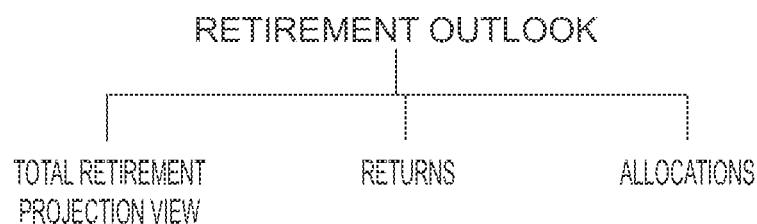
FIG. 19 is a hierarchical view of an exemplary structure for a retirement outlook subsection of an exemplary dashboard GUI to be displayed to a user of a client computer device accessing information about a retirement account of that user that is providable via communication with a host system of a retirement plan administration entity.
Figure 20:
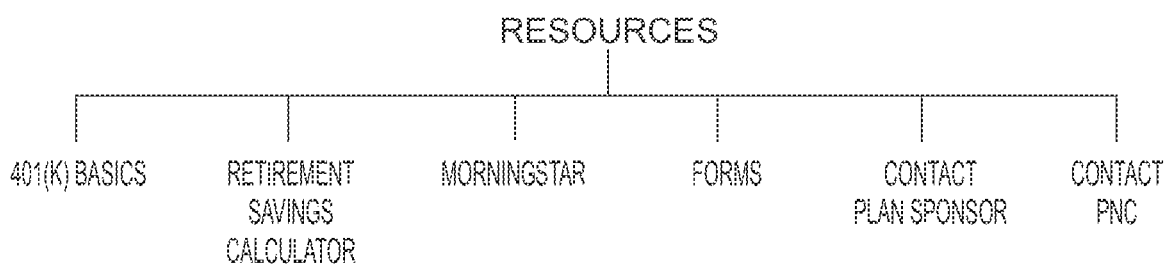
FIG. 20 is a hierarchical view of an exemplary structure for a resources subsection of an exemplary dashboard GUI to be displayed to a user of a client computer device accessing information about a retirement account of that user that is providable via communication with a host system of a retirement plan administration entity.
Figure 21:
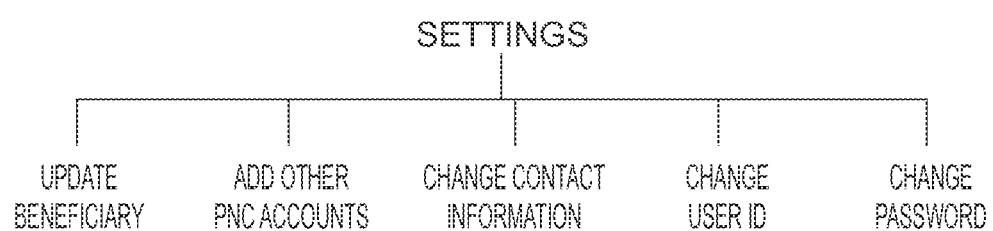
FIG. 21 is a hierarchical view of an exemplary structure for a settings subsection of an exemplary dashboard GUI to be displayed to a user of a client computer device accessing information about a retirement account of that user that is providable via communication with a host system of a retirement plan administration entity.
Figure 22:
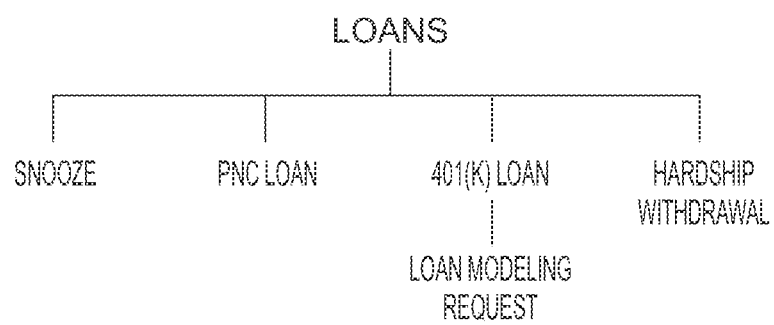
FIG. 22 is a hierarchical view of an exemplary structure for a loans subsection of an exemplary dashboard GUI to be displayed to a user of a client computer device accessing information about a retirement account of that user that is providable via communication with a host system of a retirement plan administration entity.

After being enrolled, the host system can support a website and/or an application that the user can access for taking a number of different actions relating to the user's account. FIGS. 18-22 provide exemplary hierarchy examples of how the website and/or application could be structured. For example, the website and/or application could include support for providing a user with information about the user's account and permit the user to adjust settings for his or her retirement account as shown in FIG. 18. The website and/or application can also support information for displaying to a user relating to retirement outlook such as retirement savings projections, rate of returns for the user's account of funds offered for possible investment under the user's retirement plan as indicated in FIG. 19. The website and/or application can also provide links to information about different aspects of retirement and asset performance as well as contact information or other resources as illustrated in FIG. 20. Settings for the user's account or access to the website and/or application such as user identification information, password information, or other information can be supported as shown in FIG. 21. Further, the website and/or application can support the user's application for loans or requesting a "snooze" on retirement plan contributions for some period of time as shown in FIG. 22. The "snooze" can also be understood as a cessation of contributions for some selectable time period prior to the contributions automatically being restarted again depending on a setting made by the user. The "snooze" feature is further discussed herein.

Figure 23:
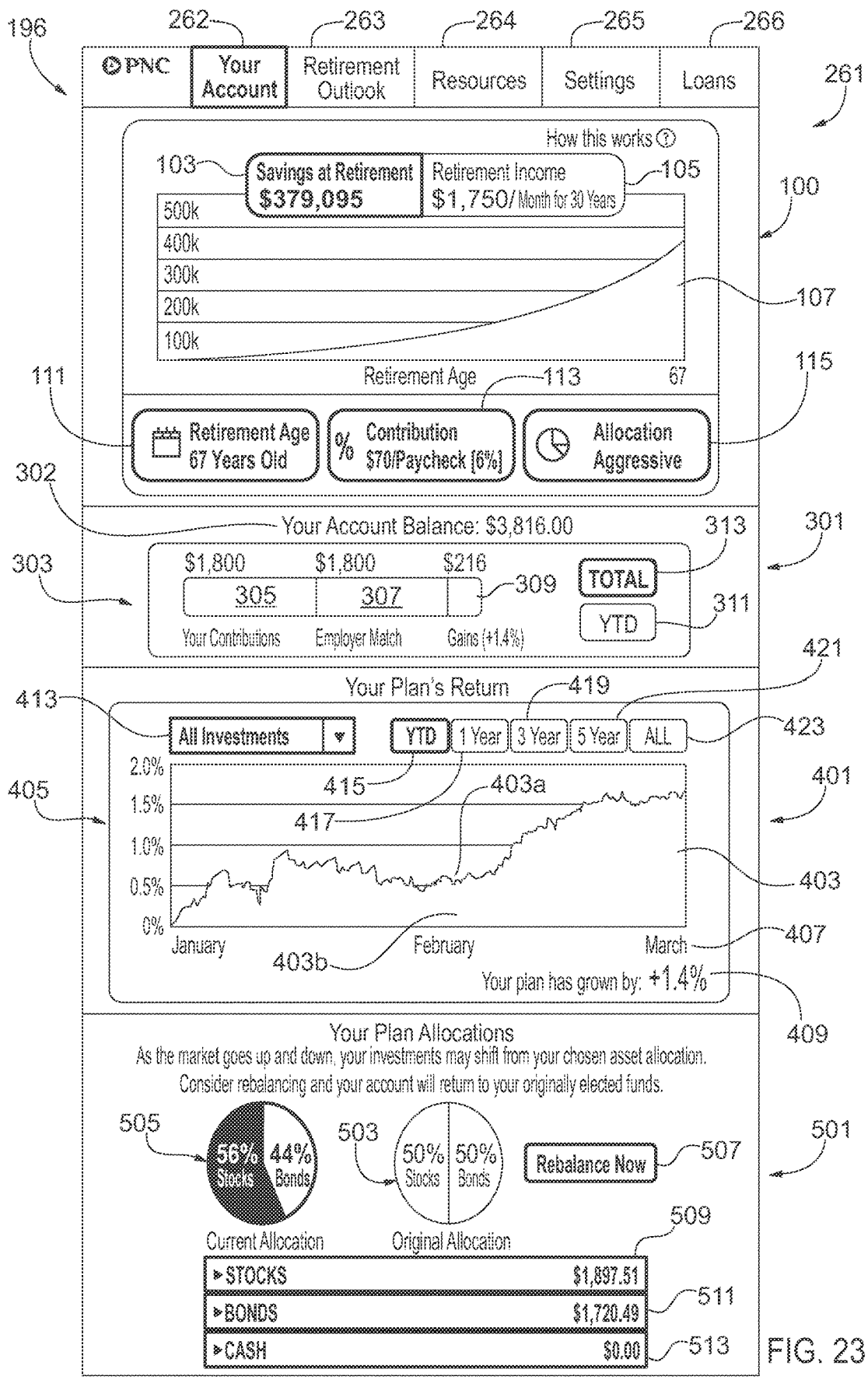
FIG. 23 is a view of a display of an exemplary dashboard of a GUI to be displayed to a user of a client computer device accessing information about a retirement account of that user that is providable via communication with a host system of a retirement plan administration entity.

Referring to FIG. 23, a user can access a web site hosted by the web server 15 of the host system 2 by entering input for a desired uniform resource locator associated with the web site hosted by the host system 2 into an internet browser run on the user's computer device. FIG. 23 is an example of a display of a user account dashboard after the user has entered password and user name information for logging in to the website hosted by the host system 2. The host system can be configured to only provide access to a user's account after receipt of sufficient security related information. Such information can include the user's saved identification information, password information as well as other security related authentication information such as fingerprint scan related data, eye scan related data, or other types of user authentication data.

In some embodiments, the user could have downloaded an application from a server and could access his or her account by running the application on his or her computer device. The application may be supported by the application server 17 of the host system. If the application is utilized, the application supported by the host system may be configured to utilize the same hierarchy and organizational structure as shown in FIGS. 18-22. The application can provide a dashboard display as shown in FIG. 23 after the user's computer device running the application has authenticated the user by communicating user identification and password related information. Other security related authentication information can also be required such as fingerprint scan related data, eye scan related data, or other types of user authentication data.

The dashboard display 196 shown in FIG. 23 can include a collection of different graphical elements 261 to provide information for summarizing to the user relevant information about the user's retirement account. That information can include the first dashboard display portion 100. The dashboard display 196 can also include a series of tabs including a first tab 262, a second tab 263, a third tab 264, a fourth tab 265, and a fifth tab 266. The first tab 262 can be associated with the dashboard display shown in FIG. 23 such that when the first tab 262 is selected the dashboard display is illustrated. The display of the first tab 262 can be structured to facilitate the support of the functions as listed in FIG. 18. The second tab 263, when selected, can result in another display being shown that is configured to facilitate support of the functions noted in FIG. 19. The third tab 264, when selected, can result in a display being shown that is configured to support the functions identified in FIG. 20. When selected, the fourth tab 265 can result in a display being shown that supports the functions listed in FIG. 21. When the fifth tab is selected, a display can be shown that is configured to support the functions identified in FIG. 22. Information for the dashboard display 196 as well as the information shown in response to selection of different tabs can be configured to incorporate or otherwise utilize information the host system 2 may receive from one or more API connections the host system 2 may form with a computer device of a provider 37. For example, information the host system 2 may provide to the user client device for display in the GUI can be transmitted via the host system's use of one or more API connections it may have or that it may form with one or more party 31 devices and/or one or more provider 37 devices. In some embodiments, information provided to a client computer device via an API connection for generation of the dashboard display 196 or other display of the GUI may include information that is only transitorily stored in the host system but is otherwise not within a database or other non-transitory memory of a host system while that data is stored in non-transitory memory of the device of the provider 37 or party 31.

The dashboard display 196 can includes a plurality of different interactive graphical elements. For example, the dashboard display 196 can include the first dashboard display portion 100. The dashboard display portion 100 can be configured to provide functions similarly to the GUI dashboard display portion 100 that can be utilized for helping the user enroll in the retirement plan offered by the user's employer or other type of retirement plant. Features of this particular dashboard display portion can be appreciated from FIGS. 3-16. For instance, a user can interact with the first dashboard display portion 100 by use of a computer device of the user to communicate with the host system 2 to adjust the user's set retirement age, contribution level, and asset allocation level for future deposits into the user's retirement account as can be appreciated from FIGS. 3-16 and 25-27 and description of aspects of these FIGS. provided herein.

Figure 28:
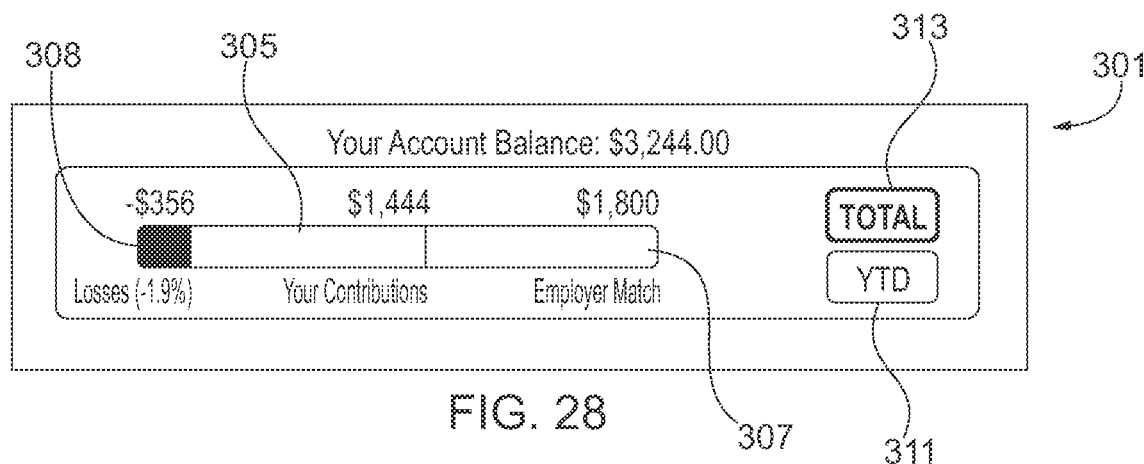
FIG. 28 is an enlarged view of a display providing indicia identifying a performance of a user's retirement plan over a pre-selected time period.
Figure 29:
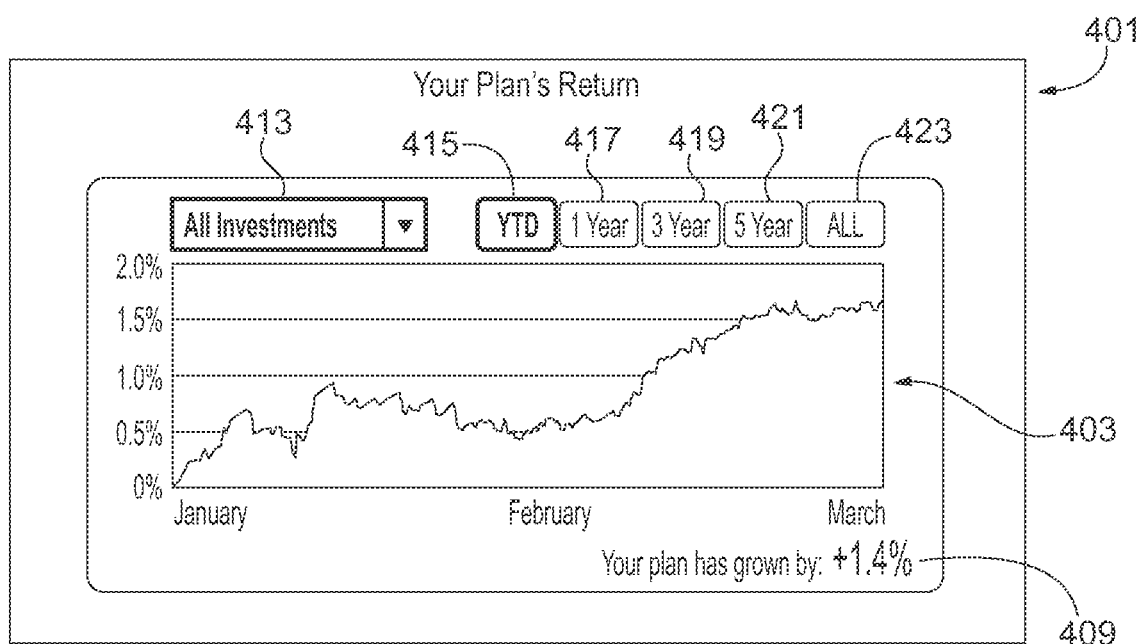
FIG. 29 is a view of an exemplary interactive display of a GUI that is configured to permit a user to assess performance of the user's retirement plan.

The dashboard display 196 can also include a second dashboard display portion 301, a third dashboard display portion 401 and a fourth dashboard display portion 501. The second dashboard display portion 301 can be configured to provide the user with a visual representation of the amount of money within the user's retirement account. The information about the amount of money within the user's retirement account can be based on data stored within the memory of the host system 2 or data obtained via a connection the host system forms with a device of a provider 37 (e.g., an API connection). The visual representation can be configured as an elongated graphical element such as a bar, elongated oval, elongated polygonal image, or other type of elongated graphical element 303. The elongated graphical element can include a number of different demarcated portions to identify subportions of the total amount within the user's retirement account. For example, a first portion 305 of the elongated graphical element can be configured to identify an amount of total contributions made by the user to the user's retirement account, a second portion of the elongated graphical element can be configured a second end portion 307 of the elongated graphical element can be configured to identify the portion of the user's retirement account that is from the user's employer providing matching contributions to the retirement account, a third portion 309 of the elongated graphical element can be configured to identify investment gains made in the retirement account. Indicia can be provided above and/or below each of the first, second, and third portions 305, 307, and 309 to label these portions and identify the total amount of value of each portion. In the event the retirement account has experienced an investment loss, a third portion 308 of the elongated graphical element can be demarcated to identify the loss of value as shown in FIG. 28. The third portion 308 for identifying a loss can be configured to be shown on a first terminal end portion of the elongated graphical element and the third portion 309 that is configured to identify a gain can be configured to be shown on a second terminal end portion of the graphical element that is opposite the end the third portion 308 would be shown when an investment loss is present. The user's contribution and employer match contribution portions can be configured to be next to each other. The employer match portion (e.g., the second portion 307) can be configured to be between the first portion 305 and the third portion 309. The user contribution first portion 305 can be configured to be located between the employer match second portion 307 and the third portion 308 when an investment loss is present as shown in FIG. 28. Indicia identifying a total balance 302 within the user's retirement account can also be displayed above the elongated graphical element. Additionally, the view of the retirement account provided by the elongated graphical element 303 of the second dashboard display portion 301 can be toggled from a year to date view that provides a view of the additions made to the account and gains and losses of the account for the present year to a total view which can provide a view of the value and gains or losses of the retirement account over the life of the account. The view provided by the elongated graphical element 303 can be adjusted between these two views via actuation of a year to date actuatable indicia 311 and a total retirement account actuatable indicia 313. A user can utilize an input device of his or her computer device to select the year to date actuatable indicia 311 and, in response, the computer device of the user will communicate with the host system 2 to provide information to the host system 2 such that the host system provides information to the user's computer device regarding the year to date performance of the user's account for display via the graphical element. The user's computer device can then utilize that data to illustrate the elongated graphical element 303 based on the data of the user's account that was provided to it by the host system 2. A user can also utilize an input device of his or her computer device to select the total retirement account actuatable indicia 313. In response, the computer device of the user will communicate with the host system 2 to provide information to the host system 2 such that the host system provides information to the user's computer device regarding the performance of the user's account throughout the life of that account for display via the graphical element. The user's computer device can then utilize that data to illustrate the elongated graphical element 303 based on the data of the user's account that was provided to it by the host system 2.

Figure 24A:
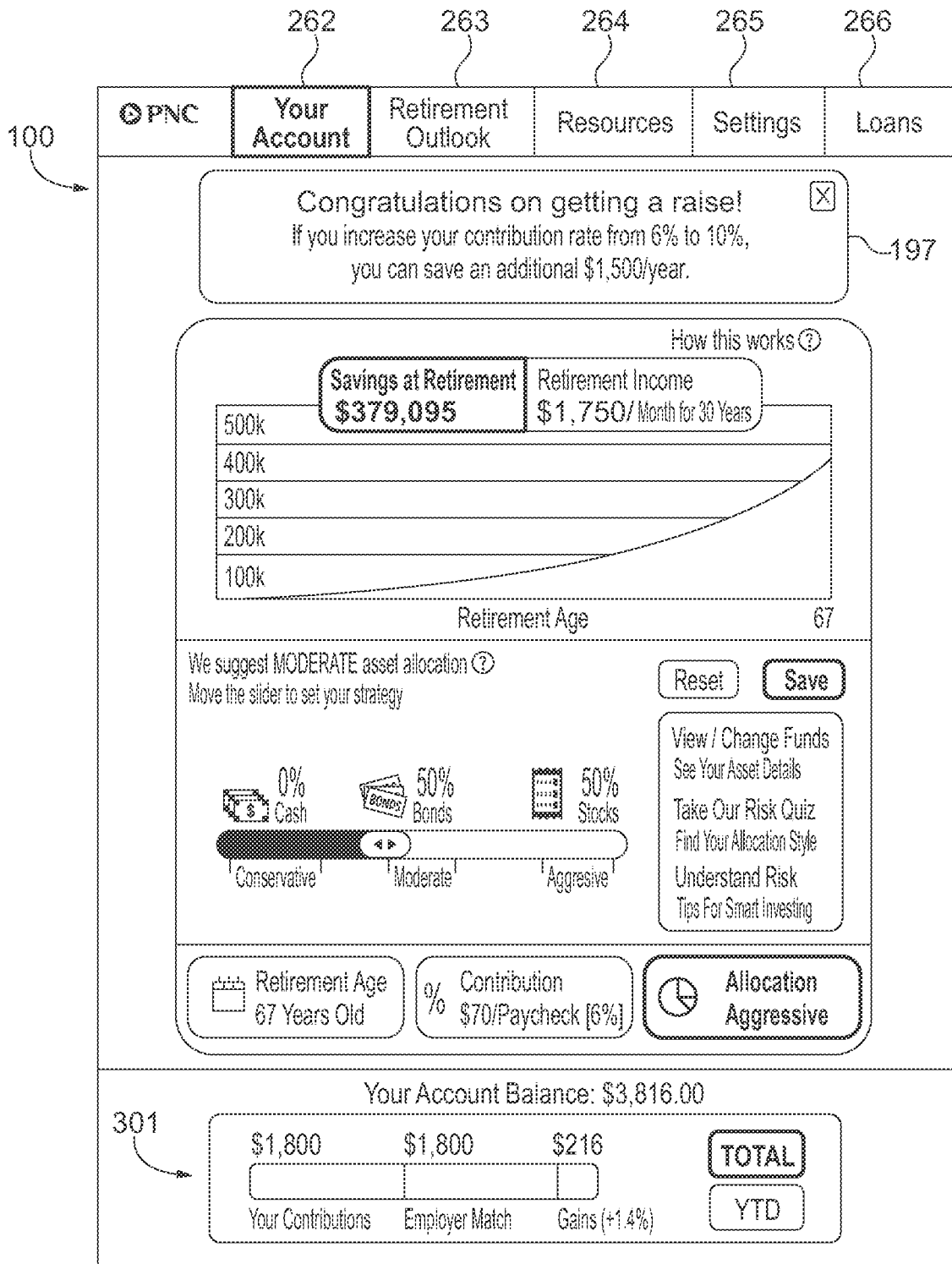
FIG. 24A is a view of a display of an exemplary graphic of a GUI to be displayed upon the host system determining that a user having logged into the host system to access information about a retirement account of that user has experienced a condition that meets a pre-selected condition such that a display is provided to the user to suggest the user change at least one condition relating to the contribution or allocation of money to be saved by a user in a retirement plan associated with that user.
Figure 24B:
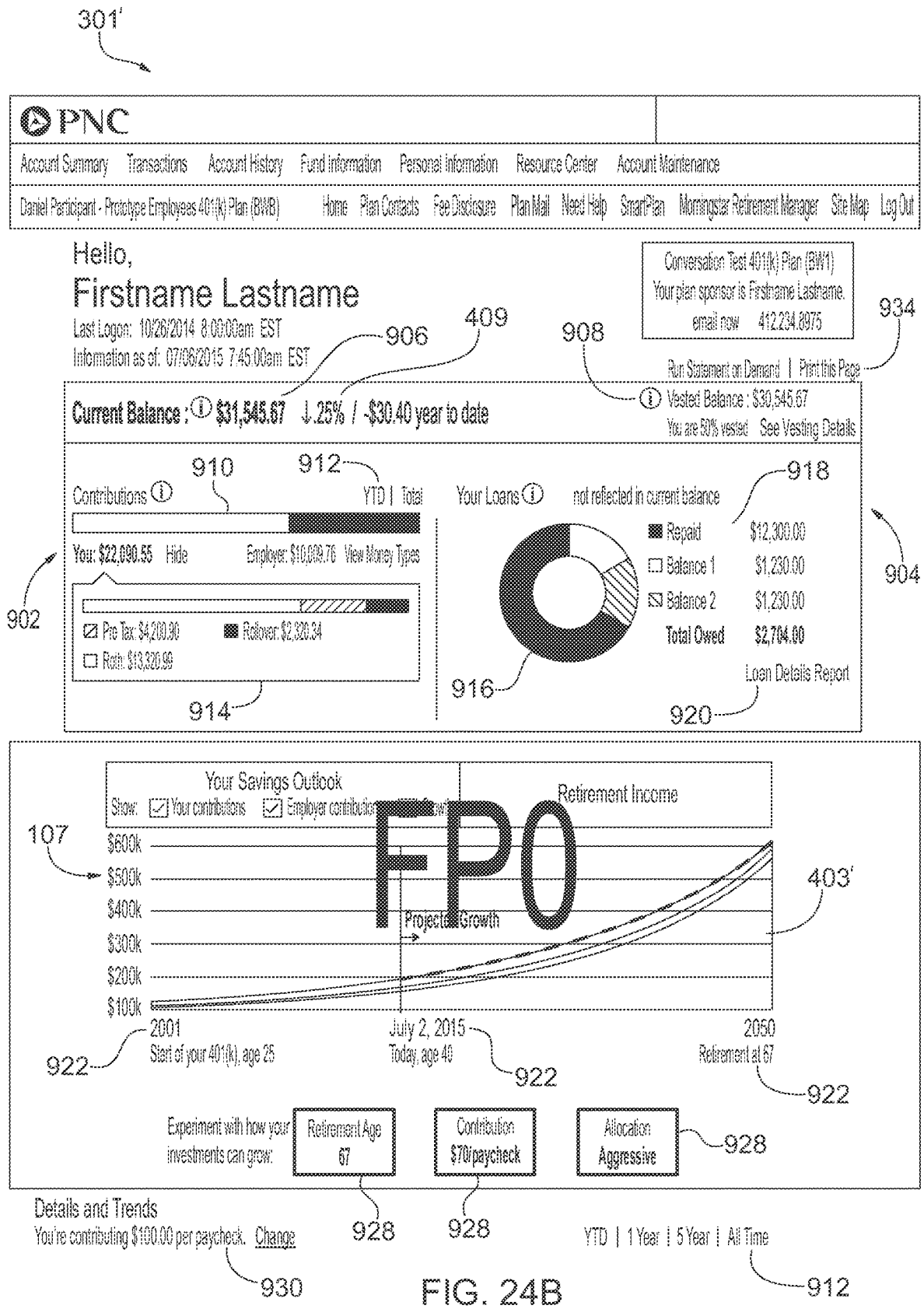
FIG. 24B is an alternative graphic of a GUI to be displayed upon the host system determining that a user having logged into the host system to access information about a retirement account.
Figure 25:
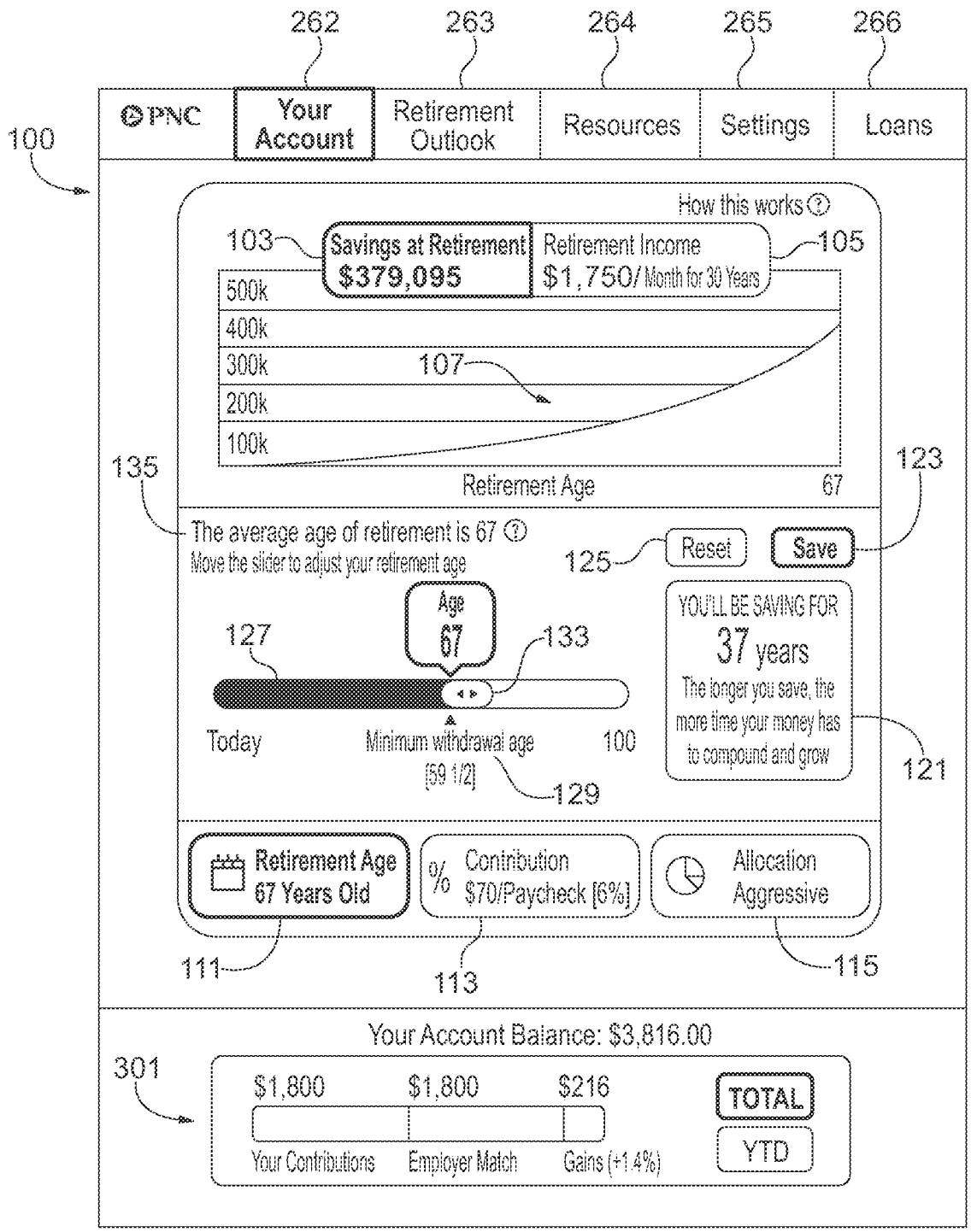
FIG. 25 is a view of a display of an exemplary graphic of a GUI to be displayed upon a user providing input to actuate a retirement age selection via interaction with a graphic shown in the exemplary display of FIG. 23.
Figure 26:
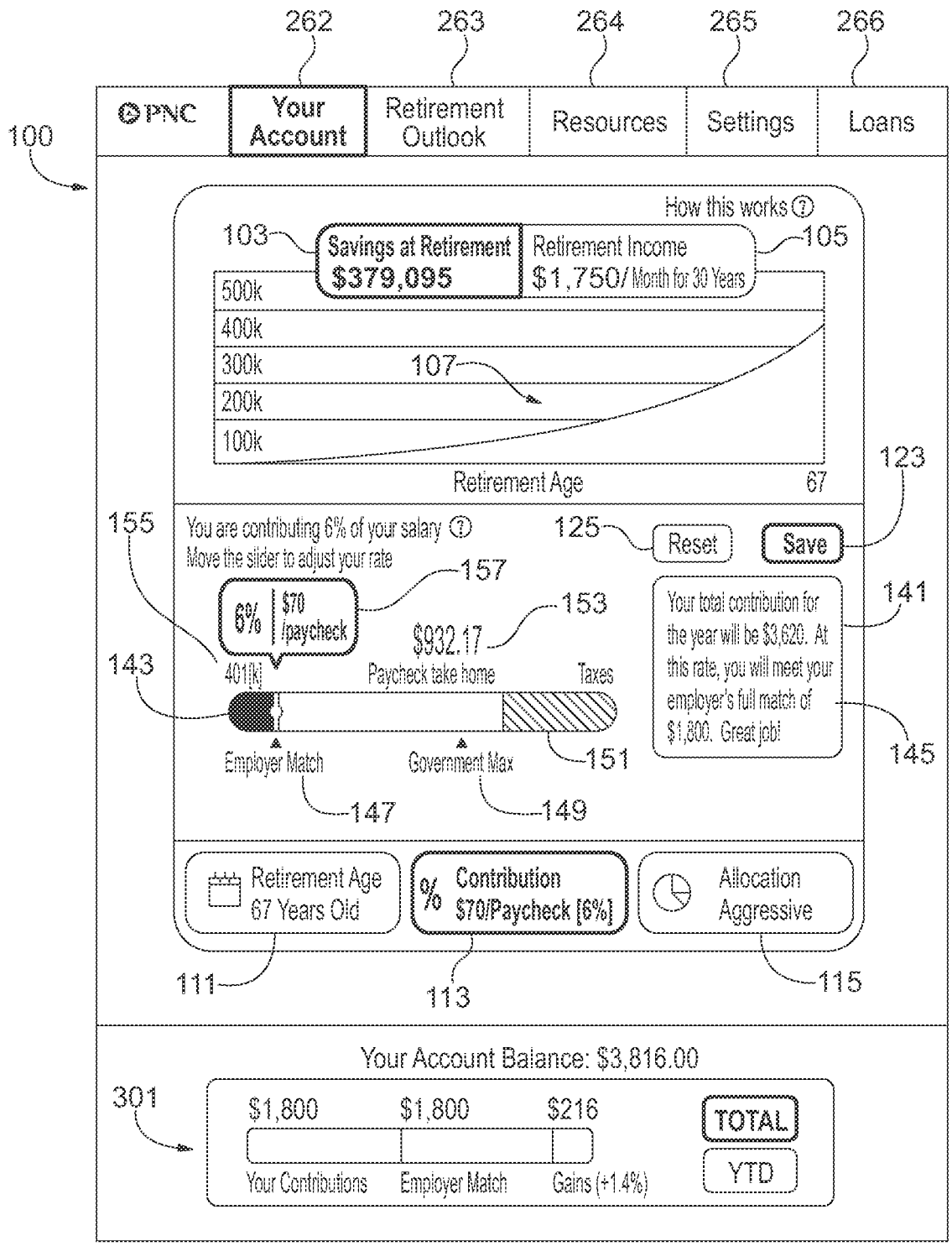
FIG. 26 is view of a display of an exemplary graphic of a GUI to be displayed upon a user providing input to actuate a contribution selection via interaction with a graphic shown in the exemplary display of FIG. 23.
Figure 27:
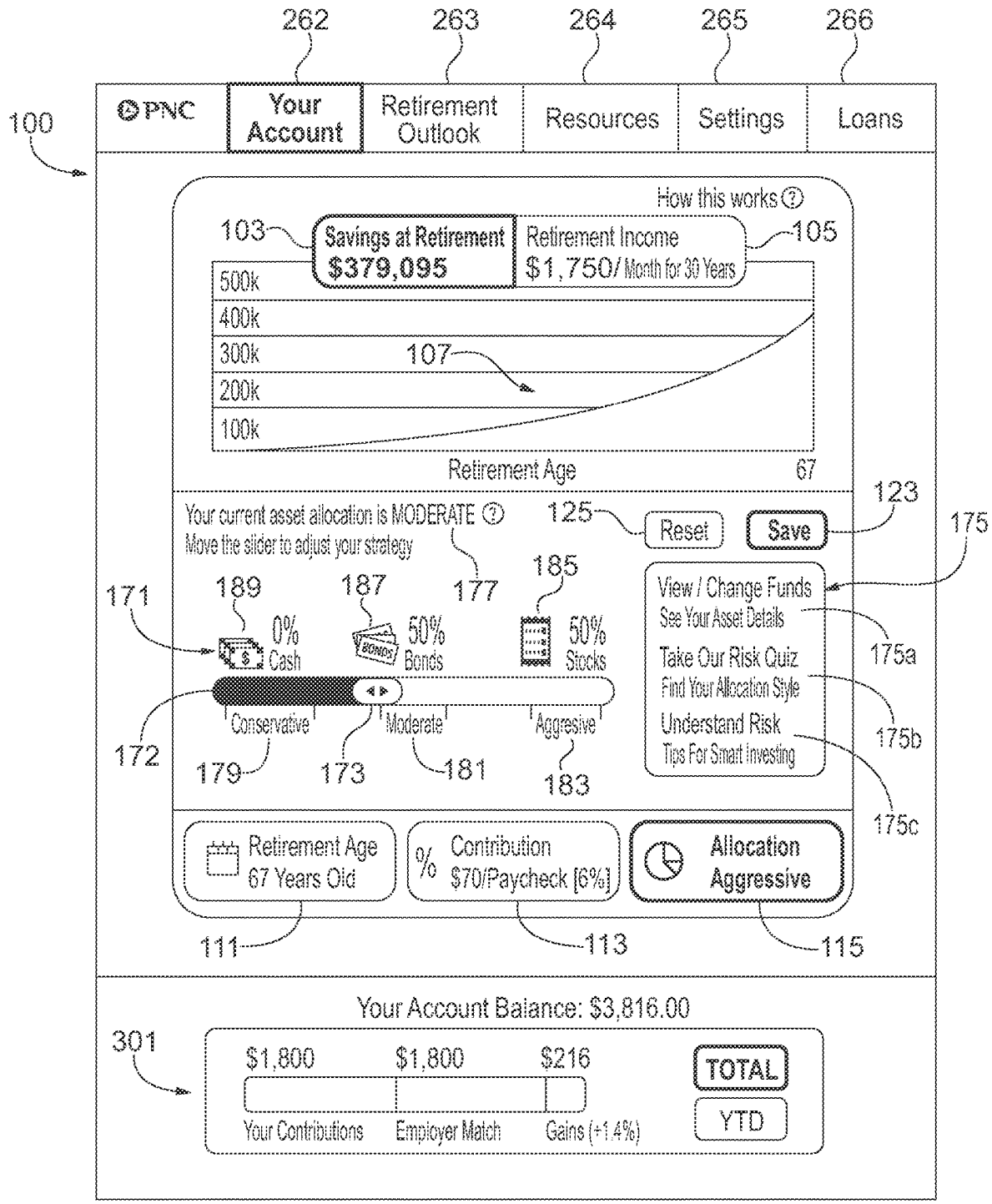
FIG. 27 is a view of a display of an exemplary graphic of a GUI to be displayed upon a user providing input to actuate an allocation selection via interaction with a graphic shown in the exemplary display of FIG. 23.

FIG. 24B is a view of an alternative graphic of a GUI to be displayed upon the host system 2 determining that a user having logged into the host system 2 to access information about a retirement account 107. This embodiment includes an alternative second dashboard display 301' and an alternative graphical representation 403' of the performance of the user's retirement account 107. The alternative second dashboard display 301' can be programmed as a balance screen panel with a contributions display 902 adjacent a loans display 904, along with a current balance indicia 906, investment return indicia 409, and vested balance indicia 908 in a header bar. While the header bar is shown as being placed at the top of the juxtaposed contributions display 902 and loans display 904, the placement of these segments can be varied.

The contributions display 902 can be programmed to display a contributions bar graphic 910. This contributions graphic 910 may be programmed to display contributions to the retirement account 107 in a segmented manner so that a user can quickly assess from where the contributions are coming from. A user can toggle between YTD, total time, or other time frames with the time period actuatable indicia 912, which will automatically reconfigure the display graphics of the alternative second dashboard display 301' accordingly. The contributions display 902 can be programmed to display a money types graphic 914, which can display the money types, such as a pre-tax, Roth IRA, and/or Rollover, for example, that comprises the retirement account 107. The money types graphic 914 can be displayed automatically or upon actuation of an actuatable indicia of the contributions graphic 910. For example, hovering over or clicking on the "You" title can generate the money types graphic 914. A user can also generate a money types graphic 914 for the Employer portion by hovering over or clicking on the "Employer" title, thus allowing a user to toggle between the money type of the participant and the employer. One or both of the contributions graphic 910 and money types graphic 914 can be programmed as a bar graph with segmented portions representing relative balances from the displayed portions.

The loans display 904 can be programmed to display an overview of the loans held by a user. The loans display 904 can include a loans graphic 916 and a loans table 918. The loans graphic 916 can be programmed as a circular bar chart with segmented portions representing relative balances from the displayed portions. The displayed portions can represent the balances of various loans held by the user, which are identified in the loans table 918. The loans table 918 can be programmed to identify the loan by a corresponding color of the loans graphic 916, and further indicate whether the loan has a current balance or has been repaid. Dollar amounts of the loans can also be displayed. A Loans Details Report actuatable indicia 920 can be programmed to link the user to a detailed report or detailed display of the loans. An explanations actuatable indicia 932 can be programmed to be displayed adjacent titles and/or headers of the alternative second dashboard display 301' (see FIG. 24C). Actuation of the explanations actuatable indicia 932 can generate a pop-up screen with textual information related to the title and/or header.

While the contributions graphic 910 and money types graphic 914 are described and illustrated as bar graphics and the loans graphic 916 as a circular bar chart, it is understood that any of the graphics can have a bar graphic, a circular bar chart, or any other shaped graphic.

The alternative graphical representation 403' of the performance of the user's retirement account 107 may be programmed to display the current and future performance of the retirement account 107 on one graphical display. For example, the x-axis may represent a timeline and the y-axis may represent the dollar value of the retirement account 107. Demarcation dates 922 can be displayed on the x-axis, which may include, but are not limited to, Start of Your 401K, Current Date, and/or Retirement Date. The alternative graphical representation 403' can be programmed to graphically display the historical performance of the retirement account 107 between the Start of Your 401K and Current Date, and the projected growth of the retirement account 107 between the Current Date and Retirement Date. Adjustment actuatable indicia 928, such as retirement age, contribution amount, and allocation, for example, can be used by a user to adjust variables and immediately determine how these affect the projected growth and projected retirement account 107 balance. A user can again toggle between YTD, total time, or other time frames with the time period actuatable indicia 912, which will automatically reconfigure the display graphics. A user can also change the contributions being made to the retirement account 107 via the change contributions actuatable indicia 930.

Upon selection of the Print actuatable indicia 934, a print screen of the alternative second dashboard display 301', which can be a snapshot of the current display without the actuatable links can be generated in .pdf format for printing.

In some embodiments, the system can be programmed to generate mobile versions of any of the various GUIs and displays. An example of a mobile version of the alternative second dashboard display 301' is shown in FIG. 24C. Mobile versions are generally displays with less features so as to not consume as much processing and/or require large display screens as compared to the non-mobile versions.

The third portion of the dashboard display 401 can provide a graphical view of the investment return the user's retirement account has experienced over any of a number of different selectable time periods. The information about the user's retirement account displayed in the third portion of the dashboard display 401 can be based on information the host system receives via at least one API connection or other type of connection with a computer system of a provider 37 or a computer system of a party 31 and/or may be based on data stored within the memory of the host system 2. The third portion of the dashboard display 401 can include a graphical representation 403 that is displayed along a y-axis 405 and an x-axis 407. The graphical representation 403 can include a line 403a extending along a y-axis and x-axis of a graph that charts the performance of the user's retirement account based on data relating to the history of the retirement account stored in the host system or that is otherwise received by the host system and subsequently communicated to the user's computer device for display. The graphical representation can also include an area 403b that is colored or otherwise demarcated that extends below the line of the graphical representation 403. The y-axis 405 can be a rate of return (e.g., percentage of investment return for the retirement account) and the x-axis can be time in terms of years, months, year-to-date, or other period of time. The period of time selected for display can be toggled between different viewed time periods. The third portion of the dashboard display can include a plurality of actuatable time period indicia for selecting the time period to be displayed in the graph of the third portion of the dashboard display. The different actuatable indicia can include a year-to-date timer period indicia 415, a one year time period indicia 417, a three year time period indicia 419 and a five year time period indicia 421. The third portion of the dashboard display can also be configured to illustrate the rate of return for all of these time periods in response to actuation of a view all actuatable indicia 423. The actuatable indicia can be configured as button-type elements, link embedded elements, or other type of selectable indicia. Upon selection of any of the actuatable time period indicia 415, 417, 419, or 421 or upon actuation of the view all actuatable indicia 423 via a user manipulating an input device of the user's computer device to provide input for selecting or otherwise actuating one of those indicia, the computer device can communicate data relating to the selection made by the user to the host system 2. In response to that data, the host system 2 can provide information to the user's computer device so that data based on the history of the user's account within data of the host system is provided to the user's computer device so that the computer device of the user can illustrate the desired graphical display on the third portion of the dashboard display 401 to the user via a display device of the computer device or otherwise connected to that computer device. The third portion of the dashboard display 401 can also include investment return indicia 409 that provides information to a user in text below or otherwise adjacent to the graphical representation 403 that identifies the growth or loss in the user's account over a selected time period.

Figure 30:
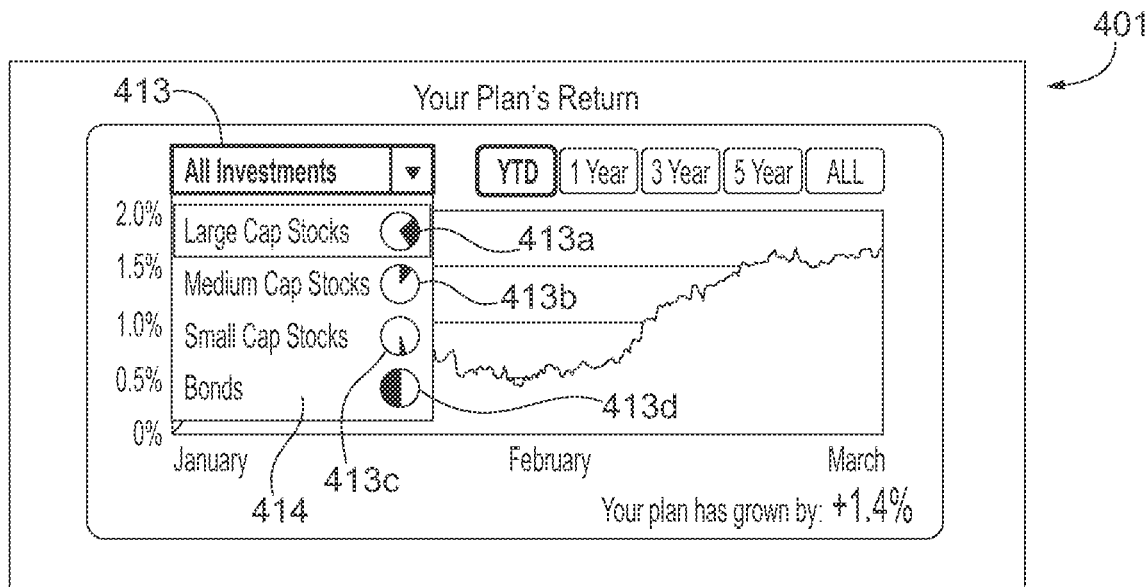
FIG. 30 is a view of a display shown in FIG. 29 after a user has provided input for selecting an asset grouping for viewing the performance of that selected asset grouping.
Figure 31:
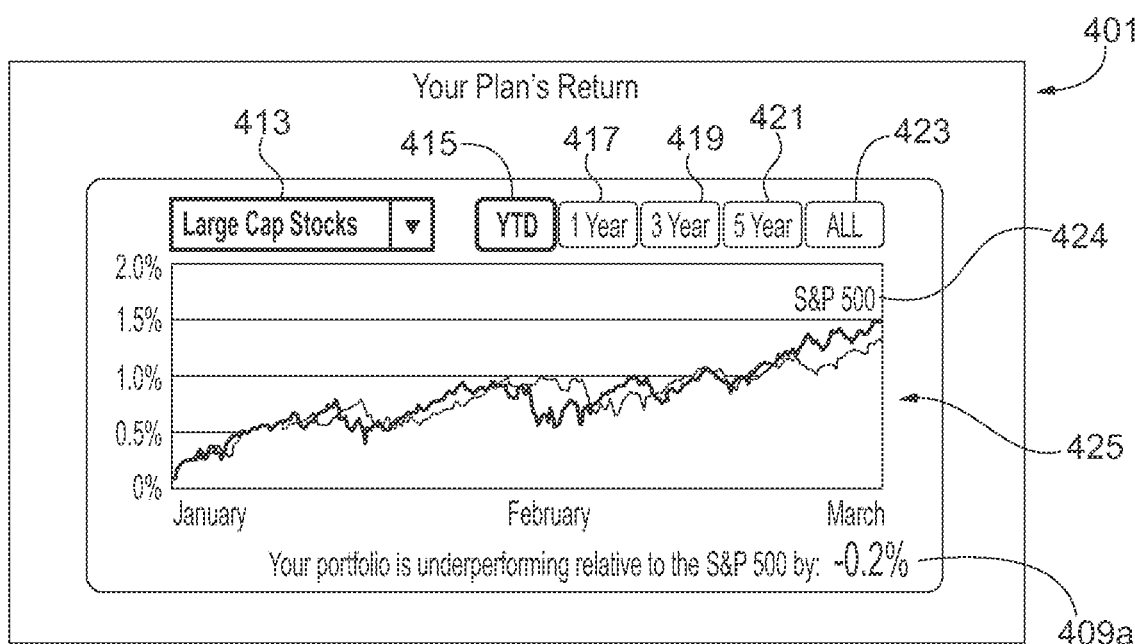
FIG. 31 is a view of a display of an exemplary GUI shown in response to the user providing input selecting an asset grouping from FIG. 30.

The third portion of the dashboard display 401 can also include a selectable drop-down menu 413 that permits the displayed graph to identify a different grouping of investments within the user's retirement account to chart. For instance, instead of providing a line 403a for charting the performance of the user's retirement account, the menu 413 can be manipulated to cause the performance of one or more stocks or stock funds to be charted, the performance of the bond related assets of the retirement account to be charted, or the performance of cash related assets of the user's retirement account to be charted. As yet another example, the performance of only one solitary selected stock fund of the retirement account can be charted in such a display or the performance of multiple different stock funds can be charted. FIGS. 30-31 provide an example of the utilization of the selectable menu 413 to select one of a number of different retirement account asset groupings 414 to be selected for a chart of the performance of those particular assets. Each asset grouping 414 can have a graphic or other indicia adjacent to it to identify the significance of that particular asset grouping to the overall value of the retirement account. For instance, as can be seen from FIG. 30, each selectable group of assets such as large cap stocks, medium cap stocks, small cap stocks, and bonds, can include a respective pie chart graphic 413a, 413b, 413c, and 413d that illustrates the portion of the retirement account value that is attributable to that grouping of assets and/or the allocation of assets for that particular grouping of assets for the user's contributions to the user's retirement account. For example, the graphic 413a illustrates a piece chart having a larger colored pie piece than the pie chart illustrations for the medium cap stocks and small cap stocks 413b and 413c. For each colored pie piece, a remaining portion of the pie that does not correspond to that particular group of assets is in a different color or can be otherwise demarcated to help identify the significance of each grouping of assets to the overall value of the retirement account. As another example, the orange pie piece for bonds in the pie chart graphic 413d is shown as being a half circle that is colored orange as the pie piece for that asset grouping to signify to the user that the bonds make up half of the user's retirement account value or to signify that the user's currently saved asset allocation for contributions into the user's retirement account is currently set at 50% of the user's contributions to be invested into the bond related assets.

In response to a user communicating a selection of one of the different asset groupings for charting via use of an input device to select the menu 413 and subsequently select one of the asset groupings provided in the drop down menu 413, the computer device of the user can communicate the user's selection to the host system 2 and the host system 2 can respond to that information by providing user account information relating to the performance of those selected assets from the saved information the host system has relating to the user's retirement account. The information about those selected assets to be displayed may be based on information the host system 2 receives via an API connection with a computer system of a party 31 or provider 37 that the host system 2 may request in response to such a selection being communicated to the host system 2 so that the data for that selection can be received from that computer system and utilized for generating the updated display of the third portion of the display 401. The user's computer device can then cause the display of the third portion of the dashboard to be updated to chart the performance of the selected asset grouping. For instance, when the user provides input to select large cap stock related assets from the menu 413, the charting of the large cap stocks performance of a particularly selected time period can be shown as a chart 425 as can be seen from FIG. 31. The illustrated chart 425 can be colored differently than the coloration used to chart all investments or other asset groupings to make it clear to the user what asset grouping is being charted. Benchmark indicia 424 can also be shown on the chart to help illustrate how the selected group of assets has performed relative to a benchmark set of investment options. For large cap stocks, such a benchmark indicia 424 can be a line on the chart illustrating the performance of large cap stocks such as the S&P 500 index of stocks or a line indicating the historical performance of the Dow Jones industrial average for that selected time period. Such data can be displayed based on historical data of the performance of such a benchmark the host system 2 received from a computer system of a provider or other party and had saved in its memory that is subsequently communicated to the user's computer device so that such data could be displayed via the third portion of the dashboard display 401.

The fourth portion of the dashboard display 501 can be directed to the allocation of assets in the user's retirement plan. Information displayed via the fourth portion of the dashboard display 501 can be based on information within the memory of the host system 2 as well as information the host system may receive via one or more API connections or other type of connections with computer devices of a party 31 or provider 37. The data for the displayed information can be requested via the API connection for subsequent utilization in communication of data to the user computer device for generation of the fourth portion of the dashboard display 501, for example. The fourth portion of the dashboard display 501 can include graphical indicia such as a first pie chart 503 and a second pie chart 505, actuatable indicia 507 for initiating a rebalancing of funds within the user's retirement account, and first, second and third selectable menus 509, 511, and 513 that can be manipulated via providing of input by a user utilizing one or more input devices connected to the user's computer device to provide more detailed information about the amount of assets in a particular grouping of assets (e.g., stocks, bonds, cash investment options, etc.). For example, in response to a selection of the first selectable menu 509, a display of stock related investments and their overall value can be displayed in more detail by providing a full listing of the different stock funds or other stock related assets that are within the assets of the user's retirement account. The displayed listing of stocks can also include a listing of the total dollar value for the stock assets for each stock related asset within the user's retirement account. Selection of the second selectable menu 511 can provide a similar display of bond related assets including a listing of each bond related asset within the user's account and a dollar value of that asset that is within the user's account. Selection of the third selectable menu 513 can result in a full display of the listing of cash related assets that are within the user's account and the dollar value associated with those assets. The selectable menus 509, 511, and 513 can also be configured so that in response to a selection of one of those menus, the other non-selected menus return to a compressed form that does not provide a detailed listing of different specific funds or assets within the non-selected asset groupings. For example, if the first selectable menu 509 is selected to be expanded to illustrate more detailed information about stock related assets and their value within the user's retirement account, the second and third selectable menus 511 and 513 can be illustrated as being moved to their compressed form or stay in their compressed form in response to the selection of the first selectable menu 509 and expansion of that menu. In other embodiments, multiple different asset groupings can be expanded via selection of their respective menus as the same time.

The graphical indicia such as the first pie chart 503 and the second pie chart 505 can also be configured to display information about an original asset allocation of the user's retirement account and the current asset allocation for valuation of the assets in the retirement account. While a user may select a particular asset allocation as an initial savings strategy for his or her retirement account, the performance of one class of assets may outpace performance in other asset groups. As a result, the allocation of assets within the retirement account can deviate from the initial set allocation levels. For example, stocks typically grow more quickly than bonds in value. Over time, savings in stock related assets may result in those assets taking up a larger portion of the retirement account as compared to the initial asset allocation setting by the user and/or in spite of a particular asset allocation the user has set for the distribution of the contributions made to the retirement account.

To help notify a user of the allocation levels within the user's retirement account, the first and second pie charts 503 and 505 can be configured to identify an original allocation of asset setting made by the user and a current allocation of assets that exist in the user's retirement account. Such information can be helpful to the user and can help aid the user's decision on whether a rebalancing of the user's retirement account is needed due to that particular user's risk tolerance and the retirement investment strategies that user would like to employ.

Figure 32:
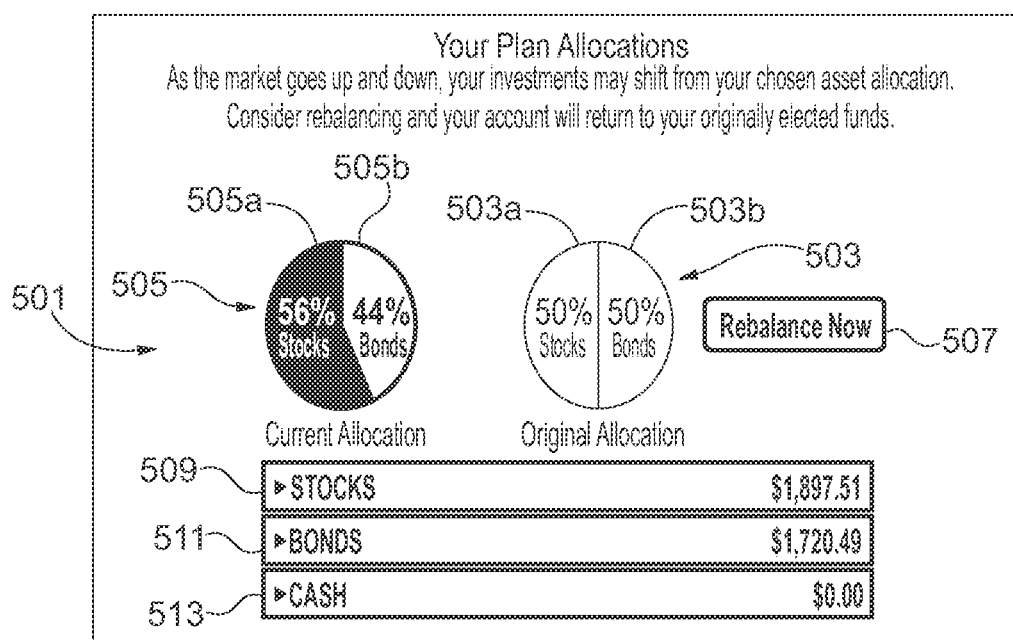
FIG. 32 is a view of a display of an exemplary GUI providing information relating to asset allocation for a retirement plan associated with a user.

For instance, the first pie chart 503 can be illustrated in a first color or shades of a first color that differ from the colors of the second pie chart 505. The first pie chart can include a plurality of area segments, or pie area segments 503a and 503b that are sized to graphically correspond to the allocation of assets original set by the user for contributions to be made into his or her retirement account. In the example of FIG. 32, that allocation is a 50% bond and 50% stock allocation setting and segments 503a and 503b are each configured as a half circle segment to represent that 50-50 allocation setting. In other embodiments there could be two segments of differing areas or three or more segments of different areas that correspond to the allocation settings for multiple different asset groupings (e.g., large cap stocks, mid cap stocks, small cap stocks, bonds, and cash asset groupings). When a particular setting corresponds to an asset grouping allocation within the first pie chart 503, that segment can have an area that corresponds to the percent of contributions to be allocated to that particular grouping (e.g., a segment corresponding to an allocation for bonds having a 40% allocation setting has an area of 40% of the first pie chart 503, a segment corresponding to the allocation for stocks that were to have a 45% allocation setting can have an area that is 45% of the area of the pie chart 503, and a segment corresponding to cash related investment that were to have a 15% allocation setting can have an area that is 15% of the area of the pie chart 503).

The second pie chart 505 can also include a plurality of segments 505a and 505b. These segments can be colored or otherwise demarcated to have distinct and separate subareas within the area of the pie chart that correspond to the percentage of the overall current value of the retirement account that is attributable to the asset grouping associated with that segment. For instance, in the example shown in FIG. 32 the first segment 505a has an area of 56% of the overall area of the pie chart as this corresponds to the value of the stock assets within the retirement account, which comprise 56% of the overall value of the retirement account. The second segment 505b corresponds with the value of the bond related assets of the retirement account and is illustrated as having an area of 44% of the overall area of the pie chart 505. The proportion of the second segment 505b to correspond with the proportion of the value of the bond related investments within the retirement account. In other embodiments, there may be three or more than three segments that each correspond with a different asset grouping and each have a proportional area within a pie chart or other graphical representation that corresponds to the proportion of the asset grouping within the retirement account (e.g., a segment corresponding to an allocation for bonds that make up 30% of the current value of the retirement account has an area of 30% of the second pie chart 505, a segment corresponding to the allocation for large cap stocks that account for 25% of the value of the retirement account can have an area that is 25% of the area of second pie chart 505, a segment corresponding to the allocation for mid cap stocks that account for 20% of the value of the retirement account can have an area that is 20% of the area of second pie chart 505, a segment corresponding to the allocation for small cap stocks that account for 15% of the value of the retirement account can have an area that is 15% of the area of second pie chart 505, and a segment corresponding to cash related investment that make up 10% of the value of the retirement account can have an area that is 10% of the area of second pie chart 505).

Should a user review the migration of asset allocation from his or her original settings to a different allocation value due to the investment gains that have occurred in the user's investments over time, the user may desire to initiate a rebalancing of the user's retirement account so that the asset allocation is changed back to his or her original setting. A user can utilize an input device such as a mouse, stylus, or touch screen display to select the actuatable indicia 507 for initiating a rebalancing of funds within the user's retirement account. In response to a user manipulating an input device such as a mouse, stylus, keyboard, or touch screen display to select the actuatable indicia 507 for imitating a rebalance of funds within the user's retirement account, the user's computer device can communicate data relating to the selection to the host system 2. The host system 2 can receive that information and schedule a transfer of assets within the user's retirement account so that the asset allocation of the retirement account returns to the original allocation setting. For the example shown in FIG. 32, if the user actuated the selectable indicia 507, the host system 2 would receive that selection and initiate a sale and acquisition of assets for the user's retirement account so that the asset allocation went from 56% stocks and 44% bonds to 50% stocks and 50% bonds by selling certain stock related investments owned in the retirement account and buying additional bond related investments to acquire more of the bond related investments already owned in the retirement account. For example, one or more stock mutual funds may have certain shares sold and additional shares of one or more bond mutual funds already owned in the retirement account could be acquired with the money received from the sale of the stock related assets so that the value of the stock assets in the retirement account makes up 50% of the value of the retirement account and the value of the bond related investments of the retirement account make up the remaining 50% of the retirement account. The host system 2 can initiate the sale and purchase of such assets upon receipt of data from the user's computer device requesting the rebalancing to occur via selection of selectable indicia 507. The host system 2 can initiate such sale and purchase by communicating with a computer system of a broker or other entity to facilitate the ordering of such sales and purchases of assets. In other embodiments, an element of the host system may be configured to perform the sale and purchase of such assets.

A user can also navigate from the user's initial dashboard display 196 that is associated with the user's account to view other aspects of the user's retirement account that is accessible via the website hosted by the web server 15 of the host system 2 or the application that is supported by and/or hosted by the application server 17 of the host system 2. A selection of the second tab 263, which is associated with retirement outlook properties and functions, can result in a view of a subset of the graphical elements of the dashboard display 196 along with other display elements. A selection of the second tab 263 can be made by a user manipulating an input device communicatively connected to the user's computer device to select the second tab. In response to selection of the second tab, the computer device of the user can communicate with the host system to transmit data relating to the user's selection. The host system 2 can receive that data and respond to it by transmitting data to the user's computer device for use in generating the display for the second tab 263. The data sent to the user's computer device can include a portion of data that the host system 2 may receive from a computer system of a provider 37 or a party 31 via an API connection or other connection it may form with that computer system in response to information received from the user's computer device. The user's computer device can receive that data from the host system 2 and generate such a display based on that received data. For some embodiments, the generated display can be configured to appear as shown in FIG. 33.

The retirement outlook display can be structured to facilitate the implementation of functionality as indicated generally in FIG. 19. Interactive graphical elements can be displayed via the display device connected to the user's computer device that are manipulatable by a user for providing input to his or her computer device and/or the host system for the display of other data related to the user's retirement account and performance of that account. The input the user provides can be provided via one or more input devices that are connected or otherwise communicatively connectable to the host system 2 and/or the computer device of the user.

Referring to FIG. 33, the exemplary display for the retirement outlook of the user's retirement account can be configured to provide a display of the user's 401(k) retirement account he may have as a benefit provided by the user's employer. In addition, other retirement accounts can be linked to the user's account and his or her other retirement accounts' performance can also be illustrated in the display. For instance, if the user has an individual retirement account ("IRA") or a Roth IRA account, that account data can also be saved within the host system 2 and be utilized for providing the display to the user as part of a GUI for the host system 2.

For example, a graphical display 107*b* can be included within a first graphical element that provides a graphical chart for displaying the projected performance of the user's retirement savings for his or her employer sponsored 401(k) plan in addition to one or more other retirement related savings accounts associated with the user that is saved within the data of the host system 2. In the example shown in FIG. 33, the graphical display 107*b* provides a chart projecting the savings at retirement in both a user's 401(k) retirement account and an IRA associated with the user. The aggregate projection for both accounts is provided in the graphical display 107*b*. The segments of the projected valuation for the accounts are displayed in a demarcated way such that the value of the 401(k) plan can be distinguished from the projected value of the IRA account. Such a demarcation can permit a user to appreciate the overall projected retirement savings he or she is currently projected to be on pace for as well as being able to appreciate the affect that each of the user's accounts has on that projected valuation.

The graphical display 107*b* can include a graph that has a first line 107*f* that extends along x and y axes to illustrate an overall value of the retirement accounts for the user over time until reaching a set retirement age. The area under the upper line 107*f* can be colored or otherwise illustrated to indicate the aggregate projected value for the user's retirement account. The colorations can be in multiple segments if the user has multiple different retirement account associated with that user. For instance, there can be a first upper segment 107*c* and a second lower segment 107*d* that each have a different area. The two segments can be colored differently to demarcate the values of the separate accounts. An optional second line 107*e* that is shown in broken line in FIG. 33 can also be overlaid at the intersection of the first and second segments 107*c* and 107*d* to help demarcate the different segments.

The projected retirement savings value can be adjusted to instead show a projected retirement income stream view. For instance, a user can manipulate an input device to select a first actuatable indicia 103*a* to have the overall projected savings value of the retirement account(s) be shown. The user can then select a second actuatable indicia 105*a* to cause the displayed graphical elements to change to illustrate a projected retirement income to the user. Such a change in views can be similar in views that occur when toggling between a projected savings and projected retirement income views as discussed herein with reference to FIGS. 3-4.

Figure 34:
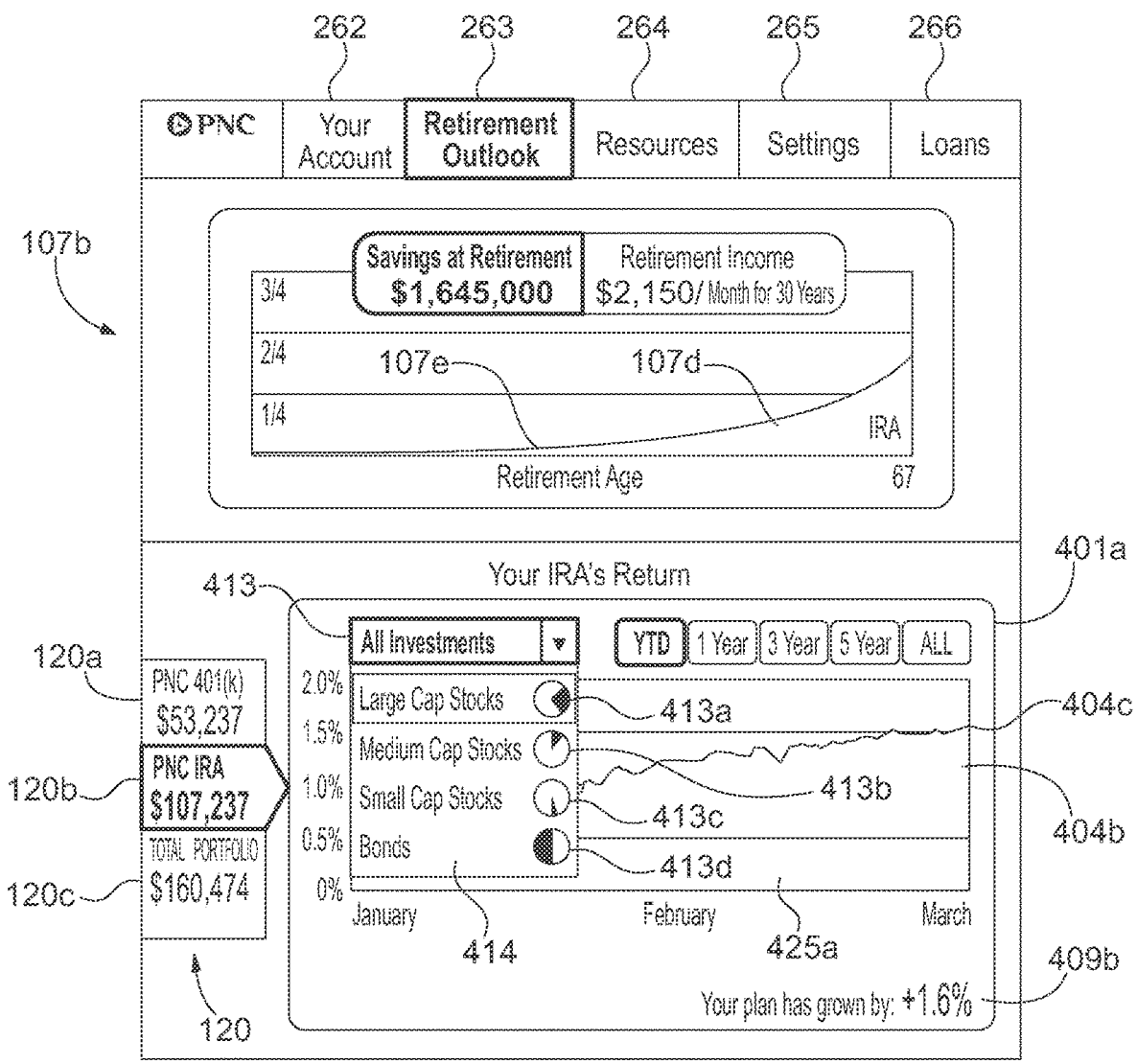
FIG. 34 is a view of a display of the exemplary GUI shown in FIG. 33 with user input being provided for selecting a view of performance for a first retirement savings account associated with a retirement plan of the user.
Figure 35:
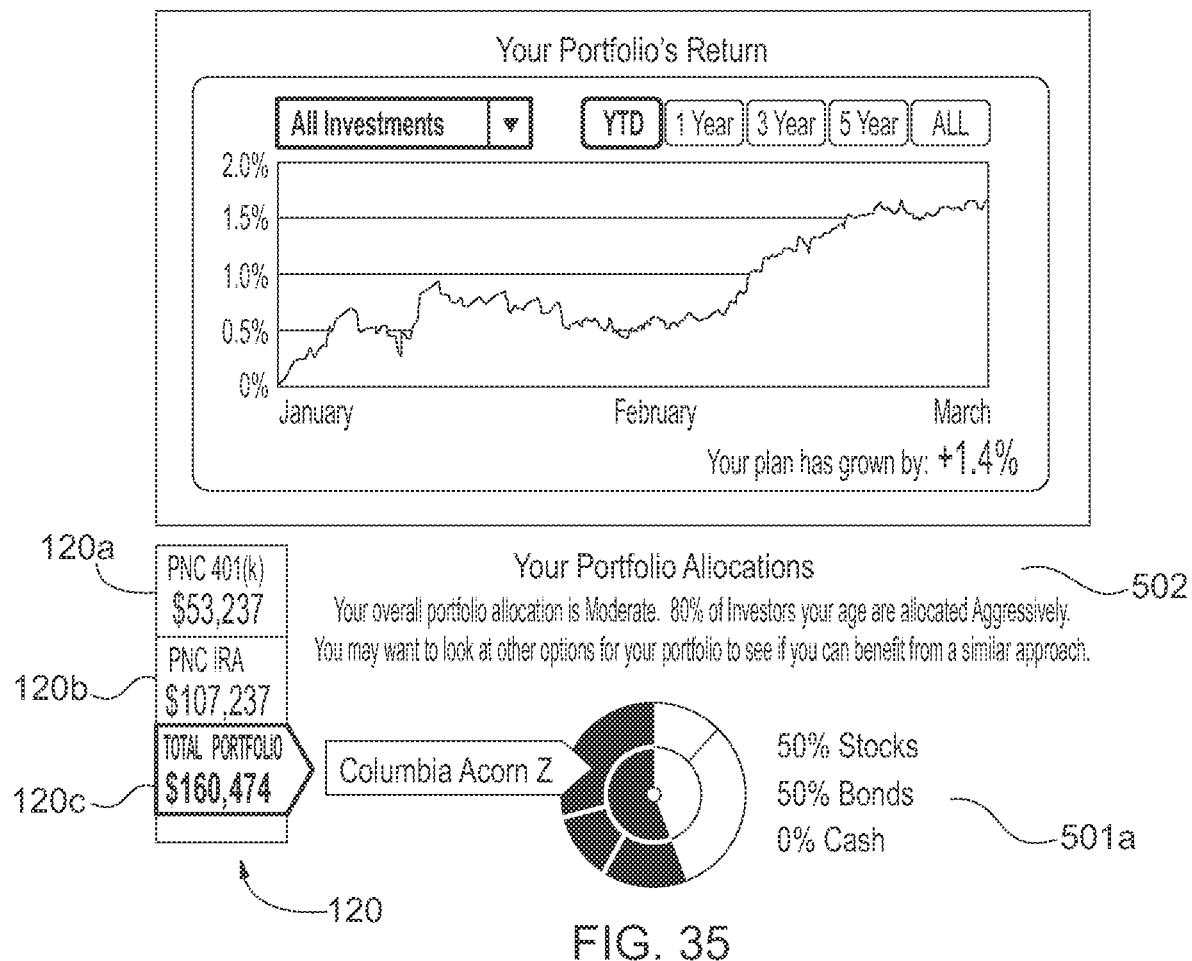
FIG. 35 is a view of a display of the exemplary GUI shown in FIG. 33 with indicia being displayed to a user in response to movement of a pointer along a graphic of the GUI.
Figure 36:
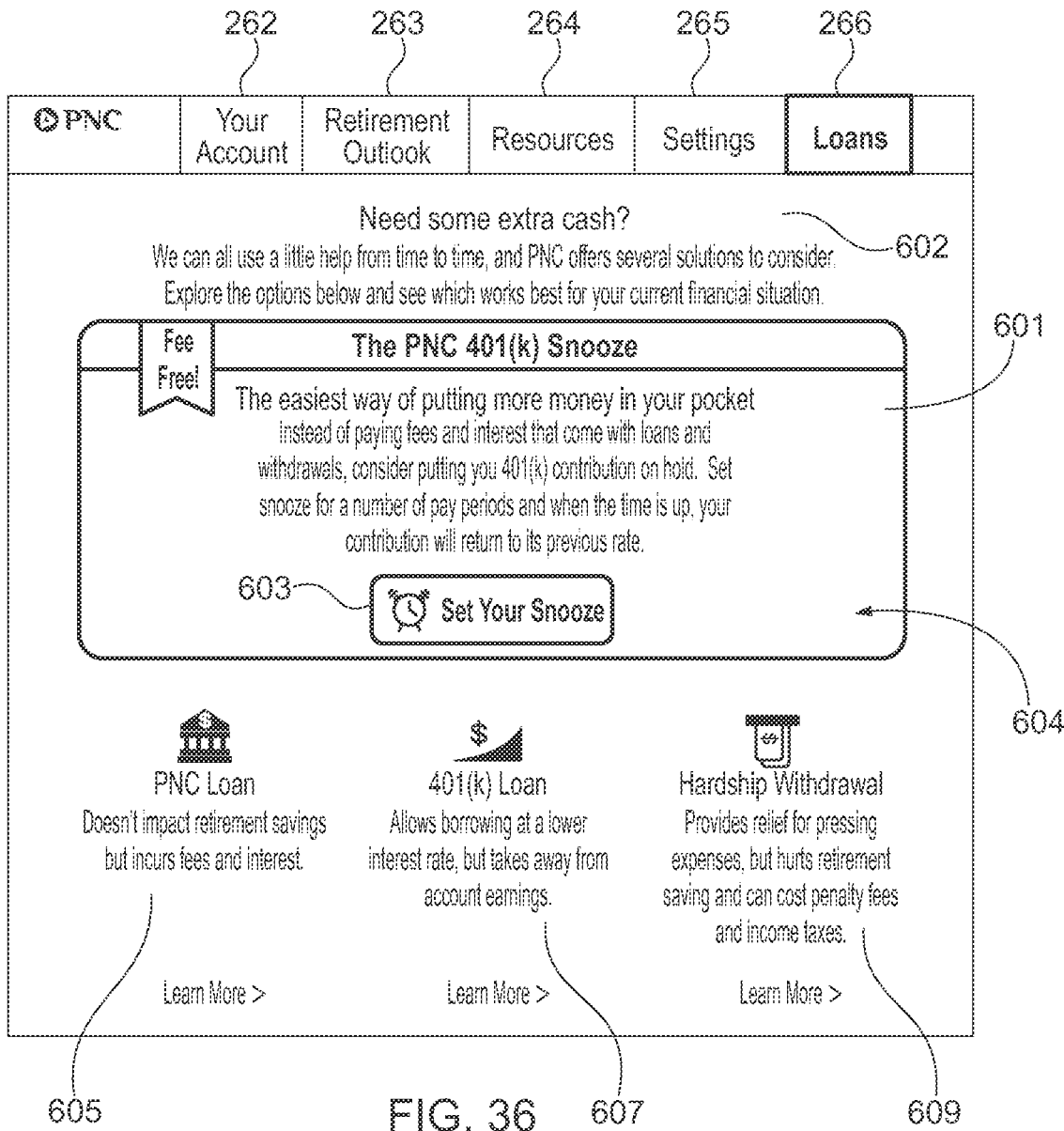
FIG. 36 is a view of a display of the exemplary GUI in response to a loans tab being selected by user input communicated to a host system hosting retirement plan services relating to the displayed GUI.
Figure 37:
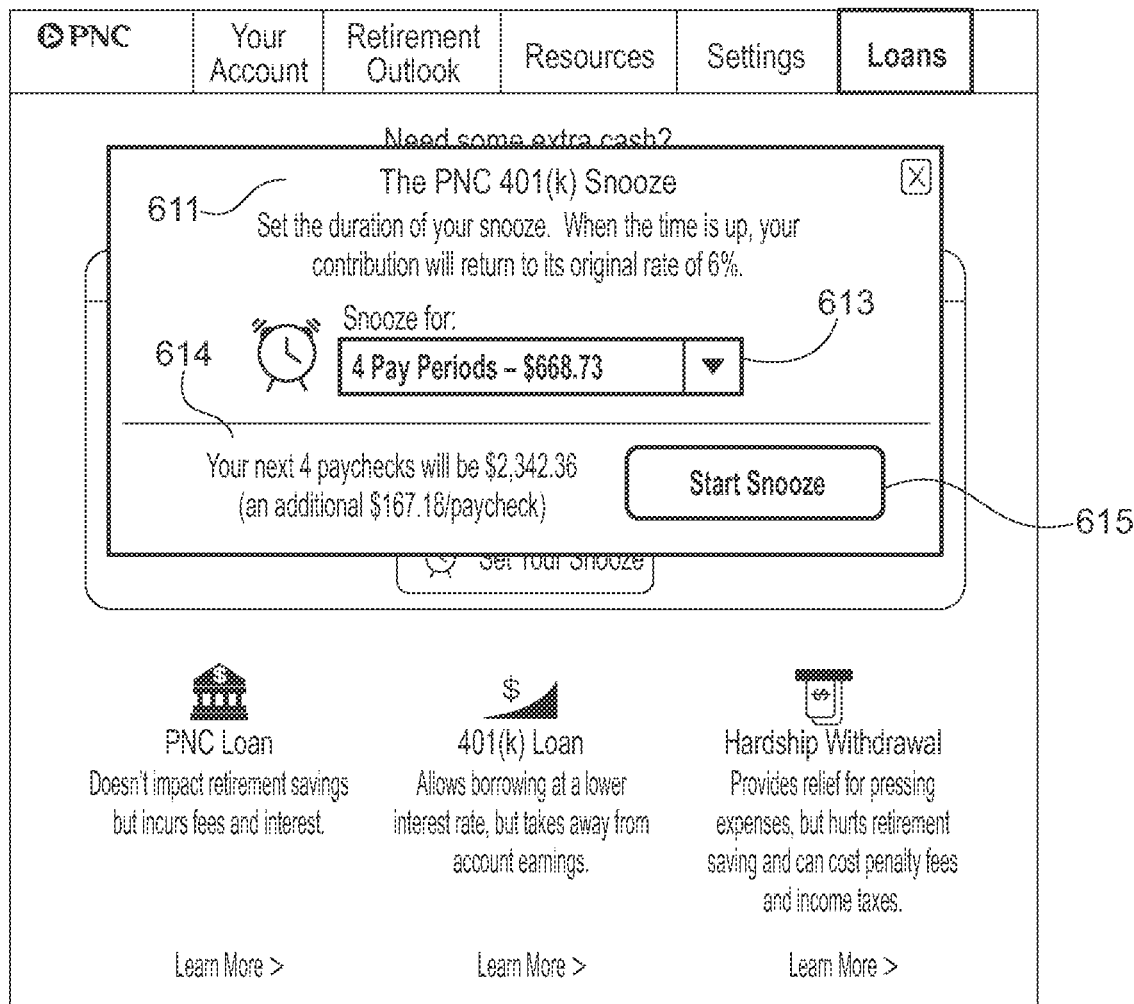
FIG. 37 is a view of a display of the exemplary GUI shown in FIG. 36 in response to user input being communicated to the host system for selection of an element of the GUI relating to cessation of regular contributions to a retirement plan for a selected time period.
Figure 38:
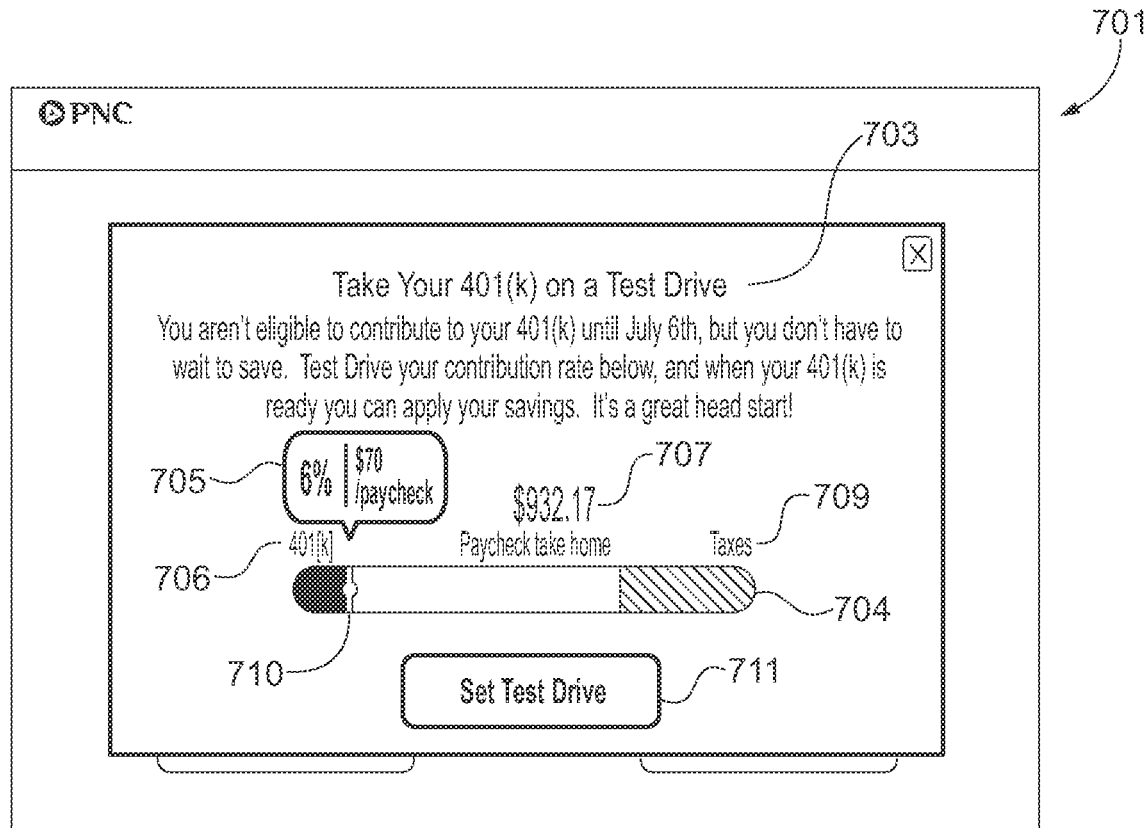
FIG. 38 is a view of a display of an exemplary GUI providable to a computer device of a client for establishing a savings program for use in preparing for 401(k) plan enrollment.

A moveable sidebar graphic 120 can be positioned adjacent to the graphical display 107*b*. The sidebar graphic can be configured to move in response to a detected motion of a pointer being moved over the graphical display elements as can be appreciated from FIGS. 33-35. For instance, when the pointer is over the retirement projection related graphical display 107*b*, the sidebar graphic 120 can be positioned to a side of this display as shown in FIG. 33. When the pointer is detected as having been moved to a position over a portfolio return graphical element 401*a*, the sidebar graphic 120 can be shown as being moved to a new location adjacent to a side of this particular graphical element as can be appreciated from FIG. 34. When the pointer is detected as having been moved to a position over a portfolio allocation display element 501*a*, the sidebar graphic 120 can be shown at another new location adjacent a side of this particular display element as shown in FIG. 35. Movement of the sidebar graphic 120 can occur such that the sidebar graphic is moved to multiple different discrete spaced apart locations on the display to be positioned adjacent to different graphical elements when a pointer is detected as being moved over those elements. Alternatively, the sidebar graphic 120 can be configured to move vertically along the display so that the sidebar graphic scrolls up or down the display in parallel with motion of a pointer that is moved via a user's manipulation of an input device (e.g., a mouse, a stylus, a touch screen display, etc.) connected to the user's computer device.

The second portfolio return graphical element 401*a* can be shown below the first element and provide a chart or other type of graphical representation that illustrates an investment return over one or more selectable time periods. The second portfolio return graphical element 401*a* can be configured similarly to the third portion of the dashboard display 401 illustrated in FIGS. 23 and 29-31 as discussed herein.

For example, the second portfolio return graphical element 401*a* can be structure to display a graph having a y-axis and an x-axis that illustrates a rate of return for the user's portfolio and/or different retirement savings accounts included within the user's retirement portfolio. The graph can include a line 404*a* that illustrates a rate or growth or loss over a particular time period. A colored area portion 404 underneath this line 404*a* can be configured to help illustrate the growth of the portfolio and/or loss experienced by the user's retirement portfolio. Text or other indicia 409*a* can be displayed underneath the displayed graph to identity a rate of growth or rate of loss that has occurred within the displayed time period.

The second portfolio return graphical element 401*a* can also include a selectable menu 413 and different actuatable indicia can also be displayed for identifying which time period to be displayed in the graphical element. For instance, the selectable actuatable timer period related indicia can include a year-to-date timer period indicia 415, a one year time period indicia 417, a three year time period indicia 419 and a five year time period indicia 421. The second portfolio return graphical element can also be configured to illustrate the rate of return for all of these time periods in response to actuation of a view all actuatable indicia 423. The actuatable indicia can be configured as button-type elements, link embedded elements, or other type of selectable indicia. Upon selection of any of the actuatable time period indicia 415, 417, 419, or 421 or upon actuation of the view all actuatable indicia 423 via a user manipulating an input device of the user's computer device to provide input for selecting or otherwise actuating one of those indicia, the computer device can communicate data relating to the selection made by the user to the host system 2. In response to that data, the host system 2 can provide information to the user's computer device so that is based on the history of the user's portfolio within data of the host system so that the computer device of the user can illustrate the desired graphical display to the user via a display device of the computer device or a display device that is otherwise connected to that computer device.

The second portfolio return graphical element 401a can also be supported by the host system 2 such that a display of graphs or other graphical illustrations for providing information on how a portion or one or more subparts of a retirement savings portfolio has performed over one or more selectable time periods. For instance, a selection of actuatable indicia within the sidebar graphic 120 can be configured to actuate a change in the chart displayed by graphic 107b as well as the chart shown in the second graphical display element 401a so that the performance of only one retirement account of a plurality of retirement accounts of the retirement portfolio of a user is viewable or a charting of the performance of multiple different accounts of the retirement portfolio is viewable.

For example, a user can manipulate an input device to select a 401(k) retirement account view indicia 120a of the slide bar graphic 120 for actuating a view of only performance information related to the user's 401(k) account. As another example, the user can utilize an input device to select an IRA account view indicia 120b of the slide bar graphic 120 to actuate a view of only performance information related to the user's IRA account. As yet another example, the user can utilize an input device to select a total portfolio view indicia 120c to actuate a view of the projected performance and past performance of the user's entire retirement portfolio that is accessible via the host system 2 (e.g., retirement accounts that have data saved in the host system or communicatable to the host system 2 via at least one interface and/or link between the host system and the party supporting or managing one or more of the user's other retirement savings accounts).

The host system 2 can be configured to receive data from the user's computer device relating to user's input provided to his or her computer device that a selection of IRA account view indicia 120b of the slide bar graphic 120 was made. In response, the host system 2 can access saved data and provide that data to the user's computer device so that a display of the performance information relating to only the user's IRA account is shown in the first and second display elements such as graphical display 107b and graphical element 401a. The displayed graphical data can chart performance of only the IRA account of the user via second line 107e and area of second segment 107d being displayed in the graphical display 107b. First line 107f and first segment 107c can be removed from the displayed information to provide the view of just IRA account related projection information in the display 107b as may be appreciated from FIGS. 33-34. Additionally, the second display element 401a can change its graph in response to the user's selection of the IRA account view indicia 120b by only showing a past performance of the user's IRA account instead of the user's entire retirement portfolio as can be appreciated from FIGS. 33 and 34. A user can further interact with the second display element 401a via menu 413 and actuatable time period indicia 415, 417, 419, 421 and view all actuatable indicia 423 to select one or more time periods to have charted and/or one or more asset groupings of the user's IRA account to be charted in the second graphical element 401a.

For example, after the IRA account view indicia 120b is actuated by a user, a user can manipulate an input device to scroll through menu 413 and select a particular asset grouping such as large cap stocks, medium cap stocks, small cap stocks, bonds, and/or a cash related investment option asset grouping. Each selectable group of assets such as large cap stocks, medium cap stocks, small cap stocks, and bonds, can include a respective pie chart graphic 413a, 413b, 413c, and 413d shown in FIG. 34 illustrates the portion of the IRA account value that is attributable to that grouping of assets and/or the allocation of assets for that particular grouping of assets for the user's contributions to the user's IRA. For example, the graphic 413a can illustrate a pie chart having a larger colored pie piece than the pie chart illustrations for the medium cap stocks and small cap stocks 413b and 413c. For each colored pie piece, a remaining portion of the pie that does not correspond to that particular group of assets is in a different color or can be otherwise demarcated to help identify the significance of each grouping of assets to the overall value of the user's IRA account. As another example, the orange pie piece for bonds in the pie chart graphic 413d shown in FIG. 34 is shown as being a half circle that is colored orange as the pie piece for that asset grouping to signify to the user that the bonds make up half of the user's IRA value or to signify that the user's currently saved asset allocation for contributions into the user's IRA is currently set at 50% of the user's contributions to be invested into the bond related assets.

In response to a user communicating a selection of one of the different asset groupings for charting via use of an input device to select the menu 413 and subsequently select one of the asset groupings provided in the drop down menu 413, the computer device of the user can communicate the user's selection to the host system 2 and the host system 2 can respond to that information by providing user account information relating to the performance of those selected assets from the saved information the host system has relating to the user's IRA. The user's computer device can then cause the display of the second graphical element 401a to be updated to chart the performance of the selected asset grouping for the user's IRA. For instance, when the user provides input to select large cap stock related assets from the menu 413, the charting of the large cap stocks performance of a particularly selected time period can be shown as a chart 425a as can be seen from FIG. 34. The illustrated chart 425a can be colored differently than the coloration used to chart all investments or other asset groupings to make it clear to the user what asset grouping is being charted. Benchmark indicia can also be shown on the chart to help illustrate how the selected group of assets has performed relative to a benchmark set of investment options. For large cap stocks, the benchmark indicia can be a line on the chart illustrating the performance of large cap stocks such as the S&P 500 index of stocks or a line indicating the historical performance of the Dow Jones industrial average for that selected time period. Such data can be displayed based on historical data of the performance of such a benchmark the host system 2 received from a computer system of a provider or other party and had saved in its memory or that it received via an API connection or other connection with the computer system of the provider or other party that is subsequently communicated to the user's computer device so that such data could be displayed.

In the event the user selected the 401(k) retirement account view indicia 120a of the slide bar graphic 120 after or before actuating the IRA account view indicia 120b, the host system and computer device of the user can communicate such that graphical display 107b and an updated charting in the second graphical element 401a are provided that only relate to the user's 401(k) account's performance. For instance, the graphical display 107b could provide only a display of the projected performance and value of the user's 401(k) account. Additionally, the second graphical element 401a could show a chart that only includes a line 404c and shaded area 404b underneath that line that illustrated past performance of the user's 401(k) account. The subparts of this account (e.g., different asset groupings within that 401(k) account) could also be shown via manipulation of the menu 413 while the 401(k) retirement account view indicia 120a of the slide bar graphic 120 is selected for view of only the 401(k) retirement account related information. Each asset grouping can be selectable via menu 413 and include pie chart graphics 413a, 413b, 413c, and 413d or other illustrated indicia that are structured for identifying the proportion of those assets that are within the user's 401(k) account. When a particular asset grouping is selected via the menu 413, a chart illustrating the past performance of that particular asset grouping of the user's 401(k) account can be displayed along with one or more benchmark indicia can also be included in the chart provide an objective means of evaluating the performance of those particular assets within the user's 401(k) account. The display of that updated chart can result from the computer device of the user communicating the user's selection of a particular asset grouping to the host system 2 and the host system 2 responding to that information by providing user account information relating to the performance of those selected assets of the user's 401(k) account from saved information the host system has relating to the user's 401(k) account. The user's computer device can then cause the display of the second graphical element 401a to be updated to chart the performance of the selected asset grouping for the user's 401(k) based upon the data received from the host system 2.

A third graphical element 501a of the exemplary retirement outlook display as can be seen in FIGS. 33 and 35 can be configured to provide graphical information relating to retirement account allocations to a user. The third graphical element can include one or more concentric charts that are configured to provide interrelated and distinct information about the user's retirement portfolio asset allocation and asset allocations for each of the user's retirement accounts within the user's retirement portfolio. The third graphical element 501a can also include suggestion indicia 502 that can include text that identifies a particular risk class for the asset allocation of the user's retirement account (e.g., conservative, moderate, or aggressive asset allocations) and suggests a change to such an allocation if the user's current allocation levels are below or above a threshold in view of the user's age or other parameters related to the user. For instance, if the user is under 40 years old and has a conservative asset allocation, the suggested text can suggest the user change his asset allocation to aggressive or moderate. As another example, if the user is over 60 years old, the suggestion provided by the suggestion indicia can suggest the user change from an aggressive allocation to a conservative or moderate allocation setting depending on the user's desired retirement age.

A comprehensive graphical illustration of asset allocations for all the retirement accounts of the user can be displayed in the third graphical element 501a. An example of such a graphical representation can include a pie chart-type illustration 506 having a first pie chart 506a that is surrounded by an annular ring shaped chart 506b. The first pie chart 506a can be configured to provide a graphical illustration of asset allocations for a first retirement account of the user and the second ring chart 506b can be configured to provide a graphical illustration of the asset allocation for a second retirement account of the user. Additional ring charts could be provided in the event the user had additional retirement accounts within his or her retirement portfolio. For instance, a third annular ring chart (not shown) could be illustrated to surround the second ring chart 506b if the user had a third retirement account.

The first innermost pie chart 506a can be configured to have different segment areas of different color to identify the allocations of assets for different asset groupings. For instance, an inner pie chart could have two half-circle segment areas 506d to represent the asset allocations for stock related investments and bond related investments for the user's first retirement account (e.g., 401(k) retirement account). The displayed asset allocation could be based on the current valuation of those assets within that retirement account or be illustrated based on the user's contribution settings for allocation of new contributions into that retirement account. The second ring chart 506b can include multiple ring area segments 506c that are colored to correspond to a particular asset allocation type such as a first group of segments being in blue color to correspond with stock related assets and a second group of segments being in an orange color to correspond with bond related assets. Those segments 506c can also be illustrated as being spaced apart from each other to signify being within different asset groupings. For instance, a plurality of different blue area segments of the ring chart can be shown to each correspond with a particular type of stock investment within the user's second retirement account (e.g., the user's IRA). Each segment may have a different area to correspond to the proportion of the assets within the retirement account to which that segment represents. For instance, a segment corresponding to assets within a first stock fund that makes up 20% of the value of assets within an IRA of the user can be a segment that has an area of 20% of the ring chart 506b.

Further, the pie chart-type illustration 506 can be configured to also provide an aggregate illustration of the overall asset allocation in the user's entire retirement portfolio that includes the first and second retirement accounts shown in the first inner pie chart 506a and the second annular ring chart 506b. For instance, blue ring area segment and pie segment areas can be aligned with each other to represent an aggregate pie chart illustration showing the proportion of stock related assets currently within the user's retirement portfolio. Orange ring area segments and orange pie area segments can be illustrated in alignment with each other to illustrate the proportion of bond related assets currently within the user's retirement portfolio as well. If there were cash related assets within the portfolio, a third set of aligned pie area segments and ring area segments in a third color such as a green color could also be displayed within the pie chart-type illustration 506. In addition to coloration, each area segment 506c and 506d could include text or other indicia to label which particular asset grouping that segment corresponds to. Hover state graphical elements or pop-up windows could also be configured to be actuated upon detection of a pointer being positioned over a particular segment. Those pop-up windows or hover state graphical elements could include text that identifies the specific asset to which that area segment corresponds and provides a specific asset allocation percentage to identify the proportion of the overall value of the retirement account to which that particular asset grouping accounts (e.g., 10% for an asset grouping of a user IRA that represents 10% of the overall value of the user's retirement account).

The pie chart-type illustration 506 can also be configured to change in view depending on a selection of actuatable indicia within the sidebar graphic 120. For example, a user can manipulate an input device to select a 401(k) retirement account view indicia 120a of the slide bar graphic 120 for actuating a view of only asset allocation information related to the user's 401(k) account in addition to changing views of data relating to the performance information related to the user's 401(k) account. As another example, the user can utilize an input device to select an IRA account view indicia 120b of the slide bar graphic 120 to actuate a view of only performance information related to the user's IRA account.

The host system 2 can be configured to receive data from the user's computer device relating to user's input provided to his or her computer device that a selection of IRA account view indicia 120b of the slide bar graphic 120 was made. In response, the host system 2 can access saved data and/or data the host system 2 may obtain via one or more API connections or other connections the host system may form or have with one or more computer systems of a provider 37 or a party 31 and provide that data to the user's computer device so that a display of the asset allocation relating to only the user's IRA account to be shown in the third graphical element 501a. In response, a pie chart only showing those asset allocations could be displayed. In some embodiments, that pie chart can be similar in structure to the pie chart 505 shown in FIG. 23 and discussed herein.

As another example, the host system 2 can be configured to receive data from the user's computer device relating to user's input provided to his or her computer device that a selection of 401(k) account view indicia 120c of the slide bar graphic 120 was made. In response, the host system 2 can access saved data and provide that data to the user's computer device so that a display of the asset allocation relating to only the user's 401(k) account to be shown in the third graphical element 501a. In response, a pie chart only showing those asset allocations could be displayed. In some embodiments, that pie chart can be similar in structure to the pie chart 505 shown in FIG. 23 and discussed herein.

The segment areas for each pie chart (e.g., the aggregate pie/ring chart, and/or pie charts for only a specific retirement account portion of a user's retirement portfolio) can be configured such that pop-up windows are to be displayed that include information about each segment to identify what asset grouping that segment corresponds to and what the actual percentage of overall value that particular asset grouping has to a particular retirement account and/or the overall value of the retirement portfolio. Text or other graphical indicia can be displayed on each segment to provide such information as well or as an alternative to the pop-up windows. For actuation of the pop-up windows and/or hover state graphical elements, the user's computer device can receive data from the host system 2 for displaying the pie chart or other graphical illustration of the asset allocation for the user's one or more retirement accounts and be configured to display such pop-up windows upon detection of a pointer being positioned over the displayed segment area.

A user can also manipulate an input device to obtain displays for a resources tab and settings tab. Selection of the resources tab can result in a display being shown to a user via a display device of the user's computer device that provides information relating to retirement savings such as, for example, information relating to principles for retirement savings and information relating to retirement savings strategies. That information can include links to files and/or websites that provide information about funds the user can choose to invest in, investment strategies, tools, and other retirement savings related information. Selection of the settings tab can result in a display being shown to a user via the display device that permits the user to communicate data to the host system for changing contact information for the user, changing the user's password, login code word, physical address, phone number, email address, or other information.

A user can also manipulate an input device to obtain a display related to obtain a loan. For instance, a selection of the fifth tab 266 that is associated with loans can be selected. In response to such a selection, the computer device of the user can communicate with the host system 2 to receive data for displaying a loans related display 601 that is related to the user's retirement account. As can be seen from FIG. 36, the loans related display 601 can include indicia 602 that identifies ways a user can obtain extra cash for meeting short term needs the user may have. Links or other actuatable loan indicia can be displayed that, when actuated, result in a display of information about obtaining a loan, a 401(k) based loan, or a hardship withdrawal from a user's 401(k). For example, a first loan indicia 605, a second loan indicia 607, and a third withdrawal indicia 609 can be displayed with links to provide more information relating to possible loan options available to the user.

Indicia can also be displayed that suggest that the user utilize a non-loan related option. For instance, indicia can be displayed to the user to suggest that the user utilize a 401(k) "snooze" option that permits the user to schedule a cessation of contributions to the user's account for a selectable number of pay periods before automatically having those contributions resume. Such a feature can help the user obtain more take home money to meet a short term cash flow need while not requiring the user to remember to reactivate contributions to the user's retirement account after having resolved the short term cash flow issues facing that user. The use of such a "snooze" option can also help the user avoid tax liabilities associated with a loan and/or other liabilities or credit score ramifications that may result from attempting to obtain and/or obtaining such a loan.

For example, the host system 2 can be configured such that in response to receipt of information from a user's computer device that a user desires to learn more about a loan, the host system 2 communicates with the user's computer device to have a pop-up window shown to the user via the display device of the user's computer device. The pop-up window can be configured to suggest that the user select an actuatable link or other type of actuatable indicia (e.g., displayed button, etc.) that initiates a process for using the 401(k) snooze option in response to selection of that indicia.

In addition, or as an alternative, the loans related display 601 can include a graphical element 604 that includes text discussing use of a 401(k) snooze option and includes actuatable 401(k) snooze indicia 603 that is selectable for scheduling a number of pay periods upon which no contributions to the user's 401(k) account are to be made before those contributions restart being made for future paychecks of the user. A user can manipulate an input device to select or otherwise actuate the actuatable 401(k) snooze indicia 603. In response to the selection, the user's computer device can communicate with the host system so that information relating to that selection is provided to the host system 2. The host system 2 can respond to that information by sending data to the user's computer device so that the user's computer device causes a display device coupled thereto to display a scheduling window 611 to be displayed on the display device. An example of such a scheduling window 611 can be seen in FIG. 37.

The scheduling window 611 can be configured as a pop-up window or other type of window. The scheduling window 611 can include a selectable menu 613 that is manipulatable to select any number of pay periods to have contributions to the user's 401(k) stopped. The scheduling window 611 can be configured to also display text 614 that identified the number of paychecks or pay periods in which contributions will be stopped to identify an amount of money the user's employer will provide to the user over the selected number of pay periods. An actuatable start snooze indicia 615 can also be displayed. Upon selection of that start snooze indicia 615, the user's computer device can communicate the selection to the host system and the host system can communicate with an employer's computer device to initiate the temporary cession of 401(k) deductions from the user's paychecks for the selected number of pay periods.

For instance, if the user manipulates the menu 613 to select a 401(k) snooze for four pay periods, and subsequently selects the start snooze indicia 615, the computer device of the user can communicate information relating to the selection made by the user to the host system 2. The web server 15 or application server 17 may receive that information, for example, depending on whether the user is accessing the host system via an application running on the user's device that is supported by the application server 17 or a web site hosted by the web server 15. In response to the receipt of that information, the application server 17 or web server 15 can communicate with a computer device of the user's employer, such as a computer device of a party 31 (e.g., an employer server system, an employer workstation, etc.). The information conveyed to the employer computer device can be information that identifies the number of pay periods for that user in which no 401(k) contributions are to be deducted from the user's paychecks. The employer's computer device can respond to that information by updating data in memory of that system so that the employee's next four pay checks do not have any 401(k) deductions. After that fourth paycheck period is over, the employer's system will again being deducting 401(k) contributions in accordance with the user's contribution rate setting. The host system 2 will be configured to invest those subsequently received contributions in accordance with the user's previously saved, selected asset allocations. It is contemplated that permitting a user to utilize a temporary pause or temporary cessation of 401(k) contributions can help the user avoid taking out a loan or a costly, tax-penalty related withdrawal from his or her 401(k) account while also avoiding the user forgetting to resume contributions to his or her 401(k) account for retirement savings after having passed through a financial hardship.

It should be understood that a snooze for more than 4 pay periods or less than 4 pay periods can also be selectable options for the user. Additionally, in the event the user again wishes to "snooze" a 401(k) contribution after an initial snooze time period has passed, the user can subsequently access the display 604 and window 611 to set another 401(k) snooze. The snooze option can be utilized as many times as a user may desire and can also adjust the snooze setting via loans related display 601 as often as desired. Alternatively, the host system 2 can be configured to only permit a selected number of snooze selections within a given time period. After that given number is met, the host system 2 can be configured to prevent further 401(k) snooze settings for a pre-selected time period.

Additionally, it should be appreciated that the snooze option can also be attributable to other types of retirement accounts in addition to 401(k) accounts. For instance, the snooze feature can be set for IRAs and other types of retirement accounts.

Savings Nudge Feature

The host system 2 can also be configured to communicate nudges such as notices about certain events and/or notices of information to a user to attempt to have the user save more money in his or her retirement account upon detection of events relating to the user's income. For instance, when the host system 2 receives information indicating the user has received a raise or a promotion, the host system can provide information to the user's computer device to suggest that the user suggest increasing a contribution to the retirement account. Such a nudge can be provided in a window to be displayed to the user when the user logs in to his or her account the first time after such a pay raise or promotion occurs. Such a nudge can be displayed as the nudge 197 shown in FIGS. 24A and 24B, for example. The host system 2 can learn of such information from an employer computer device and communicate with the user's computer device when the user attempts to utilize the host system 2 after the host system 2 has received such promotion or pay increase related information. The host system 2 can also be configured to send the user an email, text message, or other type of communication to provide such a nudge. Such text messages or emails can include a link to access the user's account for making such a contribution change or other type of change as suggested in the nudge.

Test Drive Retirement Account Feature

During the enrollment of a user, the host system can determine that a user is not yet eligible to participate in 401(k) plan offering or other retirement savings related benefit. For instance, some employer's may require an employee to work for that employer for 3 months, 6 months, or other time period before becoming eligible for enrolling in a 401(k) plan offered by the employer. During enrollment, the host system can be configured to detect such an instance. For example, the host system 2 can communicate with an employer computer device or a computer device or a provider 37 to receive data identifying employees who are eligible for the retirement plan or to receive data identifying employees not yet eligible for the retirement plan of that employer. Such information may be obtained via an API connection or other connection the host system 2 may form with such a computer system. In response to a user being on a list of ineligible employees or not being within a list of eligible employees, the host system can communicate with the user's computer device to cause a test drive display 701 to be shown to the user to initiate the entrance of data to be used for later enrollment in the 401(k) plan participation as well as helping the user prepare for such contributions being deducted from the user's paycheck by scheduling a distribution of a portion of the user's paychecks to a savings account (e.g., savings account in a financial institution, etc.) of the user for each pay period of the user until the user becomes eligible for participation in the employer's 401(k) plan or other type of retirement plan.

In other embodiments, the host system 2 may be configured to host at least one portion of an application or a portion of a website so that a new employee who is not yet eligible to enroll can view a test drive related display for entering input that can later be used to enroll the employee when he or she become eligible for enrollment while also setting up the test drive feature for initially having the employee deposit a portion of his or her payment from the user's employer as savings in a user specified savings account for contributions specified by the user. The savings account may be a pre-existing savings account of the user or may be a new savings account that the host system may help the user establish. The host system 2 may communicate with the user's computer device to solicit and receive data from the user for identifying a pre-existing savings account for establishing the test drive feature or may solicit and receive data from the user for creating a new savings account at a new bank for the user to then deposit funds into from the user's paychecks from his or her employer based on the test drive feature settings the user may select. The specified contributions may be the contribution rate of the user's pay that is scheduled by the user to be deducted from his or her paycheck for deposit into the user's 401(k) account sponsored by the user's employer after the user becomes eligible for being a plan participant. This early savings can help the user adjust his or her cash flow expectations and usage of money to account for 401(k) related savings or other retirement savings before he or she is eligible for the employer's retirement plan offering. This can help the user enroll in the retirement plan and also easily adjust to the cash flow implications for utilization of retirement savings made to that plan after he or she is eligible for enrollment and is subsequently enrolled.

Once the user has actuated the test drive feature, deposits into the user's specified saving account will be made for each pay period until the user is eligible for the offered retirement plan. The host system 2 can implement such a deposit or can communicate with the employer computer system to have such deposits or deductions occur. Thereafter, the user can be automatically enrolled in the retirement plan and have the contribution rate selected for the test drive applied for contributions to the retirement account. In other embodiments, once the user is determined to be eligible for the retirement plan, the host system 2 can determine that this occurrence has happened and send one or more messages to the user to notify the user of his or her eligibility to initiate the user sending data to the host system for finalizing enrollment and/or approving enrollment in the employer's plan. Such user contacting can include at least one text message, email message, or other type of message being sent to the user via the host system 2. The message can be sent to different devices associated with the user (e.g., a mobile phone number for text messaging, an instant message (IM) message at an IM address the user provided to the host system 2 when setting up the test drive feature, and/or an email to the email address of the user that the user provided to the host system during setting up of the test drive feature).

After the user has entered information about the user as input to be provided to the host system 2 via an application interface supported by the application server 17 or a website interface hosted by the web server 15, the user can be requested to provide information for the test drive feature for use in depositing a portion of the user's paycheck into a savings account or other personal investment account. Display 701 can be shown to the user via a display device of the user's computer device that is utilized for communicating with the host system 2. The user's computer device can facilitate the illustration of the test drive display 701 via communications with the host system and receiving data from the host system that is used to generate the test drive display 701. The test drive display 701 can include indicia that is actuatable for the user to interact with via an input device to provide data to the host system relating to the setting up of the test drive feature hosted by the host system 2.

The test drive display 701 can include text that explains the test drive feature 703, and also identifies a date on which the user can be eligible to participate in the user's employer retirement plan benefit (e.g., a 401(k) plan). Additionally, an interactive slide bar graphic 704 can be shown adjacent to the text (e.g., below the text). The slide bar graphic 704 can include a first end portion 706, a second end portion 709 opposite the first end portion 706 and a middle portion 707 between the first and second end portions. The first end portion, second end portion, and middle portion may each be colored differently or otherwise demarcated to indicate that each of those portions represent a different portion of the user's pay per pay period. For instance, the first end portion 706 can be colored green and include other indicia (e.g., text, labels, or a key) that identify the first end portion as representing a contribution to be made to the user's savings account. That first end portion can be labeled as being intended for the user's retirement plan once that user is eligible for contributions to the plan as well, or an as alternative. The middle portion 707 can be colored light blue and include text or other indicia indicating that the middle portion represents the take home pay from the user's pay check that the user will have available. The second end portion 709 can be colored in a darker blue that includes slash lines or other demarcations to indicate the portion of the user's pay that is to be withheld for payment of various state and federal taxes. Informative indicia 705 can be positioned adjacent to and above the first end portion to provide text identifying a selected contribution rate or a savings deposit rate (e.g., 6%) and/or a gross amount of money to be deducted from the user's pay for contributions (e.g., $70/paycheck). A user may manipulate an input device to move a slider 710 that is moveable along the bar element of the slider bar graphic 704 to adjust the contribution rate or savings deposit rate to any of a number of different selectable options. In response to motion of the slider 710, the contribution rate or savings deposit rate related first end portion, the middle portion, and/or the second end portion may change in size and length to illustrate the changes to the user's tax withholdings and take home pay that will occur based upon a selected contribution rate. For instance, a change in savings deposit level or a contribution level may result in showing a change in a first end portion that is representative of a deposit to a savings account or for contributing to a retirement account after the employee is eligible for participation in the retirement plan, the middle portion representative of take home pay to the employee may change in length, and the second end portion representative of tax deductions may or may not change in length depending on the change to contribution levels or saving deposit levels and the tax implications associated with the contribution into a savings account and/or retirement account has (e.g., the second end may stay the same if the taxable income is not affected by a change in contribution level or savings deposit level and may increase or decrease in length if the taxable income increases or decreases based on a change to the contribution level). The update of such a display can occur from the user's computer device communicating with the host system 2 to identify a newly selected contribution rate. In response to the information about the user's selected contribution rate, the host system can determine the changes to the user's take home pay, overall contribution to be made to the user's savings account, and taxes to be withheld from the user's pay and send such data to the user's computer device for user by the computer device for updating the slider bar graphic 704 of the display 701. The updated information viewable by the user from movement of slider 710 can help the user select the contribution rate that meets that user's needs.

After having moved the slider 710 to a desired contribution level or savings deposit level along the length of the slider bar graphic 704, the user can have the contribution rate or savings deposit allocation rate provided to the host system 2 for saving that rate and initiating the saving of the contribution rate or savings deposit rate saved by the user as deductions from the user's regular paychecks to be made to a user specified savings account until the user becomes eligible for participant in the employer retirement plan that is offered by the user's employer. The user can utilize an input device to select a set test drive button 711 or other type of actuatable indicia that is displayed on the test drive display 701. In response to the selection of the set test drive button 711, the user's computer device can communicate with the host system to provide the host system 2 with data identifying the user's selected contribution rate and data relating to the user's desire to set that contribution rate as a savings rate for the test drive feature. In response, the host system 2 can update its memory with that information for use in facilitating deductions from subsequent pay checks the user's employer is to issue to the user so that a deduction at the selected contribution rate is deducted from the user's pay and deposited in a user specified savings account. After the user is eligible for the employer retirement plan, those established contribution deductions to be made from the user's paychecks that are issued after he or she is enrolled in the retirement plan can subsequently be saved into the retirement plan for that user to asset allocations that were previously set by the user when inputting data for enrolling in the 401(k) test plan feature and/or attempting to enroll into the employer retirement plan prior to being eligible for the plan. The host system 2 can be configured so that the user is automatically enrolled after establishing the test drive feature for the user. Alternatively, the host system 2 may be configured to provide at least one nudge to the user to facilitate the user establishing a communication session with the host system 2 to enroll in the retirement plan after the user is eligible for participation in the retirement plan.

In some embodiments, the test drive display 701 can be a pop-up window that is displayed to the user after the user has entered all information relevant to enrolling in a 401(k) retirement plan as discussed with reference to FIGS. 3-17 after the user has made asset allocation, contribution, and retirement age selections and entered personal information about the user needed for setting up of the 401(k) account. Then, after the user has initiated the test drive feature, the host system 2 can automatically enroll the user in the 401(k) plan or other retirement plan offered by the user's employer when the user is eligible for participation in that plan.

In other embodiments, the test drive display 701 can be shown to the user via communications between the user's computer device and the host system 2 after the user has entered initial information about the user (e.g., user's age, social security number, address, email address, phone number, desired password and log-in, etc.) and after the host system 2 determines that the user is not yet eligible for participation in the employer sponsored retirement plan. After the user is then determined to be eligible for the retirement plan, the host system 2 can send one or more messages to the user via email, text messaging, or other means of communication (e.g., facilitation of the sending of hard copy letters, etc.) for informing the user that he or she is now eligible for retirement plan participation and should communicate with the host system 2 to enroll. Emails, text messages, and other means of communication can include a link to a website for the user to access and/or a link to actuate an application that is downloaded and saved on the user's computer device to initiate the enrollment process. The user may then interact with the host system via the GUI displays as discussed above with reference to FIGS. 3-17 to select a desired contribution rate, asset allocation settings, and projected retirement age during that subsequent enrollment process.

GUIs for Employer Related Interface with Host System

The host system 2 is also configured to support an interface with one or more employees of the employer that may sponsor one or more retirement plans. In some embodiments, that employer may be a union, an educational institution, a federal or state agency, a nonprofit organization, a manufacturer, a retailer, or another type of entity or an institution that employees a number of employees, or other type of employer. The host system 2 can be configured to facilitate the interaction with the employer via different GUIs that can be displayed on a computer device of the employer. The employer's computer device may connect to the host system via the Internet or other type of connection for exchanging data between the employer computer system and the host system 2 that can be needed to facilitate operation and management of the employer retirement plan (s). The employer computer system can include at least one computer device (e.g., a PC, laptop computer, tablet computer device etc.) that include one or more input devices (e.g., a mouse, stylus, touch screen display) that are manipulatable by an employee that is responsible for overseeing or otherwise managing a retirement plan. A display of an employer computer device or a display connected to such a device or computer system can be configured to display GUIs that the employer's employees can see and manipulate for purposes of communicating with the host system 2 to obtain data via their computer device that is usable for overseeing and managing the sponsored retirement plan.

An employer may have one or more employees that are assigned to oversee or manage a retirement plan such as a 401(k) plan as part of the work responsibilities. Those employees could be in a benefits department or a human resources department for some types of employers. At least one computer device of an employer computer system that is usable by at least one such employee can be configured to communicate with the host system 2. The computer device may be communicatively connectable to a web server 15 or application server 17 of the host system. The web server 15 or application server 17 can communicate with the computer device of the employee that is overseeing and/or managing the employer sponsored retirement plan to facilitate communications with other elements of the host system 2 as well as computer devices of parties 31 or other entities to obtain data relevant to oversight and management of the employer sponsored retirement plan.

The computer device of the retirement plan oversight employee can be configured to permit that user to enter log-in information (e.g., log-in input, password data, etc.) to obtain access to the host system and data associated with the employer's retirement plan that is managed and/or overseen via the host system 2. After providing such information to the host system, the host system 2 can exchange data with the computer device such that a GUI display is shown to a user via a display device of the computer device being used by the user to communicate with the host system 2. The GUI display can include a plurality of actuatable tabs 803, 805, 807, 809, 811, and 812 that can each be actuated to obtain a different display directed to a subject of that tab. For example, a first tab 803 can be directed to a "to do" list, or tasks that a particular user is responsible for accomplishing over a given time period. A second tab 805 can be configured to oversee employee related oversight and management activities related to the retirement plan. A third tab 807 can be directed to reports to be generated for submitting to third parties to comply with contractual or regulatory requirements associated with administration of the retirement plan. A fourth tab 809 can be directed to a review of overall plan health and can also be utilized to assess how the retirement plan benefits and/or performance can be improved. A fifth tab 811 can be directed to resources available to the user and a sixth tab 812 can be directed to contacting personnel associated with oversight or operation of the administration of the retirement plan, which can include, for example, contact information for other employees of the employer as well as personnel that are employed by third parties that help administer the retirement plan or provide a service associated with operation, administration, management, or oversight of the retirement plan.

Upon communicating the necessary credentials for connection to the web server 15 and/or application server 17 of the host system 2, the user's computer device can receive data from the host system 2 for illustrating a to do list display 801 that includes multiple different graphical elements that help identify items that the user of the computer device is responsible for performing in the oversight and/or management of the employer retirement plan. For instance, a first graphical element can include a displayed graphical segment 813 that includes an actuatable portion that is configured to facilitate the upload and saving of reports to the host system 2. Actuatable indicia 825 is selectable to indicate the upload of necessary reports is done. A drag and drop section 827 of the graphical segment can be configured so that a user can click and draft one or more reports that are stored as files on that user's computer and drag those reports on to the drag and drop section 827 for uploading copies of those reports to the host system 2. As another option, a selectable menu that permits a user to identify one or more saved files for being uploaded to the host system 2 can be displayed in addition to the drag and drop section 827, or as an alternative to the drag and drop section 827. The user can initiate an upload of the one or more report files by selecting the actuatable indicia 825 and/or other indicia. In other embodiments, the uploading can be initiated by dropping the selected file into the drag and drop section 827. Upon initiation of the uploading of files, the user's computer device can communicate data for providing copies of the report files to be uploaded to the host system 2. In response to that data, the host system 2 may receive the data for the copied files so that memory of the host system retains a copy of those one or more uploaded files.

A second graphical section 815 of the to do list display 801 can include a listing of employees that are now eligible to enroll. The listing can be in a row and column format within a window 833 (e.g., a table format). The listing can include a header row that identified different columns such as participant name, email address, phone number, and eligibility data for each employee that is eligible to enroll and who has not yet enrolled. Selectable boxes may be in a column near each listed eligible to enroll employee as well that are actuatable to mark that particular employee for purposes of sending a reminder. A header row of the table can include a selectable box for the selectable box column as well so that actuation of the box of the header row results in all listed employees being selected for a particular action to be identified via a subsequent selection made by a user (e.g., marking employees eligible to enroll as having been performed, etc.). Reminder actuatable indicia 831 can be selected for having a form reminder to enroll sent via email, text message, and/or other communication means to employees that were selected for that action by clicking on one of the selectable boxes near those employees' names. The email reminder may be a pre-selected and saved default email for example that is sent to the employee's work email address as well as one or more other email addresses associated with the employee. The text of that default email can also be included in a text message sent to a mobile phone associated with that employee. Actuatable indicia 829 can also be shown on the second graphical section 815 that is selectable for making tasks associated with reminding employees that are eligible to enroll as being completed. Upon receipt of such a selection, the user's computer device may transmit data related to the taken actions and/or the selection of the actuatable indicia 829 to inform the host system 2 that such tasks were accomplished. Upon all employees' eligible to enroll being reminded to enroll and information about completion of that task being communicated to the host system, the to do display 801 could be updated to show no other employee as needed to have a reminder sent to remind them to enroll in the offered retirement plan in the second graphical section 815.

A third graphical section 817 can be shown that includes a listing of retirement plan loans to approve for different employees that may have requested loans from their 401(k) plans or otherwise requested a loan relating to funds of their savings within their retirement account sponsored by their employer. The third graphical section 817 can include actuatable indicia 835 that is actuatable via a selection of a button, link, or other means to make tasks associated with review and approval of such loans as being completed. Upon receipt of such a selection, the user's computer device may transmit data related to the taken actions and/or the selection of the actuatable indicia 835 to inform the host system 2 that such tasks were accomplished. The loans to approve displayed in the third graphical section 817 can include a listing 837 that is in a table format. Rows of the table can be to configured to identify employees who have requested a loan, the amount of the loan requested, the start date related to the requested loan, and one or more columns for other information relevant to the requested loans. A column of selectable boxes can be provided for each row. A user can select a box for each employee that is to have their loan approved and then can select the actuatable indicia 835 to approve the loans to those employees. In response to such a selection, the computer device of the user can communicate data relating to the approval of those loans to the host system 2 for updating information relating to the approval of the loans in the host system 2 and communicating the approval of the loans to the employees that requested those loans. A header row of the table can include a selectable box for the selectable box column as well so that actuation of the box of the header row results in all listed employees being selected for a particular action to be identified via a subsequent selection made by a user (e.g., marking a review as having been performed, etc.). Upon all employees' loan requests being approved or denied and information about completion of that task being communicated to the host system, the to do display 801 could be updated to show no other employee as needed to have a loan approved in the third graphical section 817.

A fourth graphical section 819 can be displayed to the user to identify contribution rate changes for different employees that changed their contribution rates to their retirement accounts. The fourth graphical section 19 can include a table 841 that has respective rows for respective employees who have changed their contribution rate. Columns for each row can include a current rate, a new rate that was selected, an indicator that identifies whether the changed rate was increased or decreased, a change date to identify the date on which the employee entered the change to their contribution rate, and a column of selectable boxes for identifying employees who have had their contribution rate change reviewed or approved. Upon reviewing the listing, all participant names could be selected and actuatable indicia 839 could be selected for communicating the completion of the review of new contribution rates to the host system 2. A header row of the table 841 include a selectable box for the selectable box column as well so that actuation of the box of the header row results in all listed employees being selected for a particular action to be identified via a subsequent selection made by a user (e.g., marking a review of the changed contribution rate as having been performed, etc.). Upon all employees' contribution changes being approved and information about completion of that task being communicated to the host system, the to do display 801 could be updated to show no other employee as needed to have a contribution rate change approved or otherwise marked as having been noted.

The to do display 801 can also include a print button or other type of actuatable indicia 821 that is selectable for having the displayed information printed on a printer that is communicatively connected to the user's computer device. Actuatable indicia could also be displayed that is configured so that key tasks can be entered into a calendar format of a calendar application on a user's computer device, such as an Outlook calendar or other type of calendar. The actuatable indicia could also, or alternatively, be configured so that actuation of the indicia initiates a download of a file that defines a list of the displayed "to do" items or list of tasks identified in the to do display 801 and/or tasks that were previously selected via other user input to be identified in such a list. Actuation of the All is done actuatable indicia 823 is also displayable under all the different sections of the display. Selection of the All is done actuatable indicia 823 can result in the review of all listed items on the to do list elements of the display 801 being identified as having been completed. The user's computer device may communicate data relating to the actuation of the All is done indicia 823 to the host system 2 so that the host system 2 can update its memory as to the fact that all listed to do items were marked as being done by the user in response to the user manipulating an input device to select the all is done actuatable indicia 823.

The to do display 801 can permit a user that has logged into the host system 2 to quickly ascertain tasks needed to be completed for overseeing performance or management of the employer retirement plan. Further, the display can help facilitate review and approval of different actions taken with respect to the plan by plan participants. The to do display 801 can also be configured so that only actions that require performance within a pre-selected time period (e.g., 2 business days, 1 week, 1 month, 3 months, etc.) are displayed to prompt action by the user after that user has logged into the host system 2. For example, a to do display 801 may include an urgent to do tab 802 indicating that the urgent tasks associated therewith are time sensitive and/or that there are important tasks delegated to other users which are dependent upon completion of the urgent tasks. Other tabs may include an Upload to PNC tab 804, a To Dos By Category tab 806, and a Calendar of Events tab 808. Additional actuatable indicia 838 may be displayed upon selection of any of the tabs 802, 804, 806, 808. For example, selection of the urgent to do tab 802 may display an All actuatable indicia, an Interact With Participant actuatable indicia, a Submit actuatable indicia, a Fetch/Get actuatable indicia, and/or a FYI to Sponsor actuatable indicia. Indicator indicia 840 may be displayed within any of the tabs 802, 804, 806, 808 and/or actuatable indicia 838 denoting the number of pending/outstanding tasks within that category. Any one of the actuatable indicia 838 can display a tabular list 810 adjacent the actuatable indicia 838 pertaining to the information associated with the actuatable indicia 838. The tabular list 810 may include the tasks delegated to users and the status of those tasks. The tabular list 810 and/or the tasks displayed therein may be displayed in a truncated format to be expanded upon selection of a "Full View" and/or "show" actuatable indicia. Additional actuatable indicia on the to do display 801 can include performance data links associated with the retirement account of a retirement plan, which may include a Current Day Market Value tab 814, a Plan Rate of Return tab 816, etc.

Figure 40A:
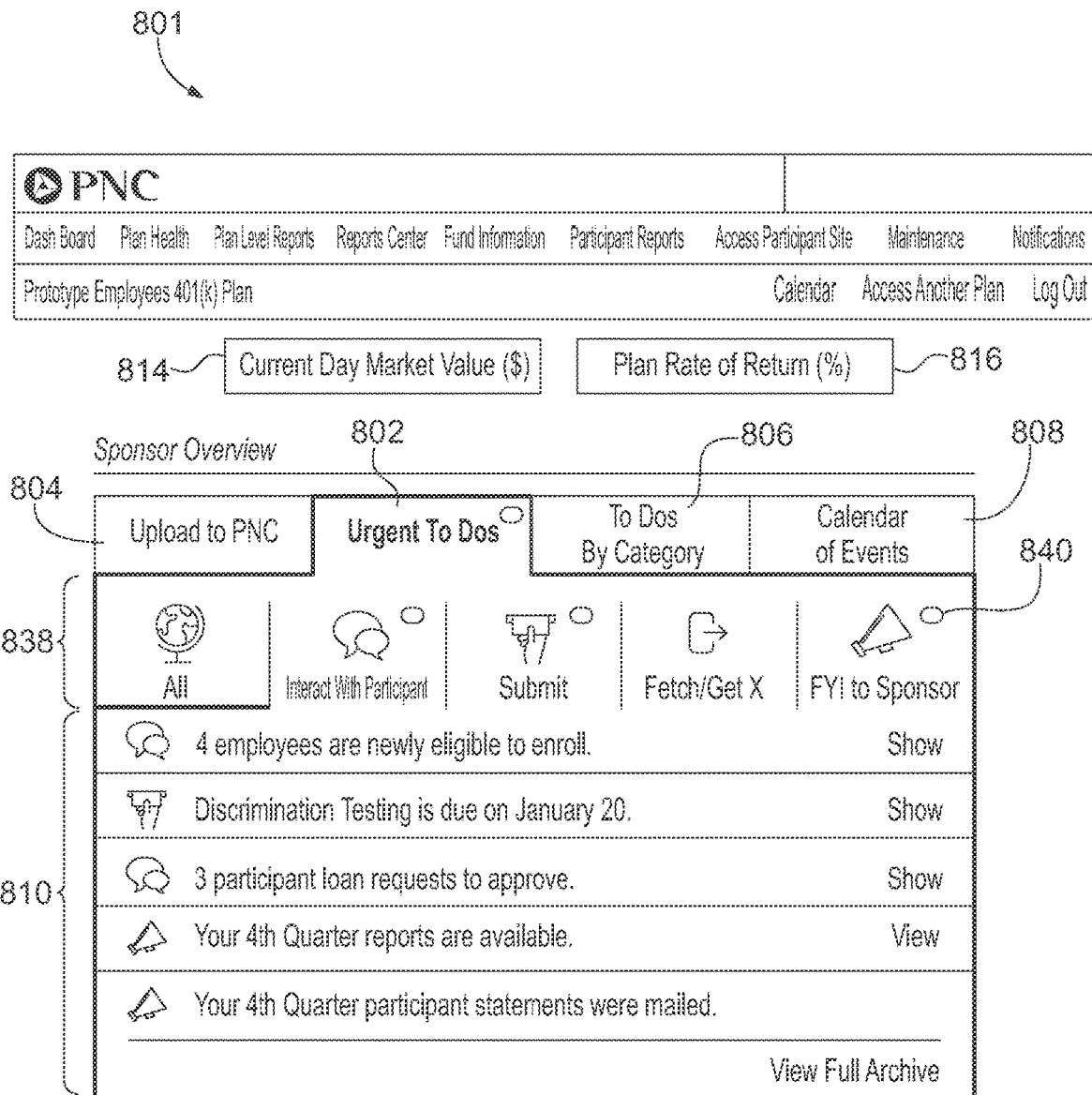
FIG. 40A is a view of a display of an exemplary GUI providable to a computer device displaying an urgent to do tab of the to do display.
Figure 40B:
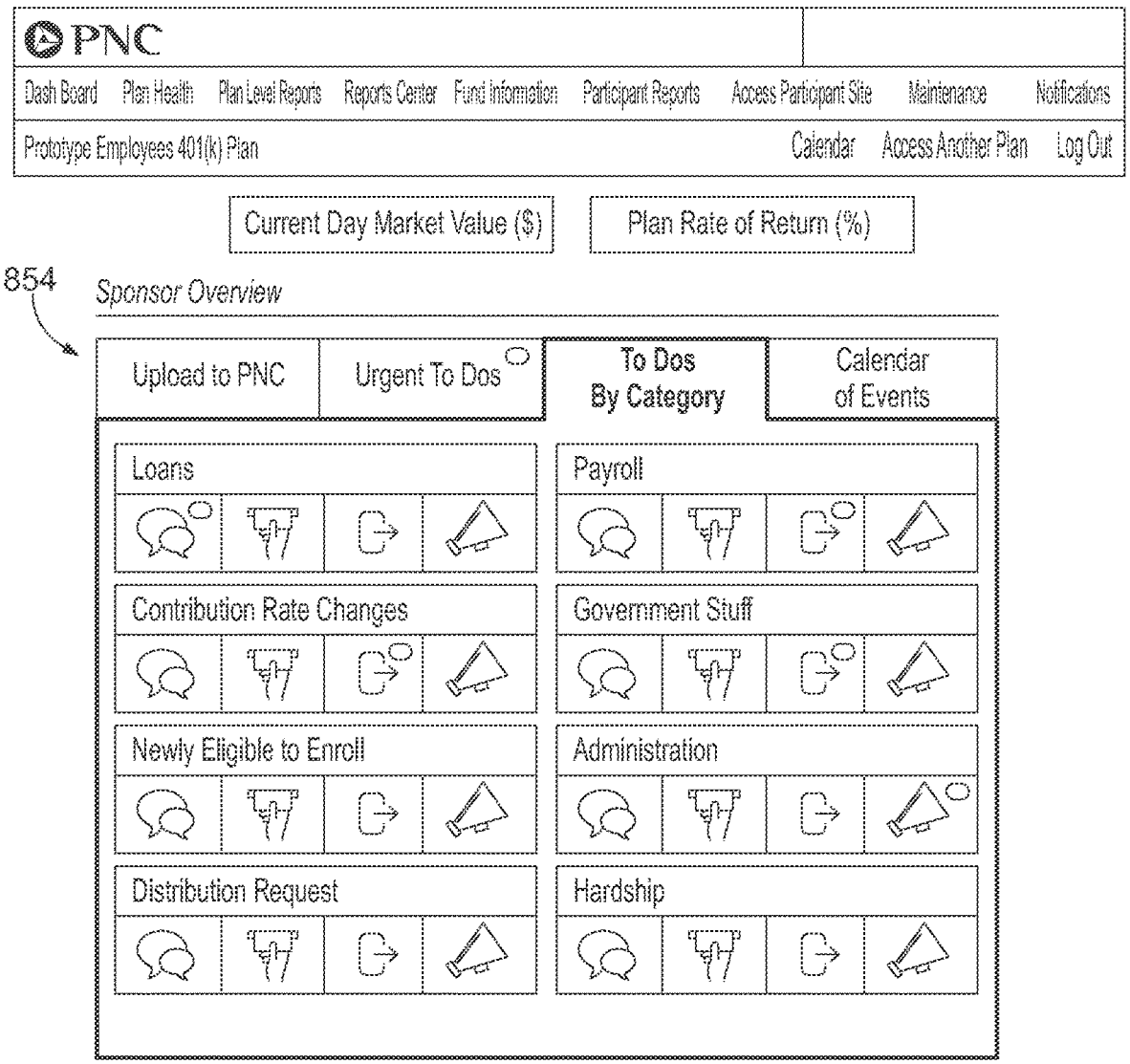
FIG. 40B is a view of a To Do by Category Screen that may be accessible from the GUI of FIG. 40A.
Figure 41:
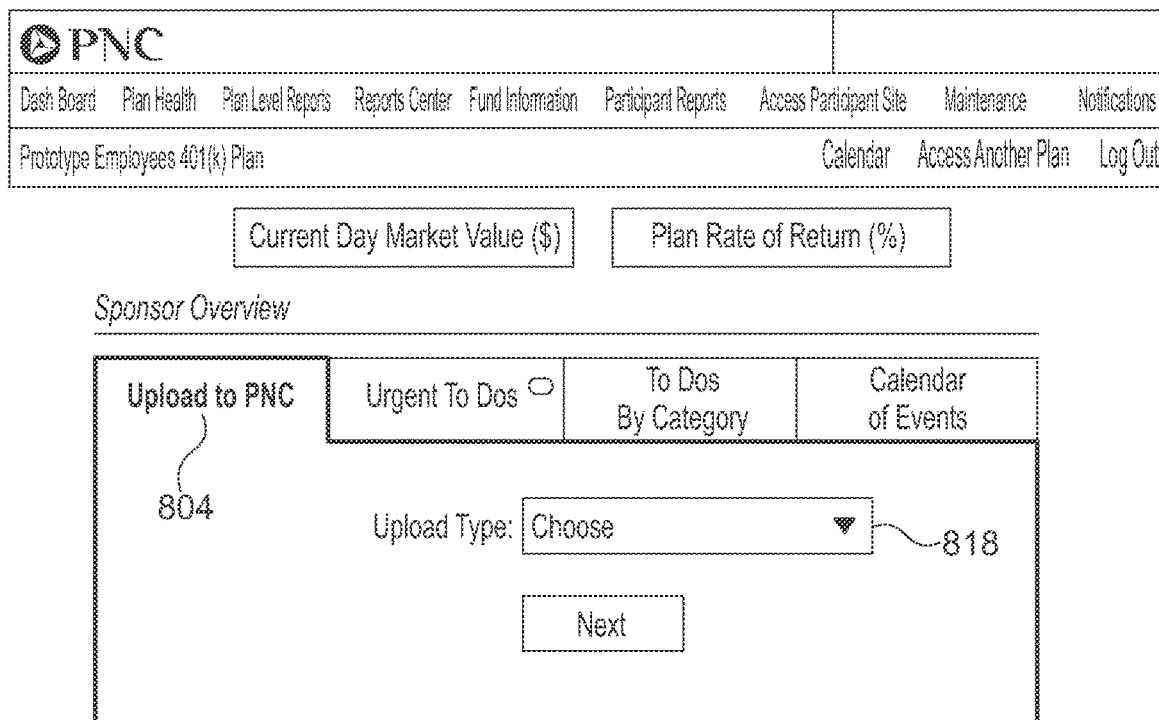
FIG. 41 is a view of a display of an exemplary GUI providable to a computer device displaying a drop-down menu to upload employee and/or payroll information.
Figure 42:
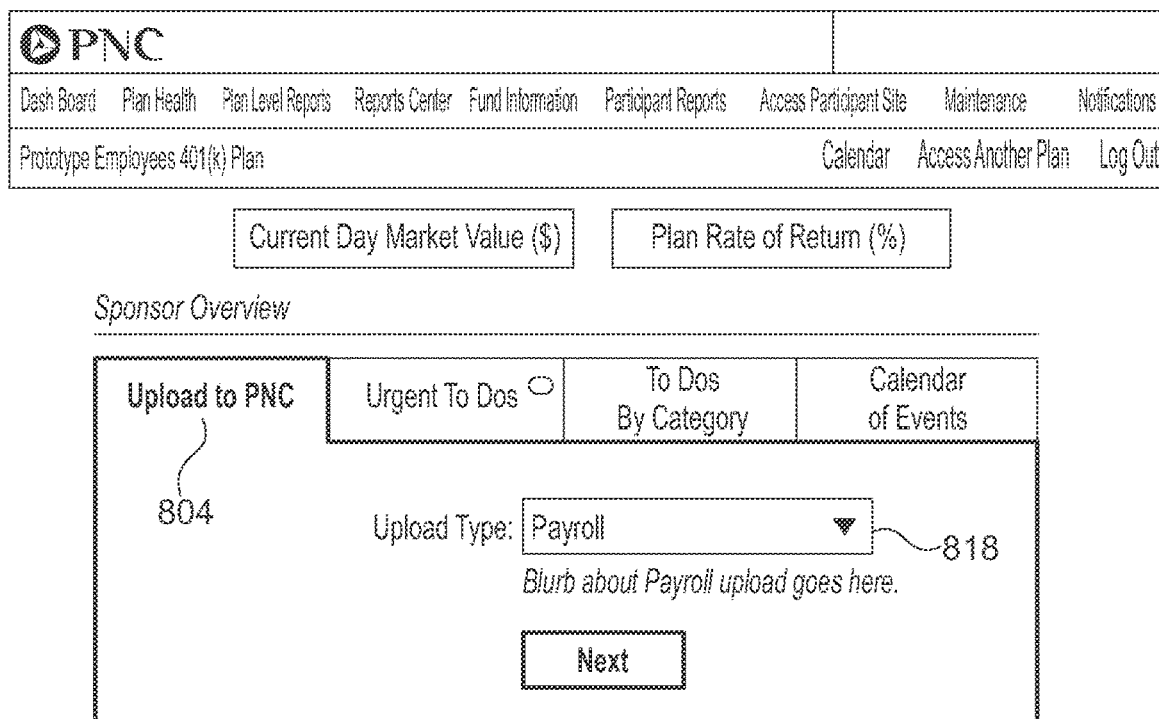
FIG. 42 is a view of the display of FIG. 41 where a user selects to input payroll information.

Selection of the To Dos By Category tab 806 can display the To Dos By Category screen 854 shown in FIG. 40B, which may be programmed to present the tasks by categories. The categories may include, but are not limited to Loans, Contribution Rate Changes, Newly Eligible to Enroll, Distribution Request, Payroll, Government Stuff, Administration, Hardship, etc. Within each category may include actuatable indicia enabling a user to drill further into the category for specific tasks.

Selection of the Calendar of Events tab 808 can display the Calendar of Events screen display 856 shown in FIG. 40C, which may be programmed to present tasks in a calendar format. In addition, radio check boxes may enable a user to filter the display of information. For example, radio check boxes can enable a user to display only payroll information, only Government Stuff, Administration, or any combination thereof.

Selection of the Upload to PNC tab 804 can facilitate uploading documentation and other data related to a to do task. For example, a plan sponsor may be tasked to upload employee information, employee payroll information, or both employee information and employee payroll information. A user may select the type of information that is being uploaded from an upload drop-down 818 menu.

FIGS. 42-45 show uploading employee payroll information. The documentation and/or data may be uploaded via an upload function 820 (e.g., a drag-drop function, a browse function, etc.), through which the documentation and/or data can be transmitted to the host system 2 via a secure transmission. A user may include textual comments to be transmitted along with the documentation/data by inputting comments in a comment box 822. "Edit", "Remove", and other actuatable indicia may be displayed to enable users to edit, modify, and remove documentation/data before it is transmitted to the host system 2.

Figure 47:
FIG. 47 is a view of a display of an exemplary GUI providable to a computer device displaying an upload function for employee information as part of the to do display.
Figure 48:
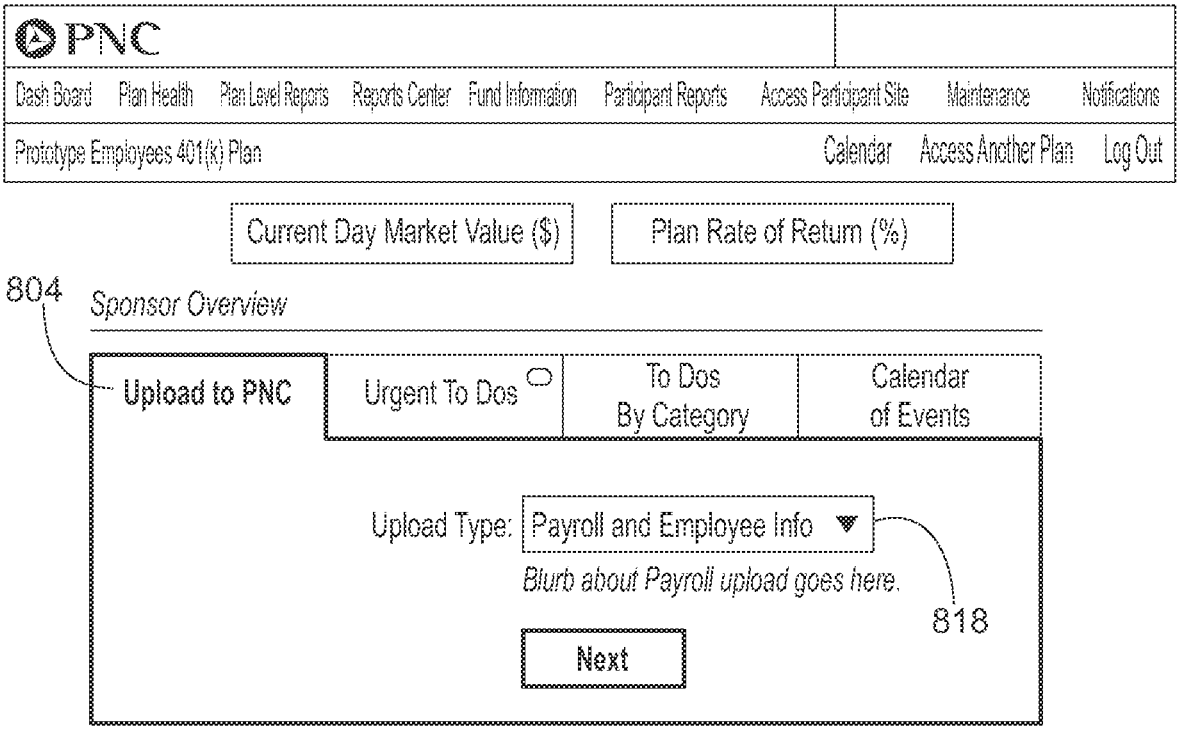
FIG. 48 is a view of the display of FIG. 41 where a user selects to input payroll and employee information.
Figure 49:
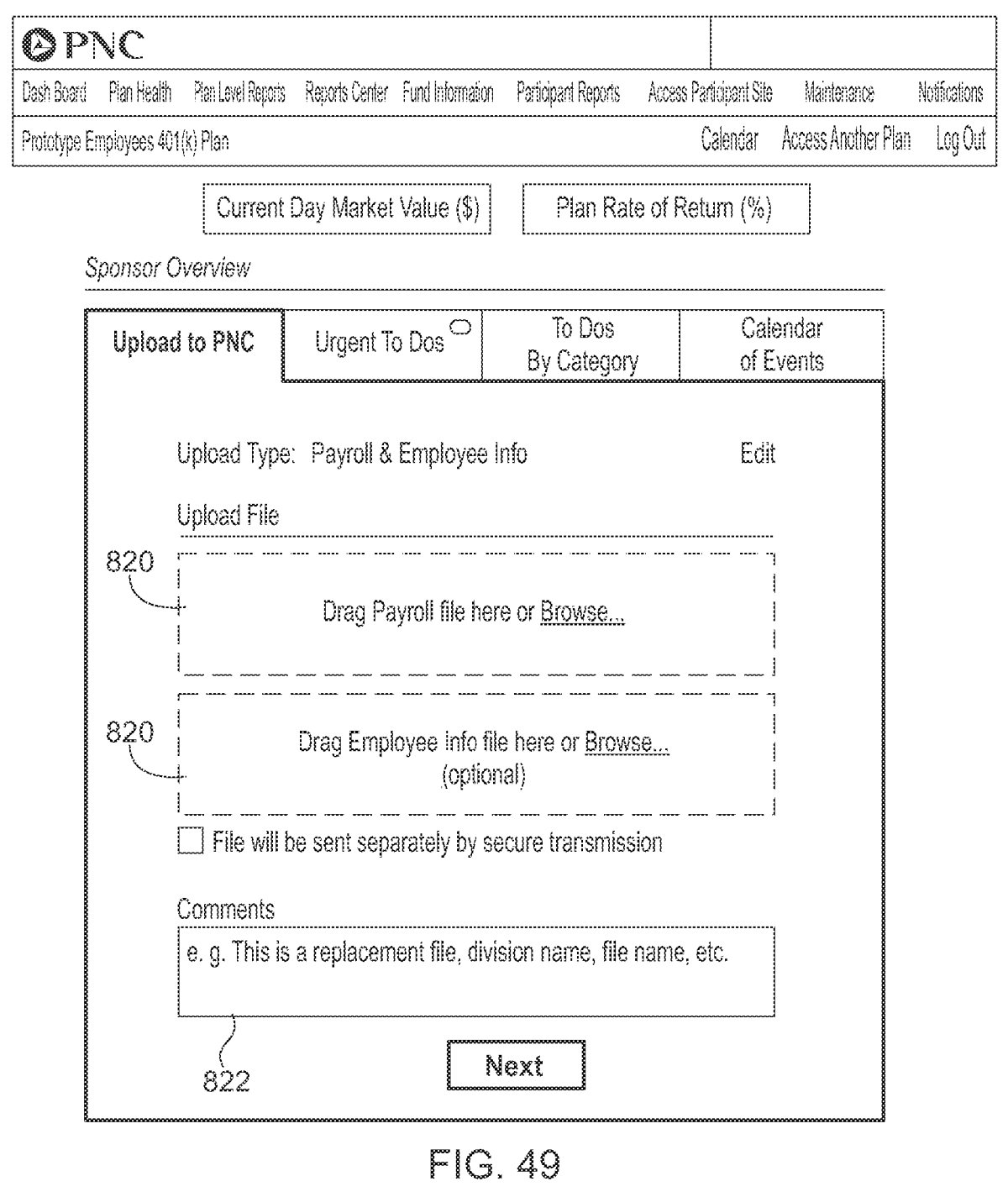

Upon uploading the documentation/data, an Upload Overview Screen 824 can be displayed, which may include an Upload File segment 826, a Funding Method segment 828, and a Money Type segment 830. The Upload File segment 826 can be programmed to display a listing of the documents/data uploaded, along with "Edit" actuatable indicia. The Funding Method segment 828 may be programmed to display radio buttons enabling a user to select a type of fund transfer (e.g., Debt, ACH, Wire, Check, etc.) and to input related to account numbers, routing numbers, SWIFT numbers, etc. (see FIG. 45). The Money Type segment 830 may be programmed to display various retirement accounts within the retirement plan held by the employee. For example, a plan sponsor may enter a desired pay period to be effected by the transfer of funds to a retirement account. The system can then automatically allocate portions of the employee's pay for that pay period and transfer the funds via the selected funding method and to the designated retirement accounts. In addition to displaying various retirement accounts within the Money Type segment 830, other sub-accounts may be displayed, such as Employee Loan Repayment accounts for example. The Upload Overview Screen 824 can also be programmed to display a total amount for the retirement accounts and sub-accounts. FIGS. 46-47 show uploading employee information, and FIGS. 48-49 show uploading employee payroll information and employee information. The screen displays associated with both of uploading employee information and employee payroll and employee information can have similar functionality and features as described above. For example uploading employ information or employee payroll information and employee information can generate the same Upload Overview Screen 824 as described earlier.

Figure 50:
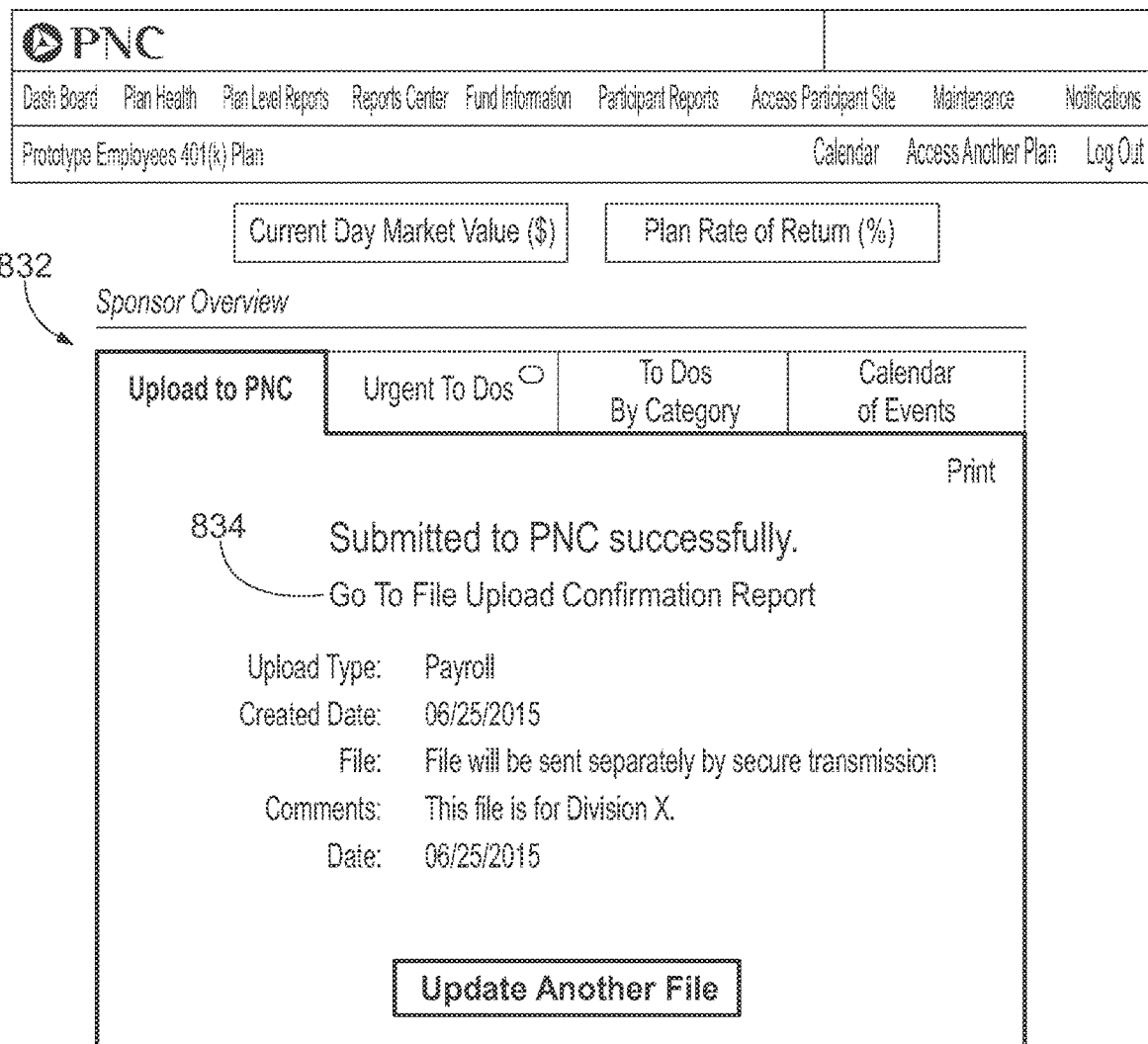
FIG. 50 is a view of a display of an exemplary GUI providable to a computer device displaying a confirmation screen as part of the upload function.
Figure 52:
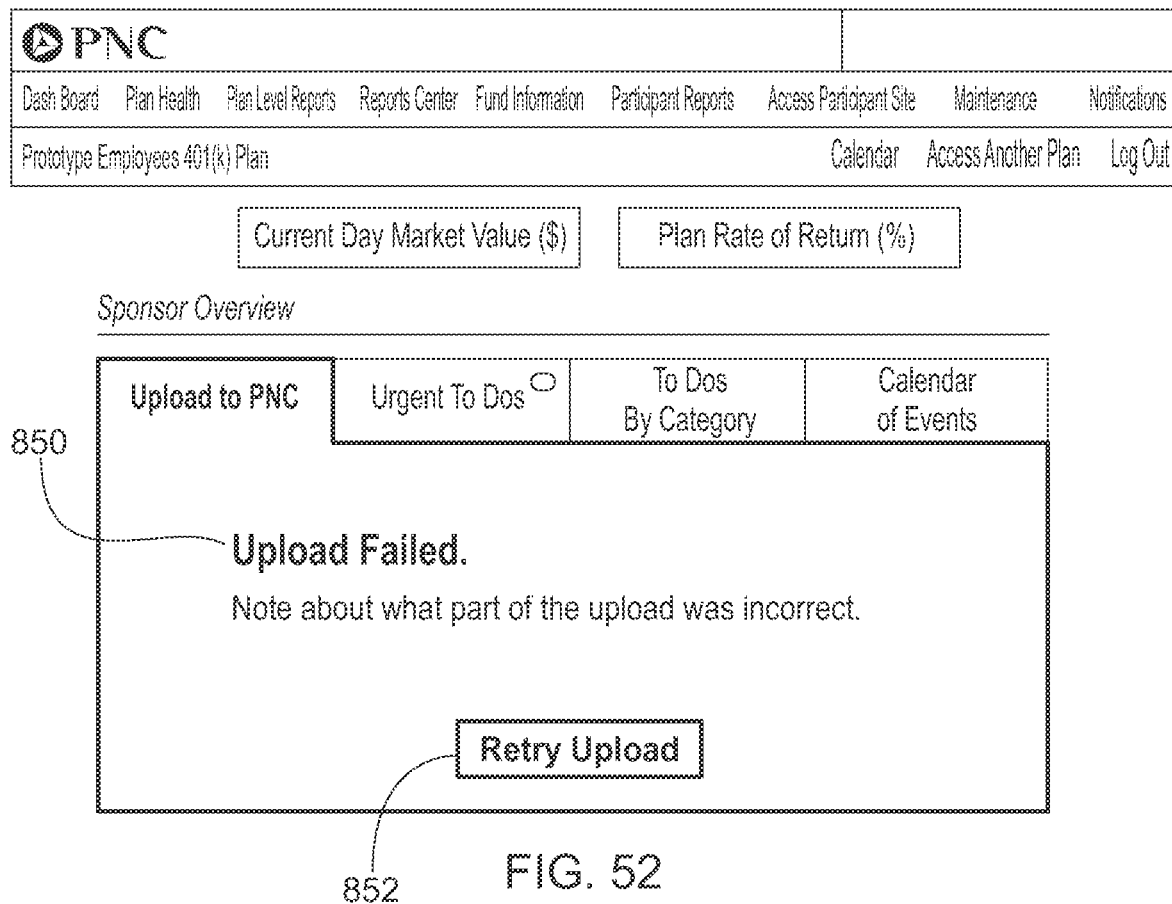
FIG. 52 is a view of a display of an exemplary GUI providable to a computer device displaying a failure to upload text.
Figure 54:
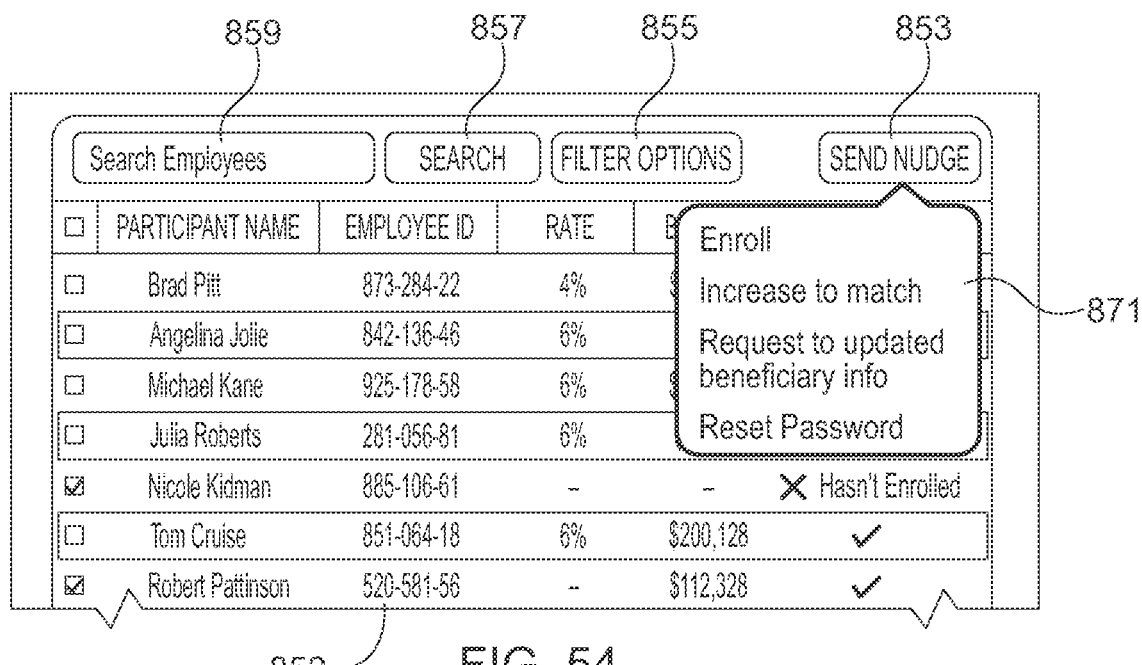
FIG. 54 is a fragmentary view of the exemplary GUI shown in FIG. 53 after input is provided to the host system relating to the sending of a notification, or nudge, to one or more employee participants in the plan offered by the employer.
Figure 55:
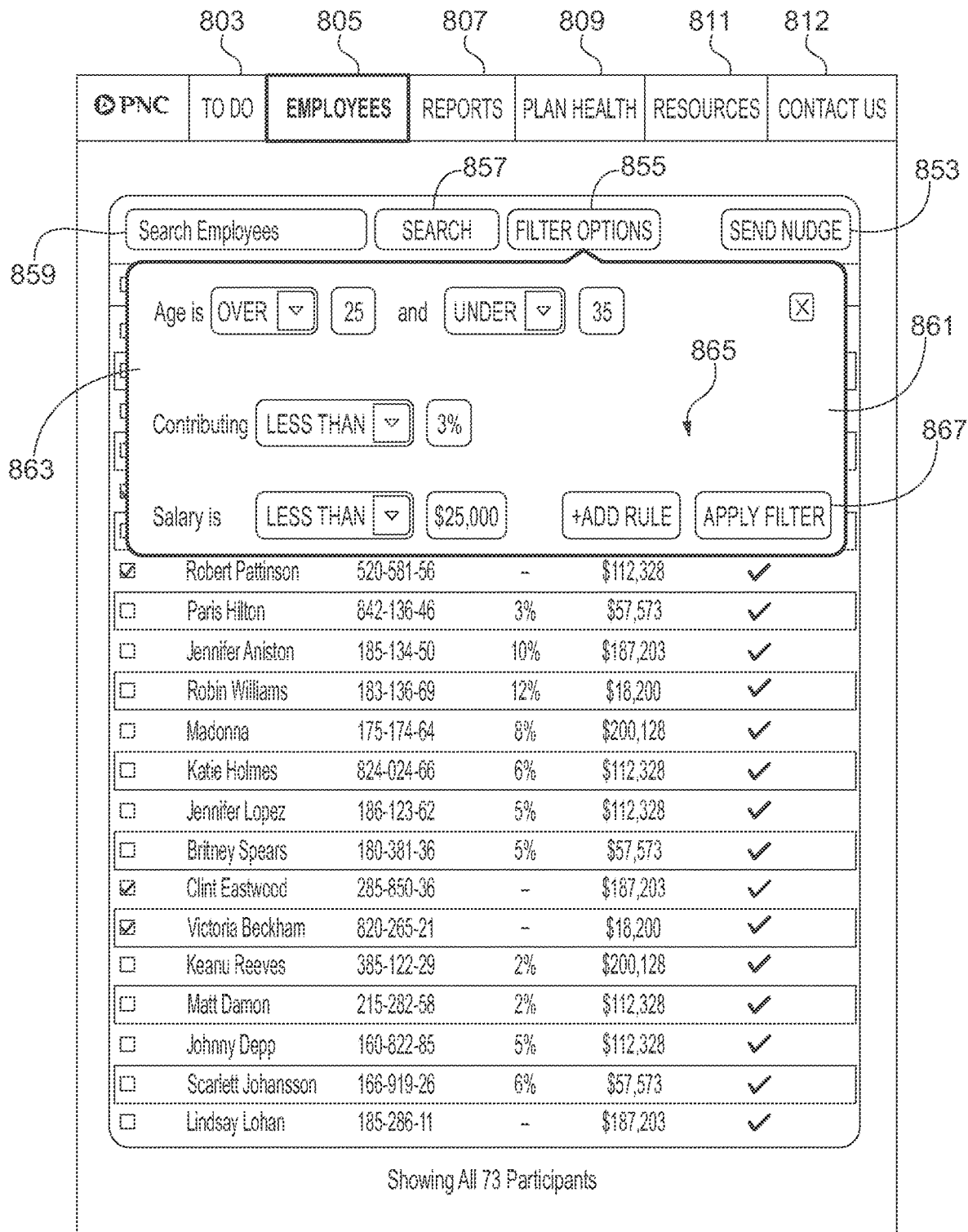
FIG. 55 is a view of a display of the exemplary GUI shown in FIG. 53 after input is communicated to the host system providing data for filtering a list of employee participants.

As shown in FIG. 50, upon successfully uploading the documents/data, a transmission confirmation screen 832 can be displayed. From this screen 832, a user can select an Upload Report link 834. After the file upload process, plan sponsors can link to the File Upload Confirmation Report query, which allows users to query the status of uploads performed for the desired timeframe. The query returns the status of the upload (Success or Fail), plan ID, file details, date/time stamp, and the user ID of the person who uploaded the file. Additional actuatable indicia may include, but are not limited to, print actuatable indicia, an Upload Another File actuatable indicia, etc. However, if an upload transmission is not successfully sent, errors are found, and/or information is missing, inline error text 844 can be displayed on the Upload Overview Screen 824, as shown in FIG. 51. Specific inline error text 844 can be displayed within the segment 826, 828, 830 for which the error pertains. In addition, transmitting the documents/data via the upload function can be disabled until the error(s) is corrected to ensure that incomplete data is not submitted and/or tasks are not prematurely designated as completed. To achieve this, the host system 2 can perform an errors check when a user selects the complete upload 836 actuatable indicia before the documents/data are transmitted. If errors are detected the upload function (e.g., the complete upload 836 actuatable indicia) can be disabled. The host system 2 can be programmed to transmit a failure to upload message to the retirement plan sponsor device, host administrator device, and/or other user-device if errors are detected and/or the upload function is disabled. In addition, the failure upload message 850 can be displayed as the user selects the Upload to PNC tab 804 in the event the user navigates away from the Upload Overview Screen 824 (see FIG. 52). In a failure to upload environment, a user can attempt to upload the documents/data again by selecting the Retry Upload 852 actuatable indicia. This can ensure that all parties are aware of the error and prevent wasted transmission and storage of data, as well as erroneous delegation of tasks.

A user can also navigate away from the to do display 801 by selecting another tab to obtain a different display relating to retirement plan performance, operation, or management. For example, a selection of the second tab 805 can result in the user's computer device communicating with the host system 2 to exchange data relating to the selection of the second tab 805 with the host system 2 and the host system 2 responding to that data by providing data to the user's computer device for a display of employee participant related data. The employee participant data display 851 can then be generated by the user's computer device and displayed via a display device of that computer device and/or connected to that computer device. The employee participant data display 851 can include a table 852 that includes a listing of different participants by name, employee identification code, as well as other data. For instance, the table could include a column for a currently selected contribution rate for each employee, the value of that particular employee's retirement account, and a column that identifies whether an employee has completed enrollment or is not enrolled. The table could also include information identifying beneficiary information for each employee, level of completeness information relating to the information the employee has provided for enrollment in the retirement plan, and contact information for the employee. A column of selectable boxes can be provided as well. The selectable boxes can be actuatable to initiate an action upon selection of other indicia after at least one box for at least one employees is selected. A header row of the table can include a selectable box for the selectable box column as well so that actuation of the box of the header row results in all listed employees being selected for a particular action to be identified via a subsequent selection made by a user.

As may be appreciated from FIGS. 40A-42, the employee participant data display 851 can also include a search query field 859, actuatable indicia for initiating a search 857, and actuatable indicia 855 for identifying filter options for illustrating results of a search. Actuatable indicia 853 for the sending of one or more notices, or "nudges", can also be shown in the employee participant data display 851.

Figure 57:
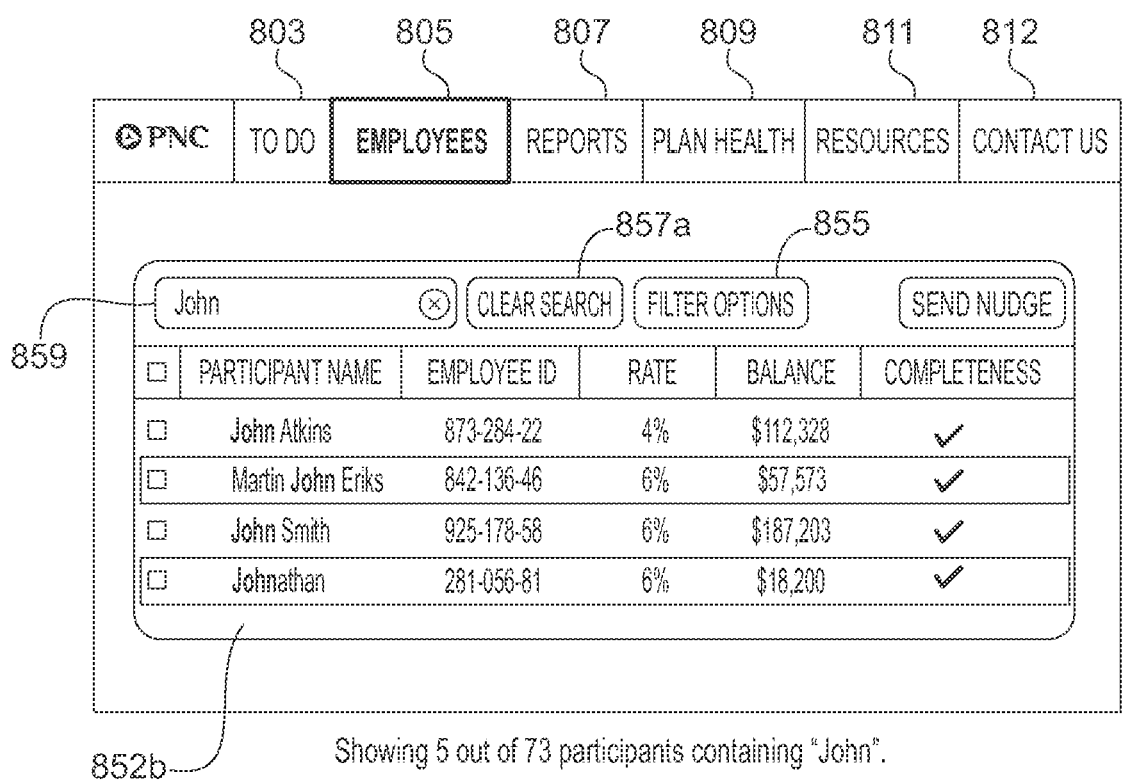
FIG. 57 is a view of a display of the exemplary GUI shown in FIG. 56 after input is provided to the host system for filtering the list of employee participants by a second set of criteria.

A user can manipulate one or more input devices to enter input into the search query field 859 to enter text such as the name of an employee, an employee ID number, or key words related to activities of interest that one or more employees may have undertaken in connection with the employer's retirement plan. The user can the utilize an input device to select the actuatable indicia for initiating the search 857. In response to selecting the actuatable indicia for initiating the search 857, information relating to the query terms entered in the search query field 859 can be sent from the user's computer device to the host system 2 such that the host system 2 performs a search and provides data to the user's computer device relating to results of the search of records relating to the employer retirement plan that were found from searching for the terms identified in the search query field 859. The user's computer device may then subsequently display the results of the conducted search to the user in an updated table 852b that is displayed as replacing a previously shown table 852, as may be appreciated from FIG. 57. If the user subsequently desires to clear the search and return to the view of the prior table 852, the user may select a clear search actuatable indicia 857a and, in response to actuation of that indicia, the user's computer device will return the view to table 852 and/or communicate with the host system to receive data tor displaying the table 852.

If the user desires to adjust how the search was conducted, the user may provide input to change the search query and subsequently request the search to be conducted again via manipulation of input. This could be done by clearing the prior search and initiating a new search or by simply adding text within the search query field 859 to have the search updated.

The user can also actuate the actuatable indicia 855 for identifying filter options to receive a display of search operations that can be adjusted to meet the user's preferences. Selections of changes to how a search is conducted can subsequently be transmitted from the user's computer device to the host system 2 for use in re-running a search or running a new search. Alternatively, the selected filtration changes can be received by the user's computer device and the user's computer device may perform the searching of the previously received employee record data it previously received from the host system 2.

Figure 56:
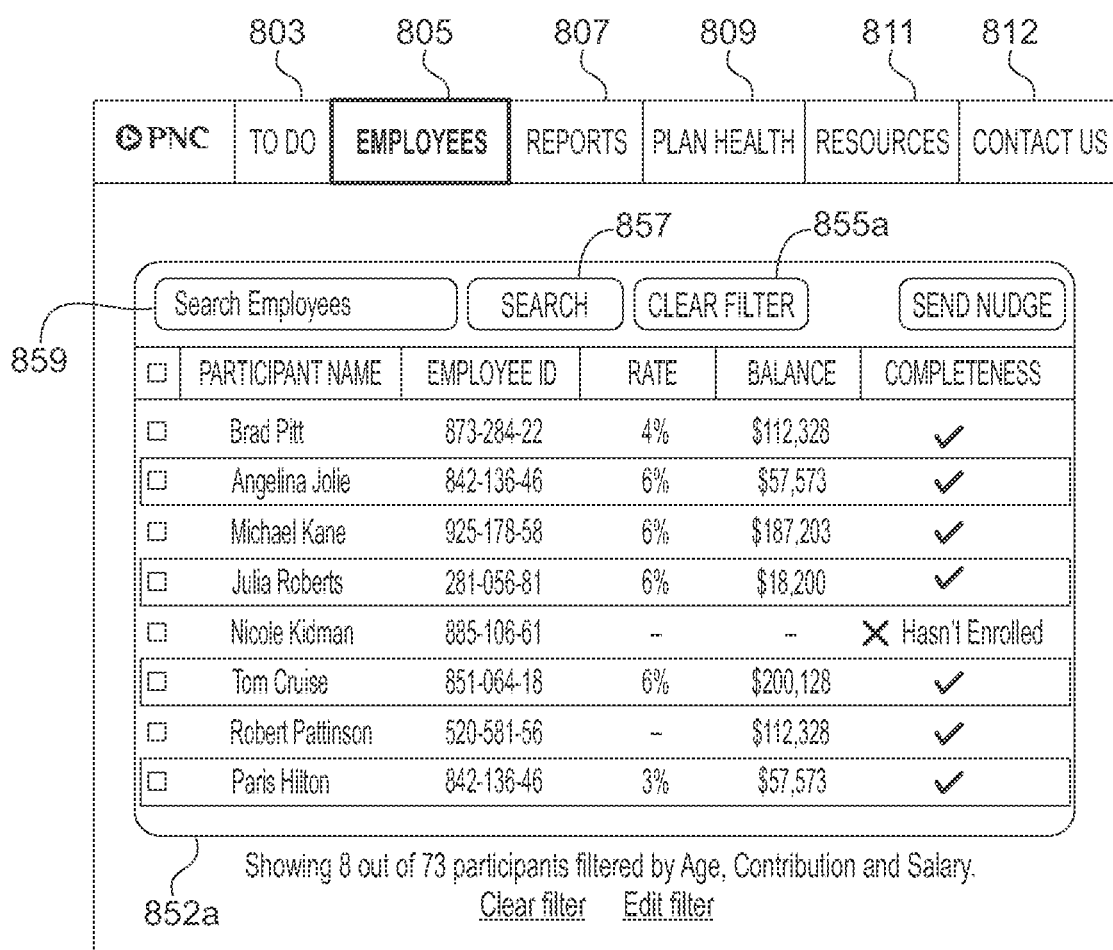
FIG. 56 is a view of a display of the exemplary GUI shown in FIG. 55 after input is provided to the host system for filtering the list of employee participants by a first set of criteria.

The user can also utilize at least one input device to actuate the actuatable indicia 855 for filtering the entirety of the employment related records identified in the table 852 to utilize filtration to attempt to identify relevant employee records. For example, upon actuation of the actuatable indicia 855 for identifying filter options, a window 861 can be displayed to the user that identifies different filter options for filtering the employees within the table 852 of listed employees. The filter options window 861 can include any of a number of filter criteria 863. The filter criteria can include at least one of: age, contribution level, and salary level. The age, contribution level, or salary level can be filtered by a specific value or an identified range of values. The filtration of the employees can occur based on a filtration based on just one such criteria or a combination of two or more sets of criteria (e.g., age of over 35 years old, contribution of under 6% and a salary of under $50,000, etc.). One or more other filter rules can be created by the user via add filter rule actuatable indicia. A user can manipulate one or more input devices to provide input for selecting one or more filter criteria to filter the displayed employee listing on the table 852. An application of the selected filter can be made final by a user selecting an apply filter button 867 or other actuatable indicia related to application of the selected filter. In response to the selection of the apply filter button 867, the user's computer device may filter the data of the employees displayed in its display device that it had previously received from the host system 2. As an alternative, in response to the actuation of the apply filter button 867, the user's computer device may communicate data related to the selected filtration criteria to the host system 2. In response, the host system 2 can conduct a search based on the entered search query of records of the employer sponsored retirement fund to identify employee records that meet the search query and provide data relating to those found records to the user's computer device for being displayed in an updated display of table 852a that shows the employees meeting the search criteria as defined by the applicable selected filter options. An example of such a filtration of employee records can be seen from FIG. 56.

When the use of the applied filter is no longer necessary or desired, a user can provide input for clearing the filtration of employee records so that the table 852 illustrating records relating to all employee participants of a plan can be again displayed. A user can provide input for selecting a clear filter button 855a or other type of clear filter actuatable indicia. In response to the selection of such indicia, the user's computer device can communicate with the host system 2 to have the filter criteria cleared. The host system 2 can respond by sending data for all relevant employee participants of the plan (and employees eligible for participation) to the user's computer device. Alternatively, the computer device of the user may remove the filter and utilize the data it previously received from the host system 2 for again displaying the full table 852.

The user can also identify one or more employees to which at least one "nudge" is to be sent. For instance, a user could see that one employee has not yet enrolled in the retirement plan even though that employee is eligible. The user could subsequently manipulate an input device (e.g., a mouse, keyboard, stylus, or touch screen display) to actuate the actuatable indicia 853 for the sending of one or more notices. A pop-up window 871 can be provided in response to such a selection by the user that requires the user to enter further input to identify a type of pre-selected default message to be sent to remind the selected one or more employees to enroll in the retirement plan. As an alternative, selection of the actuatable indicia 853 for the sending of one or more notices can result in the computer device calling up the email application for the user's computer device and creating a new message addressed to the selected employee for sending an email and/or text message to that employee. The user may then type a message to the employee and select a send button to initiate the sending of that email message and/or text message to the employee.

As yet another alternative, the user may select the actuatable indicia 853 for the sending of one or more notices and, in response, the computer device may display a pop-up window to identify the type of notice to be sent. A user may then move a pointer via manipulation of at least one input device to select one of a plurality of different notice types to send a pre-configured message having a pre-written text to provide the identified notice to one or more selected employees. For instance, an enrollment nudge, reset password nudge, increase to match nudge for changing a contribution rate of the employee, or a request to update beneficiary information nudge messages can all be predefined by the host system or a user. One of those selectable default nudges that were previously defined in the host system 2 can be selected for sending to one or more selected employees.

A default nudge can be pre-defined by the host system 2. Alternatively, or in addition, one or more nudges or other type of notices can be created by a user and saved into the host system as a pre-defined nudge for sending to employees upon a subsequent selection of sending such a nudge to one or more employees. A user may enter text or other data to establish a form notice and communicate data to the host system for saving that default message for sending as a nudge. After the pre-defined nudge is formed, a selection of that type of nudge to send to an employee can result in the host system sending an email, text message, an in-site message, an online message, a website message, or instant message to selected employees that includes text from a default message pre-defined by the user and/or host system 2. The host system 2 may send that message to selected employees based on email address, mobile phone numbers, or instant message address information stored in the memory of the host system and associated with the one or more selected users. A user may subsequently receive such a nudge via a computer device of that user and be reminded to enroll in the employer retirement plan or take any other action as noted in the notice sent to the employee.

Figure 58:
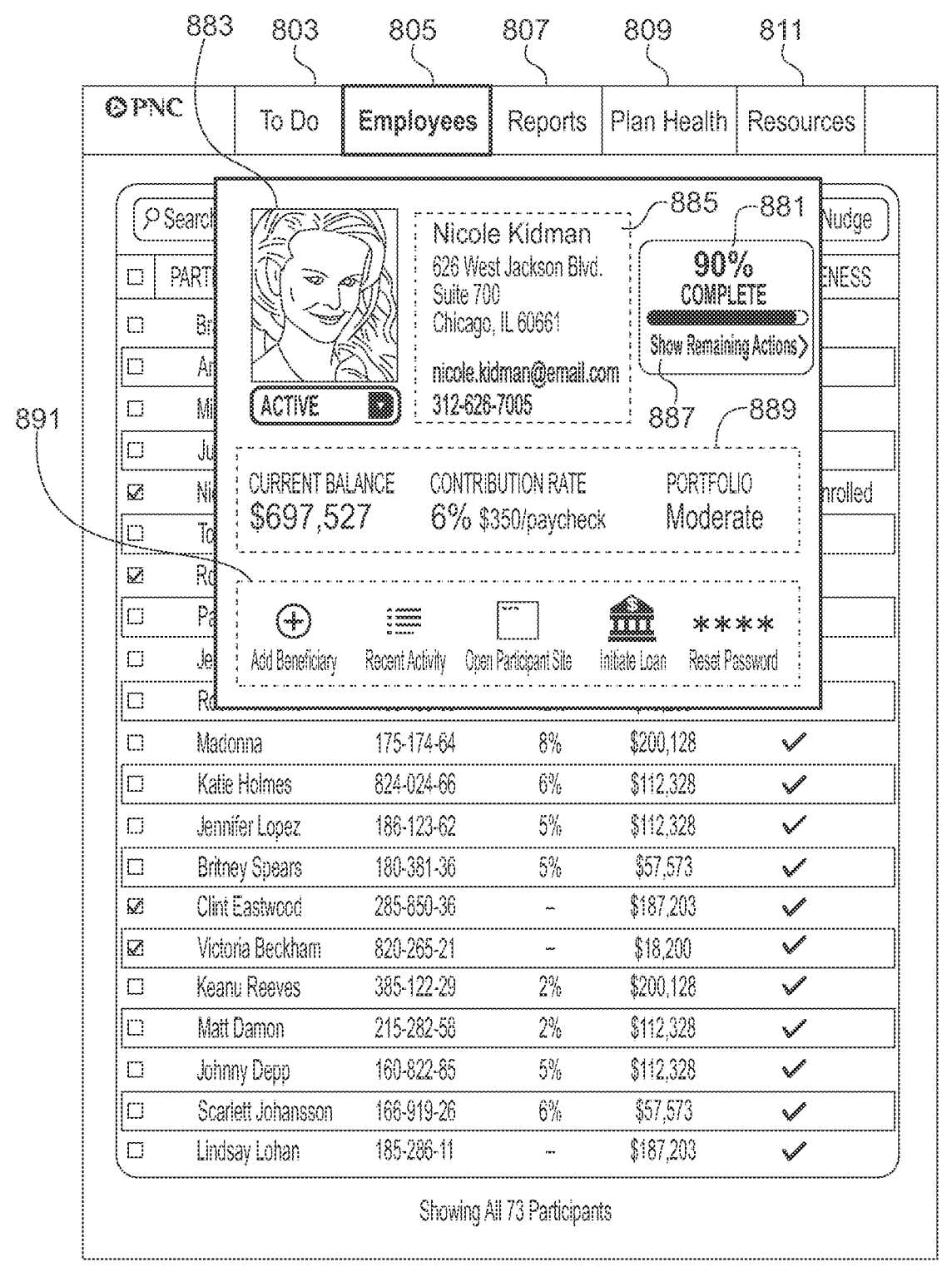

Information about each employee identified in any of tables 852, 852a, or 852b as well as any of the listings of the second graphical section 815, third graphical section 817, and/or fourth graphical section 819 of the to do display 801 may be providable via a window 881 that can be displayed in response to a selection of a particular listed employee name, or the movement of a pointer over that employee name within a row of the listing, window, table, or other graphical element. In some embodiments, a mouse right click could be configured to actuate the view of the window 881. In other embodiments, a mouse click on an employee or participant name can actuate a display of window 881 and a subsequent mouse click over the displayed window 881 can then be performed to actuate activation of the window to permit data to be entered by a subsequent use of one or more input devices (e.g., a mouse and a keyboard) into fields displayed in the window 881. The window 881 can be configured as a pop-up window for display over one or more graphical elements or can be configured as an overlay window that overlays other information that was displayed immediately prior to actuation of the view of the window 881. An example of such a window 881 is shown in FIG. 58.

The window 881 can include information about the specific employee that was selected. For example, window 881 can include a photograph of the face of the employee 883, contact information about the employee 885 that can include an address, email address, and mobile phone number of the employee. Advisory indicia 887 can also be displayed in the window 881 that includes graphical and/or text information to indicate a level of completeness ranging from 0% to 100% of the employee's enrollment in the retirement plan and entrance of all required information for enrollment, operation, management, and/or administration of that employee's retirement account. The level of completeness can be based upon whether the employee provided information as identified by an employer as being desired to be provided for administration of the retirement plan, for example. Such a level of completeness can be based on a number of different actions on a list of actions being completed, for instance. The list of actions can be defined in memory of the host system 2 and can be a default listing of the host system 2 and/or an employer modified version of such a listing.

Additionally, information about the employee's retirement account that is sponsored by the employer can be included in the window. The displayed employee retirement account information 889 can include information identifying the current value of assets within the employee's retirement account, the current contribution rate for contributing to that retirement account, and the current asset allocation type for that user's retirement account (e.g., moderate, aggressive, or conservative). Additionally, actuatable indicia 891 can be displayed in the window 881 that are selectable by a user to initiate activities relating to the employee and his or her retirement account. A user can manipulate an input device to select one of the actuatable indicia to initiate performance of a task associated with that indicia.

For instance, the actuatable indicia can include initiating the process of adding a beneficiary to the employee's retirement account, obtaining a view of recent activity that has taken place with that employee's retirement account, initiating the request for a loan relating to that employee's retirement account, or the resetting of a password of the employee that is used by the employee to log-in to the host system 2 for access to information about his or her retirement account. Actuatable indicia that is selectable to reset the employee's log-in code, or take other actions can also be displayed for selection and/or actuation.

For instance, a user can manipulate a mouse or other input device to move a pointer displayed on a display device over the window 881 to select an add beneficiary actuatable indicia. In response to selection of that indicia, a window for adding a beneficiary to the employee's retirement account can be generated and displayed. The user can then add the one or more additional beneficiaries. The input relating to the added beneficiaries can subsequently be transmitted to the host system 2 for saving in memory of the host system. As another example, a user can select the reset password indicia to actuate a resetting of the password. In response to the selection of that indicia, the user's computer device can send data to the host system containing information relating to that selection. In response to such information, the host system 2 can update its memory to reset the password associated with that user and send the user a message via email, text message and/or instant message that includes a link that is actuatable by the employee. The employee can then use that link to access the host system 2 via the employee's computer device to reset the employee's password.

As yet another example the user can select the recent activity indicia. In response to selection of that indicia, a window identifying recent activity involving the employee's retirement account can be displayed. Such activity can include contributions made by the employee, employer matches made by the employer to the retirement account, purchase and sale of asset information, and other activity involving the employee's retirement account. As yet another example, the user can select an initiate loan indicia. In response to such a selection, a window can be displayed to the user to provide input to the host system for initiating a loan or approve a loan requested by the employee that is based in part on assets of the employee's retirement account.

Figure 59:
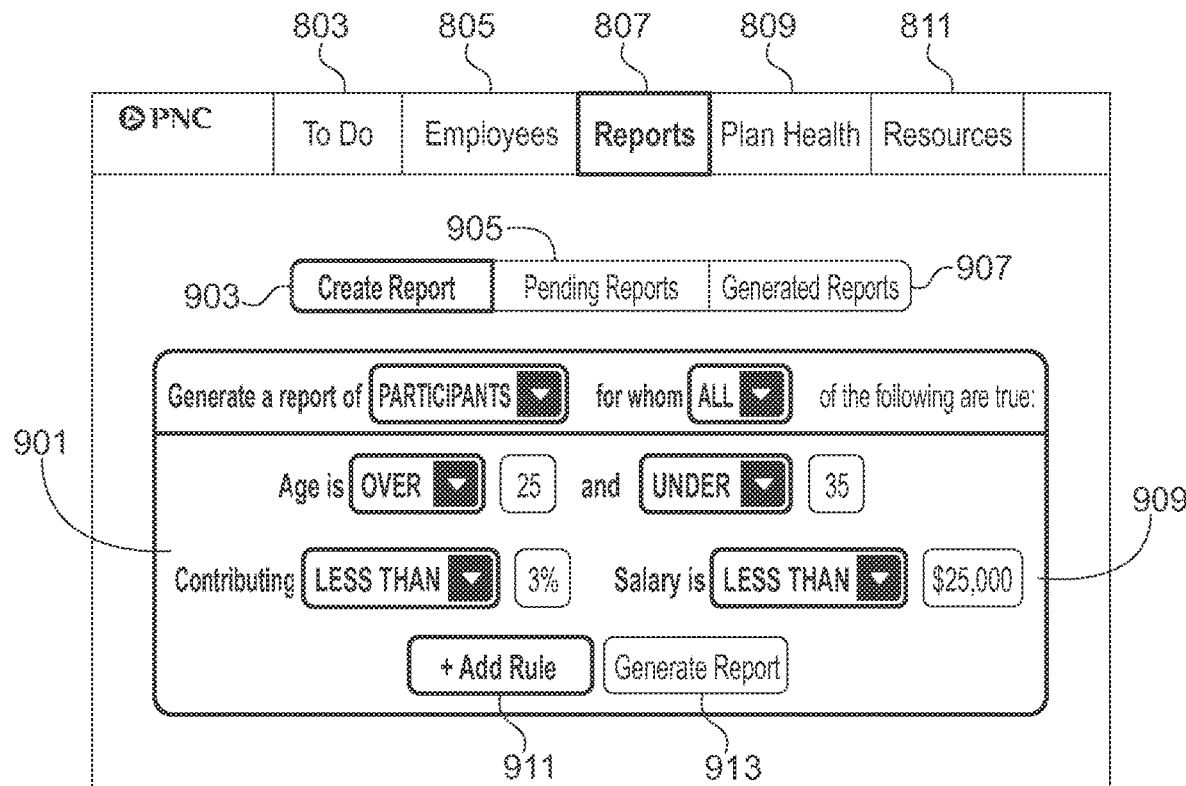
FIG. 59 is a view of the display of an the exemplary GUI shown in FIG. 39 after input is communicated to the host system providing data for selecting a tab of the GUI display shown in FIG. 39 relating to generation of reports relating to the plan offered by the employer.
Figure 60:
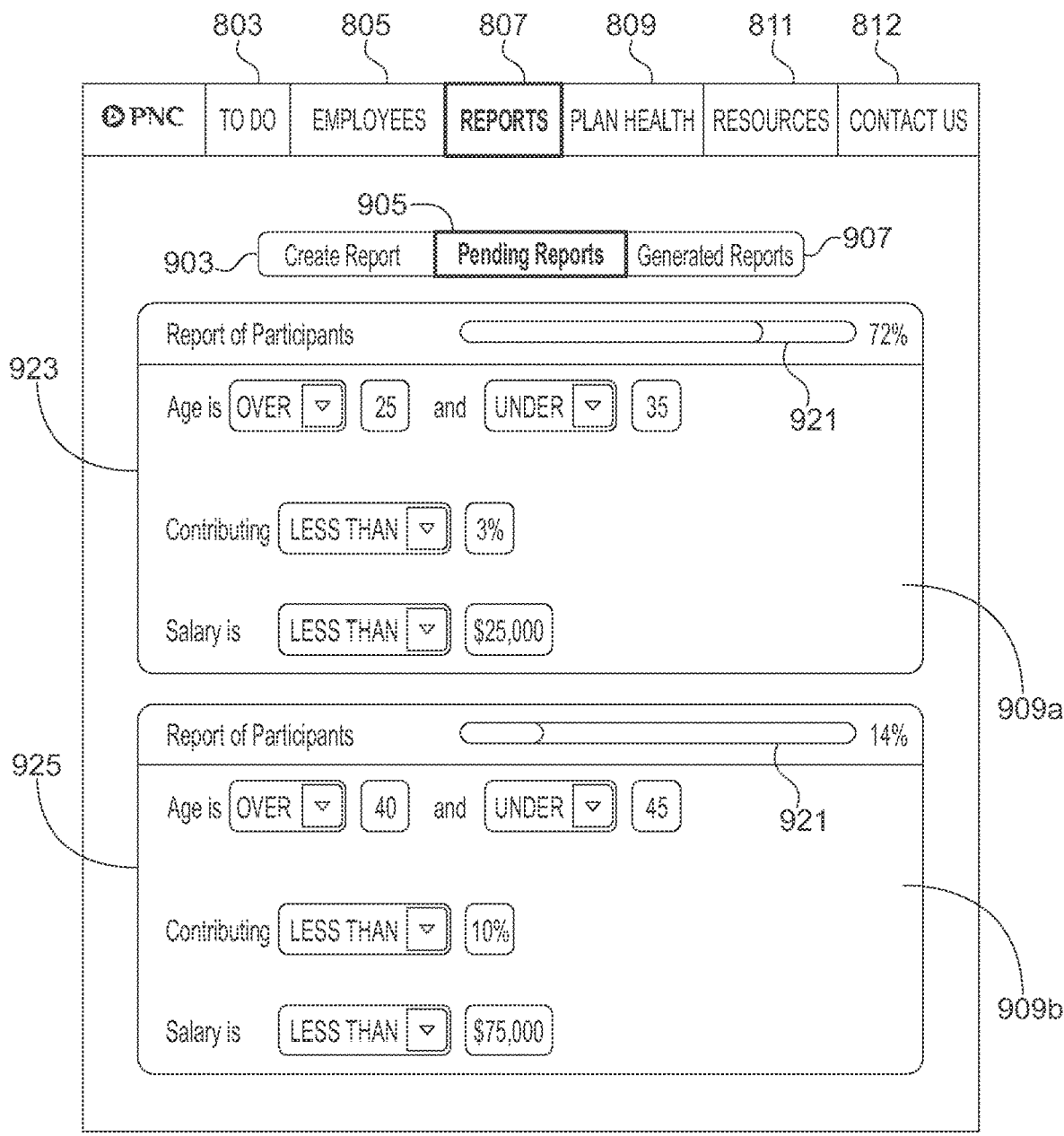
FIG. 60 is a view of a display of the exemplary GUI shown in FIG. 59 after input is provided to the host system that indicates a display of pending reports is to be provided.
Figure 61:
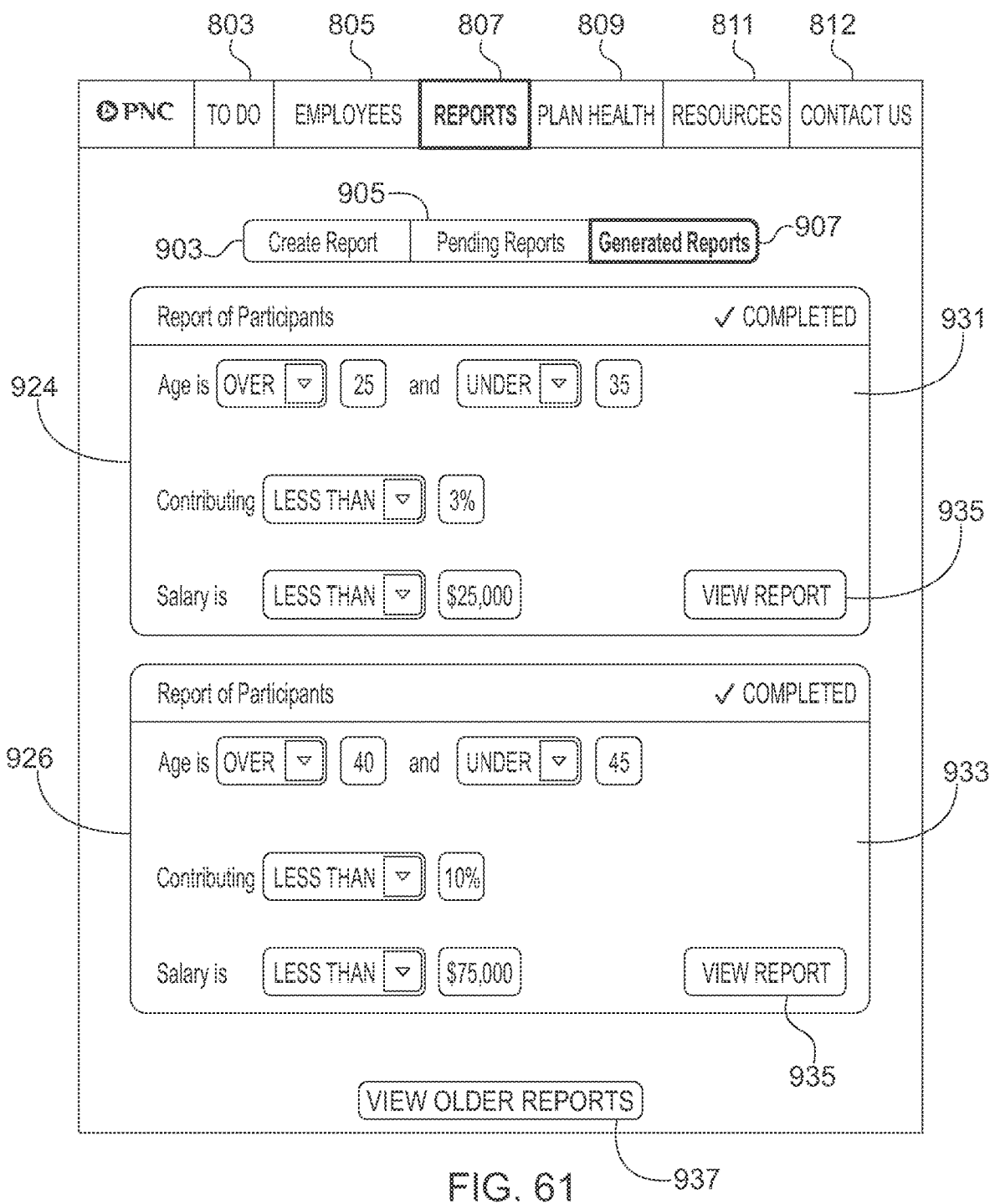
FIG. 61 is a view of the display of the exemplary GUI shown in FIG. 59 after input is provided to the host system that indicates a display of generated reports is to be provided.

A user can also navigate to a third tab 807 to create reports relating to the employer sponsored retirement plan, as can be appreciated from the exemplary report display 901 shown in FIGS. 59-61. For instance, the report display 901 that is viewable upon selection of the third tab 807 that is associatable with reports can result in a reports display being shown that includes actuatable buttons or other actuatable indicia for creating reports 903, viewing pending reports 905, and viewing generated reports 907. When the create reports button is selected, a report creation window 909 can be displayed that includes select able menus for generation of a report. The selectable menus can include menus that have selectable options for providing input to the host system 2 for generating reports relating to a select class of participants or potential participants to the employer retirement plan. The selectable menu can generate reports relating to age, an amount being contributed to a retirement account, a range of contribution rates, a range of salaries of employee participants, and other criteria. Actuatable indicia 911 for adding rules for generating a report can also be provided in the report creation window. User input can be provided similarly to the providing of filtration options for employees within tables or listings as discussed above with reference to FIGS. 53-57. After the criteria of interest is selected, a user may manipulate an input device to select a generate report button 913 or other actuatable indicia for generation of a report displayed in the report creation window 909. In response to the selection of the generate report button 913, the user's computer device can transmit data related to the report criteria for generation of the report to the host system 2 to initiate the generation of the report and request the report be generated. The host system 2 can receive that data and, in response to that data, generate a report utilizing the report generation criteria identified by the user to generate a report based on the employee records relating to the retirement account offered by the employer. After the report is generated, it can be communicated to the user's computer device for display as a generated report. While the host system 2 is generating the report, it can be identified as a pending report. The host system can periodically provide information to the user's computer device to identify an extent to which the requested report is currently completed (e.g., a progress report identifying the extent to which a report is generated such as 25% complete, 50% complete, etc.).

Referring to FIG. 60, a user can select the viewing pending reports 905 button or other type of actuatable indicia for viewing the pending reports to see a visual indication of the status of the requested generation of a report. For instance, upon actuation of the viewing pending reports 905 button, a display 909a identifying pending reports can be shown via communications the user's computer device has with the host system 2 in response to selection of the viewing pending reports button 905. The host system can provide data to the user's communication device that indicates an extent to which different requested reports are completed. The user's computer device can then use that data to provide the display of visual indicia that provides such information to the user. For instance, a first pending report window 909a and a second pending report window 909b can be shown as two pending reports that have not yet been generated in response to requests submitted by a user. The first window 909a can include a graphical element 921 identifying an extent which that report has been completed. The graphical element 921 can include one or more pictures as well as text. The first window 909a can also include text 923 or other indicia identifying the report criteria for the report to be generated, which can include, for example, information identifying the report for participants that is being generated is to generate a report identifying participants within a selected age range, and/or contribution level, and/or salary level. The second window 909b can also include the graphical element 921 identifying the extent to which a second report has been completed and also can include text 925 or other indicia identifying the criteria that is the subject of the pending report.

Generated reports can be viewed upon a user selected button or other actuatable indicia for generated reports 907. In response to such a selection made by a user utilizing at least one input device, the computer device can communicate with the host system to receive data relating to generated reports to display generated report windows such as a first generated report window 931 and a second generated report window 933. Each generated report window can include an actuatable button or other indicia 935 that can be selected to actuate opening of a file of the identified report. Upon selection of that button or indicia, the computer device can open a file for that generated report. The user's computer device may open the file from a copy of the file stored in its memory upon actuation of that button or other indicia or may communicate with the host system 2 to have the file stored in memory of the host system 2 opened to be viewed via the display device of the user's computer device. Each report window can also include text identifying the report criteria that is the subject of the report as well. For example, the first report window 931 can include text or other indicia 924 that identifies an age range of participants, the contribution rate range of participants, and the salary range of participants that is the subject of the generated report. As another example, the second report window 933 can include text or other indicia 926 that identifies an age range of participants, the contribution rate range of participants, and the salary range of participants that is the subject of the generated report.

In some embodiments, only reports within a pre-selected time range from the date on which the generated reports are viewed may be explicitly displayed. Actuatable indicia 937 for viewing older reports can be displayed under and/or above the shown generated reports. Upon selection of this indicia, older, previously generated reports can be listed or shown in a format similar to the first and second report windows 931 and 933. The user's computer device may communicate with the host system 2 upon actuation of the actuatable indicia 937 for viewing older reports to obtain data relating to these older reports before the report windows for these older reports is shown. A user may be queried to provide input identifying time related criteria for communicating to the host system so that reports within a desired past time range is included within the subsequently viewed older reports. Preset reports can also be selected and run. For instance, a pre-defined report format can be defined by selection and saving of different report generation criteria and actuation of actuatable indicia can result in a request that such a pre-set report be generated by the host system 2.

Referring to FIGS. 62-66, a view of information relating to retirement plan health can be provided in response to actuation of a fourth tab 809. The dashboard display 960 associated with the plan health can include a number of different graphical elements that include multiple different actuatable buttons or other indicia for viewing overview information 961, account demographic information 963 and fund performance information 965.

When the overview button 961 is selected, a view of overall plan information can be displayed to provide information in a visual format relating to the performance and health of the retirement plan offered by the employer. Such information can be displayed based on the information about the retirement plan that is stored in the memory of the host system as well as information the host system obtains via communications with computer systems of one or more other parties 31. The displayed elements can include text 968 summarizing important variables relating to the plan, a graph illustrating overall value of assets within the retirement plan 969, an elongated graphical element identifying employee contributions, employer match contributions and gains and/or losses to the retirement plan 971, and graphs 974 identifying employee contributions, participants, average contribution rate, average account balance, number of employees meeting the match contribution level and employees whose contribution levels are below the employer match level. Other charts or graphs could also be shown such as graphs or charts illustrating other factors or criteria relating to plan performance, employee enrollment, employee contribution, or employee utilization of the sponsored retirement plan. Additionally, one or more graphical illustrations relating to the largest funds utilized in the retirement plan 975 and a graphical element identifying how the sponsored retirement plan compares to other retirement plans sponsored by others 977 can be displayed. The graphical illustrations and bar graph illustrations of the display 960 can be based upon records of the retirement plan stored in the memory of the host system. Additionally, the graphical element identifying how the sponsored retirement plan compares to other retirement plans sponsored by others 977 can be based upon data stored in the host system 2 relating to other retirement plans that are hosted by the host system 2 and/or information the host system 2 receives from a third party computer device that provides information relating to other retirement plans managed by other employers. The host system 2 can communicate data to the user's computer device such that the user's computer device is able to generate the display 960 on a display device connected to the user's computer device and/or that is a component of the user's computer device.

The display 960 can also include actuatable indicia 967 for sending a "nudge", or notice, such as an actuatable button, link, or other actuatable element that can be selected to actuate a function. A user can select the actuatable indicia 967 via manipulation of a keyboard, mouse, touch screen display or other type of input device to initiate the sending of an email, text message, in-site message, website message, online message, or other type of communication. The generation of nudges and sending of nudges can be performed similar to the generation of nudges and sending of nudges discussed above with reference to FIGS. 24A-B and 53-57. The addressee of such nudges can also include other employees of the employer who are responsible for oversight of the retirement plan and the nudges can include pre-defined nudges relating to advising others of the health of the retirement plan or conditions of the retirement plan that need to be addressed by subsequent actions.

The host system 2 can be configured to generate text 968 that identifies parameters of a retirement plan that are areas of concern. For instance, a contribution percentage of participants within certain age ranges that is considered to be too low for complying with a pre-selected range of best practice contribution rates can be determined by the host system 2 and, if such a condition exists, text 968 can be provided that indicates that this parameter should be watched or be of concern. The host system 2 can also compare a participation rate for employees within different age ranges that may be at or below a pre-selected threshold value such that the low participation rate is of concern. Upon the detection of such a condition, the host system 2 can be configured such that the text 968 identifies the presence of this condition. As yet another example, the host system 2 can be configured to assess the asset allocations for the retirement plan participants to assess whether the overall asset allocation for participants within different age ranges is within a pre-selected best practice asset allocation. If the host system 2 determines that too many employees within the 55-65 age range have an aggressive asset allocation when the pre-selected best practice allocation is conservative, text can be generated to indicate this fact. As another example, when the host system 2 determines that employees who are between the ages of 16-45 have an asset allocation that is moderate and/or conservative when the asset allocation should be aggressive to be in compliance with the pre-selected best practice for asset allocations of employees in that age range, the host system 2 may generate text 968 that indicates such a fact. The text 968 can be configured so that it identifies a pre-selected number of factors or retirement plan parameters of interest for closer scrutiny. In the example shown in FIG. 62, the number of items of interest that are identified is five items. But, that pre-selected number may be less than 5 items or more than 5 items in other embodiments.

The graph illustrating overall value of assets within the retirement plan 969 can be based on data the host system 2 has stored in its memory relating to overall valuation of assets in the retirement plan of the employer. The graph can also include a plurality of actuatable indicia 973 to change the view of the graphed asset valuation to different time ranges such as year to date, one year, three year, five year, and all of the different selectable options. The change and view of such graphical information can be similar to the changeable views provided in the graph of retirement account valuation and retirement income valuation that is discussed herein with relation to the indicia 415, 417, 419, 421 and 423 of the third portion of the dashboard display 401 and the portfolio return graphical element 401*a*.

Graphs 974 can be based on data the host system 2 has stored in its non-transitory memory relating to the employer sponsored retirement account and can provide illustrative graphical displays for a proportion of employees of the employer that contribute to the sponsored retirement plan, a raw number of actual participants in the plan, and average contribution rate as well as a median contribution rate. Graphical elements identifying different sub-portions of the participants and what their contribution rate is can also be displayed as bar charts, pie charts, or other type of graphical illustrations. An average retirement account valuation, or balance can also be displayed based on such data. Graphical illustrations identifying a proportion or raw number of employees who contribute sufficiently to meet an employer match benefit that is offered and/or who contribute below the match benefit offer can also be displayed based on the data relating to such factors stored in the memory of the host system 2.

Figure 63:
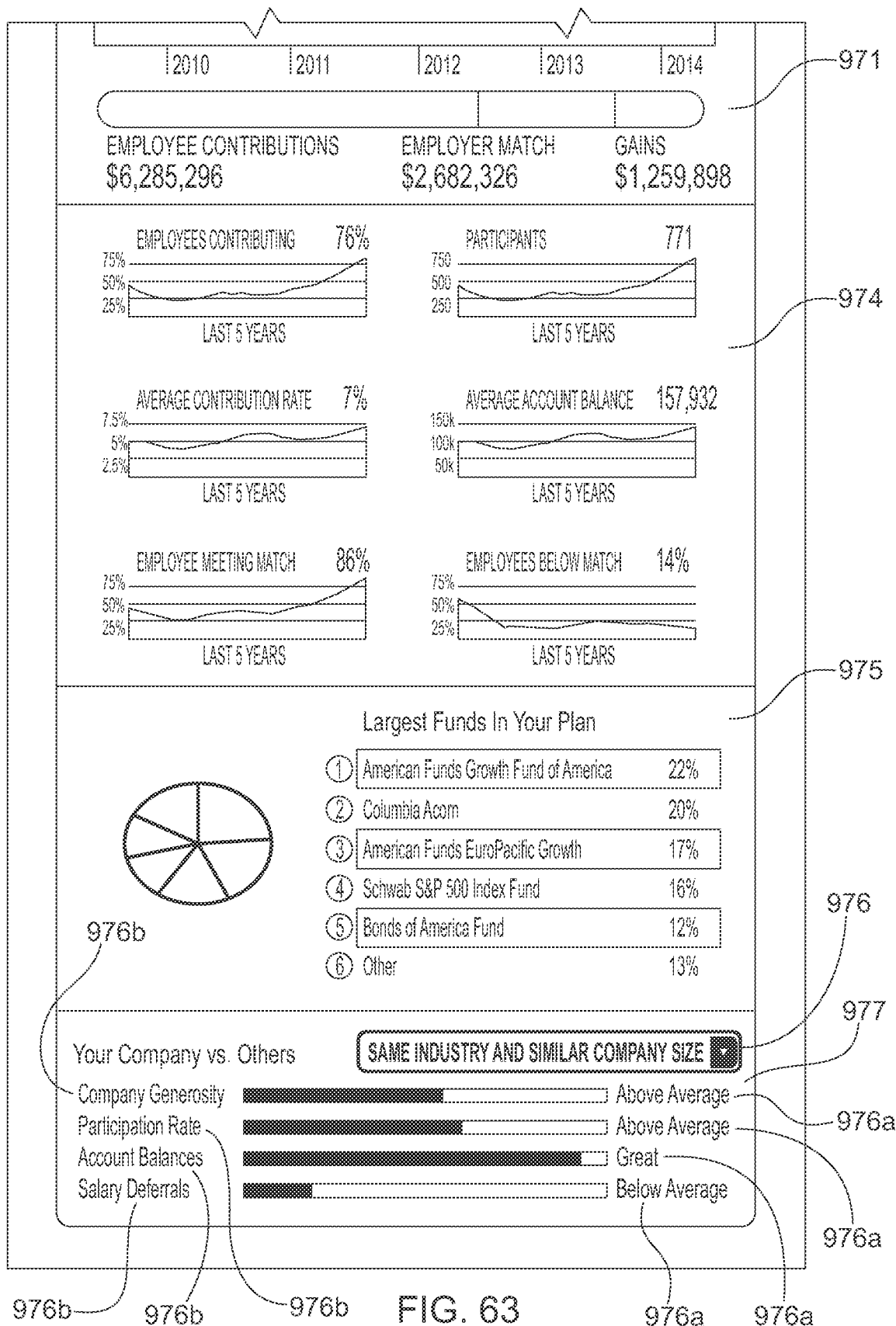
FIG. 63 is a fragmentary view the display of the exemplary GUI that can be displayed in response to input being provided to the host system indicating a display of employer plan account demographics, account performance, or an overview of employer plan related parameters is to be displayed. The combined view of elements shown in FIGS. 62-63 can be configured as providing the display of the exemplary GUI that is shown after data is communicated to the host system identifying the tab of the GUI display shown in FIG. 39 relating to the performance of the plan offered by the employer was selected for some embodiments of the host system and GUI display scheme.

The one or more graphical illustrations relating to the largest funds utilized in the retirement plan 975 can be based on the data stored in the host system relating to particular assets in which the participants of the retirement account have invested the assets within their retirement accounts of the sponsored retirement plan. Such information can help identify funds of importance to the retirement plan and can be useful in helping to identify funds or other assets that could be difficult to change away from in the event there is a desire to change what funds are offered for investment in the retirement plan. In some embodiments, the graphical illustrations can include a pie chart as well as a key that identifies the funds represented by each illustrated pie piece of the pie chart as shown in FIG. 63.

The graphical element identifying how the sponsored retirement plan compares to other retirement plans sponsored by others 977 can be based on data within the memory of the host system 2. That data can include data relating to other retirement plans administered or otherwise hosted by the host system 2 and can also include data the host system 2 received from one or more computer systems of providers of such comparison related data. The displayed comparison data can be adjusted based upon use of a selectable menu 976 that can be actuated via selection of one or more comparable options. For instance, the comparison graphical elements can include bar charts or other types of graphical illustrations as well as indicia 976*a* indicating whether certain factors are average, below average or above average as compared to the employer's industry, other companies, other companies or employers of similar size, or other comparison criteria.

The rating indicia 976*a* can be based on data the host system 2 has stored in its memory and where the data for the employer sponsored retirement plan falls within different pre-selected ranges relative to other offered retirement plans. The rating indicia can include multiple different classifications that can include poor, below average, average, above average, great, and excellent. Each classification can be illustrated when data relating to the employer plan for a particular defined comparison category 976*b* falls within the range defined as meeting a particular rating classification. For instance, if salary deferrals for an employer plan is in the bottom 10% of data of other plans stored in the host system, the rating indicia may indicate that that plan is below average in salary deferrals. As another example, if the employer match offer and participation rate of the employer plan are better than 50-80% of other plans within the data set of the host system, the rating may be classified as above average. As yet another example, if the account balances of the participants of the employer retirement plan are higher than account balances for more than 80% of other plans, then the account balances of the participants can be identified as being great.

The ratings can also change depending on how the data-set of comparisons is selected in the selectable menu 976. For instance, if only employers of a same industry and similar size is selected in the selectable menu 976, only data from plans from employers meeting that criteria may be used by the host system for generating the graphical elements and ratings indicia for each comparison category. The host system 2 can communicate the data relating to the graphical element identifying how the sponsored retirement plan compares to other retirement plans sponsored by others 977, one or more graphical illustrations relating to the largest funds utilized in the retirement plan 975, text 968 summarizing important variables relating to the plan, a graph illustrating overall value of assets within the retirement plan 969, an elongated graphical element identifying employee contributions, employer match contributions and gains and/or losses to the retirement plan 971, and graphs 974 to the user's computer device such that the user's computer device can generate these graphs, based on the data relating thereto that it receives from the host system 2.

Figure 62:
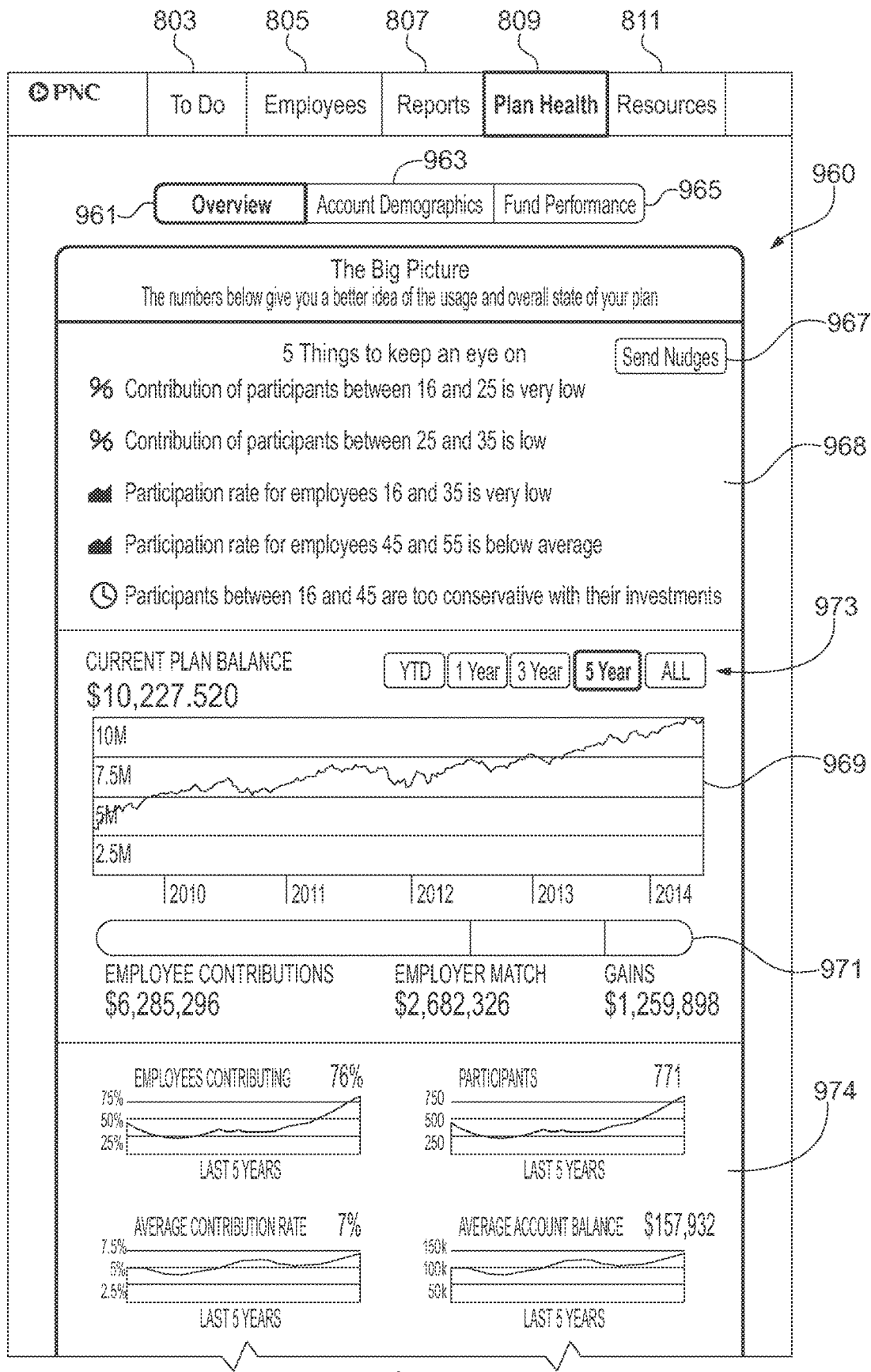
FIG. 62 is a fragmentary view of the display of an the exemplary GUI shown in FIG. 39 after input is communicated to the host system indicating a tab of the GUI display shown in FIG. 39 was selected that relates to the performance of the plan offered by the employer.
Figure 64:
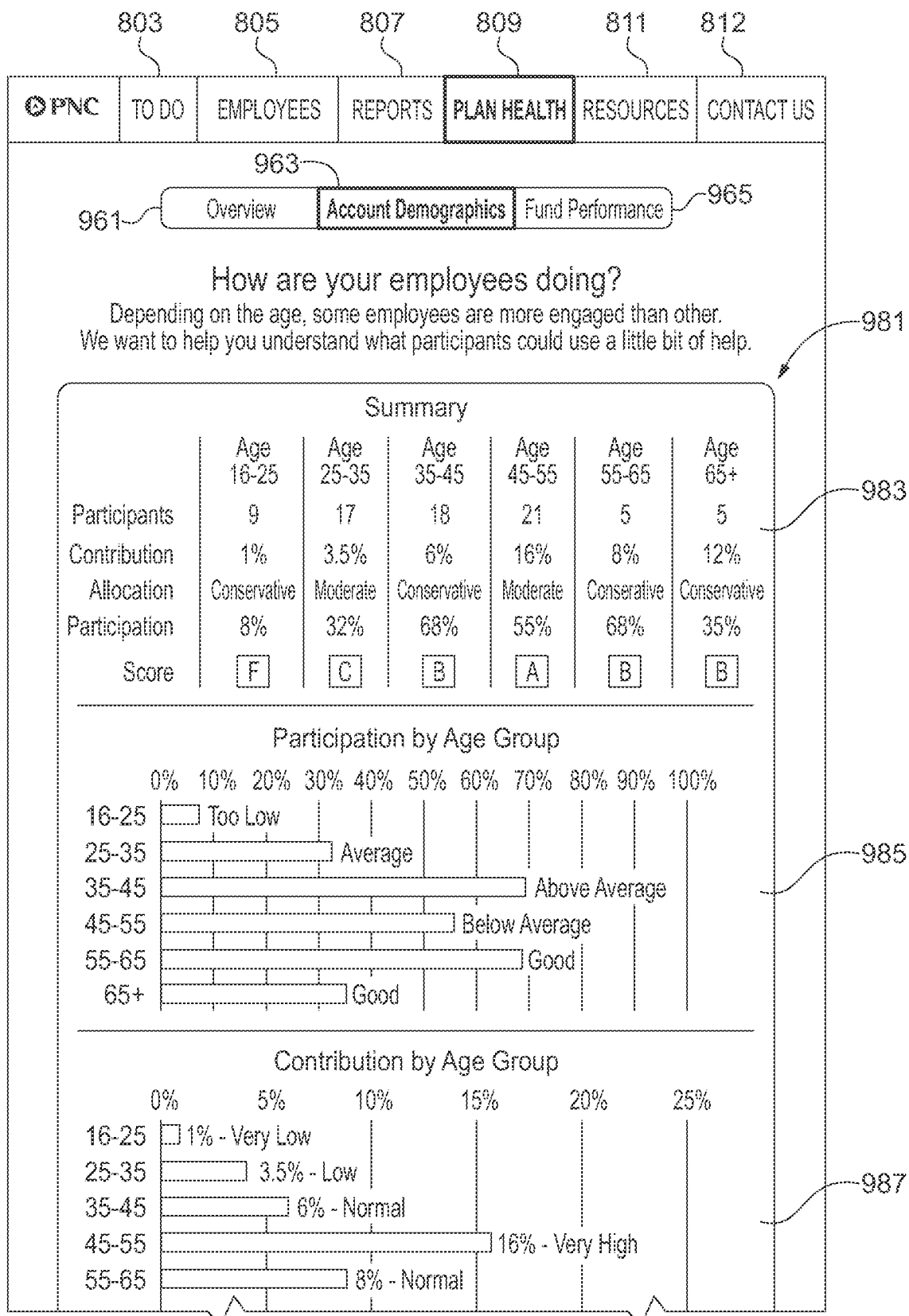
FIG. 64 is a fragmentary view of a display of the exemplary GUI shown in FIGS. 62-63 after input is provided to the host system indicating account demographics information is to be displayed.
Figure 65:
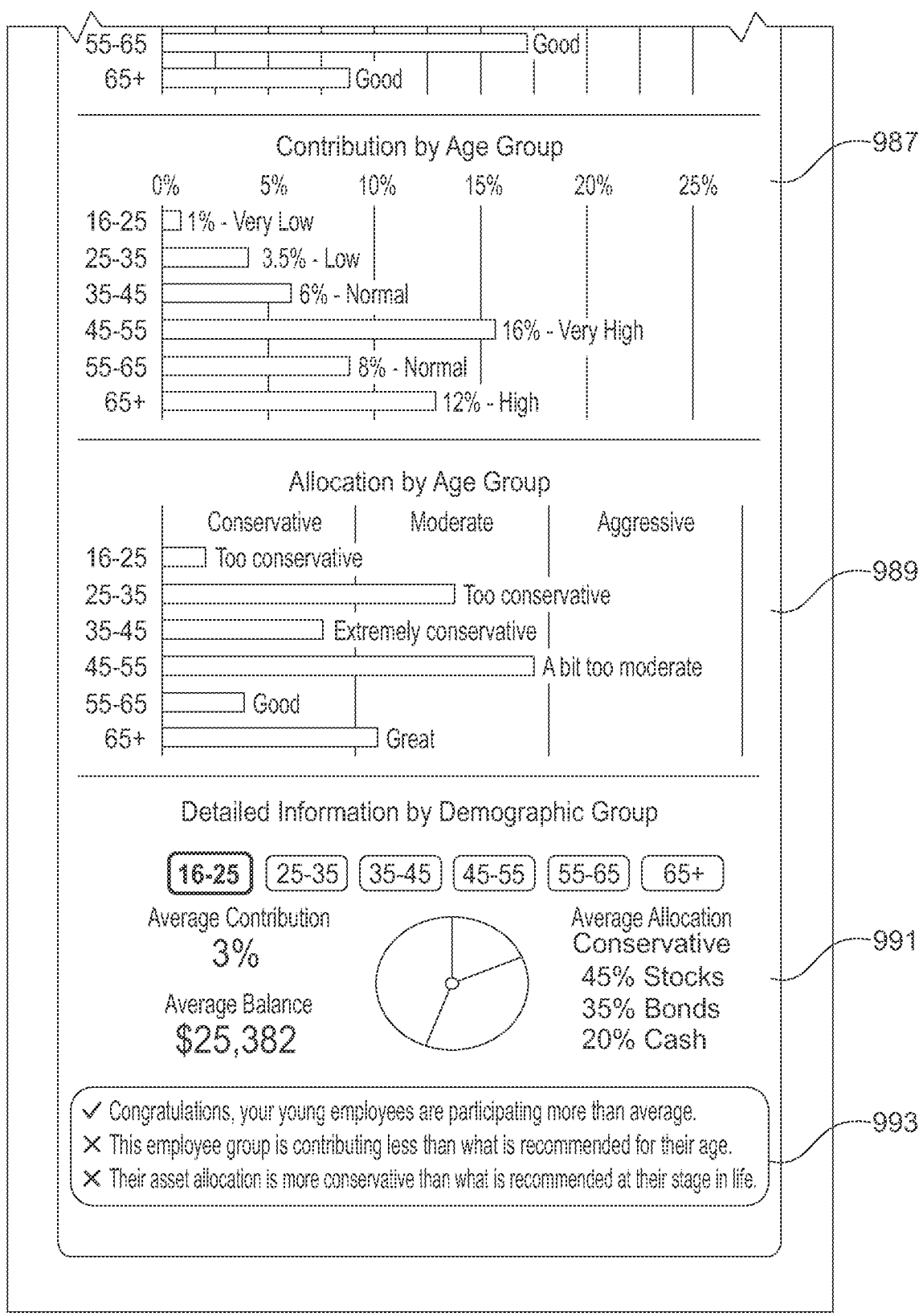
FIG. 65 is a fragmentary view of a display of the exemplary GUI shown in FIGS. 62-63 after input is provided to the host system indicating account demographics information is to be displayed. The combined view of elements shown in FIGS. 64-65 can be configured as providing the display to be shown after data is communicated indicating that selection of account demographics information is to be displayed was made when viewing the display of FIGS. 62-63.
Figure 66:
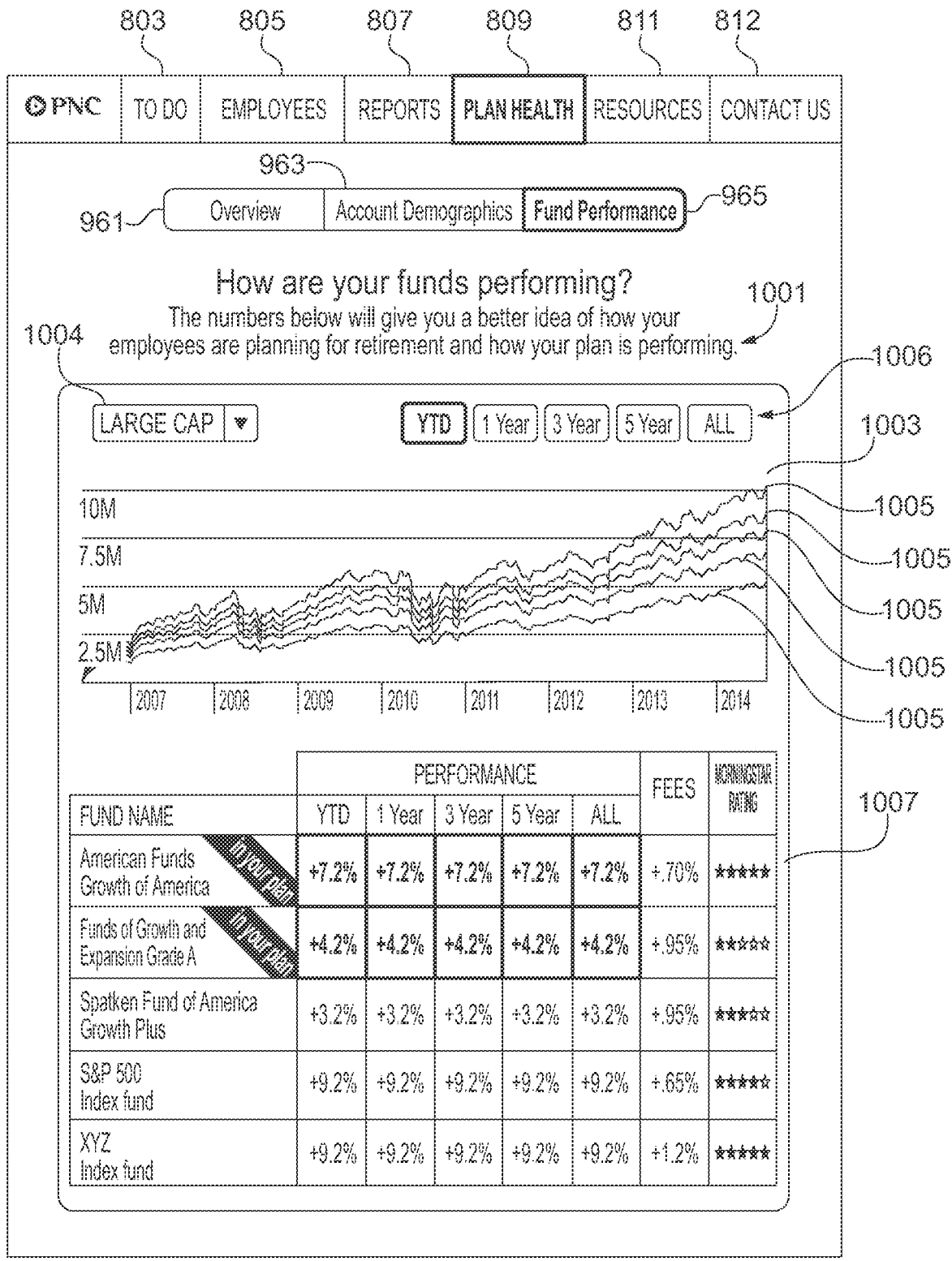
FIG. 66 is a view of a display of the exemplary GUI shown in FIG. 62 after input is provided to the host system indicating that information relating to fund performances of funds providable within the retirement plan offered by the employer is to be displayed.

Upon a selection of the actuatable button or other indicia for viewing account demographic information 963 from the display of FIGS. 62-63, or the display of FIG. 66, the user computer device can communicate with the host system 2 to receive data for generating the exemplary display illustrated in FIGS. 64-65. The account demographic data can be displayed in display 981 to provide a number of different graphical elements to provide information about account demographics of the employer retirement plan. That information can be displayed based on data the host system 2 has within its memory. For example, a summary of demographics 983 identifying different age ranges of participants, the number of participants within those age ranges, the median and/or average contribution rates for those different age ranges of participants, the asset allocation for those different age ranges of participants, a proportion of overall participants to the retirement plan that are within that age range and a rating identifying how well each age range of participants is doing in managing their retirement accounts within the retirement plan. The ratings data can be based on data about the participants in the employer's retirement plan and how those participants are contributing to the retirement plan and allocating their assets therein as compared to pre-selected retirement savings best practice threshold ranges. The ratings can be on a scale of A-F where A indicates investment strategies being employed that are generally excellent and F indicates the worst selection of investment strategies being employed by a particular age group.

A first graphical illustration 985 can also be provided with such ratings information as well as providing information identifying the proportion of employees of the employer within each age range that are currently participants in the employer's retirement plan offering. A second graphical illustration 987 can also be displayed with rating information for each age range as well as information identifying a contribution rate average for each average and a rating as to whether that contribution level is too low, low, normal, high, or very high. The ratings information can be based on whether the contribution rate average, or the median contribution rate for each age range is within different pre-selected ranges that correspond to those ratings.

A third graphical illustration 989 can also be displayed to illustrate asset allocation by each age group along with a rating identifying whether the asset allocation is relatively acceptable, or does not meet with a best practice asset allocation for that given age group. For instance, the third graphical illustration can identify whether the asset allocation for each age group is conservative, moderate, or aggressive in asset allocations. If younger age groups are conservative, the ratings displayed for those age groups can indicate their asset allocation is too conservative given the age of those participants. For older age groups having an aggressive or moderate asset allocation, the ratings can be displayed where that asset allocation is too aggressive given the age range for those participants.

The account demographic data of display 981 can also include a demographic group graphical display 991 that identifies detailed information for each age range of participants. The graphical display can include a pie chart or other type of graphical illustration that identifies the average or media asset allocation for different selectable age ranges as well as an average or median contribution rate and an average or median account balance for participants within that age range. The displayed age range can be changed by selection of one or a plurality of actuatable buttons or other actuatable indicia that are each for a respective age range (e.g., one button for age range 16-25, another button for the age range of 25-35, a third button for the age range of 35-45, a fourth button for the age range of 45-55, a fifth button for the age range of 55-65 and a sixth button for the age range of over 65). The displayed information can be based on the data the host system has relating to the participants' retirement accounts for that age range. Upon selection of a button for a different age range, the user computer device can communicate data identifying the selection of that age range to the host system and, in response thereto, the host system 2 can communicate the data relating to that selected age range to the user's computer device such that the user's computer device can display the graphic for that selected age range. The graphical display 991 can also include a summary text 993 or other summary indicia that identifies comparison related data for each age range. Such comparison information can be based on data the host system 2 has from third party vendors or data stored in the host system relating to other retirement plans it is helping to administer as well as predefined retirement investment best practices for different age groups (e.g., invest more aggressively when younger and more conservatively when nearing a retirement age). The text 993 can include providing information to indicate how the employee age range section is participating compared to other employers. The displayed text 993 can also indicate, for example, whether the contribution rate is normal, less, or more than what is recommended for the displayed age group and whether their asset allocation is too conservative or aggressive given their age.

Upon a selection of the actuatable button or other indicia for viewing fund performance information 965 from the display of FIGS. 62-63 or the display of FIGS. 64-65, the user computer device can communicate with the host system 2 to receive data for generating the exemplary display 1001 illustrated in FIG. 66. The display 1001 can provide graphical information relating to how funds that are offered within the retirement plan are performing. The funds that are illustrated can be the largest funds of the plan and/or any of a number of selectable funds that are selectable via a selection interface. The display can include a chart or graph 1003 that illustrates different lines 1005 that each correspond to a respective fund of the plan. A table 1007 identifying the funds shown in the graph as well as performance related information, fees charged by each fund, and a rating for each fund that is issued by one or more ratings providers can also be displayed. The rating data can be data the host system 2 received from one or more provider computer devices in some embodiments of the host system 2.

The funds to be displayed in the graph 1003 can be changed to any sub-category of funds via a selectable menu 1004. For instance, all funds offered under the plan, only large cap funds, only small cap funds, only mid cap funds, only value funds, only growth funds, only index funds, etc. can be shown via selection of the menu option listed within the selectable menu 11004. Additionally, fund that are not currently an investment option within the retirement plan can be shown in the graph 1003 as one or more lines 1005.

The graph lines 1005 can also be displayed as extending along different time ranges to assess performance over that selectable time range. The selectable time ranges can be selected via selection of actuatable indicia 1006. The indicia 1006 can be selected to adjust the displayed time range from year to date, one year, three year, five year, or a view of all possible time ranges offered via the indicia 1006. In some embodiments, the indicia 1006 can provide functionality similar to the functionality of viewing data as discussed herein with respect to the indicia 415, 417, 419, 421, and 423, but for fund performance related data stored in memory of the host system 2.

The funds' performance information can assist an employer in their periodic evaluation of fund offerings to drop under performing funds and add new funds. The fund performance display 1001 can also help with an assessment of the fees charged by funds within a retirement plan and the ratings level of those funds to help identify whether other options that may be better fits for a particular retirement plan exist for consideration when changes to the retirement plan asset offerings are considered.

It should be appreciated that the displays of the GUI can be configured for generation in a number of different ways. For instance, for each display and update to a particular display or graphical element of a display, a user computer device may have received information from the host system 2 from a prior communication to make the changes to the display indicated based upon selections or other use input provided by a user manipulating one or more user devices to adjust the display of the GUI shown on a display device of the computer device without further communication with the host system. Alternatively, the computer device of the user may communicate the selection(s) made by a user to the host system 2 via a web server 15, application server 17, or other element of the host system 2 to solicit a response from the host system 2 to that selection for receiving further data from the host system that is used to generate a new display of the GUI or changes to a graphical element of the GUI. The user computer device can also receive data for including in a display of the GUI or to make changes to a graphical element of the GUI or provide view or access to certain files via a communication session with the host system 2 that is based on data the computer device receives via an API connection the host system 2 has or may form with a party 31 computer device or a provider 37 computer device and/or data the host system previously received from the provider 37 and/or party 31 computer device(s). The combination of such communication patterns can also be utilized for different display elements. For instance, some information may be changed within the display by the user compute device based on previously received data and other data may have relating to input entered by a user may have to be transmitted to the host system 2 to receive further information for updating the display in view of the input provided by the user.

It should be appreciated that the GUI displays discussed herein as well as each and every graphical element of those displays can be displays and/or display elements for a website hosted by the host system 2 that is accessible via the internet or other type of communication connection or can be elements of the GUI interface that is provided via an application that is run on a user computer device and is supported by the host system 2 (e.g., the application server 17 of the host system). The application can be downloaded from the host system 2 or from an application server of a third party for installation onto a user computer device via the user computer device communicating with an application store offered by a retailer, a mobile device manufacturer, or a mobile device operating software provider to obtain the download of the application for installing the application on the computer device. After installation and/or during installation, the user computer device can communicate with the host system 2 to initialize the application and/or configure the user computer device for running the application and providing any needed authorizations and setup information to the host system 2 for subsequent use of the application for accessing and interacting with the host system 2.

It should also be appreciated that communications made between the host system and other computer devices (e.g., client device, provider device, etc.) as well as internal communications made between elements of the host system 2 can be encrypted and/or otherwise protected for transmission of that data. The specific type of encryption scheme or other type of data transmission protection scheme that is utilized can be any particular type of scheme or combination of schemes for meeting a particular set of design criteria.

CONCLUSION

It is to be appreciated that the Summary and Abstract sections may set forth one or more but not all exemplary embodiments of the present invention as contemplated by the inventor(s), and thus, are not intended to limit the present invention and the appended claims in any way. Additionally, the Detailed Description section provides an enabling disclosure of the innovation and provides a description of numerous exemplary methods and embodiments of the innovation, but does not provide an exhaustive list of all possible exemplary embodiments of the innovation.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Although the invention is illustrated and described herein with reference to specific embodiments, the invention is not intended to be limited to the details shown. Rather, various modifications may be made in the details within the scope and range equivalents of the claims and without departing from the invention, as will be appreciated by one skilled in the art.

We claim:
1. A communication system comprising:
a centrally controlled platform comprising a host system and at least one client computer device;
at least one party computer device that is communicatively connectable to the host system to provide information identifying employees that are eligible for enrollment in a retirement plan;
at least one provider computer device that is communicatively connectable to the host system to provide information relating to at least one of stock funds and bond funds that are selectable for the retirement plan;
at least one provider computer device that is communicatively connectable to the host system to provide information relating to transactions involving at least one of stock funds and bond funds for the retirement plan;
wherein:
the host system comprises at least one server computer device having hardware comprising at least one processor, at least one non-transitory memory, and at least one transceiver unit;
the host system is a multi-tiered architecture configured to operate with only two real time operating systems, the multi-tiered architecture comprising a web server as a first tier, an application sever as a second tier, and a database server as a third tier with a transaction server in communication with the application sever; and
the host system is configured to communicate with the at least one client computer device such that a graphical user interface (GUI) for displaying information to a user of the client computer device is displayable on a display device of the client computer device based on data the host system sends to the client computer device when the client computer device is communicatively connected to the host system;
wherein the host system, within a sponsored retirement plan environment, receives at least one of employee information data and employee payroll data as input data, reconfigures the input data to output data, and displays the output data via the GUI, wherein the input data is not suitable for display via the GUI, wherein the input data is in pat acquisitioned from information stored about at least one employee;
wherein the GUI is configured for enrollment in a retirement plan, wherein manipulation of the GUI by use of at least one input device of the client computer device communicates data to the host system for enrolling the user in the retirement plan;
wherein the GUI is configured to display a first enrollment display that includes a first graphical display projecting an estimated value of a retirement account over a future time period; and
wherein the first enrollment display also has a plurality of actionable indicia that comprises a first actionable indicia, a second actionable indicia, and a third actionable indicia,
the first actionable indicia configured such that selection of the first actionable indicia results in a first slider bar graphical element being displayed, manipulation of a slider element of the first slider bar graphical element resulting in a change to a selected retirement age being shown in the first graphical display of the GUI,
the second actionable indicia being configured such that selection of the second actionable indicia results in a second slider bar graphical element being displayed, manipulation of a slider element of the second slider bar graphical element resulting in a change to a selected contribution amount for periodic contributions made into the retirement account being displayed in the first graphical display of the GUI,
the third actionable indicia being configured such that selection of the third actionable indicia results in a third slider bar graphical element being displayed, manipulation of a slider element of the third slider bar graphical element resulting in a change to a selected asset allocation for contributions to the retirement account being displayed in the GUI and the first graphical display of the GUI illustrating an effect of the changed asset allocation, and
wherein each of the first slider bar graphical element, the second slider bar graphical element, and the third slider bar graphical element is a single graphical representation of factors pertaining to contribution levels associated with the change to a selected retirement age, the change to a selected contribution amount, and the change to a selected asset allocation for contributions, respectively;
wherein the GUI has a fourth actionable indicia that is displayable adjacent to the third slider bar graphical element when the third actionable indicia is selected, actuation of the fourth actionable indicia resulting in a display for taking a risk tolerance quiz being displayed in the GUI;
wherein the GUI includes a suggestion indicia to suggest a particular type of asset allocation for the user based on an age of the user, an amount of savings the user already has accumulated for retirement, retirement income streams to which the user is entitled, and results of the risk tolerance quiz.

2. The communication system of claim 1, wherein the GUI also has a fifth actionable indicia, selection of the fifth actionable indicia resulting in a selected contribution level, a selected retirement age, and a selected asset allocation being communicated to the host system for enrollment of the user in the retirement account.

3. The communication system of claim 1, wherein the GUI has a fifth actionable indicia that is displayable adjacent to the third slider bar graphical element when the third actionable indicia is selected, actuation of the fifth actionable indicia resulting in a display for selecting funds purchased using contributions made to the retirement account.

4. The communication system of claim 3, wherein the display for selecting funds purchased using contributions made to the retirement account includes:
a pie chart graphical element illustrating a selected asset allocation having at least one pie piece for stock assets and at least one pie piece for bond related assets;
at least one selectable menu for selecting at least one stock fund; and
at least one selectable menu for selecting at least one bond fund.

5. The communication system of claim 4, wherein the display for selecting funds purchased using contributions made to the retirement account includes actionable indicia for saving selected stock and bond fund information, selection of the actionable indicia being configured to cause data comprising the selected stock fund and bond fund information transmitted to the host system.

6. A method for generating a communication system for a sponsored retirement plan, the method comprising:
  generating a centrally controlled platform comprising a host system in communication with at least one server computer device having hardware comprising at least one processor, at least one non-transitory memory, and at least one transceiver unit, wherein the host system is configured to have a multi-tiered architecture configured to operate with only two real time operating systems, the multi-tiered architecture comprising a web server as a first tier, an application server as a second tier, and a database server as a third tier with a transaction server in communication with the application server;
  placing the host system in communication with at least one party computer device configured to provide information identifying employees that are eligible for enrollment in the retirement plan;
  placing the host system in communication with at least one provider computer device configured to provide information relating to at least one of stock funds and bond funds that are selectable for the retirement plan;
  placing the host system in communication with at least one provider computer device configured to provide information relating to transactions involving at least one of stock funds and bond funds for the retirement plan;
  generating a graphical user interface (GUI) for displaying information to a user of the client computer device; and
  receiving by the host system, within a sponsored retirement plan environment, at least one of employee information data and employee payroll data as input data;
  reconfiguring, by the host system, the input data to output data;
  displaying the output data on the client device via the GUI, wherein the input data is not suitable for display via the GUI and the input data is in part acquisitioned from information stored about at least one employee;
  defining the GUI by data sent by the host system such that enrollment in a retirement plan, wherein manipulation of the GUI by use of at least one input device of the client computer device communicates data to the host system for enrolling the user in the retirement plan;
  displaying a first enrollment display via the GUI that includes a first graphical display projecting an estimated value of a retirement account over a future time period;
  displaying via the first enrollment display a plurality of actionable indicia that comprises a first actionable indicia, a second actionable indicia, and a third actionable indicia, wherein:
    the first actionable indicia is configured such that selection of the first actionable indicia results in a first slider bar graphical element being displayed, and manipulation of a slider element of the first slider bar graphical element results in a change to a selected retirement age being shown in the first graphical display of the GUI;
    the second actionable indicia is configured such that selection of the second actionable indicia results in a second slider bar graphical element being displayed, and manipulation of a slider element of the second slider bar graphical element results in a change to a selected contribution amount for periodic contributions made into the retirement account being displayed in the first graphical display of the GUI;
    the third actionable indicia is configured such that selection of the third actionable indicia results in a third slider bar graphical element being displayed, and manipulation of a slider element of the third slider bar graphical element results in a change to a selected asset allocation for contributions to the retirement account being displayed in the GUI, wherein the first graphical display of the GUI illustrates an effect of the changed asset allocation; and
    each of the first slider bar graphical element, the second slider bar graphical element, and the third slider bar graphical element is a single graphical representation of factors pertaining to contribution levels associated with the change to a selected retirement age, the change to a selected contribution amount, and/or the change to a selected asset allocation for contributions, respectively;
  displaying a fourth actionable indicia adjacent to the third slider bar graphical element when the third actionable indicia is selected, actuation of the fourth actionable indicia resulting in a display for taking a risk tolerance quiz being displayed in the GUI;
  displaying a suggestion indicia to suggest a particular type of asset allocation for the user based on age of the user, an amount of savings the user already has accumulated for retirement, retirement income streams to which the user is entitled, and results of the risk tolerance quiz.

7. The method of claim 6, wherein the GUI also has a fifth actionable indicia, and selection of the fifth actionable indicia results in a selected contribution level, a selected retirement age, and a selected asset allocation being communicated to the host system for enrollment of the user in the retirement account.

8. The method of claim 6, wherein the GUI also has a fifth actionable indicia that is displayable adjacent to the third slider bar graphical element when the third actionable indicia is selected, and actuation of the fifth actionable indicia results in a display for selecting funds purchased using contributions made to the retirement account.

9. The method of claim 8, wherein the display for selecting funds purchased using contributions made to the retirement account includes:
  a pie chart graphical element illustrating a selected asset allocation having at least one pie piece for stock assets and at least one pie piece for bond related assets;
  at least one selectable menu for selecting at least one stock fund; and
  at least one selectable menu for selecting at least one bond fund.

10. The method of claim 9, wherein the display for selecting funds purchased using contributions made to the retirement account includes actionable indicia for saving selected stock and bond fund information, and selection of the actionable indicia causes data comprising the selected stock fund and bond fund information transmitted to the host system.

11. The method of claim 9, wherein the GUI also has a sixth actionable indicia that is displayable adjacent to the third slider bar graphical element when the third actionable indicia is selected, and actuation of the sixth actionable indicia results in a display for taking a risk tolerance quiz being displayed in the GUI.

12. The method of claim 6, wherein the GUI also has a fifth actionable indicia that is displayable adjacent to the third slider bar graphical element when the third actionable indicia is selected, and actuation of the fifth actionable indicia results in a display for taking a risk tolerance quiz being displayed in the GUI.

* * * * *